United States Patent
Bent, II

(10) Patent No.: US 11,610,260 B1
(45) Date of Patent: Mar. 21, 2023

(54) SYSTEM, METHOD AND PROGRAM PRODUCT TO TRANSFER, ALLOCATE AND TRACK OWNERSHIP INTERESTS IN AGGREGATED ACCOUNTS

(71) Applicant: Island Intellectual Property, LLC, Manhasset, NY (US)

(72) Inventor: Bruce R. Bent, II, New York, NY (US)

(73) Assignee: ISLAND INTELLECTUAL PROPERTY LLC, Manhasset, NY (US)

( * ) Notice: Subject to any disclaimer, the term of this patent is extended or adjusted under 35 U.S.C. 154(b) by 36 days.

(21) Appl. No.: 17/104,172

(22) Filed: Nov. 25, 2020

Related U.S. Application Data

(60) Provisional application No. 63/008,250, filed on Apr. 10, 2020, provisional application No. 62/966,876, filed on Jan. 28, 2020.

(51) Int. Cl.
  *G06Q 40/02* (2012.01)
  *G06F 9/46* (2006.01)

(52) U.S. Cl.
  CPC ............. *G06Q 40/02* (2013.01); *G06F 9/466* (2013.01)

(58) Field of Classification Search
  None
  See application file for complete search history.

(56) References Cited

U.S. PATENT DOCUMENTS

| | | | |
|---|---|---|---|
| 5,826,241 A | 10/1998 | Stein et al. | |
| 6,154,732 A | 11/2000 | Tarbox | |
| 7,366,695 B1 | 4/2008 | Allen-Rouman et al. | |
| 7,502,758 B2 | 3/2009 | Burke | |
| 7,707,106 B1 | 4/2010 | Swanson et al. | |
| 7,849,003 B2 | 12/2010 | Egnatios et al. | |
| 7,865,435 B1 | 1/2011 | Medina, III | |
| 7,890,424 B1 | 2/2011 | Wakim et al. | |
| 7,996,308 B1 * | 8/2011 | Bent .................. G06Q 20/10 | 705/35 |
| 8,015,084 B1 | 9/2011 | Hirka et al. | |
| 8,036,984 B2 | 10/2011 | Elterich | |
| 8,055,557 B2 | 11/2011 | Sorbe et al. | |
| 8,069,113 B2 | 11/2011 | Elterich | |

(Continued)

FOREIGN PATENT DOCUMENTS

| | | |
|---|---|---|
| AU | 2001286897 | 3/2002 |
| WO | 2002021374 | 3/2002 |

OTHER PUBLICATIONS

Retail sweep programs. (1997). Federal Reserve Bulletin, 83(11), 870. Retrieved from https://dialog.proquest.com/professional/docview/219561390?accountid=131444 on Dec. 1, 2022 (Year: 1997).*

(Continued)

*Primary Examiner* — Kito R Robinson
(74) *Attorney, Agent, or Firm* — Amster, Rothstein & Ebenstein LLP

(57) ABSTRACT

The present invention generally relates to computer systems, methods and program products for allocation of client funds in a sweep product using segregated aggregated deposit accounts. The present invention also generally relates to computer systems, methods, and program products for the tracking of ownership in federally insured accounts with more than one ownership interest.

20 Claims, 35 Drawing Sheets

(56) References Cited

U.S. PATENT DOCUMENTS

| | | | |
|---|---|---|---|
| 8,095,446 B2 | 1/2012 | Green et al. | |
| 8,108,272 B2 | 1/2012 | Sorbe et al. | |
| 8,121,943 B2 | 2/2012 | Elterich | |
| 8,200,554 B1 | 6/2012 | Foss et al. | |
| 8,234,188 B1 | 7/2012 | Phillips et al. | |
| 8,244,611 B2 | 8/2012 | Galit | |
| 8,260,705 B1* | 9/2012 | Bent | G06Q 40/06 705/40 |
| 8,275,703 B1 | 9/2012 | Billman | |
| 8,306,912 B2 | 11/2012 | Galit | |
| 8,326,766 B2 | 12/2012 | Hirka et al. | |
| 8,364,586 B1 | 1/2013 | Medina, III | |
| 8,392,299 B2 | 3/2013 | Sorbe et al. | |
| 8,392,304 B1 | 3/2013 | Phillips et al. | |
| 8,392,330 B2 | 3/2013 | Sorbe et al. | |
| 8,429,074 B2 | 4/2013 | Galit | |
| 8,452,702 B1 | 5/2013 | O'Donnell | |
| 8,458,089 B1 | 6/2013 | Is | |
| 8,498,933 B1 | 7/2013 | Bent et al. | |
| 8,521,569 B1 | 8/2013 | Bent | |
| 8,560,442 B1 | 10/2013 | Bent et al. | |
| 8,566,200 B1 | 10/2013 | Bent et al. | |
| 8,566,201 B1 | 10/2013 | Bent et al. | |
| 8,571,960 B1 | 10/2013 | Bent et al. | |
| 8,571,984 B1 | 10/2013 | Bent et al. | |
| 8,583,515 B2 | 11/2013 | Sorbe et al. | |
| 8,583,545 B1 | 11/2013 | Bent et al. | |
| 8,589,289 B1* | 11/2013 | O'Donnell | G06Q 40/02 705/35 |
| 8,589,295 B2 | 11/2013 | Sorbe et al. | |
| 8,606,676 B1 | 12/2013 | Bent et al. | |
| 8,612,324 B1 | 12/2013 | Bent et al. | |
| 8,630,943 B2 | 1/2014 | Maricondi | |
| 8,655,689 B1 | 2/2014 | Gareis | |
| 8,660,928 B2 | 2/2014 | Green | |
| 8,666,887 B2 | 3/2014 | Elterich | |
| 8,682,730 B2 | 3/2014 | Hirka et al. | |
| 8,688,577 B1 | 4/2014 | Bent | |
| 8,712,911 B1 | 4/2014 | Bent et al. | |
| 8,719,062 B1 | 5/2014 | Bent et al. | |
| 8,719,157 B1 | 5/2014 | Bent et al. | |
| 8,781,931 B1 | 7/2014 | Bent et al. | |
| 8,788,409 B1 | 7/2014 | Souza | |
| 8,788,414 B2 | 7/2014 | Sorbe et al. | |
| 2003/0065642 A1 | 4/2003 | Zee | |
| 2004/0153400 A1 | 8/2004 | Burke | |
| 2005/0044035 A1 | 2/2005 | Scott | |
| 2005/0149436 A1 | 7/2005 | Elterich | |
| 2005/0177496 A1 | 8/2005 | Blagg et al. | |
| 2006/0282356 A1 | 12/2006 | Andres et al. | |
| 2007/0198404 A1 | 8/2007 | Hirka et al. | |
| 2009/0043699 A1 | 2/2009 | Elterich | |
| 2009/0043701 A1 | 2/2009 | Elterich | |
| 2009/0055313 A1 | 2/2009 | Elterich | |
| 2009/0119227 A1 | 5/2009 | Green et al. | |
| 2009/0150284 A1 | 6/2009 | Burke | |
| 2009/0164320 A1 | 6/2009 | Galit | |
| 2009/0164350 A1 | 6/2009 | Sorbe et al. | |
| 2009/0164351 A1 | 6/2009 | Sorbe et al. | |
| 2009/0164352 A1 | 6/2009 | Sorbe et al. | |
| 2009/0164353 A1 | 6/2009 | Sorbe et al. | |
| 2009/0164368 A1 | 6/2009 | Galit | |
| 2009/0164370 A1 | 6/2009 | Sorbe et al. | |
| 2010/0274687 A1 | 10/2010 | Ghosh et al. | |
| 2011/0131103 A1 | 6/2011 | Hirka et al. | |
| 2012/0016782 A1 | 1/2012 | Hardison, III | |
| 2012/0041875 A1 | 2/2012 | Sorbe et al. | |
| 2012/0047066 A1 | 2/2012 | Sorbe et al. | |
| 2012/0078750 A1 | 3/2012 | Watkins | |
| 2012/0179628 A1 | 7/2012 | Green | |
| 2013/0030971 A1 | 1/2013 | Weiss et al. | |
| 2013/0030974 A1 | 1/2013 | Casey et al. | |
| 2013/0066702 A1 | 3/2013 | Galit | |
| 2013/0159152 A1 | 6/2013 | Minor et al. | |
| 2013/0179339 A1 | 7/2013 | Sorbe et al. | |
| 2013/0232080 A1 | 9/2013 | Galit | |
| 2013/0238505 A1 | 9/2013 | Hirka et al. | |
| 2014/0012726 A1 | 1/2014 | Kruse | |
| 2014/0052625 A1 | 2/2014 | Sorbe et al. | |
| 2014/0143140 A1 | 5/2014 | Elterich | |
| 2014/0180962 A1 | 6/2014 | Fiala et al. | |
| 2014/0188737 A1 | 7/2014 | Salah et al. | |
| 2014/0344158 A1 | 11/2014 | Hirka et al. | |

OTHER PUBLICATIONS

U.S. Appl. No. 14/179,096, filed Feb. 12, 2014, Island Intellectual Property LLC.
U.S. Appl. No. 14/268,479, filed May 2, 2014, Island Intellectual Property LLC.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 1996 or earlier; 10 pgs.
Product Bulletin from Bill McCain, Subject: Insured Savings Product Announcement, May 8, 1989, 7 pgs.
Insured Savings Project Team Meeting, Feb. 2, 1989, 16 pgs.
Insured Savings Product Description, Product Name: Insured Savings, Product Description: U.S. Pat. No. 4,985,833, 3 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City-Austin deposit program to hold existing customers' deposits, Mar. 17, 1988, 7 pgs.
Insured Savings Remote Site Sweep Procedures, 3 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, Jul. 17, 1990; 1 pg.
Addendum to Insured Savings Agency Agreement, Jul. 17, 1990; 1 pg.
Letter to Paula Martin, Jul. 3, 1990, 1 pg.
Letter to John Lovell, Jul. 3, 1990, 1 pg.
Insured Savings Balance Limits form, 1996 or earlier; 1 sheet.
Email from John Oncken re: Depository Levels at Insured Savings Depositories, Nov. 2, 1989, 1 pg.
Cash Management Balance Monitoring Agreement Form; 1996 or earlier; 1 sheet.
Memorandum from Ed Piner, Subject: Discontinuation of Automatic Balance Monitoring in conjunction with Insured Savings Accounts, May 21, 1991, 1 pg.
Blank form letter from Edward N. Piner, May 24, 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Letter From William W. Wiles, Secretary of the Board, Board of Governors of the Federal Reserve System, Jun. 22, 1983, 6 Sheets.
Letter From Oliver I. Ireland, Associate General Counsel, Board of Governors of the Federal Reserve System, Jun. 22, 1988, 5 Sheets.
Alliance Insured Account, Information Statement, Sep. 1999, 6 sheets.

(56) References Cited

OTHER PUBLICATIONS

Lawsuit by Carlo DeBlasio et al. and Merrill Lynch & Co., Inc. et al., Opinion and Order, Jul. 27, 2009, Civil Action No. 07 CIV. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.
Investors MoneyAccount[SM] and Insurance Plus Service Agreement, Schedule A, Mar. 1994; 3 sheets.
Investors MoneyAccount[SM] (an FDIC-insured money market account), Apr. 1996; 4 sheets.
Investors MoneyAccount[SM] The FDIC-Insured Money Market with an Important Plus., Apr. 1996; 2 sheets.
Investment Company Act of 1940—Section 3(a)(1), 2(a)(36); Securities Act of 1933—Section 2(1), Nov. 29, 1985, Kempter Financial Services, Inc., 9 pgs.
Insured Money Account Program Agreement and Disclosure Statement, Mar. 2000; 11 sheets.
First National Bank in Brookings, Certificates of Deposit, Jul. 17, 2009 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93—35, Jun. 28, 1993, 2 sheets.
§204.134, 12 CFR Ch. 11 (Jan. 1, 09 Edition), 2 sheets.
Money Fund $$ Moving to Bank Deposits, 6 *FRC Monitor*, Dec. 2003, 2 sheets.
Crane, P. & Krasner, Mike, *An iMoney Net Special Report*™ , "Brokerage Cash Sweep Options: The Shift from Money Funds to FDIC-Insured Bank Deposit Accounts", Nov. 2004, 64 pgs.
The May 1998 Senior Financial Officer Survey, *Board of Govenors of the Federal Reserve System*, with Appendix A, 48 pgs.
Interest Rate Review© A Publication of *Meyer Weekly Interest Rate Survey*, A Look At Tiers, vol. II, No. 4, Apr. 1987, 6 pgs.
Interest Rate Review© A Publication of *Meyer Weekly Interest Rate Survey*, A Study of Historical Rates and Yields, vol. II, No. 6, Jun. 1987, 8 pgs.
Blank form letterto Oliver Ireland, Oct. 7, 1994, 1 pg.
Letterto L.P. Fleming, Jr. Esq., Feb. 7, 1995, 3 pgs.
Letter to James E. Creekman, Aug. 1, 1995, 4 pgs.
Letterto Brenda L. Skidmore, Aug. 30, 1995, 4 pgs.
Merrill Lynch & Co., Inc. Form 10-K405 (Annual Report (Regulation S-K, item 405)), Filed Mar. 14, 02 for the Period Ending Dec. 28, 2001, with Schedules, Exhibits, and 2001 Annual Report, 248 pgs.
Merrill Lynch & You, "Financial Services The Way You Want, When You Want Them," Jan. 2000 4 Sheets.
Merrill Lynch, Pierce, Fenner & Smith Incorporated, "Information Statement," 2000, 12 Sheets.
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", *On Wall Street*, Nov. 2000, 1 sheet.
Quest Insured Account, *QUESTessentials*, May 17, 1994; 3 sheets.
Quest Insured Account, *Information Statement*, 5 sheets.
OCC Insured Bank Deposit Account, Jun. 1993; 3 sheets.
Insured Bank Deposit Account, *Information Statement*, Jul. 1, 2000, 2 sheets.
Letter from Marilyn J. Hensle, announcing Salomon Smith Barney Bank Deposit Program.[SM], with Q&A, Aug. 16, 2000; 14 sheets.
Bank Deposit program Disclosure Statement, *Salomon Smith Barney*, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.

The Merrill Lynch Cash Management Account, Financial Service, 1982; 18 pgs.
The Insured Savings Account, Issuer Guide to Offering MMDAs through Merrill Lynch, Jul. 1986; 27 pgs.
Insured Savings Account Fact Sheet, The Merrill Lynch Cash Management Account Financial Service, Apr. 1987, 11 pgs.
CMA Insured Savings Account Fact Sheet, Jul. 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, *American Banker*, Dec. 6, 2000, 2 pgs.
Insured Deposit Account (IDA), May 21, 1996, 11 pgs.
An Introduction to the Smith Barney *Insured Deposit Account*, 1995, 8 pgs.
Memorandum from Ted Hamilton re: Insured Deposit Account, Oct. 10, 1995, 13 pgs.
The Insured Deposit Account: "*Money in the Bank*", 1997, 2 sheets.
Merrill Joins Money Market Account, CMA; Broker Begins Testing With 12 Institutions, *Lexis Nexis*, Sep. 23, 1983, 4 pgs.
Form 8-K Merill Lynch & Co Inc—MER, Filed: Mar. 7, 2002, Report of unscheduled material events or corporate changes, 41 pgs.
Lawsuit by *Island Intellectual Property LLC and Intrasweep LLC* against *Deutsche Bank Trust Company Americas and Total Bank Solutions*, Complaint for Patent Infringement, Jury Trial Demanded, Feb. 23, 2010, Case No. 10 CV 1518, (Document 1).
Lawsuit by *Island Intellectual Property LLC and Lids Capital LLC* against *Deutsche Bank Trust Company Americas and Total Bank Solutions*, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Federally "Insured Deposit Program", AmVest Capital, 1 sheet.
Federally Insured Deposit Program for Banks, AmVest capital, Jan. 15, 2010, 2 sheets.
Flow Chart, AmVest Capital, Dec. 9, 2009, 1 sheet.
Flow of Business for Federally Insured Deposit Program "FIDP", Deutsche Bank & Trust Company of the Americas, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.
Scott & Stringfellow starts correspondent clearing business, News Release BB&T, Nov. 13, 2007, 2 sheets.
Curian Capital Introduces Custom Wealth Platform, Market Watch, Aug. 18, 2009, 3 pgs.
Ellie Behling, Curian Capital Introduces Custom Wealth Platform, Nov. 10, 2009, 3 sheets.
Curian Capital Introduces Custom Wealth Platform, Reuters, Aug. 18, 2009, 3 pgs.
Curian Capital Introduces Custom Wealth Platform, WSJ.com, Aug. 18, 2009, 3 pgs.
Curian Capital, LLC: Private Company Information, Business Week, Nov. 10, 2009, 3 pgs.
Curian Capital Introduces Custom Wealth Platform, Yahoo! Finance, Aug. 18, 2009, 3 pgs.
Bank Insured Deposit Program, D.A. Davidson & Co., Jan. 15, 2010, 2 sheets.
Bank Insured Deposit Program, D.A. Davidson & Co., Nov. 2, 2009, 2 sheets.
D.A. Davison & Co., Bank Insured Deposit Program, Disclosure Statement, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio Investing: Brokerage Features » Cash Investments» FDIC. Plus Program, Jan. 14, 2010, 3 pgs.

(56) References Cited

OTHER PUBLICATIONS

Folio Investing: Brokerage Features » Cash Investments» Cash Seep Rates, Jan. 14, 2010, 2 sheets.
Folio Investing: Brokerage Features » Cash Investments» Cash Seep Banks, Jan. 15, 2010, 3 pgs.
Folio Investing: Brokerage Features » Cash Investments» Cash Sweep FAQ, Jan. 14, 2010, 3 pgs.
Folio Investing: Brokerage Features » Cash Investments» Cash Sweep FAQ, Jan. 18, 2010, 2 sheets.
Folio Investing: Brokerage Features » Cash Investments» Cash Sweep FAQ, Jan. 15, 2010, 2 sheets.
Folio Investing: Brokerage Features » Cash Investments» Sweep Terms & Conditions, Jan. 14, 2010, 2 sheets.
H.C. Denison Company, Sheboygan, WI, retrieved from internet Nov. 2, 2009; 1 sheet.
The LYRA Program with H.C. Denison Company, Sheboygan Wisconsin, Jan. 15, 2010, 2 sheets.
Current LYRA Program Rates, H.C. Denison Co., Jan. 15, 2010, 1 sheet.
Current LYRA Program Rates, H.C. Denison Co., Nov. 2, 2009, 1 sheet.
Current LYRA Program Banks, H.C. Denison Co. LYRA Program, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
Current Rates, http://currentrates.hillard.com/ Jan. 6, 2010, 1 sheet.
Current Rates, http://currentrates.hillard.com/ Nov. 2, 2009, 1 sheet.
Current Rates, Market Info, Hilliard Lyons, Nov. 2, 2009, 4 pgs.
Legent Insured Deposit, www.legentclearing.co/mmf/phf, Nov. 2, 2009, 2 sheets.
Legent Insured Deposit Program—Summary of Terms and Conditions, Nov. 2008, 4 pgs.
Investment Account Application, Cleared Through Legent Clearing, May 2006; 2 sheets.
Customer Agreement, Cleared Through Legent Clearing, May 2006; 3 pgs.
Cash Management, Mesirow Financial—B/D and IA Services, www.mesirowfinancial.com/bdia/cas_mgmt.jsp, Jan. 15, 2010, 2 sheets.
Frequently Asked Questions: FDIC Sweep Program, optionsXpress, retrieved from internet Jan. 6, 2010; www.optionsxpress.com/welcom/faq/aq/fdc.aspx#rate.
Terms & Conditions for optionsXpress' Bank Insured Deposit Program, optionsXpress, Oct. 14, 2009; 6 pgs.
Frequently Asked Questions: FDIC Sweep Program, optionsXpress, www.optionsxpress.com/welcom/faq/fdic.aspx, Jan. 6, 2010, 3 pgs.
Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www.pershing.com/rates.html, Jan. 6, 2010m 6 pgs.
Money Market Mutual Fund and FDIC-Insured Deposit Program Rates & Bank List, Jan. 5, 2010; www.pershing.com/rates.html, 1 sheet.
Clearing firms used by the top independent broker-dealers, Investment News, www.investmentnews/article/20081214/CHART/812119919, Jan. 15, 2010, 4 sheets.
Objective investment advice Building trust, Wayne Strout, www.waynestrout.com/more)info, Jan. 18, 2010, 5 pgs.
Eagle sweep disclosure, first republic Securities Company, Jun. 1, 2009, 12 pgs.
The financial organizer, ProCash Plus, Apr. 2007; 12 pgs.
Insured deposit account program disclosure booklet, 16 pgs.
UPDATE New FDIC product at IPI: Deutsche Bank Insured Deposit Program, Investment Professionals INC, Feb. 4, 2009, 11 pgs.
Insured cash account, , http://lplfinancial.lpl.com/x68.xml, with LPL Financial insured cash account program disclosure booklet, LPL Financial Jan. 15, 2010, 23 pgs.
FAQs about the Deutsche Bank insured deposit program, Securities America, Jul. 17, 2009; 3 pgs.
Insured deposit program, www.aigadvisorgroup.com/fdic/03.04.09.htm, Jan. 15, 2010, 3 pgs.
Flexinsured Account$^{SM}$, PrimeVest, http://primevest.com/flexInsured_account.asp, Jan. 14, 2010, 1 sheet.
FlexInsured$^{SM}$ Account disclosure statement, PrimeVest, 2009, 5 pgs.
An independent broker-dealer, Royal Alliance, http://www.royalalliance.com, Jan. 15, 2010, 1 sheet.
Brokerage products and services, www.steerneagee.com/sali/pcg/pages/products-services.aspx, Nov. 4, 2009, 2 sheets.
Client account agreement to Sterne Agee Clearing, INC, Sterne, Agee & Leach, Inc and its authorized agents, Feb. 3, 2009, 5 pgs.
Valet a full service asset management account, http://valetaccount.com/visaTerms.php, Nov. 12, 2009, 6 pgs.
We have your banking needs covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/english/FDIC.asp, Nov. 10, 2009, 1 sheet.
Safe sound secure insured deposit programs, East West Bank, www.eastweatbank.com/English/SS_SIDPrograms.asp, Jan. 15, 2010, 2 sheets.
Money market insured deposit program, East West Bank, www.eastweatbank.com/English/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Francisco, UCB, www.ibankunited.com/home.html, Nov. 12, 2009, 1 sheet.
Money market insured deposit program, Desert Community Bank, www.dck.org/MMarket_insured.html, Nov. 12, 2009, 1 sheet.
Insured deposit program bank list, www.dcbk.org/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.
Protect your cash portfolio!, http://insureddepositsonline.com, Jan. 15, 2010, 1 sheet.
Protect your cash portfolio!, www.insureddepositsonline.com/component/option.com_frontpage/Itemid,1/, Nov. 2, 2009, 1 sheet.
Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.
This new bank is over 80 years old, Insured Deposit Program, Evolve Bank & Trust, www.insureddepositsonline.com/content/view/44/116/, Nov. 2, 2009, 1 sheet.
Temporary liquidity guarantee program, Evolve Bank & Trust, www.getevolved.com/index.php?option=com_content&task=view&id=67&itemid=263, Nov. 2, 2009, 1 sheet.

(56) References Cited

OTHER PUBLICATIONS

Contact us, Insured Deposit Program, Evolve Bank & Trust, www.insureddepositsonline.com/content/view/40/119/, Nov. 2, 2009, 1 sheet.
Over $12,5 million of FDIC deposit insurance available, Insured Deposit Program, Deutsche Bank, Apr. 2009; www.insureddepositsonline.com, 1 sheet.
How the program works, Insured deposit program, Evolve Bank & Trust, www.insureddepositsonline.com/content/view/47/112/, Nov. 4, 2009, 11 pgs.
Insured deposit online, Deutsche Bank Insured Deposit Program, list of program banks, retrieved from internet May 14, 2009; 2 sheets.
Insured deposit online, The Insured Deposit Program, Evolve Bank & Trust, retrieved from internet Apr. 3, 2009; 2 sheets.
Insured deposit online, Frequently asked questions, Evolve Bank & Trust, www.insureddepositsonline.com/content/section/3/71, May 14, 2009, 3 pgs.
Insured deposit online, The Insured Deposit Program, Evolve Bank & Trust, Apr. 3, 2009, 2 pgs.
Personal Banking, Insured Deposit Program, Pulaski Bank, www.pulaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm, Jan. 26, 2010, 2 sheets.
Personal Banking, Insured Deposit Program, Pulaski Bank, www.pulaskibankstl.com/personal/checking-personalinsured.htm, Dec. 8, 2009, 1 sheet.
Personal Banking, Insured Deposit Program, Pulaski Ban, www.pulaskibankstl.com/personal/checking-personalinsured.htm, May 14, 2009, 1 sheet.
Who can benefit from the insured deposit program?, Insured Deposit Program, Pulaski Bank, Apr. 2009; 2 sheets.
Total Bank Solutions, Deposit Institutions, www.totalbanksolutions.com/deposit.cfm, Jan. 15, 2010, 2 sheets.
Total Bank Solutions, Insured Deposit Program, www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.
Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep Program, www.totalbanksolutions.com/insured-deposit.cfm, Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.
Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, Broker Sweep Program, www.totalbanksolutions.com/brokerweep.htm, Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Christopher McCrum, LinkedIn, http://74.125.93.132/search?=cache:5hs9cebUSjgJ:www.linkedin.com/pub/christopher-mccrum/ . . . , Nov. 2, 2009, 2 sheets.
Kentucky Bankers Association, Alternative for excess deposit coverage FREE Webiners, http://209.235.145/cgi-bin/websuite/tcsassnwebsuite.pl? . . . , Nov. 2, 2009, 2 sheets.
Kentucky Bankers Association Detailed listening, http://member.kybanks.com/source/members . . . , Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_qn4182/is_20081128/ai_n31055289/, Nov. 2, 2009, 2 sheets.
Deutsche Bank, Deutsche Bank insured deposit program, Dec. 18, 2009; 3 pgs.
Deutsche Bank Insured Deposits, Bank list as of Dec. 18, 2009, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
CD's pass agencies as largest holding in MMFs: Repo plunges in sept., www.cranedata.us/archives/news/2009/10/, Nov. 3, 2009, 14 pgs.
Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalidity Contentions, Mar. 12, 2010, Civil Action No. 09 Civ. 2675 (VM) (AJP).
Lawsuit by Island Intellectual Property LLC and Intrasweep LLC against Institutional Defendant Corp., Institutional Deposits Corp.'s Preliminary Invalidity Contentions, Mar. 15, 2010; Case No. 09-CV-03079-JEC.
Exhibit 1, Invalidity Chart: IMA and Insurance Plus Service Agreement, U.S. Pat. No. 7,509,286, 21 pgs.
Exhibit 2, Invalidity Chart: Investors Money Account$^{SM}$ System, U.S. Pat. No. 7,509,286, 26 pgs.
Exhibit 3, Invalidity Chart: Insured Money Account System, U.S. Pat. No. 7,509,286, 26 pgs.
Exhibit 4, Invalidity Chart: U.S. Pat. No. 4,985,833 (Oncken), U.S. Pat. No. 7,509,286, 21 pgs.
Exhibit 5, Invalidity Chart: First City Bank of Texas' Insured Savings Program, U.S. Pat. No. 7,509,286, 39 pgs.
Exhibit 6, Invalidity Chart: Quest Insured Account, U.S. Pat. No. 7,509,286, 19 pgs.
Exhibit 7, Invalidity Chart: CIBC World Markets—Insured Bank Deposit Account, U.S. Pat. No. 7,509,286, 16 pgs.
Exhibit 8, Invalidity Chart: Merrill Lynch CMA/ISA Service, U.S. Pat. No. 7,509,286, 72 pgs.
Exhibit 9, Invalidity Chart: 1983 Fed Letter, U.S. Pat. No. 7,509,286, 16 pgs.
Exhibit 10, Invalidity Chart: Merrill Lynch Banking Advantage Program ("MLBA Program"), U.S. Pat. No. 7,509,286, 22 pgs.
Exhibit 11, Invalidity Chart: Merrill Lynch & You + MLBA Information Statement, U.S. Pat. No. 7,509,286, 18 pgs.
Exhibit 12, Invalidity Chart: Smith Barney Insured Deposit Account, U.S. Pat. No. 7,509,286, 22 pgs.
Exhibit 13, Invalidity Chart: Smith Barney Bank Deposit Program, U.S. Pat. No. 7,509,286, 18 pgs.
Exhibit 14, Invalidity Chart: Alliance Insured Account, U.S. Pat. No. 7,509,286, 16 pgs.
Exhibit 15, Invalidity Chart: Reserve's American Express Presentation, U.S. Pat. No. 7,509,286, 16 pgs.
Exhibit 16, Invalidity Chart: U.S. Pat. No. 7,376,606 (Jacobsen), U.S. Pat. No. 7,536,350, 6 pgs.
Exhibit 17, Obviousness Combinations Chart, U.S. Pat. No. 7,509,286, 351 pgs.
Lawsuit by *Island Intellectual Property LLC et al.* v. *Deutsch BankTrust Company Americas, et al.*; Defendant Deutsche Bank Trust Company Americas' Second Supplemental Responses to Double Rock's Interrogatories Nos. 2, 8 and 9, Jul. 2010, 65 pages.

(56) References Cited

OTHER PUBLICATIONS

Exhibit 2, Invalidity Chart: U.S. Pat. No. 4,985,833 (Oncken)—U.S. Pat. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
Letter to R.M. Zaitzeff, from W.W. Wiles, dated Jun. 22, 1983 (response to May 10, 1983 letter re: offering of MMDAs), 6 pages.
Letter to G.T. Schwartz, from O.I. Ireland, dated Jun. 22, 1988 (response to Dec. 18, 1987 letter re: proposed modifications to Merrill Lynch's CMA Program), 5 pages.
Information Statement, "Alliance Insured Account," Sep. 1999; 6 pages.
Investors MoneyAccountSM and Insurance Plus Service Agreement, attached Schedule A (List of Banks Participating in the Insurance Plus Service), IMAD Mar. 1994, 3 pages.
Investors Money AccountSM (an FDIC-insured money market account), IMA-1; Mar. 1994, 4 pages.
Investors MoneyAccountSM, "The FDIC-Insured Money Market Investment with an Important Plus," IMA Oct. 1995, 2 pages.
1985 SEC No. Act. LEXIS 2756, Investment Company Act of 1940—Section 3(a)(1), 2(a)(36); Securities Act of 1933—Section 2(1), Nov. 29, 1985, Kemper Financial Services, Inc., 9 pages.
Insured Money Account Program Agreement and Disclosure Statement, (attached Schedule A—Deposit Account Terms), faxed Mar. 28, 2000; 10 pages.
First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL:http://web.archive.org/web/20000524132934/www.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6 FRC Monitor, Dec. 2003, 2 pages.
Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.
Interest Rate Review, A Publication of the Meyer Weekly Interest Rate Survey, "A Look et Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action, U.S. Appl. No. 10/071,053, with attached SB08, date considered Mar. 10, 2009, 2 pages.
Merrill Lynch & You, "Financial Services The Way You Want, When You Want Them," Jan. 2000, 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Appl. No. 11/,767,827, Date Mailed Sep. 23, 2009, 4 pages.
USPTO Office Action, Office Action Summary, U.S. Appl. No. 11/767,827, Date Mailed Jun. 5, 2009, 35 pages.
Services Mark Application, Applicant: Reserve Management Corporation, Mark: Reserve Insured Deposits, (attached Power of Attorney, Declaration, Drawing Page, Sep. 21, 2001, 6 pages.
Letter to C.R. Macedo, from R.L. Rainey, Re: Promontory Interfinancial Network, LLC, dated Jul. 22, 2008, (attached Attachements A-E), 35 pages.
Letter to C.R. Macedo, from R.L. Rainey, Re: Promontory Interfinancial Network, LLC, dated Oct. 16, 2008, (attached Attachements A-C), 22 pages.
Letter to C.R. Macedo, from R.L. Rainey, Re: Promontory Interfinancial Network, LLC, dated Feb. 23, 2009, (attached Exhibit A-B), 21 pages.
Merrill Lynch & Co., Inc., Form 10-K405 (annual Report (Regulation S-K, item 405)), Filed Mar. 14, 2002 for the Period Ending Dec. 28, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit Program$^{SM}$, (attached Q&A: Important Information about the New Salomon Smith Barney Bank Deposit Program), Aug. 16, 2002, 14 pages.
Salomon Smith Barney, "Bank Deposit Program Disclosure Statement," 3 pages.
FDIC, FDIC Law, Regulations, Related Acts—4000—Advisory Opinions, Oct. 22, 1987, J. W. Via, Jr., Counsel [online] [Retrieved on Jan. 22, 2010]. Retrieved from the Internet: URL: <http://www.fdic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.
Merrill Lynch—Pierce, Fenner & Smith, Inc., "The Merrill Lynch Cash Management Account®," Financial Service, Jan. 1985, 18 pages.
Merrill Lynch, "Insured Savings.TM. Account Fact Sheet," The Merrill Lynch Cash Management Account® Financial Service, 1987; 11 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved form the Internet: <URL: http://www.americanbanker.com/printthis.html?id=2000120603YJGEZD>, 2 pages.
The Insured Deposit Account: "Money in the Bank," p. 5; Three Little Letters. Three Big Ways to Save in 1998, p. 4.
LexisNexis, The American Banker, Sep. 23, 1983, Merrill Joins Money Market Account, CMA; Broker Begins Testing With 12 Institutions, Byline: A. Arvan, 4 pages.
Merrill Lynch & Co Inc—MER, 10k Wizard, Form 8-K, "Report of Unscheduled Material Events or Corporate Changes," Filed Mar. 7, 2002, 51 pages.
Federal Reserve System, LEXSEE 51 FR 9632, "Definition of Deposit and Technical Amendments," Action: Final Rule, Mar. 20, 1986, 13 pages.
Federal Reserve System, LEXSEE 56 FR 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition), pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, LEXSEE 47 FR 55207, "Reserve Requirements of Depository Institutions; Money Market Deposit Account," Dec. 8, 1982, Action: Fianal Rule, 5 pages.

(56) References Cited

OTHER PUBLICATIONS

Insured Bank Deposits™ Program Summary Information Statement, Feb. 2005; 11 pages.
Insured Bank Deposits™ Program Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 4 pages.
Memorandum to M. Peterson, J. Whitt, R. Wroten, E. Naumes, E. Deal, B. McCain, From J.E. Oncken, Jun. 15, 1990, Re: Insured Savings Update (with attachments), 7 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachements), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital BuilderSM Account Financial Service, Insured Savings$^{SM}$ Account Participating Depository Institutions, 1996, 2 pages.
Insured Deposit Account, May 21, 1996, 14 pages.
An Introduction to the Smith Barney Insured Deposit Account, Sep. 1995; 8 pages.
Smith Barney Inc, Capital Markets, Debt Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
"Man Bites Dog: Funds Move Into Banking," IBC's Money Fund Selector, 2 Sheets, Nov. 6, 1998.
"Reverse Ups Insurance Limit On Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
12 CFR Part 329—Interest on Deposit, Source: 51 FR 10808, Mar. 31, 1986, 5 Sheets.
AB 2011 Assembly Bill—Bill Analysis, Senate Amendments, http://www.leginfo.ca.gov/pub/bill/asm/ab_2001-2050/ab_2011_cfa_20060811_ 161755_asm_floor.html, 2006, pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.
AB 2011 Assembly Bill—CHAPTERED, http://www.leginfo.ca.gov/pub/bill/asm/ab 2001-2050/ab_2011_bill_20060925_chaptered.html, 2006, pp. 1-3.
AB 2011 Assembly Bill—ENROLLED, http://www.leginfo.ca.gov/pub/bill/asm/ab 2001-2050/ab_2011_bill_20060816_enrolled.html, 2006, pp. 1-3.
AB 2011 Assembly Bill—HISTORY, Complete Bill History, http://www.leginfo.ca.gov/pub/bill/asm/ab_2001-2050/ab_2011_bill_20060925_history.html, 2006, p. 1.
About iMoneyNet, Inc., About iMoneyNet's Money Funds Division, 4 Sheets, Aug. 21, 2003, http://www.ibcdata.com/about.htm.
Adler, Joe, "Promontory to Roll Out Deposit Service Insuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Announcing Changes in Automatic "Sweep" Investment Options, LPL Financial Services, Linsco/Private Ledger, Member NASD/SIPC, Jun. 2006; 26 Sheets.
Bank Deposit Program, Online http://web.archive.org/web/20030620100115/http:/www.smithbarney.com/products_servi, Jan. 19, 2001, 4 Sheets.
Bent, "Bruce Bent Makes Money Market Funds Act Like Bank Accounts," Equity BBDP, Oct. 5, 1998, 3 Sheets.
Blackwell, "ABA to Approve System for Sharing Deposit Coverage," American Banker, 2 Sheets, Feb. 11, 2003.
Blackwell, "New Pitch: Deposit Insurance Sharing," American Banker Online, 4 Sheets, Jan. 21, 2003.
Board of Governors of the Federal Reserve System, 1984 Fed. Res. Interp. Ltr. LEXIS 56, Nov. 16, 1984, 3 Sheets.
Board of Governors of the Federal Reserve System, 1988 Fed. Res. Interp. Ltr. LEXIS 141, Jun. 22, 1988, 3 Sheets.
Board of Governors of the Federal Reserve System, 1989 Fed. Res. Interp. Ltr. LEXIS 154, Jun. 21, 1989, 2 Sheets.
Board of Governors of the Federal Reserve System, 1989 Fed. Res. Interp. Ltr. LEXIS 77, Mar. 14, 1989, 2 Sheets.
Board of Governors of the Federal Reserve System, 1990 Fed. Res. Interp. Ltr. LEXIS 94, Feb. 1, 1990, 1 Sheet.
Board of Governors of the Federal Reserve System, 1991 Fed. Res. Interp. Ltr. LEXIS 232, Jan. 30, 1991,2 Sheets.
Board of Governors of the Federal Reserve System, 1994 Fed. Res. Interp. Ltr. LEXIS 156, Jun. 24, 1994, 3 Sheets.
Board of Governors of the Federal Reserve System, 1994 Fed. Res. Interp. Ltr. LEXIS 314, Oct. 17, 1994, 2 Sheets.
Board of Governors of the Federal Reserve System, 1994 Fed. Res. Interp. Ltr. LEXIS 419, Oct. 14, 1994, 4 Sheets.
Britt, "Struggling with Sweep Accounts," America's Community Banker, vol. 6, No. 12, 11 Sheets, Dec. 1, 1997.
California Independent Bankers, ICBA Independent Community Bankers of America, Banker Bulletin, 2006, CIB 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
Certificate of Deposit Registry Service: Keeping Deposits in the Corn Patch, Banknews, 2 Sheets. Mar. 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Chapelle, "Merrill's Rivals Say They, Too. Offer Services Beyond Banking," Securities Data Publishing On Wall Street, 2 Sheets, Feb. 1, 2003.
CMA, Insured Savings Account Fact Sheet, Merrill Lynch, Pierce, Fenner & Smith Incorporated, 1997, pp. 49-57.

(56) References Cited

OTHER PUBLICATIONS

CMA, Insured Savings Account Fact Sheet, Merrill Lynch, Pierce, Fenner & Smith Incorporated, Jul. 1994, pp. 47-54.

CMA, The Investor Credit Line Service, Cost-Effective Financing for the '90s, Merrill Lynch, Pierce, Fenner & Smith Incorporated, 1997, pp. 36-46.

CMA, The Merrill Lynch Cash Management Account Financial Service, Insured Savings Account Participating Depository Institutions, Merrill Lynch, Pierce, Fenner & Smith Incorporated, Mar. 1995, 2 Sheets.

CMA, The Merrill Lynch Cash Management Account Financial Service, Insured Savings Account Participating Depository Institutions, Merrill Lynch, Pierce, Fenner & Smith Incoporated, Nov. 1992, 2 Sheets.

CMA, The Merrill Lynch Cash Management Account Financial Service, Merrill Lynch, Pierce, Fenner & Smith Incorporated, Jan. 1997, 35 Sheets.

Litigation Notice After Payment of Issue Fee filed in Parent U.S. Appl. No. 10/382,946, Apr. 3, 2009, 160 pages.

Coyle, "A Look at commercial Demand Deposit Options," America's Community Banker, vol. 9, Issue 2, Bell & Howell Information and Learning Company, 9 Sheets, Feb. 1, 2000.

Crockett, "Big Banks Found Stepping Up Marketing of 'Sweep' Accounts," American Banker, vol. 159, No. 198, American Banker Inc., 3 Sheets, Oct. 13, 1994.

Declaration of Mr. Bruce Bent II, Vice Chairman and Registrant of Applicant on the date of first commercial use of the service providing interest and FDIC insurance for a checking accounts by means of a system using money market deposit accounts (MMDA's) of Oct. 23, 1997.

Declaration of Mr. Bruce Bent II, Vice Chairman and Registrant of Applicant. (3 Sheets) and Exhibits A, B, C and D, Mar. 1, 2007, (6 Sheets).

Deposit Growth Strategies for Financial Institutions, New Sweep Account Helps Retain $40 Million in Business Deposits, vol. 7, No. 12, The Reserve Funds, May 2001, 1 Sheet.

Deutsche Bank Insured Deposit Program, Marketing Literature 2007, 3 pages.

DI 48, Excerpts of Transcript of Hearing, U.S. Dist. Ct., District of Delaware, Civil Action No. 82-680, Apr. 8, 1983, 5 sheets.

DI 56, Interrog. Response, U.S. Dist. Ct. District of Delaware, Civil Action No. 82-680, May 20, 1983, 15 Sheets.

DI 99, Suppl. Interrogatory Response, U.S. Dist. Ct., District of Delaware, Civil Action No. 82-630, May 30, 1984, 6 Sheets.

Dreyfus Insured Deposit Program, Multiple List Program—Effective May 11, 2009, 1 Sheet.

Email from Olivia Kim to Charles Macedo on Jun. 9, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to lntrasweep's common interrogatory Nos. 1-5, Confidential-Attorneys only, Civil Action No. 09 Civ, 2675 (VM) (AJP).

Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).

Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Total Bank Solutions, LLC's responses to Double Rock's Common interrogatory Nos. 1-10 to defendants, Reservation of Right, Civil Action No. 09 Civ. 2675 (VM) (AJP).

FDIC Federal Register Citations: Email from Bert Ely to Comments, Mar. 8, 2006, Subject: Large-Bank Deposit Insurance Determination Proposal—RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.

FDIC, Federal Deposit Insurance Corporation, Letter to Mr. Ronald Rexter, Feb. 28, 2003, From Michelle M. Borzillo, Counsel Supervision and Legislation Section, 2 Sheets.

Federal Register: Oct. 9, 1997 (vol. 62, No. 196), pp. 52809-52868. http://www.fdic.gov/news/news/inactivefinancial/1997/fil97111b.html.

Financial Services Industry, "Web Watch: Trading Company Bundles CDs for Better Rates," Community Banker, Jun. 2002, online, http://findarticles.com/p/articles/mi_qa5344/is_200206/ai_n21313883/.

Finistar Reg. No. 2,939,558, Registered Apr. 12, 2005.

Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.

Frost Bank, Member FDIC, Checking Accounts, 1 Sheet, Sep. 19, 2003, https://www.frostbank.com/cgi-bin/ecomm/frost1/scripts/products/product_detail.jsp?BV_ . . . .

Garmhausen, "Matching Small Banks with Large Muni Deposits," American Banker, Online The Financial Services Resource, Oct. 4, 2005, 4 pages, http://www.finstar.com/docs/AmericanBanker.html.

Heavyweight Funding, Bankers News, Mar. 4, 2003, vol. II, Issue No. 5, 2 Sheets.

Hencke, "New Rules for FDIC deposit Insurance", ABA Bank Compliance, vol. 20, No. 7, Jul./Aug. 1999, pp. 31-37.

Hoffman, "Reserve's FDIC-Insured Account Draws Regionals; But some see little need for insurance," Crain Communications Inc., Investment News, 2 Sheets, Jun. 4, 2001.

IDC Deposits, online, http://idcdeposits.com/, 2009, 1 Sheet.

In The Know, Important Information About Your Account, Smith Barney Citigroup, 2005, 6 Sheets.

Insured Bank Deposit Program Summary Information Statement, Information Statement, and list of Eligible Program Banks Effective Feb. 10, 2005, 11 pages.

Insured Cash Account Program Disclosure Booklet, LPL Financial Services, Linsco/Private Ledger, Member NASD/SIPC 14 pages.

Jong et al., "The Valuation and Hedging of Variable Rate Savings Accounts," University of Amsterdam, Nov. 15, 2001, 23 Sheets.

Keenan, "Tapping Brokerages for Alternative to CDs," American Banker, The Financial Services Daily, 3 Sheets, Feb. 18, 2004.

Lake Forest Bank & Trust Company, Introducing MaxSafe Deposit Accounts with up to $3.75 Million in FDIC Insurance, www.lakeforestbank.com/maxsafe, 2 Sheets.

Lavine, "Check Out High-Yield Checking Accounts," Broward Daily Business Review, vol. 39, No. 102, 2 Sheets, Apr. 27, 1998.

Lawsuit by *Island Intellectual Property LLC, Lids Capital. LLC, Double Rock Corporation and Intrasweep LLC*, against *Promontory Interfinancial Network, LLC, Deutsche Bank AG, Deutsche Bank Trust Company Americas and Total Bank Solutions, LLC*, Complaint, Apr. 14, 2009, Case No. 09 CV 3750.

Lawsuit by *Carlo DeBlasio et al.* against *Merrill Lynch & Co., Inc. et al.*, Declaration of Andrew W. Stern, including Exhibits A, B, C, D, E and F, Nov. 12, 2007, Case No. 07-cv-318 (RJS) (Document 59).

Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion For Dismissal of the Second Amended Class Action Complaint, Including: "Client Commitment"; "Get Started Today"; "Total Merrill"; "Guideline For Business Conduct"; "Commitment To Clarity"; "Cash Management Account"; "Information Statement Regarding Changes To Interest Rates On Deposits in Merrill Lynch Banks"; Feb. 5, 2008.

Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 72).

(56) References Cited

OTHER PUBLICATIONS

Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).
Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 74).
Lawsuit by *Carlo DeBlasio et al.* against *Merrill Lynch & Co., Inc. et al.*, Declaration of Joel P. Laitman in Support of Plaintiffs3 Memorandum of Law in Opposition to Defendants' Motion for Dismissal of the Second Amended Class Action Complaint, Including: . . . Feb. 5, 2008 (Document 75).
Lawsuit by *Carlo DeBlasio et al.* against *Merrill Lynch & Co., Inc. et al.*, Declaration of Kenneth I. Schacter, including Exhibits A, B, C, D, F, G, H, J, K, L, M, N, O, P, Q and R, Nov. 14, 2007, Case No. 07-cv-318 (RJS) (Document 69).
Lawsuit by *Carlo DeBlasio et al.* against *Merrill Lynch & Co., Inc. et al.*, Declaration of Mathew J. Terry in Support of Motion to Dismiss by Defendants Wachovia Corporation, Wachovia Securities, LLC, Wachovia Bank, N.A., and Wahcovia Bank of Delaware, N.A., including Exhibits A, B, C, and D, Nov. 14, 2007, Case No. 07-318 (RJS) (Document 67).
Lawsuit by *Carlo DeBlasio et al.* against *Merrill Lynch & Co., Inc. et al.*, Declaration of Scott D. Musoff in Support of The Merrill Lynch Defendants' Motion to Dismiss The Second Amended Class Action Complaint, ECF Case, Nov. 12, 2007, Case No. 07-cv-318 (RJS) (Document 64).
Lawsuit by *Carlo DeBlasio et al.* against *Merrill Lynch & Co., Inc. et al.*, Reply Declaration of Kenneth Schacter including Exhibits S and T, Mar. 6, 2008, Case No. 07-cv-318 (RJS) (Document 81).
Lawsuit by *Carlo DeBlasio et al.* against *Merrill Lynch & Co., Inc. et al.*, Second Amended Class Action Complaint, Jury Trial Demanded, Introduction and Summary of Allegations, Jun. 11, 2007, Case No. 07-cv-318-VM.
Lawsuit by *Carlo DeBlasio et al.* against *Merrill Lynch & Co., Inc. et al.*, Supplemental Declaration of Matthew J. Terry in Support of Motion to Dismiss by Defendants Wachovia LLC, Wachovia Securities, LLC, Wachovia Bank N.A., and Wachovia Bank of Delaware, N.A., including Exhibits A and B, Mar. 6, 2008 Case No. 07-cv-318 (RJS) (Document 79).
Lawsuit by *Carlo DeBlasio et al.* against *Merrill Lynch & Co., Inc. et al.*, Opinion and Order Regarding Motions, Jul. 27, 2009, Case No. 07 CIV 318(RJS).
Lawsuit by *Island Intellectual Property LLC and lntrasweep LLC* against *Deutsche Bank Trust, Company Americas and Total Bank Solutions, LLC, Deutsche Bank Trust Company Americas'* answer to plaintiffs' Feb. 23, 2010 complaint and counterclaims, May 4, 2010, Civil Action No. 09 Civ. 2675 (VM) (AJP) (Document 111).
Lawsuit by *Island Intellectual Property LLC and Intrasweep LLC* against *Deutsche Bank Trust Company Americas and Total Bank Solutions, LLC, Total Bank Solutions, LLC*'s answer to plaintiffs' Feb. 23, 2010 complaint and counterclaims, May 4, 2010, Civil Action No. 09 Civ. 2675 (VM) (AJP)(Document 112).
Lawsuit by *Island Intellectual Property LLC and Intrasweep LLC* against *Institutional Deposits Corp.* The Island Plaintiffs' Complaint against Defendant Institutional Deposits Corp., Nov. 4, 2009, Civil Action No. 1 09-CV-3079.
Lawsuit by *Island Intellectual Property LLC and Intrasweep LLC* against *Institutional Deposits Corp.*, Complaint for Patent Infringement, Jury Trial Demanded, Nov. 4, 2009, Civil Action No. 09 CV 3079.
Lawsuit by *Island Intellectual Property LLC and Intrasweep LLC* against *Institutional Deposits Corp.*, Consent Order, Apr. 21, 2010, Case No. 09-CV-3079 (Document 44).
Lawsuit by *Island Intellectual Property LLC and Intrasweep LLC*, Answer of Defendant Institutional Deposits Corp, to Complaint for Patent Infringement, Dec. 10, 2009, Case No. 09 CV 03079 (JEC), (Document 16).
Lawsuit by *Island Intellectual Property LLC and Lids Capital LLC* against *Deutsche Bank Trust Company Americas and Total Bank Solutions, LLC, Deutsche Bank Trust Company* answer to plaintiffs' Mar. 16, 2010 complaint and counterclaims, May 4, 2010, Civil Action No. 09 Civ. 2675 (VM) (Ajp) (Document 113).
Lawsuit by *Island Intellectual Property LLC and Lids Capital LLC* against *Deutsche Bank Trust Company Americas and Total Bank Solutions, LLC, Total Bank Solutions, LLC*'s answer to plaintiffs' Mar. 16, 2010 complaint and counterclaims, May 4, 2010, Civil Action No. 09 Civ. 2675 (VM)(Document 114).
Lawsuit by *Island Intellectual Property LLC, et al.* against *Deutsche Bank Trust Company Americas, et al.,*. Defendant Deutsch Bank Trust Company Americas' Responses to Double Rock's Interrogatories Nos. 1 -10; May 2010; Civil Action No. 09 Civ. 2675 (VM)(AJP).
Lawsuit by *Island Intellectual Property LLC, et al.* against *Deutsche BankTrust Company Americas*; Defendant Total Bank Solutions, LLC's Responses to Double Rock's Common Interrogatory Nos. 1-10 to Defendants; May 2010; Civil Action No. 09 Civ. 2675 (VM)(AJP).
Lawsuit by *Island Intellectual Property LLC, Intrasweep LLC and Double Rock Corporation* against *Deutsche Bank AG, Deutsche Bank Trust Company Americas and Total Bank Solutions, LLC*, Complaint for Patent Infringement, May 19, 2009, Case No. 09 CIV 4673.
Lawsuit by *Island Intellectual Property LLC, Lids Capital LLC, and Double Rock Corporation* against *Deutsche Bank AG, Deutsche Bank Trust Company Americas and Total Bank Solutions, LLC*, including Cover Sheet, Summons, Complaint and Rule 7.1 Statement, Mar. 24, 2009, Case No. 09 CV 2677.
Lawsuit by *Island Intellectual Property LLC, Lids Capital LLC, and Double Rock Corporation* against *Promontory Interfinancial Network, LLC and MBSC Securities Corporation*, including CoverSheet, Summons, Complaint and Rule 7.1 Statement, Mar. 24, 2009, Case No. 09 CV 2675.
Lawsuit by *Island Intellectual Property LLC, Lids Capital LLC, Double Rock Corporation and Intrasweep LLC* against *Deutsche Bank AG, Deutsche BankTrust Company Americas and Total Bank Solutions, LLC*, Stipulated Dismissal of Deutsche Bank AG Without Prejudice, Nov. 19, 2009, Civil Action No. 09 CIV 2675 (VM) (AJP) (Document 79).
Lawsuit by *Island Intellectual Property LLC, Lids Capital LLC, Double Rock Corporation and Intrasweep LLC* against *Deutsche Bank Trust Company Americas and Total Bank Solutions, LLC, Deutsche Bank Trust Company Americas'* First Amended Answer to Consolidated First Amended Complaint and Counterclaims, Dec. 4, 2009, Civil Action No. 09 CIV 2675 (VM) (AJP), (Document 86).
Lawsuit by *Island Intellectual Property LLC, Lids Capital LLC, Double Rock Corporation and Intrasweep LLC* against *Deutsche Bank Trust Company Americas and Total Bank Solutions, LLC, Total Bank Solutions, LLC*'s First Amended Answer to Consolidated First Amended Complaint and Counterclaims Dec. 4, 2009, Civil Action No. 09 CIV 2675 (VM) (AJP) (Document 87).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche BankTrust Company Americas and Total Bank Solutions, LLC*, Answer and Counterclaims, Answer of Defendant MBSC Securities Corporation, Jun. 25, 2009, Case No. 09 CV 2675.
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche BankTrust Company Americas and Total Bank Solutions, LLC*, Answer and Counterclaims, Answer of Defendant Promontory Interfinancial Network, LLC, Jun. 25, 2009, Case No. 09 CV 2675.
Lawsuit by *Island Intellectual Property LLC, Lids Capital LLC, Double Rock Corporation and Intrasweep LLC* against *Promontory*

(56) References Cited

OTHER PUBLICATIONS

*Interfinancial Network LLC, MBSC Securities Corporation, Deutsche Bank AG, Deutsche BankTrust Company Americas and Total Bank Solutions, LLC*, Consolidated First Amended Complaint, Jury Trial Demanded, Jun. 11, 2009, Civil Action No. 09 CIV 2675 (VM).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Jury Trial Demanded, Deutsche Bank AG's Answer To Consolidated First Amended Complaint, Jun. 25, 2009, Civil Action No. 09 CIV 2675.
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Jury Trial Demanded, Deutsche BankTrust Company Americas' Answer To Consolidated First Amended Complaint and Counter Claims, Jun. 25, 2009, Civil Action No. 09 CIV 2675.
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Jury Trial Demanded, Total Bank Solutions, LLC's Answer To Consolidated First Amended Complaint and Counterclaims, Jun. 25, 2009, Civil Action No. 09 CIV 2675.
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Stipulated Dismissal of Counts l-lll of Defendant Promontory Interfinancial Network, LLC's, Counterclaim with Prejudice, Oct. 19, 2009, (Document 68).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Stipulation and Order, Oct. 29, 2009, Case No. 09 CV 2675 (VM) (AJP) (Document 73).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant Deutsche Bank Trust Company Americas' Counterclaims, Jul. 9, 2009, Civil Action No. 09 CIV 2675 (VM).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant MBSC Securities Corporation's Counterclaims, Jul. 9, 2009, Civil Action No. 09 CIV 2675 (VM).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant Promontory Interfinancial Network LLC's Counterclaims, Jul. 9, 2009, Civil Action No. 09 CIV 2675 (VM).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant Total Bank Solutions, LLC's Counterclaims, Jul. 9, 2009, Civil Action No. 09 CIV 2675 (VM).

Lawsuit by *Promontory Interfinancial Network, LLC* against*Double Rock Corporation p/k/a Reserve Management Corporation and Lids Capital LLC*, Amended Complaint, Mar. 27, 2009, Civil Action No. 1:09 CV316.
Lawsuit by *Promontory Interfinancial Network, LLC* against *Double Rock Corporation p/k/a Reserve Management Corporation*, Complaint, Mar. 24, 2009, Civil Action No. 1:09 CV 316.
Lawsuit by *Promontory Interfinancial Network, LLC* against *Double Rock Corporation p/k/a Reserve Management Corporation, Island Intellectual Property LLC, Lids Capital LLC and Intrasweep LLC*, Amended Complaint, Apr. 15, 2009, Civil Action No. 3:09 CV 217.
Lawsuit by *Promontory Interfinancial Network, LLC* against *Double Rock Corporation p/k/a Reserve Management Corporation, Island Intellectual Property LLC, Lids Capital LLC and Intrasweep LLC*, Complaint, May 19, 2009, Civil Action No. 3:09 CV 322.
Lawsuit by *Promontory Interfinancial Network, LLC* against *Double Rock Corporation, p/k/a Reserve Management Corporation, Island Intellectual Property LLC and Lids Capital LLC*, including Cover Sheet, Summons and Complaint, Apr. 14, 2009, Civil Action No. 3:09 CV 217.
Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.
Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.
Letter From Joseph A. DiNuzzo, Counsel, Oct. 20, 1999, FDIC, Federal Deposit Insurance Corporation, 1 Sheet.
Letter From Merle Y. Waldman, LXSEE 1985 Sec No- Act., Lexis 1593, Securities Exchange Act of 1934—Section 15(a), Jan. 8, 1985, 11 Sheets.
Letter from Michael Bradfield, General Counsel, Board of Governors of the Federal Reserve System, Nov. 16, 1984, 4 Sheets.
Letter From Roger A. Hood, Assistant General Counsel, Jul. 16, 1986, FDIC, Federal Deposit Insurance Corporation, Legal Division, 1 Sheet.
Letter from Roger M. Zaitzeff, Seward & Kissel to Gilbert T. Schwartz, Associate General Counsel, Board of Governors of the Federal Reserve System; May 10, 1983, 5 sheets.
Letter from Stephanie Martin, Assoc. General Counsel, Board of Governors of the Federal Reserve System, Apr. 22, 2004, 8 Sheets.
Letter to Mr. James E. Creekman, Group Vice President, From Oliver Ireland, Associate General Counsel, Aug. 1, 1995, 4 Sheets.
Letter to Mr. Jonathan L. Levin, Esq., From Oliver Ireland, Associate General Counsel, Oct. 18, 1996, 2 Sheets.
Letter to Mr, L.P. Fleming, Jr., Esq., From Oliver Ireland, Associate General Counsel, Oct. 18, 1996, 2 Sheets.
Letter to Ms. Brenda L. Skidmore, Senior Vice President, From Oliver Ireland, Associate General Counsel, Aug. 30, 1995, 4 Sheets.
Letter to William R. Burdette, CEO, Apr. 6, 2009, FDIC, Federal Deposit Insurance Corporation, 2 pages.
Letterto William R. Burdette, CEO, Nov. 15, 2007, FDIC, Federal Deposit Insurance Corporation, 5 Sheets.
Liberman et al., Market Watch, "How Important are Banks?" FDIC Insurance on Deposits Just One Continuing Advantage, Oct. 17, 2006, 3 Sheets.
McReynolds et al. "Unusual Products for Unusual Times," Securities Data Publishing on Wall Street, 6 Sheets, May 1, 2001.
Mcreynolds, "The Power of CASH: Ho-hum cash can be great product (and lead to more business) in troubled times," Securities Data Publishing on Wall Street, 3 Sheets, Jun. 1, 2002.
Merrill Lynch Announces Beyond Banking, The Power of Advice For Smarter Cash Management, Jan. 8, 2 Sheets.
Merrill Moves CMA Cash to Bank, Street Talk, On Wall Street, Nov. 2000, p. 26.
Money Fund Report, Bank of New York Adds Insured Sweeps Option, Friday, May 3, 2002, The Reserve Funds, 1 Sheet.
Money Fund Report, IBC Financial Data, Inc., Novembers, 1998, 1 Sheet.
Money Fund Report, Insured Cash Sweep Options Proliferate, Friday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.

(56) References Cited

OTHER PUBLICATIONS

Munk, Merrill Makes New Push Into Traditional Banking, Dow Jones Newswires, Jan. 3, 2003, 1 Sheet.
Mutual Funds Magazine, Bargain Basement Funds, Oct. 1997, 1 Sheet.
Mutual Funds Magazine, Bargain Basement Funds, Oct. 1997, 2 Sheets.
News Article: "Regulators Support Demand Deposit Bill", Regulatory Compliance Watch—Mar. 9, 1998; 2 Sheets, vol. 9, No. 10.
Northbrook Bank & Trust Company, Introducing our MaxSafe CD with up to $700,000 of FDIC Insurance, 4 Sheets.
Northbrook Bank & Trust Company, Seven Times the Security of a Normal CD, Introducing our MaxSafe CD, 4 Sheets.
O'Brian, "Money-Market Funds Suit Many Investors, But Proud Creator Frets About Extra Risk," Re-Printed From The Wall Street Journal, Monday, Nov. 6, 2000, Dow Jones & Company, Inc., 2 Sheets.
On Wall Street, Helping Brokers Build A More Successful Business, The Power of CASH, Jun. 2002, 2 Sheets.
On Wall Street, Helping Brokers Build A More Successful Business, Unusual Products For Unusual Times, May 2001, 2 Sheets.
Online, www.usabancshares.com, Brave New World, 1999, 2 Sheets.
Part: 2, Monetary Policy and Reserve Requirements, Subpart—Regulation D, Board Interpretations of Regulation D, Transaction Accounts—Linked to Time Deposits, vol. 1, Federal Reserve Regulatory Service, Mar. 1994; 2 Sheets.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Promontory Interfinancial Network, Promontory Interfinancial Network Announces New Deposit Placement Service, Jan. 21, 2003, 3 Sheets.
Promontory Interfinancial Network: http://www.promnetwork.com/index.html, 2003.
Promontory Interfinancial Network: Frequently Asked Questions (FAQs), Feb. 5, 2003, 5 pages.
Promontory to Roll Out Deposit Service Insuring Liquid Funds, American Banker, by Joe Adler, Feb. 22, 2010, 2 sheets.
Reserve Insured Deposits, United States Patent and Trademark Office, Reg. No. 2,694,910, Registered Mar. 11, 2003, 1 Sheet.
Ring, National /Global, "Amex Spans The Globe in Retail Bank Buildup," Nov. 27, 2000, 1 Sheet.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Sweeping Your Firm Into FDIC Insured Deposits, Harken Financial Services, Aug. 4, 2006, 8 Sheets.
Testimony of Bruce R. Bent, CEO of the Reserve Funds, Before the Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwritting, From: Denise Russo, Director, Underwritting, 6 Sheets.
The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.
The Pershing Press, Dreyfus Insured Deposit Program, Issue 2, Aug. 2008, http://www.pershing.com/news/pershing_press/news_466244.html, 1 Sheets.
The Reserve Fund, Study of U.S. Pat. No. 6,374,231, 1 Sheet.
The Reserve Funds Press Release, "The Reserve Funds and Frontier Bank Partner to Offer Revolutionary Banking Product," 5 Sheets, Aug. 1, 2000.
The Reserve Funds, Objectives, Observations & Strategies for American Enterprises Inv., Oct. 18, 2000, 11 Sheets.
The Reserve Funds, NJBA Endorses New Sweep Account Offers New Jersey Banks Deposit Growth, Retention, for Immediate Release, May. 23, 2011, 1 Sheet.
The Reserve Funds, Reserve Management and Irwin Union Bank Trust Company Partner to Offer The Reserve Return Sweep, for Immediate Release, Mar. 8, 2001, 2 Sheets.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
The Reserve, "Reserve Insured Deposits," 2 Sheets, Oct. 4, 2006, http://www.ther.com/ps/ps_fif.shtml.
The Reserve, "What Sets Us Apart," 2 Sheets, Oct. 4, 2006, http://www.ther.com/bank/bank_wsua.shtml.
The Unmatched Sweep Solution From the Cash Management Expert, 2 Sheets.
Total Bank Solutions, Bank Sweep FAQs http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.
Total Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategtic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 7 pgs.
TotalBank Solutions, web.archive.org/web/20050126044216/http://totalbanksolutions.com, Jan. 26, 2005, 2 pgs.

(56) References Cited

OTHER PUBLICATIONS

USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Waddell, "Sweeping Clean," Advisor, The Advisor to Advisors, Oct. 2001; 2 Sheets.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.
Lawsuit by *Island Intellectual Property LLC* against *Clearview Correspondent Services, LLC, et al.*; Complaint for Patent Infringement; Civil Action No. 1:11-cv-448 (LO/TRJ); Apr. 26, 2011; 55 pages.
Lawsuit by *Island Intellectual Property LLC* against *First Southwest Company*; Complaint for Patent Infringement; Civil Action No. 1:11-CV-00371-UNA; Apr. 26, 2011; 42 pages.
Lawsuit by *Island Intellectual Property LLC et al.*, against *Deutsche Bank Trust Company Americas, et al.*; Expert Report of Richard T. Powers Concerning Invalidity of U.S. Pat. Nos. 7,509,286; 7,519,551; 7,536,350; 7,668,771; 7,668,772, 7,672,886; and 7,680,734; and Exhibits A-R; Civil Action No. 09 Civ.2675(VM)(AJP), Oct. 28, 2010; 1, 119 pages.
Lawsuit by *Island Intellectual Property LLC* v. *Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.
Lawsuit by *Island Intellectual Property LLC* v. *Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.
Lawsuit by *Island Intellectual Property LLC* v. *Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.
Lawsuit by *Island Intellectual Property LLC* v. *First Southwest Company*; First Southwest Company's Answer to Complaint and Counterclaims; Civil Action 1:11-cv-371-SD; Jun. 20, 2011; 11 pages.
Lawsuit by *Island Intellectual Property LLC, et al.* against *Deutsche Bank Trust Company Americas, et al.*; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.
Lawsuit by *Island Intellectual Property LLC, et al.* against *Deutsche Bank Trust Company Americas, et al.*; Expert Report of the Honorable Gerald J. Mossinghoff and Exhibits A-E; Civil Action No. 09 Civ. 2675 (VM)(AJP); Nov. 23, 2010; 107 pages.
Lawsuit by *Island Intellectual Property LLC, et al.*, against *Deutsche BankTrust Company Americas, et al.*; Defendant Deutsche BankTrust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.
Lawsuit by *Island Intellectual Property LLC, et al.*, against *Deutsche BankTrust Company Americas, et al.*; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.
*Island Intellectual Property LLC et al.* v. *Deutsche Bank AG, et al.*; Memorandum and Order; Case 1:09-cv-02675-KBF; Doc. 289; Feb. 14, 2012; pp. 1-28.
*Island Intellectual Property LLC et al.* v. *Deutsche Bank AG, et al.*; Order; Case 1:09-cv-02675-KBF; Doc. 221; Feb. 14, 2012; pp. 1-34.
*Island Intellectual Property LLC et al.* v. *Deutsche BankTrust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3 and Exhibits.
*Island Intellectual Property LLC et al.* v. *Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.
*Island Intellectual Property LLC et al.* v. *Deutsche Bank Trust Company Americas, et al.*; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.
*Island Intellectual Property LLC et al.* v. *Deutsche BankTrust Company Americas, et al.*; Memorandum and Order; Case 1:09-cv-02675-KBF; Doc. 265; Feb. 6, 2012; pp. 1-22.
*Island Intellectual Property LLC et al.* v. *Deutsche Bank Trust Company Americas, et al.*; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.
*Island Intellectual Property LLC et al.* v. *Deutsche Bank Trust Company Americas, et al.*; Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.
*Island Intellectual Property LLC et al.* v. *Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.
*Island Intellectual Property LLC et al.* v. *Deutsche Bank Trust Company Americas, et al.*; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.
*Island Intellectual Property LLC et al.* v. *Deutsche BankTrust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.
*Island Intellectual Property LLC et al.* v. *Deutsche BankTrust Company Americas, et al.*; Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.
Knight-Ridder; Money Matters, Tips you can use—Limits Apply as FDIC Insurance Covers Depositor, Not Account; Chicago Tribune; Feb. 4, 1998; 2 pages.
Lawsuit by *Island Intellectual Property LLC et al.* v. *Deutsche Bank Trust Company Americas et al.*; Joint Statement of Claims and Defenses to be Presented at Trial Set for Feb. 27, 2012; Jan. 16, 2012; Case 1:09-cv-02675-KBF (Document 227).
Lawsuit by *Island Intellectual Property LLC et al.* v. *Deutsche Bank Trust Company Americas et al.*; Declaration of Olivia M. Kim in Support of Defendants' Motion for Summary Judgment of Invalidity Under 35 U.S.C. §101; Oct. 6, 2011; Case 1:09-cv-02675-VM, Document 197.
Lawsuit by *Island Intellectual Property LLC et al.* v. *Deutsche Bank Trust Company Americas et al.* Plaintiffs' Memorandum of Law in

(56) References Cited

OTHER PUBLICATIONS

Opposition to Defendants' Motion for Summary Judgment of Invalidity Under 35 U.S.C. § 101; Nov. 2, 2011; Case 1:09-cv-02675-VM, Document 201.
Lawsuit by *Island Intellectual Property LLC et al.* v. *Deutsche Bank Trust Company Americas et al.*; Defendants Reply in Support of Their Motion for Summary Judgment of Invalidity Under 35 U.S.C. § 101; Nov. 15, 2011; Case 1:09-cv-02675-VM, Document 208.
Lawsuit by *Island Intellectual Property LLC et al.* v. *Deutsche Bank Trust Company Americas et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.
Lawsuit by *Island Intellectual Property LLC et al.* v. *Deutsche Bank Trust Company Americas et al.*; Order; Dec. 7, 2011; Case 1:09-cv-02675-VM, Document 212.
Lawsuit by *Island Intellectual Property LLC et al.* v. *Deutsche Bank Trust Company Americas et al.*; Special Master's Report and Recommended Decision on Defendants' Summary Judgment Motion of Invalidity Under 35 U.S.C. §101; Dec. 19, 2011.
Lawsuit by *Island Intellectual Property LLC et al.* v. *Deutsche Bank Trust Company Americas et al.*; Supplemental Declaration of Olivia M. Kim in Support of Defendants' Opening and Reply Claim Construction Briefs; Nov. 15, 2011; Case 1:09-cv-02675-VM, Document 207.
Martens, Don W.; letter to Hon. Victor Marrero re. supplement to letter of Nov. 28, 2011 on tentative rulings on claim construction in *Island Intellectual Property LLC et al.* v. *Deutsche Bank Trust Company Americas et al.*; Nov. 28, 2011; Case 1:09-cv-02675-VM; Document 211.
Martens, Don W.; letterto Hon. Victor Marrero re. tentative rulings on claim construction in *Island Intellectual Property LLC et al.* v. *Deutsche Bank Trust Company Americas et al.*; Nov. 28, 2011; Case 1:09-cv-02675-VM, Document 210.
Scottrade Bank Deposit Program—Terms, Conditions & Disclosures; Author unknown; Aug. 2011; pp. 1-3.
Hencke, Christopher; New Rules for FDIC Deposit Insurance; ABA Bank Compliance, Jul./Aug. 1999, pp. 31-37.
Campbell, Andrew, et al.; A new standard for deposit insurance and government guarantees after the crisis; Journal of Financial Regulation and Compliance, vol. 17 No. 3, 2009; pp. 210-239.
Cynamon et al.; Redefining the Monetary Aggregates: A Clean Sweep; Eastern Economic Journal, vol. 32, No. 4, Fall 2006; pp. 661-672.
12 CFR Part 330; Simplification of Deposit Insurance Rules; Federal Register, vol. 63 Issue 90; May 11, 1998; pp. 1-31.
The Merrill Lynch Cash Management Account—Financial Service; Jan. 1985, 18 pages.
Order Granting Defendant's Motion to Dismiss, issued in *Island Intellectual Property LLC* v. *Stone Castle Management LLC et al.*, Case No. 19-04792-JPO (S.D.N.Y.), Dkt. No. 58, issued on May 29, 2020.
Order Granting Plantiff's Request for an Indicative Ruling, issued in *Island Intellectual Property LLC* v. *Stone Castle Management LLC et al.*, Case No. 19-04792-JPO (S.D.N.Y.), Dkt. No. 73, issued on Apr. 13, 2021.
Order Granting Plaintiff's Motion to Vacate the May 29, 2020 Opinion and Order, issued in *Island Intellectual Property LLC* v. *Stone Castle Management LLC et al.*, Case No. 19-04792-JPO (S.D.N.Y.), Dkt. No. 75, issued on Apr. 16, 2021.
Notice of Voluntary Dismissal with Prejudice Pursuant to F.R.C.P. 41(a)(1)(A)(i), filed in *Island Intellectual Property LLC* v. *Stone Castle Management LLC et al.*, Case No. 19-04792-JPO (S.D.N.Y.), Dkt. No. 76, issued on Apr. 20, 2021.
First Amended Complaint, filed in *Stone Castle Management LLC* v. *Island Intellectual Property LLC*, Case No. 20-cv-07868-JMF (S.D.N.Y.), Dkt. No. 28, filed on Dec. 22, 2020.

Exhibit 1—U.S. Pat. No. 7,509,286 to First Amended Complaint, filed in *Stone Castle Management LLC* v. *Island Intellectual Property LLC*, Case No. 20-cv-07868-JMF (S.D.N.Y.), Dkt. No. 28-1, filed on Dec. 22, 2020.
Exhibit 2—U.S. Pat. No. 7519551 to First Amended Complaint, filed in Stone Castle Management LLC v. Island Intellectual Property LLC, Case No. 20-CV-07868-JMF (S.D.N.Y.), Dkt. No. 28-2, filed on Dec. 22, 2020.
Exhibit 3—U.S. Pat. No. 7,536,350 to First Amended Complaint, filed in *Stone Castle Management LLC* v. *Island Intellectual Property LLC*, Case No. 20-cv-07868-JMF (S.D.N.Y.), Dkt. No. 28-3, filed on Dec. 22, 2020.
Exhibit 4—U.S. Pat. No. 7,668,772 to First Amended Complaint, filed in *Stone Castle Management LLC* v. *Island Intellectual Property LLC*, Case No. 20-cv-07868-JMF (S.D.N.Y.), Dkt. No. 28-4, filed on Dec. 22, 2020.
Exhibit 5—U.S. Pat. No. 7,672,886 to First Amended Complaint, filed in *Stone Castle Management* LLC v. *Island Intellectual Property LLC*, Case No. 20-cv-07868-JMF (S.D.N.Y.), Dkt. No. 28-5, filed on Dec. 22, 2020.
Exhibit 6—U.S. Pat. No. 7,680,734 to First Amended Complaint, filed in *Stone Castle Management LLC* v. *Island Intellectual Property LLC*, Case No. 20-cv-07868-JMF (S.D.N.Y.), Dkt. No. 28-6, filed on Dec. 22, 2020.
Exhibit 7—U.S. Pat. No. 7,716,131 to First Amended Complaint, filed in *Stone Castle Management LLC* v. *Island Intellectual Property LLC*, Case No. 20-cv-07868-JMF (S.D.N.Y.), Dkt. No. 28-7, filed on Dec. 22, 2020.
Exhibit 8—U.S. Pat. No. 7,752,129 to First Amended Complaint, filed in *Stone Castle Management LLC* v. *Island Intellectual Property LLC*, Case No. 20-cv-07868-JMF (S.D.N.Y.), Dkt. No. 28-8, filed on Dec. 22, 2020.
Exhibit 9—U.S. Pat. No. 7,769,688 to First Amended Complaint, filed in *Stone Castle Management LLC* v. *Island Intellectual Property LLC*, Case No. 20-cv-07868-JMF (S.D.N.Y.), Dkt. No. 28-9, filed on Dec. 22, 2020.
Exhibit 10—U.S. Pat. No. 7,809,640 to First Amended Complaint, filed in *Stone Castle Management LLC* v. *Island Intellectual Property LLC*, Case No. 20-cv-07868-JMF (S.D.N.Y.), Dkt. No. 28-10, filed on Dec. 22, 2020.
Exhibit 11—U.S. Pat. No. 7,933,821 to First Amended Complaint, filed in *Stone Castle Management LLC* v. *Island Intellectual Property LLC*, Case No. 20-cv-07868-JMF (S.D.N.Y.), Dkt. No. 28-11, filed on Dec. 22, 2020.
Exhibit 12—U.S. Pat. No. 8,019,667 to First Amended Complaint, filed in *Stone Castle Management LLC* v. *Island Intellectual Property LLC*, Case No. 20-cv-07868-JMF (S.D.N.Y.), Dkt. No. 28-12, filed on Dec. 22, 2020.
Exhibit 13—U.S. Pat. No. 8,260,697 to First Amended Complaint, filed in *Stone Castle Management LLC* v. *Island Intellectual Property LLC*, Case No. 20-cv-07868-JMF (S.D.N.Y.), Dkt. No. 28-13, filed on Dec. 22, 2020.
Exhibit 14—U.S. Pat. No. 8,290,859 to First Amended Complaint, filed in *Stone Castle Management LLC* v. *Island Intellectual Property LLC*, Case No. 20-cv-07868-JMF (S.D.N.Y.), Dkt. No. 28-14, filed on Dec. 22, 2020.
Exhibit 15—U.S. Pat. No. 8,290,860 to First Amended Complaint, filed in *Stone Castle Management LLC* v. *Island Intellectual Property LLC*, Case No. 20-cv-07868-JMF (S.D.N.Y.), Dkt. No. 28-15, filed on Dec. 22, 2020.
Exhibit 16—U.S. Pat. No. 8,290,861 to First Amended Complaint, filed in *Stone Castle Management LLC* v. *Island Intellectual Property LLC*, Case No. 20-cv-07868-JMF (S.D.N.Y.), Dkt. No. 28-16, filed on Dec. 22, 2020.
Exhibit 17—U.S. Pat. No. 8,311,916 to First Amended Complaint, filed in *Stone Castle Management LLC* v. *Island Intellectual Property LLC*, Case No. 20-cv-07868-JMF (S.D.N.Y.), Dkt. No. 28-17, filed on Dec. 22, 2020.
Exhibit 18—U.S. Pat. No. 8,355,985 to First Amended Complaint, filed in *Stone Castle Management LLC* v. *Island Intellectual Property LLC*, Case No. 20-cv-07868-JMF (S.D.N.Y.), Dkt. No. 28-18, filed on Dec. 22, 2020.

(56) References Cited

OTHER PUBLICATIONS

Exhibit 19—U.S. Pat. No. 8,386,383 to First Amended Complaint, filed in *Stone Castle Management LLC* v. *Island Intellectual Property LLC*, Case No. 20-cv-07868-JMF (S.D.N.Y.), Dkt. No. 28-19, filed on Dec. 22, 2020.
Exhibit 20—U.S. Pat. No. 8,401,962 to First Amended Complaint, filed in *Stone Castle Management LLC* v. *Island Intellectual Property LLC*, Case No. 20-cv-07868-JMF (S.D.N.Y.), Dkt. No. 28-20, filed on Dec. 22, 2020.
Exhibit 21—U.S. Pat. No. 7,536,350 to First Amended Complaint, filed in *Stone Castle Management LLC* v. *Island Intellectual Property LLC*, Case No. 20-cv-07868-JMF (S.D.N.Y.), Dkt. No. 28-21, filed on Dec. 22, 2020.
Exhibit 22—U.S. Pat. No. 8,498,933 to First Amended Complaint, filed in *Stone Castle Management LLC* v. *Island Intellectual Property LLC*, Case No. 20-cv-07868-JMF (S.D.N.Y.), Dkt. No. 28-22, filed on Dec. 22, 2020.
Exhibit 23—U.S. Pat. No. 8,560,442 to First Amended Complaint, filed in *Stone Castle Management LLC* v. *Island Intellectual Property LLC*, Case No. 20-cv-07868-JMF (S.D.N.Y.), Dkt. No. 28-23, filed on Dec. 22, 2020.
Exhibit 24—U.S. Pat. No. 8,566,200 to First Amended Complaint, filed in *Stone Castle Management LLC* v. *Island Intellectual Property LLC*, Case No. 20-cv-07868-JMF (S.D.N.Y.), Dkt. No. 28-24, filed on Dec. 22, 2020.
Exhibit 25—U.S. Pat. No. 8,566,201 to First Amended Complaint, filed in *Stone Castle Management LLC* v. *Island Intellectual Property LLC*, Case No. 20-cv-07868-JMF (S.D.N.Y.), Dkt. No. 28-25, filed on Dec. 22, 2020.
Exhibit 26—U.S. Pat. No. 8,571,984 to First Amended Complaint, filed in *Stone Castle Management LLC* v. *Island Intellectual Property LLC*, Case No. 20-cv-07868-JMF (S.D.N.Y.), Dkt. No. 28-26, filed on Dec. 22, 2020.
Exhibit 27—U.S. Pat. No. 8,612,324 to First Amended Complaint, filed in *Stone Castle Management LLC* v. *Island Intellectual Property LLC*, Case No. 20-cv-07868-JMF (S.D.N.Y.), Dkt. No. 28-27, filed on Dec. 22, 2020.
Exhibit 28—USRE43,246 to First Amended Complaint, filed in *Stone Castle Management LLC* v. *Island Intellectual Property LLC*, Case No. 20-cv-07868-JMF (S.D.N.Y.), Dkt. No. 28-28, filed on Dec. 22, 2020.
Exhibit 29—U.S. Pat. No. 6,374,231 to First Amended Complaint, filed in *Stone Castle Management LLC* v. *Island Intellectual Property LLC*, Case No. 20-cv-07868-JMF (S.D.N.Y.), Dkt. No. 28-29, filed on Dec. 22, 2020.
Exhibit 30—U.S. Pat. No. 8,150,766 to First Amended Complaint, filed in *Stone Castle Management LLC* v. *Island Intellectual Property LLC*, Case No. 20-cv-07868-JMF (S.D.N.Y.), Dkt. No. 28-30, filed on Dec. 22, 2020.
Exhibit 31—U.S. Pat. No. 8,359,267 to First Amended Complaint, filed in *Stone Castle Management LLC* v. *Island Intellectual Property LLC*, Case No. 20-cv-07868-JMF (S.D.N.Y.), Dkt. No. 28-31, filed on Dec. 22, 2020.
Exhibit 32—U.S. Pat. No. 8,712,911 to First Amended Complaint, filed in *Stone Castle Management LLC* v. *Island Intellectual Property LLC*, Case No. 20-cv-07868-JMF (S.D.N.Y.), Dkt. No. 28-32, filed on Dec. 22, 2020.
Exhibit 33—U.S. Pat. No. 8,719,157 to First Amended Complaint, filed in *Stone Castle Management LLC* v. *Island Intellectual Property LLC*, Case No. 20-cv-07868-JMF (S.D.N.Y.), Dkt. No. 28-33, filed on Dec. 22, 2020.
Exhibit 34—U.S. Pat. No. 8,655,689 to First Amended Complaint, filed in *Stone Castle Management LLC* v. *Island Intellectual Property LLC*, Case No. 20-cv-07868-JMF (S.D.N.Y.), Dkt. No. 28-34, filed on Dec. 22, 2020.
Exhibit 35—Maier et al., Patent Protection Provides Long-term Net Strategy to First Amended Complaint, filed in *Stone Castle Management LLC* v. *Island Intellectual Property LLC*, Case No. 20-cv-07868-JMF (S.D.N.Y.), Dkt. No. 28-35, filed on Dec. 22, 2020.
Exhibit 36—Oct. 29, 2018 Letter from IIP to SCP to First Amended Complaint, filed in *Stone Castle Management LLC* v. *Island Intellectual Property LLC*, Case No. 20-cv-07868-JMF (S.D.N.Y.), Dkt. No. 28-3, filed on Dec. 22, 2020.
Exhibit 37—Nov. 13, 2018 Letter from SC to IIP to First Amended Complaint, filed in *Stone Castle Management LLC* v. *Island Intellectual Property LLC*, Case No. 20-cv-07868-JMF (S.D.N.Y.), Dkt. No. 28-36, filed on Dec. 22, 2020.
Exhibit 38—Nov. 20, 2018 Letter from IIP to SC to First Amended Complaint, filed in *Stone Castle Management LLC* v. *Island Intellectual Property LLC*, Case No. 20-cv-07868-JMF (S.D.N.Y.), Dkt. No. 28-37, filed on Dec. 22, 2020.
Exhibit 39—Dec. 4, 2018 Letter from SC to IIP to First Amended Complaint, filed in *Stone Castle Management LLC* v. *Island Intellectual Property LLC*, Case No. 20-cv-07868-JMF (S.D.N.Y.), Dkt. No. 28-38, filed on Dec. 22, 2020.
Exhibit 40—May 24, 2019 (SDNY 013) 2019 Complaint to First Amended Complaint, filed in *Stone Castle Management LLC* v. *Island Intellectual Property LLC*, Case No. 20-cv-07868-JMF (S.D.N.Y.), Dkt. No. 28-39, filed on Dec. 22, 2020.
Exhibit 41—Aug. 5, 2019 (SDNY 041) SC Motion to Dismiss to First Amended Complaint, filed in *Stone Castle Management LLC* v. *Island Intellectual Property LLC*, Case No. 20-cv-07868-JMF (S.D.N.Y.), Dkt. No. 28-40, filed on Dec. 22, 2020.
Exhibit 42—Sep. 4, 2019 (SDNY 049) IIP Opp to Motion to Dismiss to First Amended Complaint, filed in *Stone Castle Management LLC* v. *Island Intellectual Property LLC*, Case No. 20-cv-07868-JMF (S.D.N.Y.), Dkt. No. 28-42, filed on Dec. 22, 2020.
Exhibit 43—Sep. 11, 2019 (SDNY 051) SC Reply ISO Motion to Dismiss to First Amended Complaint, filed in *Stone Castle Management LLC* v. *Island Intellectual Property LLC*, Case No. 20-cv-07868-JMF KS.D.N.Y.), Dkt. No. 28-43, filed on Dec. 22, 2020.
Exhibit 44—May 29, 2020 (SDNY 058) Opinion and Order re Motion to Dismiss to First Amended Complaint, filed in *Stone Castle Management LLC* v. *Island Intellectual Property LLC*, Case No. 20-cv-07868-JMF (S.D.N.Y.), Dkt. No. 28-44, filed on Dec. 22, 2020.
Exhibit 45—Jun. 25, 2020 (SDNY 060) IIP Letter to Judge Oetken to First Amended Complaint, filed in *Stone Castle Management LLC* v. *Island Intellectual Property LLc*, Case No. 20-cv-07868-JMF (S.D.N.Y.), Dkt. No. 28-45, filed on Dec. 22, 2020.
Exhibit 46—Jun. 25, 2020 (NYS 002) IIP State Court Complaint to First Amended Complaint, filed in *Stone Castle Management LLC* v. *Island Intellectual Property LLC*, Case No. 20-cv-07868-JMF (S.D.N.Y.), Dkt. No. 28-46, filed on Dec. 22, 2020.
Exhibit 47—Aug. 12, 2020 (NYS 022) SC Motion to Dismiss State Court Complaint to First Amended Complaint, filed in *Stone Castle Management LLC* v. *Island Intellectual Property LLC*, Case No. 20-cv-07868-JMF (S.D.N.Y.), Dkt. No. 28-47, filed on Dec. 22, 2020.
Exhibit 48—Aug. 12, 2020 (NYS 012) SCFC Motion to Dismiss State Court Complaint to First Amended Complaint, filed in *Stone Castle Management LLC* v. *Island Intellectual Property LLC*, Case No. 20-cv-07868-JMF (S.D.N.Y.), Dkt. No. 28-48, filed on Dec. 22, 2020.
Exhibit 49—Jan. 26, 1975 Opinion Letter issued by the SEC, No. 74-1324 to First Amended Complaint, filed in *Stone Castle Management LLC* v. *Island Intellectual Property LLC*, Case No. 20-cv-07868-JMF (S.D.N.Y.), Dkt. No. 28-49, filed on Dec. 22, 2020.
Exhibit 50—Jun. 22, 1983 Interp Letter issued by the Federal Reserve to First Amended Complaint, filed in *Stone Castle Management LLC* v. *Island Intellectual Property LLC*, Case No. 20-cv-07868-JMF (S.D.N.Y.), Dkt. No. 28-50, filed on Dec. 22, 2020.
Exhibit 51—Nov. 16, 1984 Interp Letter issued by the Federal Reserve to First Amended Complaint, filed in *Stone Castle Management LLC* v. *Island Intellectual Property LLC*, Case No. 20-cv-07868-JMF (S.D.N.Y.), Dkt. No. 28-51, filed on Dec. 22, 2020.
Exhibit 52—Jan. 8, 1985 Opinion Letter issued by the SEC to First Amended Complaint, filed in *Stone Castle Management LLC* v. *Island Intellectual Property LLC*, Case No. 20-CV-07868-JMF (S.D.N.Y.), Dkt. No. 28-52, filed on Dec. 22, 2020.
Exhibit 53—May 22, 1986 Interp Letter issued by FDIC, No. 86-15 to First Amended Complaint, filed in *Stone Castle Management*

(56) References Cited

OTHER PUBLICATIONS

*LLC* v. *Island Intellectual Property LLC*, Case No. 20-cv-07868-JMF (S.D.N.Y.), Dkt. No. 28-53, filed on Dec. 22, 2020.
Exhibit 54—Jul. 23, 1986 Interp Letter issued by FDIC, No. 86-21 to First Amended Complaint, filed in *Stone Castle Management LLC* v. *Island Intellectual Property LLC*, Case No. 20-cv-07868-JMF (S.D.N.Y.), Dkt. No. 28-54, filed on Dec. 22, 2020.
Exhibit 55—Aug. 11, 1986 Interp Letter issued by FDIC, No. 86-22 to First Amended Complaint, filed in *Stone Castle Management LLC* v. *Island Intellectual Property LLC*, Case No. 20-cv-07868-JMF (S.D.N.Y.), Dkt. No. 28-55, filed on Dec. 22, 2020.
Exhibit 56—Aug. 15, 1986 Interp Letter issued by FDIC, No. 86-23 to First Amended Complaint, filed in *Stone Castle Management LLC* v. *Island Intellectual Property LLC*, Case No. 20-cv-07868-JMF (S.D.N.Y.), Dkt. No. 28-56, filed on Dec. 22, 2020.
Exhibit 57—Oct. 20, 1986 Interp Letter issued by FDIC, No. 86-31to First Amended Complaint, filed in *Stone Castle Management LLC* v. *Island Intellectual Property LLC*, Case No. 20-cv-07868-JMF (S.D.N.Y.), Dkt. No. 28-57, filed on Dec. 22, 2020.
Exhibit 58—Aug. 31, 1988 Interp Letter issued by FDIC, No. 88-56 to First Amended Complaint, filed in *Stone Castle Management LLC* v. *Island Intellectual Property LLC*, Case No. 20-cv-07868-JMF (S.D.N.Y.), Dkt. No. 28-58, filed on Dec. 22, 2020.
Exhibit 59—Jun. 19, 1989 Interp Letter issued by FDIC, No. 89-19 to First Amended Complaint, filed in *Stone Castle Management LLC* v. *Island Intellectual Property LLC*, Case No. 20-cv-07868-JMF (S.D.N.Y.), Dkt. No. 28-59, filed on Dec. 22, 2020.
Exhibit 60—Exhibit 59—Aug. 9, 1990 Interp Letter issued by FDIC, No. 90-34 to First Amended Complaint, filed in *Stone Castle Management LLC* v. *Island Intellectual Property LLC*, Case No. 20-cv-07868-JMF (S.D.N.Y.), Dkt. No. 28-60, filed on Dec. 22, 2020.
Exhibit 61—Apr. 1, 1994 Interp Letter issued by FDIC, No. 94-18 to First Amended Complaint, filed in *Stone Castle Management LLC* v. *Island Intellectual Property LLC*, Case No. 20-cv-07868-JMF (S.D.N.Y.), Dkt. No. 28-61, filed on Dec. 22, 2020.
Motion to Dismiss First Amended Complaint, filed in *Stone Castle Management LLC* v. *Island Intellectual Property LLC*, Case No. 20-CV-07868-JMF (S.D.N.Y.), Dkt. No. 30, filed on Jan. 12, 2021.
Declaration of Bruce R. Bent II in Support of Motion to Dismiss, filed in *Stone Castle Management LLC* v. *Island Intellectual Property LLC*, Case No. 20-CV-07868-JMF (S.D.N.Y.), Dkt. No. 31, filed on Jan. 12, 2021.
Opposition to Motion to Dismiss First Amended Complaint, filed in *Stone Castle Management LLC* v. *Island Intellectual Property LLC*, Case No. 20-CV-07868-JMF (S.D.N.Y.), Dkt. No. 34, filed on Jan. 26, 2021.
Declaration of George Shilowitz in Opposition to Motion to Dismiss First Amended Complaint, filed in *Stone Castle Management LLC* v. *Island Intellectual Property LLC*, Case No. 20-cv-07868-JMF (S.D.N.Y.), Dkt. No. 35, filed on Jan. 26, 2021.
Declaration of Jordan Bekier in Opposition to Motion to Dismiss First Amended Complaint, filed in *Stone Castle Management LLC* v. *Island Intellectual Property LLC*, Case No. 20-cv-07868-JMF (S.D.N.Y.), Dkt. No. 36, filed on Jan. 26, 2021.
Exhibit 1—DoubleRock Webpage to Declaration of Jordan Bekier in Opposition to Motion to Dismiss First Amended Complaint filed in *Stone Castle Management LLC* v. *Island Intellectual Property LLC*, Case No. 20-CV-07868-JMF (S.D.N.Y.), Dkt. No. 36-1, filed on Jan. 26, 2021.
Exhibit 2—Dec. 12, 2018 letter to Stone Castle to Declaration of Jordan Bekier in Opposition to Motion to Dismiss First Amended Complaint filed in *Stone Castle Management LLC* v. *Island Intellectual Property LLC*, Case No. 20-CV-07868-JMF (S.D.N.Y.), Dkt. No. 36-2, filed on Jan. 26, 2021.
Reply In Support of Motion to Dismiss First Amended Complaint, filed in *Stone Castle Management LLC* v. *Island Intellectual Property LLC*, Case No. 20-CV-07868-JMF (S.D.N.Y.), Dkt. No. 37, filed on Feb. 2, 2021.

Order of Dismissal, issued in *Stone Castle Management LLC* v. *Island Intellectual Property LLC*, Case No. 20-cv-07868-JMF (S.D.N.Y.), Dkt. No. 39, issued on Mar. 2, 2021.
Amended Complaint, filed in *Island Intellectual Property LLC* v. *American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 28, filed on Feb. 1, 2021.
Exhibit A—U.S. Pat. No. 7,509,286 to Amended Complaint filed in *Island Intellectual Property LLC* v. *American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 28-1, filed on Feb. 1, 2021.
Exhibit B—U.S. Pat. No. 7,668,772 to Amended Complaint filed in *Island Intellectual Property LLC* v. *American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 28-2, filed on Feb. 1, 2021.
Exhibit C—U.S. Pat. No. 8,019,667 to Amended Complaint filed in *Island Intellectual Property LLC* v. *American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 28-3, filed on Feb. 1, 2021.
Exhibit D—U.S. Pat. No. 8,260,697 to Amended Complaint filed in *Island Intellectual Property LLC* v.*American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 28-4, filed on Feb. 1, 2021.
Exhibit E—U.S. Pat. No. 8,566,201 to Amended Complaint filed in *Island Intellectual Property LLC* v. *American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 28-5, filed on Feb. 1, 2021.
Brief In Support of Motion to Dismiss Amended Complaint by Kelly Ann Brown and Robert Harm Zondag, filed in *Island Intellectual Property LLC* v. *American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 31, filed on Mar. 1, 2021.
Declaration of Monica A. Mark In Support of Motion to Dismiss Amended Complaint by Kelly Ann Brown and Robert Harm Zondag, filed in *Island Intellectual Property LLC* v. *American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 32, filed on Mar. 1, 2021.
Exhibit A. Affidavit of Robert Zondag dated Sep. 12, 2019 to Declaration of Monica A. Mark In Support of Motion to Dismiss Amended Complaint by Kelly Ann Brown and Robert Harm Zondag, filed in *Island Intellectual Property LLC* v. *American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 32-1, filed on Mar. 1, 2021.
Exhibit B. Affidavit of Kelly Brown dated Sep. 12, 2019 to Declaration of Monica A. Mark In Support of Motion to Dismiss Amended Complaint by Kelly Ann Brown and Robert Harm Zondag, filed in *Island Intellectual Property LLC* v. *American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 32-2, filed on Mar. 1, 2021.
Exhibit C. Online conversation dated Jul. 16, 2020 to Declaration of Monica A. Mark In Support of Motion to Dismiss Amended Complaint by Kelly Ann Brown and Robert Harm Zondag, filed in *Island Intellectual Property LLC* v. *American Deposit Management, LLC, dba The American Deposit Management Co., A.B. Data,*

(56) References Cited

OTHER PUBLICATIONS

*Ltd., Bruce Allen Arbit, Kelly Ann Brown, and Robert Harm Zondag*, Case No. 20-CV-1535 PP (E.D. Wis.), Dkt. No. 32-3, filed on Mar. 1, 2021.
Brief In Support of Motion to Dismiss Amended Complaint by American Deposit Management LLC, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 35, filed on Mar. 1, 2021.
Brief In Support of Motion to Dismiss Amended Complaint by A.B. Data, Ltd., filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-CV-1535 PP (E.D. Wis.), Dkt. No. 38, filed on Mar. 1, 2021.
Brief In Support of Motion to Dismiss Amended Complaint by Bruce Allen Arbit, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-CV-1535 PP (E.D. Wis.), Dkt. No. 40, filed on Mar. 1, 2021.
Brief In Opposition to Defendant American Deposit Management LLC's Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 41, filed on Apr. 1, 2021.
Brief In Opposition to Defendants Kelly Ann Brown and Robert Harm Zondag's Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 42, filed on Apr. 1, 2021.
Brief In Opposition to Defendants A.B. Data, Ltd. and Bruce Allen Arbits Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 43, filed on Apr. 1, 2021.
Reply In Support of Defendants A.B. Data, Ltd. and Bruce Allen Arbits Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 44, filed on May 3, 2021.
Brief In Support of Defendants Kelly Ann Brown and Robert Harm Zondag's Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 45, filed on May 3, 2021.
Reply in Support of Defendant American Deposit Management LLC's Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 46, filed on May 3, 2021.
Declaration of Monica A. Mark In Support of Defendant American Deposit Management LLC's Reply in Support of the Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 47, filed on May 3, 2021.
Exhibit A—per curiam Order, 20-2146 to Declaration of Monica A. Mark In Support of Defendant American Deposit Management LLC's Reply in Support of the Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 47-1, filed on May 3, 2021.
Exhibit B—Memorandum of Law, 19-cv-04792-JPO to Declaration of Monica A. Mark In Support of Defendant American Deposit Management LLC's Reply in Support of the Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 47-2, filed on May 3, 2021.
Exhibit C—Motion to Stay, 20-2146 to Declaration of Monica A. Mark In Support of Defendant American Deposit Management LLC's Reply in Support of the Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 47-3, filed on May 3, 2021.
Exhibit D—Order, 19-cv-04792-JPO to Declaration of Monica A. Mark In Support of Defendant American Deposit Management LLC's Reply in Support of the Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 47-4, filed on May 3, 2021.
Exhibit E—per curiam Order, 20-2146 to Declaration of Monica A. Mark In Support of Defendant American Deposit Management LLC's Reply in Support of the Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 47-5, filed on May 3, 2021.
Exhibit F—per curiam Order, 20-2146 to Declaration of Monica A. Mark In Support of Defendant American Deposit Management LLC's Reply in Support of the Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 47-6, filed on May 3, 2021.
Exhibit G—Joint Letter, 20-cv-07868-JMF to Declaration of Monica A. Mark In Support of Defendant American Deposit Management LLC's Reply in Support of the Motion to Dismiss Amended Complaint, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 47-7, filed on May 3, 2021.
Joint Stipulation of Dismissal with Prejudice, filed in *Island Intellectual Property LLC v. American Deposit Management, LLC, dba The American Deposit Management Co., A.B. Data, Ltd., Bruce Allen Arbit, Kelly Ann Brown, and Robert Harm Zondag*, Case No. 20-cv-1535 PP (E.D. Wis.), Dkt. No. 52, filed on Oct. 5, 2021.
Complaint, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), Dkt. No. 1, filed on Jul. 20, 2021.
Exhibit 1 to Complaint, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), Dkt. No. 1-2, filed on Jul. 20, 2021.
Exhibit 2 to Complaint, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), Dkt. No. 1-3, filed on Jul. 20, 2021.

(56) References Cited

OTHER PUBLICATIONS

Exhibit 3 to Complaint, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), Dkt. No. 1-4, filed on Jul. 20, 2021.

Exhibit 4 to Complaint, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), Dkt. No. 1-5, filed on Jul. 20, 2021.

Exhibit 5 to Complaint, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), Dkt. No. 1-6, filed on Jul. 20, 2021.

Motion to Dismiss the Complaint for Failure to State a Claim Under Fed. R. Civ. P. 12(b)(6), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 25, filed on Sep. 30, 2021.

Response In Opposition to Motion to Dismiss the Complaint for Failure to State a Claim Under Fed. R. Civ. P. 12(b)(6), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), Dkt. No. 38, filed on Oct. 29, 2021.

Exhibit A—TXISL-010708-TXISL-010715 to Response In Opposition to Motion to Dismiss the Complaint for Failure to State a Claim Under Fed. R. Civ. P. 12(b)(6), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 38-1, filed on Oct. 29, 2021.

Reply In Support of Motion to Dismiss the Complaint for Failure to State a Claim Under Fed. R. Civ. P. 12(b)(6), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), Dkt. No. 40, filed on Nov. 5, 2021.

Affidavit—Declaration of Janis E. Clements to 115. Reply In Support of Motion to Dismiss the Complaint for Failure to State a Claim Under Fed. R. Civ. P. 12(b)(6), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 40-1, filed on Nov. 5, 2021.

Exhibit A to Declaration—Consent Judgment to Reply In Support of Motion to Dismiss the Complaint for Failure to State a Claim Under Fed. R. Civ. P. 12(b)(6), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), Dkt. No. 40-2, filed on Nov. 5, 2021.

Sur-Reply In Opposition to Motion to Dismiss the Complaint for Failure to State a Claim Under Fed. R. Civ. P. 12(b)(6), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), Dkt. No. 43, filed on Nov. 12, 2021.

Plaintiff Island Intellectual Property LLC's Disclosure of Asserted Claims and Infringement Contentions and Identification of Document Production Accompanying Disclosure (with Exhibits), served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), served on Sep. 15, 2021.

Exhibit A to Plaintiff Island Intellectual Property LLC's Disclosure of Asserted Claims and Infringement Contentions and Identification of Document Production Accompanying Disclosure (with Exhibits), served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Sep. 15, 2021..

Exhibit B to Plaintiff Island Intellectual Property LLC's Disclosure of Asserted Claims and Infringement Contentions and Identification of Document Production Accompanying Disclosure (with Exhibits), served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Sep. 15, 2021.

Exhibit C to Plaintiff Island Intellectual Property LLC's Disclosure of Asserted Claims and Infringement Contentions and Identification of Document Production Accompanying Disclosure (with Exhibits), served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Sep. 15, 2021.

Exhibit D to Plaintiff Island Intellectual Property LLC's Disclosure of Asserted Claims and Infringement Contentions and Identification of Document Production Accompanying Disclosure (with Exhibits), served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Sep. 15, 2021.

Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Exhibit A-1—551 Lincoln-1985 (1985 SEC No. Act. Lexis 1593) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Exhibit A-2 551—Hagan (U.S. Pat. No. 5,291,398) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Exhibit A-3 551—Gottesman (U.S. Pat. No. 6,049,782) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Exhibit A-4 551-Britt (America's Community Banker. Dec. 1997, vol. 6 Issue 12) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Exhibit A-5—551 Wharton Study (The Merrill Lynch cash management account financial service—a case study in strategic information systems) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. B-1—821-Lincoln-1985 (1985 SEC No. Act. Lexis 1593) to Defendants' Preliminary Invalidity and Subject Matter Eligibility Contentions, served in *Island Intellectual Property LLC v. TD Ameritrade, Inc., TD Ameritrade Clearing, Inc., TD Ameritrade*

(56) References Cited

OTHER PUBLICATIONS

*Trust Company, TD Ameritrade Holding Corp., and The Charles Schwab Corporation*, Case No. 21-cv-00273-JRG (E.D. Tex.), served on Nov. 23, 2021.
Ex. B-2—821-Hagan (U.S. Pat. No. 5,291,328) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. B-3—821 Gottesman (U.S. Pat. No. 6,049,782) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. B-4—821-Britt (America's Community Banker. Dec. 97, vol. 6 Issue 12) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. B-5—821-Wharton Study (The Merrill Lynch cash management account financial service—a case study in strategic information systems) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. C-1—916-Lincoln-1985 (1985 SEC No. Act. Lexis 1593) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. C-2—916-Hagan (U.S. Pat. No. 5,291,398) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. C-3—916-Gottesman (U.S. Pat. No. 6,049,782) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. C-4—916-Britt (America's Community Banker. Dec. 1997, vol. 6 Issue 12) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. C-5—916-Wharton Study (The Merrill Lynch cash management account financial service—a case study in strategic information systems) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. D-1—286-Lincoln-1985 (1985 SEC No. Act. Lexis 1593) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. D-2—286 Hagan (U.S. Pat. No. 5,291,398) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. D-3—286-Gottesman (U.S. Pat. No. 6,049,782) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. D-4—286-Britt (America's Community Banker. Dec. 1997, vol. 6 Issue 12) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. D-5—286-Wharton Study (The Merrill Lynch cash management account financial service—a case study in strategic information systems) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. E-1—734—Lincoln-1985 (1985 SEC No. Act. Lexis 1593) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. E-2—734—Hagan (U.S. Pat. No. 5,291,398) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. E-3—734—Gottesman (U.S. Pat. No. 6,049,782) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. E-4—734-Britt (America's Community Banker. Dec. 97, vol. 6 Issue 12) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. E-5—734—Wharton Study (The Merrill Lynch cash management account financial service—a case study in strategic information systems) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Exhibit F-1 551 Subject Matter Contentions to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Exhibit F-2 821 Subject Matter Contentions to Defendants' Preliminary Invalidity and Subject Matter Eligibility Contentions,

(56) References Cited

OTHER PUBLICATIONS served in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Exhibit F-3 916 Subject Matter Contentions to Defendants' Preliminary Invalidity and Subject Matter Eligibility Contentions, served in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Exhibit F-4 286 Subject Matter Contentions to Defendants' Preliminary Invalidity and Subject Matter Eligibility Contentions, served in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Exhibit F-5 734 Subject Matter Contentions to Defendants' Preliminary Invalidity and Subject Matter Eligibility Contentions, served in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Plaintiff's PR 4-2 Disclosure of Preliminary Claim Constructions and Extrinsic Evidence, served in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Jan. 12, 2021.
Defendants' Disclosure of Preliminary Claim Constructions and Extrinsic Evidence Pursuant to P.R. 4-2, served in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Jan. 12, 2021.
Protective Order, issued in in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 1, filed on Jul. 20, 2021.
Joint Claim Construction and Prehearing Statement by Island Intellectual Property LLC, filed in in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 47, filed on Feb. 1, 2022.
Exhibit A to Joint Claim Construction and Prehearing Statement by Island Intellectual Property LLC filed in in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 47-1, filed on Feb. 1, 2022.
Exhibit B to Joint Claim Construction and Prehearing Statement by Island Intellectual Property LLC filed in in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 47-2, filed on Feb. 1, 2022.
Exhibit C to Joint Claim Construction and Prehearing Statement by Island Intellectual Property LLC filed in in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 47-3, filed on Feb. 1, 2022.
Exhibit D to Joint Claim Construction and Prehearing Statement by Island Intellectual Property LLC filed in in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 47-4, filed on Feb. 1, 2022.

Opening Claim Construction Brief filed by Island Intellectual Property LLC in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54, filed on Mar. 2, 2022.
Declaration of John Dellaportas in Support of Plaintiff's Opening Claim Construction Brief Filed By Island Intellectual Property LLC in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-1, filed on Mar. 2, 2022.
Exhibit 1 to Opening Claim Construction Brief filed by Island Intellectual Property LLC in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-2, filed on Mar. 2, 2022.
Exhibit 2 to Opening Claim Construction Brief filed by Island Intellectual Property LLC in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-2, filed on Mar. 2, 2022.
Exhibit 3 to Opening Claim Construction Brief filed by Island Intellectual Property LLC in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-4, filed on Mar. 2, 2022.
Exhibit 4 to Opening Claim Construction Brief filed by Island Intellectual Property LLC in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-5, filed on Mar. 2, 2022.
Exhibit 5 to Opening Claim Construction Brief filed by Island Intellectual Property LLC in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-6, filed on Mar. 2, 2022.
Exhibit 6 to Opening Claim Construction Brief filed by Island Intellectual Property LLC in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-7, filed on Mar. 2, 2022.
Exhibit 7 to Opening Claim Construction Brief filed by Island Intellectual Property LLC in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-8, filed on Mar. 2, 2022.
Exhibit 8 to Opening Claim Construction Brief filed by Island Intellectual Property LLC in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-9, filed on Mar. 2, 2022.
Exhibit 9 to Opening Claim Construction Brief filed by Island Intellectual Property LLC in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-10, filed on Mar. 2, 2022.
Exhibit 10 to Opening Claim Construction Brief filed by Island Intellectual Property LLC in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-11, filed on Mar. 2, 2022.

(56) References Cited

OTHER PUBLICATIONS

Exhibit 11 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-12, filed on Mar. 2, 2022.
Exhibit 12 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-13, filed on Mar. 2, 2022.
Exhibit 13 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-14, filed on Mar. 2, 2022.
Exhibit 14 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-15, filed on Mar. 2, 2022.
Exhibit 15 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-16, filed on Mar. 2, 2022.
Exhibit 16 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-17, filed on Mar. 2, 2022.
Exhibit 17 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-18, filed on Mar. 2, 2022.
Exhibit 18 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-19, filed on Mar. 2, 2022.
Exhibit 19 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-20, filed on Mar. 2, 2022.
Exhibit 20 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-21, filed on Mar. 2, 2022.
Exhibit 21 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-22, filed on Mar. 2, 2022.
Exhibit 22 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-23, filed on Mar. 2, 2022.
Exhibit 23 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-24, filed on Mar. 2, 2022.
Exhibit 24 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-25, filed on Mar. 2, 2022.
Exhibit 25 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-26, filed on Mar. 2, 2022.
Exhibit 26 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-27, filed on Mar. 2, 2022.
Exhibit 27 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-28, filed on Mar. 2, 2022.
Exhibit 28 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-29, filed on Mar. 2, 2022.
Exhibit 29 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-30, filed on Mar. 2, 2022.
Declaration of Ivan Zatkovich in Support of Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-30, filed on Mar. 2, 2022.
Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55, filed on Mar. 16, 2022.
Exhibit 1 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-1, filed on Mar. 16, 2022.
Exhibit 2 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-2, filed on Mar. 16, 2022.
Exhibit 3 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade

(56) References Cited

OTHER PUBLICATIONS

*Trust Company, TD Ameritrade Holding Corp., and The Charles Schwab Corporation*, Case No. 21-cv-00273-JRG (E.D. Tex.), Dkt. No. 55-3, filed on Mar. 16, 2022.
Exhibit 4 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-4, filed on Mar. 16, 2022.
Exhibit 5 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-5, filed on Mar. 16, 2022.
Exhibit 6 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-6, filed on Mar. 16, 2022.
Exhibit 7 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-7, filed on Mar. 16, 2022.
Exhibit 8 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-8, filed on Mar. 16, 2022.
Exhibit 9 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-9, filed on Mar. 16, 2022.
Exhibit 10 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-10, filed on Mar. 16, 2022.
Exhibit 11 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-11, filed on Mar. 16, 2022.
Exhibit 12 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-12, filed on Mar. 16, 2022.
Exhibit 13 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-13, filed on Mar. 16, 2022.
Exhibit 14 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-14, filed on Mar. 16, 2022.
Exhibit 15 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-15, filed on Mar. 16, 2022.
Exhibit 16 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-16, filed on Mar. 16, 2022.
Exhibit 17 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-17, filed on Mar. 16, 2022.
Exhibit 18 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-18, filed on Mar. 16, 2022.
Reply to Claim Construction Brief filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 58, filed on Mar. 25, 2022.
Declaration of John Dellaportas to Reply to Claim Construction Brief filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 58-1, filed on Mar. 25, 2022.
Exhibit 30 to Reply to Claim Construction Brief filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 58-2, filed on Mar. 25, 2022.
Exhibit 31 to Reply to Claim Construction Brief filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 58-3, filed on Mar. 25, 2022.
Joint Claim Construction Chart by Island Intellectual Property LLC filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 59, filed on Mar. 30, 2022.
Exhibit A to Joint Claim Construction Chart by Island Intellectual Property LLC filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 59-1, filed on Mar. 30, 2022.
Orderdenying without prejudice Doc. 25 Motion to Dismiss the Complaint for Failure to State a Claim Under Fed. R. Civ. P. 12(b)(6), issued in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), Dkt. No. 63, on Apr. 12, 2022.
Redaction to 68 Response to Non-Motion, SealedAnswer and Counterclaims by TD Ameritrade Clearing, Inc., et al., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 71, on May 5, 2022.

(56) References Cited

OTHER PUBLICATIONS

Response to 68 Response to Non-Motion, Answer to Counterclaims by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 71, on May 5, 2022.
Claim Construction Memorandum Opinion and Order. Signed by District Judge Rodney Gilstrap, issued in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 73, on May 20, 2022.
Stipulation by Island Intellectual Property LLC. filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 78, on Jun. 9, 2022.
Stipulation by Island Intellectual Property LLC. filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 79, on Jun. 10, 2022.
Stipulation by Island Intellectual Property LLC. filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 81, on May 5, 2022.
Motion to Strike / Defendants Daubert Motion to Exclude the Opinions and Testimony of Brian P. Murphy by TD Ameritrade Clearing, Inc., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 85, on Jul. 15, 2022.
Declaration of Nicholas A. Brown in Support of Defendants' Daubert Motion to Exclude the Opinions and Testimony of Brian P. Murphy, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 85-1, on Jul. 15, 2022.
Exhibit 1 to Motion to Strike / Defendants Daubert Motion To Exclude the Opinions and Testimony of Brian P. Murphy by TD Ameritrade Clearing, Inc., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 85-2, on Jul. 15, 2022.
Exhibit 2 to Motion to Strike / Defendants Daubert Motion to Exclude the Opinions and Testimony of Brian P. Murphy by TD Ameritrade Clearing, Inc., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 85-3, on Jul. 15, 2022.
Exhibit 3 to Motion to Strike / Defendants Daubert Motion to Exclude the Opinions and Testimony of Brian P. Murphy by TD Ameritrade Clearing, Inc., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 85-4, on Jul. 15, 2022.
Proposed Order to Motion to Strike / Defendants Daubert Motion to Exclude the Opinions and Testimony of Brian P. Murphy by TD Ameritrade Clearing, Inc., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 85-5, on Jul. 15, 2022.
Motion to Strike / Plaintiffs Daubert Motion to Exclude Certain Portions of the Expert Testimony of Richard T. Powers Regarding Invalidity of U.S. Pat. Nos. 7,508,286 7,519,551; 7,933,821; and 8,311,916 and for Summary Judgment of no Anticipation By the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88, on Jul. 15, 2022.
Appendix A to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-2, on Jul. 15, 2022.
Appendix B to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-3, on Jul. 15, 2022.
Appendix C to Motion to Strike / Plaintiffs Daubert Motion To Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-4, on Jul. 15, 2022.
Appendix D to Motion to Strike / Plaintiffs Daubert Motion To Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-5, on Jul. 15, 2022.
Appendix E to Motion to Strike / Plaintiffs Daubert Motion To Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-6, on Jul. 15, 2022.
Appendix F to Motion to Strike / Plaintiffs Daubert Motion To Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-7, on Jul. 15, 2022.
Appendix G to Motion to Strike / Plaintiffs Daubert Motion To Exclude Certain Portions of the Expert Testimony of Richard T. Powers Regarding Invalidity of U.S. Pat. Nos. 7,508,286; 7,519,551;

(56) References Cited

OTHER PUBLICATIONS 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-8, on Jul. 15, 2022.

Appendix H to Motion to Strike / Plaintiffs Daubert Motion To Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No. Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-9, on Jul. 15, 2022.

Appendix 1 to Motion to Strike / Plaintiffs Daubert Motion To Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-10, on Jul. 15, 2022.

Appendix J to Motion to Strike / Plaintiffs Daubert Motion To Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-11, on Jul. 15, 2022.

Appendix K to Motion to Strike / Plaintiffs Daubert Motion to Exclude Certain Portions of the Expert Testimony of Richard T. Powers Regarding Invalidity of U.S. Pat.Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-12, on Jul. 15, 2022.

Appendix L to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation By the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-13, on Jul. 15, 2022.

Appendix M to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation By the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-14, on Jul. 15, 2022.

Appendix N to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation By the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-15, on Jul. 15, 2022.

Appendix O to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-16, on Jul. 15, 2022.

Appendix P to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-17, on Jul. 15, 2022.

Appendix Q to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-18, on Jul. 15, 2022.

Appendix R to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-19, on Jul. 15, 2022.

Appendix S to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-20, on Jul. 15, 2022.

Appendix T to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-21, on Jul. 15, 2022.

Appendix U to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property

(56) References Cited

OTHER PUBLICATIONS

LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-22, on Jul. 15, 2022.
Redaction to 84 Sealed Motion to Strike as Untimely Certain Portions of the Expert Testimony of Richard T. Powers Regarding Invalidity of U.S. Pat. Nos. 7,508,286 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97, on Jul. 20, 2022.
Exhibit A to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-2, on Jul. 20, 2022.
Exhibit B to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-3, on Jul. 20, 2022.
Exhibit C to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-4, on Jul. 20, 2022.
Exhibit E to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-6, on Jul. 20, 2022.
Exhibit G to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-8, on Jul. 20, 2022.
Exhibit H to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-9, on Jul. 20, 2022.
Exhibit K to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-12, on Jul. 20, 2022.
Exhibit L to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-13, on Jul. 20, 2022.
Exhibit M to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-14, on Jul. 20, 2022.
Exhibit N to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-15, on Jul. 20, 2022.
Exhibit O to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-16, on Jul. 20, 2022.
Exhibit P to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-17, on Jul. 20, 2022.
Exhibit Q to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-18, on Jul. 20, 2022.
Redaction to 86 Sealed Motion to Strike and Exclude New and Untimely Opinions of Steven R. Kursh Regarding Written Description and Noninfringement of U.S. Pat. Nos. 7,508,286; 7,519,551 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98, on Jul. 20, 2022.
Exhibit B to Redaction to 86 Sealed Motion to Strike and Exclude New and Untimely Opinions of Steven R. Kursh Regarding Written Description and Noninfringement of U.S. Pat. Nos. 7,508,286 7,519,551; 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-3, on Jul. 20, 2022.
Exhibit C to Redaction to 86 Sealed Motion to Strike and Exclude New and Untimely Opinions of Steven R. Kursh Regarding Written Description and Noninfringement of U.S. Pat. Nos. 7,508,286 7,519,551; 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-4, on Jul. 20, 2022.

(56) References Cited

OTHER PUBLICATIONS

Exhibit D to Redaction to 86 Sealed Motion to Strike and Exclude New and Untimely Opinions of Steven R. Kursh Regarding Written Description and Noninfringement of U.S. Pat. Nos. 7,508,286 7,519,551; 7,933,821; and 8,311,916, , filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-5, on Jul. 20, 2022.

Exhibit E to Redaction to 86 Sealed Motion to Strike and Exclude New and Untimely Opinions of Steven R. Kursh Regarding Written Description and Noninfringement of U.S. Pat. Nos. 7,508,286 7,519,551; 7,933,821; and 8,311,916, , filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-6, on Jul. 20, 2022.

Exhibit F to Redaction to 86 Sealed Motion to Strike and Exclude New and Untimely Opinions of Steven R. Kursh Regarding Written Description and Noninfringement of U.S. Pat. Nos. 7,508,286 7,519,551; 7,933,821; and 8,311,916, , filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-7, on Jul. 20, 2022.

Exhibit G to Redaction to 86 Sealed Motion to Strike and Exclude New and Untimely Opinions of Steven R. Kursh Regarding Written Description and Noninfringement of U.S. Patent. Nos. 7,508,286 7,519,551; 7,933,821; AND 8,311,916, , filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-CV-00273-JRG (E.D. Tex.), Dkt. No. 98-8, on Jul. 20, 2022.

Exhibit H to Redaction to 86 Sealed Motion to Strike and Exclude New and Untimely Opinions of Steven R. Kursh Regarding Written Description and Noninfringement of U.S. Pat. Nos. 7,508,286 7,519,551; 7,933,821; and 8,311,916, , filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-9, on Jul. 20, 2022.

Exhibit I to Redaction to 86 Sealed Motion to Strike and Exclude New and Untimely Opinions of Steven R. Kursh Regarding Written Description and Noninfringement of U.S. Pat. Nos. 7,508,286 7,519,551; 7,933,821; and 8,311,916, , filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-10, on Jul. 20, 2022.

Exhibit J to Redaction to 86 Sealed Motion to Strike and Exclude New and Untimely Opinions of Steven R. Kursh Regarding Written Description and Noninfringement of U.S. Pat. Nos. 7,508,286 7,519,551; 7,933,821; and 8,311,916, , filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-11, on Jul. 20, 2022.

Exhibit L to Redaction to 86 Sealed Motion to Strike and Exclude New and Untimely Opinions of Steven R. Kursh Regarding Written Description and Noninfringement of U.S. Pat. Nos. 7,508,286 7,519,551; 7,933,821; and 8,311,916, , filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-13, on Jul. 20, 2022.

Exhibit M to Redaction to 86 Sealed Motion to Strike and Exclude New and Untimely Opinions of Steven R. Kursh Regarding Written Description and Noninfringement of U.S. Pat. Nos. 7,508,286 7,519,551; 7,933,821; and 8,311,916,, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-14, on Jul. 20, 2022.

Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct By Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99, on Jul. 20, 2022.

Exhibit A to Redactipn to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based On Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-2, on Jul. 20, 2022.

Exhibit B to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based On Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-3, on Jul. 20, 2022.

Exhibit C to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based On Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-4, on Jul. 20, 2022.

Exhibit D to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based On Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-5, on Jul. 20, 2022.

Exhibit E to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-6, on Jul. 20, 2022.

Exhibit G to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-8, on Jul. 20, 2022.

Exhibit H to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade*

(56) References Cited

OTHER PUBLICATIONS

*Holding Corp., and The Charles Schwab Corporation*, Case No. 21-cv-00273-JRG (E.D. Tex.), Dkt. No. 99-9, on Jul. 20, 2022.
Exhibit J to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-11, on Jul. 20, 2022.
Exhibit K to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-12, on Jul. 20, 2022.
Exhibit L to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-13, on Jul. 20, 2022.
Exhibit N to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-15, on Jul. 20, 2022.
Exhibit O to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-16, on Jul. 20, 2022.
Exhibit P to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-17, on Jul. 20, 2022.
Exhibit Q to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-18, on Jul. 20, 2022.
Exhibit R to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-19, on Jul. 20, 2022.
Exhibit S to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-20, on Jul. 20, 2022.
Exhibit T to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-21, on Jul. 20, 2022.
Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100, on Jul. 20, 2022.
Exhibit C to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-4, on Jul. 20, 2022.
Exhibit F to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-7, on Jul. 20, 2022.
Exhibit G to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-8, on Jul. 20, 2022.
Exhibit H to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-9, on Jul. 20, 2022.
Exhibit I to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island*

(56) References Cited

OTHER PUBLICATIONS

*Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-10, on Jul. 20, 2022.
Exhibit J to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-11, on Jul. 20, 2022.
Exhibit K to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-12, on Jul. 20, 2022.
Exhibit P to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-17, on Jul. 20, 2022.
Exhibit V to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-23, on Jul. 20, 2022.
Redaction to 87 Sealed Motion / Defendants' Motion for Partial Summary Judgment of No. Infringement Under the Doctrine of Equivalents and No. Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102, on Jul. 20, 2022.
Declaration of Nicholas A. Brown in Support of Defendants' Motion for Partial Summary Judgment of No Infringement Under the Doctrine of Equivalents and No Indirect Infringement, to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-1, on Jul. 20, 2022.
Exhibit 2 to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-2, on Jul. 20, 2022.
Exhibit 3 to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-3, on Jul. 20, 2022.
Exhibit 4 to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-4, on Jul. 20, 2022.
Exhibit 5 to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-5, on Jul. 20, 2022.
Exhibit 6 to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-6, on Jul. 20, 2022.
Exhibit 7 to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-7, on Jul. 20, 2022.
Redaction to 91 Sealed Motion / Defendants' Daubert Motion To Exclude the Opinions and Testimony of Bryan M. Van Uden, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 103, on Jul. 20, 2022.
Declaration OF Julie P. Bookbinder In Support OF Defendants' Daubert Motion To Exclude The Opinions and Testimony of Bryan M. Van Uden Deredaction to 91 Sealed Motion /Defendants' Daubert Motion To Exclude the Opinions and Testimony of Bryan M. Van Uden, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 103-1, on Jul. 20, 2022.
Exhibit 1 to Redaction to 91 Sealed Motion / Defendants' Daubert Motion To Exclude the Opinions and Testimony of Bryan M. Van Uden, filed in *Island Intellectual Property LLC v. TD Ameritrade,*

(56) References Cited

OTHER PUBLICATIONS

Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 103-2, on Jul. 20, 2022.

Exhibit 6 to Redaction to 91 Sealed Motion / Defendants' Daubert Motion To Exclude the Opinions and Testimony of Bryan M. Van Uden, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 103-3, on Jul. 20, 2022.

Redactiion to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104, on Jul. 20, 2022.

Declaration Nicholas A. Brown in Support of Defendants' Motion for Summary Judgment, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-1, on Jul. 20, 2022.

Exhibit 1 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-2, on Jul. 20, 2022.

Exhibit 2 to Redactin to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-3, on Jul. 20, 2022.

Exhibit 3 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-4, on Jul. 20, 2022.

Exhibit 4 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-5, on Jul. 20, 2022.

Exhibit 5 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-6, on Jul. 20, 2022.

Exhibit 6 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-7, on Jul. 20, 2022.

Exhibit 7 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-8, on Jul. 20, 2022.

Exhibit 8 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-9, on Jul. 20, 2022.

Exhibit 9 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-10, on Jul. 20, 2022.

Exhibit 10 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-11, on Jul. 20, 2022.

Exhibit 11 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-12, on Jul. 20, 2022.

Exhibit 12 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-13, on Jul. 20, 2022.

Exhibit 13 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade*

(56) References Cited

OTHER PUBLICATIONS

Trust Company, TD Ameritrade Holding Corp., and The Charles Schwab Corporation, Case No. 21-cv-00273-JRG (E.D. Tex.), Dkt. No. 104-14, on Jul. 20, 2022.
Exhibit 14 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-15, on Jul. 20, 2022.
Exhibit 15 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-16, on Jul. 20, 2022.
Exhibit 16 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-17, on Jul. 20, 2022.
Exhibit 17 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-18, on Jul. 20, 2022.
Exhibit 18 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-19, on Jul. 20, 2022.
Exhibit 19 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-20, on Jul. 20, 2022.
Exhibit 20 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-21, on Jul. 20, 2022.
Exhibit 21 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-22, on Jul. 20, 2022.
Exhibit 22 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-23, on Jul. 20, 2022.
Exhibit 23 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-24, on Jul. 20, 2022.
Exhibit 24 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-25, on Jul. 20, 2022.
Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105, on Jul. 20, 2022.
Declaration of Julie P. Bookbinder in Support of Defendants' Daubert Motion to Exclude Certain Opinions and Testimony of Ivan Zatkovich filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-1, on Jul. 20, 2022.
Exhibit 1 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-2, on Jul. 20, 2022.
Exhibit 2 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-3, on Jul. 20, 2022.
Exhibit 3 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade*

(56) References Cited

OTHER PUBLICATIONS

*Clearing, Inc., TD Ameritrade Trust Company, TD Ameritrade Holding Corp., and The Charles Schwab Corporation*, Case No. 21-cv-00273-JRG (E.D. Tex.), Dkt. No. 105-4, on Jul. 20, 2022.
Exhibit 4 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-5, on Jul. 20, 2022.
Exhibit 6 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), Dkt. No. 105-6, on Jul. 20, 2022.
Exhibit 7 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-7, on Jul. 20, 2022.
Exhibit 8 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-8, on Jul. 20, 2022.
Exhibit 10 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-9, on Jul. 20, 2022.
Exhibit 11 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-10, on Jul. 20, 2022.
Exhibit 12 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-11, on Jul. 20, 2022.
Resposse in Opposition re 85 Motion to Strike / Defendants Daubert Motion to Exclude the Opinions and Testimony of Brian P. Murphy filed by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 106, on Jul. 20, 2022.
Exhibit A to Response in Opposition re 85 Motion to Strike / Defendants Daubert Motion to Exclude the Opinions and Testimony of Brian P. Murphy filed by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 106-1, on Jul. 20, 2022.
Exhibit B to Response in Opposition re 85 Motion to Strike / Defendants Daubert Motion to Exclude the Opinions and Testimony of Brian P. Murphy filed by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 106-2, on Jul. 20, 2022.
Exhibit C to Response in Opposition re 85 Motion to Strike / Defendants Daubert Motion to Exclude the Opinions and Testimony of Brian P. Murphy filed by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 106-3, on Jul. 20, 2022.
Exhibit D to Response in Opposition re 85 Motion to Strike / Defendants Daubert Motion to Exclude the Opinions and Testimony of Brian P. Murphy filed by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 106-4, on Jul. 20, 2022.
Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116, on Jul. 29, 2022.
Exhibit 1 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-1, on Jul. 29, 2022.
Exhibit 2 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-2, on Jul. 29, 2022.

(56) References Cited

OTHER PUBLICATIONS

Exhibit 3 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-3, on Jul. 29, 2022.

Exhibit 4 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-4, on Jul. 29, 2022.

Exhibit 6 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-5, on Jul. 29, 2022.

Exhibit 7 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-6, on Jul. 29, 2022.

Exhibit 8 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No. Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-7, on Jul. 29, 2022.

Exhibit 9 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-8, on Jul. 29, 2022.

Exhibit 10 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-9, on Jul. 29, 2022.

Exhibit 11 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-10, on Jul. 29, 2022.

Exhibit 12 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116,-11 on Jul. 29, 2022.

Exhibit 13 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-12, on Jul. 29, 2022.

Exhibit 14 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-13, on Jul. 29, 2022.

Exhibit 15 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade

(56) References Cited

OTHER PUBLICATIONS

Trust Company, TD Ameritrade Holding Corp., and The Charles Schwab Corporation, Case No. 21-cv-00273-JRG (E.D. Tex.), Dkt. No. 116-14, on Jul. 29, 2022.

Declaration of Nicholas A. Brown in Support of Defendants Opposition to Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art, filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 116-15, on Jul. 29, 2022.

Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916 by TD Ameritrade Clearing, Inc., TD Ameritrade Holding Corp., TD AmeritradeTrust Company, TD Ameritrade, Inc., The Charles Schwab Corporation, filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 117, on Jul. 29, 2022.

Exhibit 1 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551 7,933,821; and 8,311,916 by TD Ameritrade Clearing, Inc., TD Ameritrade Holding Corp., TD Ameritrade Trust Company, TD Ameritrade, Inc., The Charles Schwab Corporation, filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 117-1, on Jul. 29, 2022.

Exhibit 2 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551 7,933,821; and 8,311,916 by TD Ameritrade Clearing, Inc., TD Ameritrade Holding Corp., TD Ameritrade Trust Company, TD Ameritrade, Inc., The Charles Schwab Corporation, filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 117-2, on Jul. 29, 2022.

Exhibit 3 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat/ Nos. 7,508,286; 7,519,551 7,933,821; and 8,311,916 byTD Ameritrade Clearing, Inc., TD Ameritrade Holding Corp., TD Ameritrade Trust Company, TD Ameritrade, Inc., The Charles Schwab Corporation, filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 117-3, on Jul. 29, 2022.

Exhibit 4 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551 7,933,821; and 8,311,916 byTD Ameritrade Clearing, Inc., TD Ameritrade Holding Corp., TD Ameritrade Trust Company, TD Ameritrade, Inc., The Charles Schwab Corporation, filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 117-4, on Jul. 29, 2022.

Exhibit 5 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551 7,933,821; and 8,311,916 byTD Ameritrade Clearing, Inc., TD Ameritrade Holding Corp., TD Ameritrade Trust Company, TD Ameritrade, Inc., The Charles Schwab Corporation, filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 117-5, on Jul. 29, 2022.

Exhibit 7 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551 7,933,821; and 8,311,916 byTD Ameritrade Clearing, Inc., TD Ameritrade Holding Corp., TD Ameritrade Trust Company, TD Ameritrade, Inc., The Charles Schwab Corporation, filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 117-6, on Jul. 29, 2022.

Exhibit 9 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551 7,933,821; and 8,311,916 byTD Ameritrade Clearing, Inc., TD Ameritrade Holding Corp., TD Ameritrade Trust Company, TD Ameritrade, Inc., The Charles Schwab Corporation, filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 117-7, on Jul. 29, 2022.

Declaration of Nicholas A. Brown in Support of Defendants' Opposition to Plaintiff's Motion to Strike and Exclude New and Untimely Opinions of Steven R. Kursh Regarding Written Description and Noninfringement of U.S. Pat. Nos. 7,508,286; 7,519,551; 7,933,821; and 8,311,916, filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 117-8, on Jul. 29, 2022.

Redaction to 109 Sealed Patent Response to Sealed Patent Motion,, re 84 Sealed Motion to Strike as Untimely Certain Portions of the Expert Testimony of Richard T. Powers Regarding Invalidity by TD Ameritrade Clearing, Inc., TD Ameritrade Holding Corp., TD Ameritrade Trust Company, TD Ameritrade, Inc., The Charles Schwab Corporation, filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 118, on Jul. 29, 2022.

Exhibit 2 to Redaction to 109 Sealed Patent Response to Sealed Patent Motion,, re 84 Sealed Motion to Strike as Untimely Certain Portions of the Expert Testimony of Richard T. Powers Regarding Invalidity by TD Ameritrade Clearing, Inc., TD Ameritrade Holding Corp., TD Ameritrade Trust Company, TD Ameritrade, Inc., The Charles Schwab Corporation, filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 118-1, on Jul. 29, 2022.

Exhibit 3 to Redactipm to 109 Sealed Patent Response to Sealed Patent Motion,, re 84 Sealed Motion to Strike as Untimely Certain Portions of the Expert Testimony of Richard T. Powers Regarding Invalidity by TD Ameritrade Clearing, Inc., TD Ameritrade Holding Corp., TD Ameritrade Trust Company, TD Ameritrade, Inc., The Charles Schwab Corporation, filed in Island Intellectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 118-2, on Jul. 29, 2022.

(56) References Cited

OTHER PUBLICATIONS

Exhibit 4 to Redaction to 109 Sealed Patent Response to Sealed Patent Motion,, re 84 Sealed Motion to Strike as Untimely Certain Portions of the Expert Testimony of Richard T. Powers Regarding Invalidity by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 118-3, on Jul. 29, 2022.

Exhibit 6 to Redaction to 109 Sealed Patent Response to Sealed Patent Motion,, re 84 Sealed Motion to Strike as Untimely Certain Portions of the Expert Testimony of Richard T. Powers Regarding Invalidity by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 118-4, on Jul. 29, 2022.

Declaration of Nicholas A. Brown in Support of Defendants' Opposition To Plaintiff's Motion to Strike as Untimely Certain Portions of the Expert Testimony of Richard T. Powers Regarding Invalidity of U.S. Pat. Nos. 7,508,286; 7,519,551; 7,933,821; and 8,311,916, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 118-5, on Jul. 29, 2022.

Redaction to 111 Sealed Patent Response to Sealed Patent Motion,,, re 95 Sealed Motion (Corrected) /Daubert Motion to Exclude Reasonable Royalty Analysis of Dana Trexler as Unreliable and to Strike Her Opinions as to Cost of Alleged Non-Infringing Alternative by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 119, on Jul. 29, 2022.

Exhibit 2 to Redaction to 111 Sealed Patent Response to Sealed Patent Motion,,, re 95 Sealed Motion (Corrected) /Daubert Motion to Exclude Reasonable Royalty Analysis of Dana Trexler as Unreliable and to Strike Her Opinions as to Cost of Alleged Non-Infringing Alternative by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 119, on Jul. 29, 2022.

Exhibit 9 to Redaction to 111 Sealed Patent Response to Sealed Patent Motion,,, re 95 Sealed Motion (Corrected) /Daubert Motion to Exclude Reasonable Royalty Analysis of Dana Trexler as Unreliable and to Strike Her Opinions as to Cost of Alleged Non-Infringing Alternative by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 119, on Jul. 29, 2022.

Exhibit 10 to Redaction to 111 Sealed Patent Response to Sealed Patent Motion,,, re 95 Sealed Motion (Corrected) /Daubert Motion to Exclude Reasonable Royalty Analysis of Dana Trexler as Unreliable and to Strike Her Opinions as to Cost of Alleged Non-Infringing Alternative by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 119, on Jul. 29, 2022.

Exhibit 12 to REDACTION to 111 Sealed Patent Response to Sealed Patent Motion,,, re 95 Sealed Motion (Corrected) /Daubert Motion to Exclude Reasonable Royalty Analysis of Dana Trexler as Unreliable and to Strike Her Opinions as to Cost of Alleged Non-Infringing Alternative by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 119, on Jul. 29, 2022.

Declaration of Julie P. Bookbinder in Support of Defendants' Opposition to Plaintiff's Corrected Daubert Motion to Exclude Reasonable Royalty Analysis of Dana Trexler as Unreliable and to Strike Her Opinions as to Cost of Alleged Non-Infringing Alternatives, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 119-5, on Jul. 29, 2022.

Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120, on Jul. 29, 2022.

Exhibit 1 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-1, on Jul. 29, 2022.

Exhibit 2 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-2, on Jul. 29, 2022.

Exhibit 3 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-3, on Jul. 29, 2022.

Exhibit 4 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade*

(56) References Cited

OTHER PUBLICATIONS

*Holding Corp., and The Charles Schwab Corporation*, Case No. 21-cv-00273-JRG (E.D. Tex.), Dkt. No. 120-4, on Jul. 29, 2022.
Exhibit 13 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-8, on Jul. 29, 2022.
Exhibit 14 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-9, on Jul. 29, 2022.
Exhibit 16 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-10, on Jul. 29, 2022.
Exhibit 17 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-11, on Jul. 29, 2022.
Exhibit 18 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-12, on Jul. 29, 2022.
Exhibit 19 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-13, on Jul. 29, 2022.
Exhibit 20 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-14, on Jul. 29, 2022.
Exhibit 23 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-15, on Jul. 29, 2022.
Exhibit 24 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-16, on Jul. 29, 2022.
Exhibit 25 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-17, on Jul. 29, 2022.
Exhibit 26 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-18, on Jul. 29, 2022.
Declaration of Nicholas A. Brown in Support of Defendants' Opposition to Plaintiff's Sealed Motion for Partial Summary Judgment of Dismissal of Defendants' Third, Sixth and Twelfth Counterclaims and Ninth Affirmative Defense Alleging Unenforceability of The '551, '821 and '286 Patents Based on Inequitable Conduct, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-19, on Jul. 29, 2022.
Redaction to 110 Sealed Response to Motion, by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121, on Aug. 1, 2022.
Exhibit A to Redaction to 110 Sealed Response to Motion, by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-1, on Aug. 1, 2022.
Exhibit B to Redaction to 110 Sealed Response to Motion, by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-2, on Aug. 1, 2022.
Exhibit C to Redaction to 110 Sealed Response to Motion, by Island Intellectual Property LLC, filed in *Island Intellectual Property LLC*

(56) References Cited

OTHER PUBLICATIONS v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-3, on Aug. 1, 2022.

Exhibit D to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-4, on Aug. 1, 2022.

Exhibit H to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-8, on Aug. 1, 2022.

Exhibit I to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-9, on Aug. 1, 2022.

Exhibit R to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-18, on Aug. 1, 2022.

Exhibit T to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-20, on Aug. 1, 2022.

Exhibit U to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-21, on Aug. 1, 2022.

Exhibit V to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-22, on Aug. 1, 2022.

Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122, on Aug. 1, 2022.

Exhibit A to Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122-1, on Aug. 1, 2022.

Exhibit B to Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122-2, on Aug. 1, 2022.

Exhibit C to Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122-3, on Aug. 1, 2022.

Exhibit D to Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122-4, on Aug. 1, 2022.

Exhibit N to Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122-14, on Aug. 1, 2022.

Exhibit O to Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122-15, on Aug. 1, 2022.

Redaction to 113 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 123, on Aug. 1, 2022.

Exhibit D to Redaction to 113 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 123, on Aug. 1, 2022.

Exhibit J to Redaction to 113 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 123-10, on Aug. 1, 2022.

Exhibit L to Redaction to 113 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 123-12, on Aug. 1, 2022.

Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124, on Aug. 1, 2022.

Exhibit A to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-1, on Aug. 1, 2022.

Exhibit B to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-2, on Aug. 1, 2022.

Exhibit C to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-3, on Aug. 1, 2022.

Exhibit F to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade

(56) References Cited

OTHER PUBLICATIONS

*Trust Company, TD Ameritrade Holding Corp., and The Charles Schwab Corporation,* Case No. 21-cv-00273-JRG (E.D. Tex.), Dkt. No. 124-6, on Aug. 1, 2022.
Exhibit H to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-8, on Aug. 1, 2022.
Exhibit I to Redaction to 114 Sealed Response to Motion, by Island Intellectual Property LLC, filed in*Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-9, on Aug. 1, 2022.
Exhibit K to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-11, on Aug. 1, 2022.
Exhibit P to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-16, on Aug. 1, 2022.
Exhibit Q to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-17, on Aug. 1, 2022.
Exhibit R to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-18, on Aug. 1, 2022.
Exhibit S to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-19, on Aug. 1, 2022.
Exhibit T to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-20, on Aug. 1, 2022.
Exhibit U to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-21, on Aug. 1, 2022.
Exhibit V to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-22, on Aug. 1, 2022.
Exhibit W to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-23, on Aug. 1, 2022.
Exhibit X to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-24, on Aug. 1, 2022.
Exhibit Y to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-25, on Aug. 1, 2022.
Exhibit DD to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-30, on Aug. 1, 2022.
Exhibit EE to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-31, on Aug. 1, 2022.
Exhibit FF to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-32, on Aug. 1, 2022.
Exhibit GG to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-33, on Aug. 1, 2022.
Exhibit HH to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 124-34, on Aug. 1, 2022.
Reply to Response to Motion re 85 Motion to Strike / Defendants Daubert Motion to Exclude the Opinions and Testimony of Brian P. Murphy filed by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 128, on Aug. 3, 2022.
Redaction to 129 Sealed Patent Reply to Response to Patent Motion, re 96 Sealed Motion /Corrected—Defendants' Daubert Motion To Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 136, on Aug. 5, 2022.
Exhibit 13 to Redaction to 129 Sealed Patent Reply to Response to Patent Motion, re 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation,* Case No. 21-cv-00273-JRG (E.D. Tex.), Dkt. No. 136-1, on Aug. 5, 2022.
Declaration of Nicholas A. Brown in Support of Defendants' Reply in Further Support of Their Daubert Motion to Exclude Certain

(56) References Cited

OTHER PUBLICATIONS

Opinions and Testimony of Ivan Zatkovich filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 136-2, on Aug. 5, 2022.
Redaction to 130 Sealed Patent Reply to Response to Patent Motion, re 87 Sealed Motion /Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 137, on Aug. 5, 2022.
Redaction to 134 Sealed Patent Reply to Response to Patent Motion,, re 91 Sealed Motion /Defendants' Daubert Motion to Exclude the Opinions and Testimony of Bryan M. Van Uden by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 138, on Aug. 5, 2022.
Exhibit 12 to Redaction to 134 Sealed Patent Reply to Response to Patent Motion, re 91 Sealed Motion / Defendants' Daubert Motion to Exclude the Opinions and Testimony of Bryan M. Van Uden by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 138-1, on Aug. 5, 2022.
Exhibit 13 to Redaction to 134 Sealed Patent Reply to Response to Patent Motion, re 91 Sealed Motion / Defendants' Daubert Motion to Exclude the Opinions and Testimony of Bryan M. Van Uden by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 138-2, on Aug. 5, 2022.
Declaration of Julie P. Bookbinder in Support of Defendants' Reply in Further Support of Their Daubert Motion To Exclude the Opinions and Testimony of Bryan M. Van Uden, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 138-3, on Aug. 5, 2022.
Redaction to 125 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 139, on Aug. 5, 2022.
Exhibit U to Redaction to 125 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 139-1, on Aug. 5, 2022.
Exhibit V to Redaction to 125 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 139-2, on Aug. 5, 2022.
Redaction to 126 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 140, on Aug. 5, 2022.
Exhibit S to Redaction to 126 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 140-2, on Aug. 5, 2022.
Exhibit T to Redaction to 126 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 140-3, on Aug. 5, 2022.
Exhibit U to Redaction to 126 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 140-4, on Aug. 5, 2022.
Exhibit V to Redaction to 126 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 140-5, on Aug. 5, 2022.
Redaction to 135 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 141, on Aug. 5, 2022.
Redaction to 131 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 142, on Aug. 5, 2022.
Redaction to 132 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 143, on Aug. 5, 2022.
Exhibit S to Redaction to 132 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 143-3, on Aug. 5, 2022.
Sur-Reply to Reply to Response to Motion re 85 Motion to Strike / Defendants Daubert Motion to Exclude the Opinions and Testimony of Brian P. Murphy filed by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 150, on Aug. 10, 2022.
Redaction to 155 Sealed Sur-Reply to Reply to Response to Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 162, on Aug. 12, 2022.

(56) References Cited

OTHER PUBLICATIONS

Declaration of Nicholas A. Brown in Support of Defendants' Sur-Reply in Further Opposition to Plaintiff's Sealed Motion for Partial Summary Judgment of Dismissal of Defendants' Third, Sixth and Twelfth Counterclaims and Ninth Affirmative Defense Alleging Unenforceability of The '551, '821 and '286 Patents Based on Inequitable Conduct, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 162-1, on Aug. 12, 2022.
Redaction to 156 Sealed Sur-Reply to Reply to Response to Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163, on Aug. 12, 2022.
Declaration of Julie P. Bookbinder in Support of Defendants' Sur-Reply in Further Opposition to Plaintiff's Corrected Daubert Motion to Exclude Reasonable Royalty Analysis of Dana Trexler as Unreliable and to Strike Her Opinions as to Cost of Alleged Non-Infringing Alternatives, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163-1, on Aug. 12, 2022.
Exhibit 14 to Redaction to 156 Sealed Sur-Reply to Reply to Response to Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163-2, on Aug. 12, 2022.
Exhibit 15 to Redaction to 156 Sealed Sur-Reply to Reply to Response to Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163-3, on Aug. 12, 2022.
Exhibit 16 to Redaction to 156 Sealed Sur-Reply to Reply to Response to Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163-4, on Aug. 12, 2022.
Exhibit 17 to Redaction to 156 Sealed Sur-Reply to Reply to Response to Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163-5, on Aug. 12, 2022.
Exhibit 18 to Redaction to 156 Sealed Sur-Reply to Reply to Response to Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163-6, on Aug. 12, 2022.
Redaction to 157 Sealed Patent Sur-Reply to Reply to Response to Patent Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 164, on Aug. 12, 2022.
Redaction to 158 Sealed Patent Sur-Reply to Reply to Response to Patent Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 165, on Aug. 12, 2022.
Agreed Motion in Limine and To Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 167, on Aug. 15, 2022.
Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170, on Aug. 17, 2022.
Declaration of Nicholas A. Brown in Support of Defendants' Opposed Motions in Limine and To Exclude, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-1, on Aug. 17, 2022.
Exhibit 1 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-2, on Aug. 17, 2022.
Exhibit 2 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-3, on Aug. 17, 2022.
Exhibit 3 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-4, on Aug. 17, 2022.
Exhibit 4 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-5, on Aug. 17, 2022.
Exhibit 5 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade*

(56) References Cited

OTHER PUBLICATIONS

*Clearing, Inc., TD Ameritrade Trust Company, TD Ameritrade Holding Corp., and The Charles Schwab Corporation*, Case No. 21-cv-00273-JRG (E.D. Tex.), Dkt. No. 170-6, on Aug. 17, 2022.
Exhibit 8 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-9, on Aug. 17, 2022.
Exhibit 9 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-10, on Aug. 17, 2022.
Exhibit 10 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-11, on Aug. 17, 2022.
Exhibit 12 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-12, on Aug. 17, 2022.
Exhibit 13 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-13, on Aug. 17, 2022.
Exhibit 14 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-14, on Aug. 17, 2022.
Redaction to 168 Sealed Patent Motion in Limine by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171, on Aug. 18, 2022.
Exhibit C to Redaction to 168 Sealed Patent Motion in Limine by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-3, on Aug. 18, 2022.
Exhibit E to Redaction to 168 Sealed Patent Motion in Limine by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-5, on Aug. 18, 2022.
Exhibit F to Redaction to 168 Sealed Patent Motion in Limine by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-CV-00273-JRG (E.D. Tex.), Dkt. No. 171-6, on Aug. 18, 2022.
Exhibit G to Redaction to 168 Sealed Patent Motion in Limine by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-7, on Aug. 18, 2022.
Exhibit H to Redaction to 168 Sealed Patent Motion in Limine by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-8, on Aug. 18, 2022.
Exhibit 1 to Redaction to 168 Sealed Patent Motion in Limine by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-9, on Aug. 18, 2022.
Exhibit J to Redaction to 168 Sealed Patent Motion in Limine by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-10, on Aug. 18, 2022.
Exhibit K to Redaction 168 Sealed Patent Motion in Limine by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-11, on Aug. 18, 2022.
Exhibit L to Redaction to 168 Sealed Patent Motion in Limine by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-12, on Aug. 18, 2022.
Exhibit O to Redaction to 168 Sealed Patent Motion in Limine by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-15, on Aug. 18, 2022.
Exhibit B to Redaction to 168 Sealed Patent Motion in Limine by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-2, on Aug. 18, 2022.
Redaction to 172 Sealed Patent Response to Sealed Patent Motion, re 168 Sealed Patent Motion in Limine by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 175, on Aug. 24, 2022.
Redaction to 173 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 176, on Aug. 25, 2022.
Exhibit G to Redaction to 173 Sealed Response to Motion, by Island Intellectual Property LLC, filed in *Island Intellectual Property LLC v. TD Ameritrade, Inc., TD Ameritrade Clearing, Inc., TD Ameritrade*

(56) References Cited

OTHER PUBLICATIONS

Trust Company, TD Ameritrade Holding Corp., and The Charles Schwab Corporation, Case No. 21-cv-00273-JRG (E.D. Tex.), Dkt. No. 176-7, on Aug. 25, 2022.
Exhibit Q to Redaction to 173 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 176-17, on Aug. 25, 2022.
Exhibit R to Redaction to 173 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 176-18, on Aug. 25, 2022.
Exhibit S to Redaction to 173 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 176-19, on Aug. 25, 2022.
Exhibit T to Redaction to 173 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 176-20, on Aug. 25, 2022.
Exhibit Y to Redaction to 173 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 176-25, on Aug. 25, 2022.
Stipulation (Joint Stipulations of the Parties) by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 182, on Sep. 22, 2022.
Report and Recommendations re 92 Sealed Motion / Defendants' Motion for Summary Judgment of Invalidity Under 36 U.S.C. § 101 filed by TD Ameritrade Holding Corp., TD Ameritrade Trust Company, TD Ameritrade, Inc., TD Ameritrade Clearing, Inc., The Charles Schwab Corporation. Signed by Magistrate Judge Roy S. Payne on Sep. 28, 2022 in filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 184.
Redaction to 189 Sealed Objection to Report and Recommendations by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 190 on Oct. 19, 2022.
Appendix A—Material Disputed Facts on Inventiveness to Redaction to 189 Sealed Objection to Report and Recommendations by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 190-1 on Oct. 19, 2022.
Appendix B—Island's Post-Alice Patents to Redaction to 189 Sealed Objection to Report and Recommendations by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 190-2 on Oct. 19, 2022.
Redaction to 191 Sealed Patent Response to Non-Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 192 on Nov. 1, 2022.
U.S. App. No. 09/176,340, filed Oct. 21, 1998, Issued USP Expired.
U.S. Appl. No. 09/324,296, filed Jun. 2, 1999, Abandoned.
U.S. Appl. No. 09/677,535, filed Oct. 2, 2000, Issued USP Expired.
U.S. Appl. No. 10/071,053, filed Feb. 8, 2002, Issued USP Expired.
U.S. Appl. No. 10/305,439, filed Nov. 26, 2002, Issued USP Expired.
U.S. Appl. No. 10/382,946, filed Mar. 6, 2003, U.S. Pat. No. 7,536,350.
U.S. Appl. No. 10/411,650, filed Apr. 11, 2003, U.S. Pat. No. 7,509,286.
U.S. Appl. No. 10/825,440, filed Apr. 14, 2004, Issued USP Expired.
U.S. Appl. No. 11/149,278, filed Jun. 10, 2005, U.S. Pat. No. 7,672,886.
U.S. Appl. No. 11/641,046, filed Dec. 19, 2006, U.S. Pat. No. 8,150,766.
U.S. Appl. No. 11/689,247, filed Mar. 21, 2007, U.S. Pat. No. 7,752,107.
U.S. Appl. No. 11/767,827, filed Jun. 25, 2007, U.S. Pat. No. 7,668,771.
U.S. Appl. No. 11/767,837, filed Jun. 25, 2007, U.S. Pat. No. 7,680,716.
U.S. Appl. No. 11/767,846, filed Jun. 25, 2007, U.S. Pat. No. 7,672,901.
U.S. Appl. No. 11/767,856, filed Jun. 25, 2007, U.S. Pat. No. 7,672,902.
U.S. Appl. No. 11/840,052, filed Aug. 16, 2007, Issued USP Expired.
U.S. Appl. No. 11/840,060, filed Aug. 16, 2007, Issued USP Expired.
U.S. Appl. No. 11/840,064, filed Aug. 16, 2007, Abandoned.
U.S. Appl. No. 11/932,762, filed Oct. 31, 2007, Issued USP Expired.
U.S. Appl. No. 12/025,402, filed Feb. 4, 2008, U.S. Pat. No. 8,380,621 Granted.
U.S. Appl. No. 12/271,705, filed Nov. 14, 2008, Issued USP Expired.
U.S. Appl. No. 12/340,026, filed Dec. 19, 2008, U.S. Pat. No. 8,032,456.
U.S. Appl. No. 12/385,522, filed Apr. 10, 2009, Issued USP Expired.
U.S. Appl. No. 12/4408,507, filed Mar. 20, 2009, Issued USP Expired.
U.S. Appl. No. 12/408,511, filed Mar. 20, 2009, Issued USP Expired.
U.S. Appl. No. 12/408,523, filed Mar. 20, 2009, Issued USP Expired.
U.S. Appl. No. 12/453,387, filed May 8, 2009, Issued USP Expired.
U.S. Appl. No. 12/453,388, filed May 8, 2009, Issued USP Expired.
U.S. Appl. No. 12/453,389, filed May 8, 2009, Issued USP Expired.
U.S. Appl. No. 12/453,390, filed May 8, 2009, Issued USP Expired.
U.S. Appl. No. 12/622,979, filed Nov. 20, 2009, Issued USP Expired.
U.S. Appl. No. 12/638,544, filed Dec. 15, 2009, U.S. Pat. No. 8,781,931.
U.S. Appl. No. 12/684,071, filed Jan. 7, 2010, Issued USP Expired.
U.S. Appl. No. 12/686,797, filed Jan. 13, 2010, U.S. Pat. No. 8,019,668.
U.S. Appl. No. 12/794,448, filed Jun. 4, 2010, To B Closed.
U.S. Appl. No. 12/794,545, filed Jun. 4, 2010, U.S. Pat. No. 8,311,939.
U.S. Appl. No. 12/816,092, filed Jun. 15, 2010, U.S. Pat. No. 8,352,342.
U.S. Appl. No. 12/829,961, filed Jul. 2, 2010, U.S. Pat. No. 7,996,308.
U.S. Appl. No. 12/953,221, filed Nov. 23, 2010 U.S. Pat. No. 8,370,236.

(56) References Cited

OTHER PUBLICATIONS

U.S. Appl. No. 12/974,974, filed Dec. 21, 2010, Issued USP Expired.
U.S. Appl. No. 13/032,456, filed Feb. 22, 2011, U.S. Pat. No. 8,458,089.
U.S. Appl. No. 13/032,467, filed Feb. 22, 2011, U.S. Pat. No. 8,589,289.
U.S. Appl. No. 13/052,696, filed Mar. 21, 2011, Issued USP Expired.
U.S. Appl. No. 13/181,101, filed Jul. 12, 2011, U.S. Pat. No. 8,239,321.
U.S. Appl. No. 13/181,394, filed Jul. 12, 2011, Issued USP Expired.
U.S. Appl. No. 13/228,031, filed Sep. 8, 2011, U.S. Pat. No. 8,452,702.
U.S. Appl. No. 13/237,699, filed Sep. 20, 2011, U.S. Pat. No. 8,583,545.
U.S. Appl. No. 13/248,647, filed Sep. 29, 2011, U.S. Pat. No. 8,359,267.
U.S. Appl. No. 13/529,540, filed Jun. 21, 2012, U.S. Pat. No. 8,386,382.
U.S. Appl. No. 13/558,153, filed Jul. 25, 2012, Abandoned.
U.S. Appl. No. 13/562,961, filed Jul. 31, 2012, Issued USP Expired.
U.S. Appl. No. 13/591,793, filed Aug. 22, 2012, Issued USP Expired.
U.S. Appl. No. 13/591,818, filed Aug. 22, 2012, Issued USP Expired.
U.S. Appl. No. 13/650,927, filed Oct. 12, 2012, U.S. Pat. No. 8,655,689.
U.S. Appl. No. 13/651,932, filed Oct. 15, 2012, U.S. Pat. No. 8,612,324.
U.S. Appl. No. 13/710,999, filed Dec. 11, 2012, Abandoned.
U.S. Appl. No. 13/715,370, filed Dec. 14, 2012, U.S. Pat. No. 8,719,157.
U.S. Appl. No. 13/733,645, filed Jan. 3, 2013, To B Closed.
U.S. Appl. No. 13/735,631, filed Jan. 7, 2013, U.S. Pat. No. 8,521,569.
U.S. Appl. No. 13/736,515, filed Jan. 8, 2013, To B Closed.
U.S. Appl. No. 13/759,434, filed Feb. 5, 2013, U.S. Pat. No. 8,571,960.
U.S. Appl. No. 13/801,51, filed Mar. 13, 2013, Issued USP Expired.
U.S. Appl. No. 13/801,874, filed Mar. 13, 2013, U.S. Pat. No. 9,430,798.
U.S. Appl. No. 13/828,468, filed Mar. 14, 2013, Abandoned.
U.S. Appl. No. 13/828,929, filed Mar. 14, 2013, Abandoned.
U.S. Appl. No. 13/829,309, filed Mar. 14, 2013, Abandoned.
U.S. Appl. No. 13/829,747, filed Mar. 14, 2013, Abandoned.
U.S. Appl. No. 13/829,974, filed Mar. 14, 2013, Abandoned.
U.S. Appl. No. 13/830,143, filed Mar. 14, 2013, Abandoned.
U.S. Appl. No. 13/839,890, filed Mar. 15, 2013, U.S. Pat. No. 8,712,911.
U.S. Appl. No. 13/840,685, filed Mar. 15, 2013, Abandoned.
U.S. Appl. No. 13/841,778, filed Mar. 15, 2013, U.S. Pat. No. 9,811,811.
U.S. Appl. No. 13/842,360, filed Mar. 15, 2013, U.S. Pat. No. 8,606,676.
U.S. Appl. No. 13/842,630, filed Mar. 15, 2013, U.S. Pat. No. 8,719,062.
U.S. Appl. No. 14/074,219, filed Nov. 7, 2013, Abandoned.
U.S. Appl. No. 14/179,096, filed Feb. 12, 2014, Abandoned.
U.S. Appl. No. 14/268,479, filed May 2, 2014, U.S. Pat. No. 10,068,294.
U.S. Appl. No. 14/933,580, filed Nov. 5, 2015, U.S. Pat. No. 9,374,370.
U.S. Appl. No. 14/933,689, filed Nov. 5, 2015, Abandoned.
U.S. Appl. No. 14/933,703, filed Nov. 5, 2015, U.S. Pat. No. 9,805,344.
U.S. Appl. No. 15/146,645, filed May 4, 2016, U.S. Pat. No. 9,569,773.
U.S. Appl. No. 15/154,590, filed May 13, 2016, U.S. Pat. No. 9,483,762.
15/241,959, filed Aug. 19, 2016, U.S. Pat. No. 9,607,335.
U.S. Appl. No. 15/251,091, filed Aug. 30, 2016, U.S. Pat. No. 10,134,035.
U.S. Appl. No. 15/251, 108, filed Aug. 30, 2016, U.S. Pat. No. 10,623,182.
U.S. Appl. No. 15/412,771, filed Jan. 23, 2017, U.S. Pat. No. 10,552,910.
U.S. Appl. No. 15/602,916, filed May 23, 2017, U.S. Pat. No. 9,946,997.
U.S. Appl. No. 16/698,227, filed Sep. 7, 2017, U.S. Pat. No. 9,904,914.
U.S. Appl. No. 15/789,051, filed Oct. 20, 2017, U.S. Pat. No. 9,965,750.
U.S. Appl. No. 16/227,993, filed Dec. 20, 2018, U.S. Pat. No. 10,832,317.
U.S. Appl. No. 16/715,944, filed Dec. 16, 2019, U.S. Pat. No. 11,367,138.
U.S. Appl. No. 17/104,172, filed Nov. 25, 2020, Present Application—Allowed—Notice of Allowance dated Dec. 8, 2022.
U.S. Appl. No. 17/534,546, filed Nov. 24, 2021, Non-Final Rejection dated Aug. 15, 2022.

* cited by examiner

| Holdings 620 | | | |
|---|---|---|---|
| Account | City/State | Ins # | Amount |
| Single Accounts 602 | New York, NY | 12654 | 35794.00 |
| Joint Accounts 604 | Phoenixville, PA | 19816 | 15654.00 |
| Association Accounts 606 | Dallas, TX | 36549 | 48591.00 |
| Non-Profit Accounts 608 | Boston, MA | 65491 | 9541.00 |
| Joint Accounts 610 | Miami, FL | 67181 | 4796.00 |
| Trust Accounts 612 | San Diego, CA | 61861 | 25489.00 |
| Retirement Accounts 614 | Brooklyn, NY | 59865 | 54681.00 |
| Employee Benefit Plan Accounts 616 | Newton, MA | 54891 | 41651.00 |
| Government Accounts 617 | New York, NY | 98975 | 357942.00 |

| Municipality Account Breakdown By Country ||  |
|---|---|---|
| Country | Amount (mm) | Percentage |
| Afghanistan | 0 | 0% |
| Albania | 0 | 0% |
| Algeria | 0 | 0% |
| Andorra | 0 | 0% |
| Angola | 0 | 0% |
| Antigua and Barbuda | 0 | 0% |
| Argentina | 0 | 0% |
| Armenia | 0 | 0% |
| Australia | 0 | 0% |
| Austria | 0 | 0% |
| Azerbaijan | 0 | 0% |
| Bahamas | 0 | 0% |
| Bahrain | 0 | 0% |
| Bangladesh | 0 | 0% |
| Barbados | 0 | 0% |
| Belarus | 0 | 0% |
| Belgium | 0 | 0% |
| Belize | 0 | 0% |
| Benin | 0 | 0% |
| . . . |  | 0% |
|  |  | 0% |
| Chile | 0 | 0% |
| China | 0 | 0% |
| Colombia | 0 | 0% |
| Comoros | 0 | 0% |
| Congo (Congo-Brazzaville) | 0 | 0% |
| Costa Rica | 0 | 0% |
| Croatia | 0 | 0% |
| Cuba | 0 | 0% |
| Cyprus | 0 | 0% |
| Czechia (Czech Republic) | 0 | 0% |
| Fiji | 0 | 0% |
| Finland | 0 | 0% |
| France | 0 | 0% |
| Gabon | 0 | 0% |
| Gambia | 0 | 0% |
| Georgia | 0 | 0% |
| Germany | 0 | 0% |
| Ghana | 0 | 0% |
| . . . |  | 0% |
|  |  | 0% |
| United Kingdom | 0 | 0% |
| United States of America | $35,794.00 | 100% |
| Uruguay | 0 | 0% |
| Uzbekistan | 0 | 0% |
| Vanuatu | 0 | 0% |
| Venezuela | 0 | 0% |
| Vietnam | 0 | 0% |
| Yemen | 0 | 0% |
| Zambia | 0 | 0% |
| Zimbabwe | 0 | 0% |

FIG. 6D-3

| Municipality Account Breakdown By State | | |
|---|---|---|
| State | Amount (mm) | Percentage |
| Alabama | $715.88 | 2.00% |
| Alaska | $357.94 | 1.00% |
| Arizona | $1,252.79 | 3.50% |
| Arkansas | $357.94 | 1.00% |
| California | $1,610.73 | 4.50% |
| Colorado | $644.29 | 1.80% |
| Connecticut | $536.91 | 1.50% |
| Delaware | $143.18 | 0.40% |
| Florida | $322.15 | 0.90% |
| Georgia | $35.79 | 0.10% |
| Hawaii | $3.58 | 0.01% |
| Idaho | $393.73 | 1.10% |
| Illinois | $1,825.49 | 5.10% |
| Indiana | $1,503.35 | 4.20% |
| Iowa | $161.07 | 0.45% |
| Kansas | $68.01 | 0.19% |
| Kentucky | $1,467.55 | 4.10% |
| Louisiana | $429.53 | 1.20% |
| Maine | $644.29 | 1.80% |
| Maryland | $547.65 | 1.53% |
| Massachusetts | $1,424.60 | 3.98% |
| Michigan | $1,267.11 | 3.54% |
| Minnesota | $651.45 | 1.82% |
| Mississippi | $336.46 | 0.94% |
| Missouri | $257.72 | 0.72% |
| Montana | $694.40 | 1.94% |
| Nebraska | $705.14 | 1.97% |
| Nevada | $859.06 | 2.40% |
| New Hampshire | $361.52 | 1.01% |
| New Jersey | $644.29 | 1.80% |
| New Mexico | $143.18 | 0.40% |
| New York | $6,979.83 | 19.50% |
| North Carolina | $146.76 | 0.41% |
| North Dakota | $189.71 | 0.53% |
| Ohio | $168.23 | 0.47% |
| Oklahoma | $204.03 | 0.57% |
| Oregon | $565.55 | 1.58% |
| Pennsylvania | $536.91 | 1.50% |
| Rhode Island | $393.73 | 1.10% |
| South Carolina | $705.14 | 1.97% |
| South Dakota | $193.29 | 0.54% |
| Tennessee | $479.64 | 1.34% |
| Texas | $2,126.16 | 5.94% |
| Utah | $35.79 | 0.10% |
| Vermont | $42.95 | 0.12% |
| Virginia | $551.23 | 1.54% |
| Washington | $1,582.09 | 4.42% |
| West Virginia | $347.20 | 0.97% |
| Wisconsin | $1.97 | 0.01% |
| Wyoming | $175.39 | 0.49% |

Account Management
- Source Accounts (702)
- Destination Accounts (704)
- Broker-Dealer 1 Account 706-1
- Broker-Dealer 1 Account 706-2
- Broker-Dealer 2 Account 706-3
- Source Institution Acct 706-N
- ➕ Add Account (710)

FIG. 7B

Account Management
- Source Accounts (702)
- Destination Accounts (704)
- Enter Source Institution: (720)
- Enter Account Number: (722)
- Enter Account Credentials:
  - Username: (724)
  - Password: (726)
- Submit (728) | Cancel (730)

FIG. 7C

Account Management
- Source Accounts (702')
- Destination Accounts (704')
- Bank 1 Account 732-1
- Mutual Fund 1 Account 732-2
- Mutual Fund 2 Account 732-3
- Dest. Institution Acct 732-M
- ➕ Add Account (710')

FIG. 7D

Account Management
- Source Accounts (702')
- Destination Accounts (704')
- Enter Destination Institution: (720')
- Enter Account Number: (722')
- Enter Account Credentials:
  - Username: (724')
  - Password: (726')
- Submit (728') | Cancel (730')

800

Your Transaction Management Account

| Home 802 | Source Accounts 804 | Destination Accounts 806 | Transaction Settings 808 | TMS Account 810 |

Transaction History

| Date | From Account | To Account | Amount |
|---|---|---|---|
| May 16, 2014, 01:54:23 PM E.T. | Broker-Dealer 1 Acct. 822-1 | Bank 1 Acct. 824-1 | $3,788.90 |
| May 29, 2014, 10:16:02 AM E.T. | Broker-Dealer 1 Acct. 822-2 | Mutual Fund 2 Acct. 824-2 | $700 |
| Jul. 7, 2014, 04:42:12 PM E.T. | Source Inst. Acct. 822-3 | Destination Inst. Acct. 824-3 | $12,860.38 |
| Jul. 9, 2014, 03:37:49 PM E.T. | Destination Inst. Acct. 824-N | Source Inst. Acct. 822-M | $5,998.17 |

Your Transaction Management Account

| Home 802 | Source Accounts 804 | Destination Accounts 806 | Transaction Settings 808 | TMS Account 810 |

Add Source Account 832

Your Source Accounts:

Broker-Dealer 1 Account 822-1 — 
— Current Balance: $ 32,546.90    [View History] 836
834                                 [Edit Account] 838

Broker-Dealer 1 Account 822-2  +

Broker-Dealer 2 Account 822-3  +

Source Institution Acct 822-N  +

| Home 802 | Source Accounts 804 | Destination Accounts 806 | Transaction Settings 808 | DAS Account 810 |

Your Transaction Management Account

Source Accounts > New Source Account

Add New Source Account

Enter Source Institution:
842

Enter Account Number:
844

Enter Account Credentials:
Username: — 846
Password: — 848

Submit    Cancel

| Home 802 | Source Accounts 804 | Destination Accounts 806 | Transaction Settings 808 | DAS Account 810 |

Your Transaction Management Account

Source Accounts > Edit Broker-Dealer 1 Account 822-1

Edit Broker-Dealer 1 Account 822-1

Enter Source Institution:
852  Broker-Dealer 1

Account Number:
854  1004986106

Enter Account Credentials:
Username: jsmith11 — 856
Password: xxxxxxxxx — 858

860  Save Changes    Cancel Changes  862

Delete Account  864

FIG. 8D

S1002: Generating a web-based user interface at a first client computer associated with a first client account associated with a first client S1004: Receiving, from the first client computer through the web-based user interface, a request to withdraw or transfer funds S1006: Accessing one or more electronic databases stored on one or more computer-readable media to obtain aggregate account information and client account information S1008: Performing the following steps for each client account associated with clients of a first common client type S1008-1: accessing a client available deposit amount, Di, for clients of the first common client type including funds to be distributed over Ni respective banks in a program S1008-2: determining, a value of Ni destination institutions for the respective client account S1008-3: allocating at least a portion of the respective client available deposit amount to each of the respective Ni banks determined for the client transaction amount

CONTINUED WITH FIG. 10

FIG. 9

CONTINUED FROM FIG. 9

S1010: Selecting, for allocation, one or more of the aggregate deposit accounts and allocating the funds requested to be transferred or withdrawn to be met with funds in the Ni respective banks for the respective client account S1012: Generating data for transferring funds to or from the Ni banks in the program S1014: Updating one or more of the electronic databases with update data for each of the more than one client accounts

FIG. 10

CONTINUED FROM FIG. 11A

S1110: Selecting, for allocation, one or more of the aggregate deposit accounts and allocating the funds requested to be transferred or withdrawn to be met with funds in the Ni destination institutions for the respective client account S1112: Generating data for transferring funds to or from the Ni destination institutions in the program S1114: Updating one or more of the electronic databases with update data for each of the more than one client accounts

FIG. 11B

S1202: accessing one or more electronic databases including aggregate account information for a first plurality of deposit accounts held in a plurality of banks and client account information for each client account of a plurality of client accounts S1204: obtaining client account transaction information for a second plurality of deposit accounts of the first plurality of deposit accounts S1206: determining a net transfer amount for each of one or more source institutions over one or more sub-periods of time S1208: performing the following steps for each of the second plurality of deposit accounts S1208-1: determining a respective client type S1208-2: accessing a respective client available deposit amount S1208-3: determining a number of banks of the plurality of banks S1208-4: allocating a client bank distribution amount to each bank of the number of banks

CONTINUED WITH FIG. 12B

FIG. 12A

CONTINUED FROM FIG. 12A

S1210: selecting one or more accounts of the first plurality of deposit accounts S1212: generating transfer instructions to transfer funds to the selected one or more accounts S1214: transmitting the transfer instructions to each bank of the number of banks S1216: updating the client account information and the aggregated account information

FIG. 12B

S1302: (optional) receive, from a first bank, a request to identify each ownership interest of a balance of funds deposited at the first bank S1304: accessing one or more electronic databases including: (i) deposit account information for a first deposit account held in the first bank; (ii) source account information associated with the first deposit account; and (iii) reserve requirement information S1306: determining a number of ownership interests in the first deposit account S1308: performing the following steps for each of the ownership interests S1308-1: determining a respective client balance of funds held in a respective sub-account of the first deposit account S1308-2: calculating a respective client balance percentage S1308-3: determining a respective client type for the respective ownership interest S1308-4: assigning the respective client type to the respective sub-account, respective client balance, and/or the respective client balance percentage

CONTINUED WITH FIG. 13C

FIG. 13B

CONTINUED FROM FIG. 13B

S1308-5: accessing the one or more electronic databases to determine a respective reserve requirement S1308-6: calculating a respective reserve balance requirement for the respective client balance of funds S1310: performing the following steps for each sub-account of the plurality of sub-accounts S1310-1: determining a respective client type associated with the respective sub-account and a respective sub-account balance associated with the respective sub-account S1310-2: determining a value N sub-accounts of the plurality of sub-accounts that are associated with the respective client type S1310-3: determining respective sub-account transaction information S1310-4: determining a respective sub-account balance requirement

CONTINUED WITH FIG. 13D

FIG. 13C

S1402: accessing one or more databases comprising depository institution information for a plurality of depository institutions and aggregated deposit account information for a plurality of aggregated deposit accounts holding funds of a plurality of client accounts associated with a plurality of clients S1404: obtaining transaction data related to transactions associated with the plurality of client accounts during a first time period S1406: determining a first net amount of funds associated with the transaction data S1408: determining a respective updated balance of funds of each client account based on transactions associated with the respective client account during the first time period S1410: determining an updated total client type deposit information indicating an updated total amount of funds associated with each respective client type S1412: allocating funds associated with the first net amount of funds among the plurality of client accounts

CONTINUED WITH FIG. 14B

FIG. 14A

```
┌─────────────────────────────────────────┐
│       CONTINUED FROM FIG. 14A           │
└─────────────────────────────────────────┘
                    ↓
┌─────────────────────────────────────────┐
│ S1414: generating one or more instructions to transfer funds to or from at │
│ least one of the plurality of aggregated deposit accounts │
└─────────────────────────────────────────┘
                    ↓
┌─────────────────────────────────────────┐
│ S1416: sending, to each depository institution associated with the at least │
│ one of the plurality of aggregated deposit accounts the one or more │
│ instructions │
└─────────────────────────────────────────┘
                    ↓
┌─────────────────────────────────────────┐
│ S1418: generating, for each depository institution of the plurality of │
│ depository institutions, a respective report │
└─────────────────────────────────────────┘
                    ↓
┌─────────────────────────────────────────┐
│ S1420: sending, to each depository institution of the plurality of │
│ depository institutions, the respective report associated with a respective │
│ depository institution │
└─────────────────────────────────────────┘
```

FIG. 14B

S1412: allocating all funds associated with the first net amount of funds among the plurality of client accounts S1502: determining, for each aggregated deposit account of the plurality of aggregated deposit accounts, a respective updated aggregated account balance by:

S1502-A: identifying one or more of the plurality of aggregated deposit accounts to transfer the first net amount of funds and, for each of the one or more aggregated deposit accounts identified, a respective transfer amount S1502-B: calculating, for each depository institution of the plurality of depository institutions, a respective updated institution balance amount S1503: Allocate Municipal Client Type First?

YES → CONTINUED WITH FIG. 15B

NO → CONTINUED WITH FIG. 15C

FIG. 15A

CONTINUED FROM FIG. 15A

S1504: allocating client funds associated with funds held in the identified one or more aggregated accounts among the plurality of aggregated deposit accounts by:

S1504-A: allocating a first portion of the client funds, the first portion being associated with municipal clients, among the plurality of aggregated deposit accounts based on:
- the updated total client type deposit information associated with municipal clients; and
- for each depository institution:
  - client type target information associated with municipal clients;
  - available collateral information; and
  - updated depository institution balance amount S1504-B: allocating a second portion of the client fund, the second portion being associated with each of the remaining client types, among the plurality of aggregated deposit accounts based on:
- the updated total client type deposit information associated with the remaining client types; and
- for each depository institution:
  - client type target information;
  - updated depository institution balance amount; and
  - available institution balance S1506: updating the depository institution information and the aggregated deposit account information

FIG. 15B

CONTINUED FROM FIG. 15A

S1504': allocating client funds associated with funds held in the identified one or more aggregated accounts among the plurality of aggregated deposit accounts based on:

- the updated total client type deposit information; and
- for each depository institution:
    - client type target information;
    - updated depository institution balance amount;
    - available institution collateral; and
    - available institution balance S1506': updating the depository institution information and the aggregated deposit account information

FIG. 15C

SYSTEM, METHOD AND PROGRAM PRODUCT TO TRANSFER, ALLOCATE AND TRACK OWNERSHIP INTERESTS IN AGGREGATED ACCOUNTS

REFERENCE TO RELATED APPLICATIONS

This application claims the benefit of and priority to each of U.S. Provisional Patent Application No. 63/008,250, filed on Apr. 10, 2020 and entitled "SYSTEM, METHOD AND PROGRAM PRODUCT TO TRANSFER, ALLOCATE AND TRACK OWNERSHIP INTERESTS IN AGGREGATED ACCOUNTS"; and U.S. Provisional Patent Application No. 62/966,876, filed on Jan. 28, 2020 and entitled "SYSTEM, METHOD AND PROGRAM PRODUCT TO TRANSFER, ALLOCATE AND TRACK OWNERSHIP INTERESTS IN SWEEP SYSTEMS USING SEGREGATED, AGGREGATED DEPOSIT ACCOUNTS," the entire contents of each is hereby incorporated by reference herein.

FIELD

The field of the invention generally relates to various technological improvements in systems, methods, and program products used with aggregated accounts. In embodiments, the invention relates generally to new technological mechanisms to transfer, allocate and track ownership interest in aggregate accounts at depository or other destination institutions based on client type.

BACKGROUND

Cash management systems manage liquidity, account balances, payments and other cash management functions for public entities, non-profit entities, municipalities, businesses, condominiums, homeowner's associations, housing cooperatives, individuals, and publicly traded entities, to name a few. For example, cash management systems may transfer funds directly from account holders to interest-bearing deposit accounts, money market mutual funds, ETFs (exchange traded funds), enhanced cash investments, ultra-short term bond investments, and CDs (certificates of deposit), to name a few, or between trading accounts, such as brokerage accounts, and interest-bearing deposit accounts, such as bank or other depository accounts and other cash management vehicles. Cash management systems often carry out cash management functions for insured accounts, such as, for example, FDIC-insured accounts, SIPC-insured account, NCUSIF-insured accounts and collateral insurance, to name a few. Such systems are implemented using computers specifically programmed to carry out transaction operations, including transfer and/or allocation operations.

In many systems, the tracking and allocating operations involve complex computer calculations and computer systems, especially, when the aggregated accounts holding the clients' funds can include hundreds, or thousands of different clients whose funds are held across multiple depository institutions. To further exacerbate the problem, not only are there a large number of clients whose fund are held in a given aggregated account, but there a can be many different types of clients from many different regions of the country whose funds are held in the same aggregated account.

As a result, complex computer systems have been developed in the past by Applicant and others, that present complex technological challenges associated with allocating funds from different client accounts of a given source institution or institutions, for deposit in aggregated accounts at and among a plurality of deposit institutions.

A shortcoming of existing cash management systems, such as, for example, sweep systems, is that the daily reconciliation system used to keep track of ownership interest in aggregated accounts at depository institutions is complex and burdensome for depository institutions to keep track of funds associated with different types of clients held in a given aggregated account. Since depository institutions may invest client funds held in aggregated accounts in different ways depending upon the client type, to date, this has caused depository institutions to have to adopt the least efficient investment vehicle to cover all possible client types that may be held in a given aggregated account. Technological shortcomings to date have made it very difficult for sweep programs, for example, to overcome this knowledge gap at the depository institutions. The technological shortcomings of the existing cash management systems—particularly the programs and computers thereof—may also result in destination institutions that have one or more aggregated accounts including deposits from a plurality of client types (e.g., corporations, individuals, retirement or pension plan accounts, or municipalities to name a few), without any knowledge of how much funds of each client type is being held. Current Federal and State laws and regulations as well as other rules and regulations limit the type of transactions and/or investments that can be made with deposits based on ownership interest. For example, investments using deposits from individuals, versus business entities, versus municipalities versus pensions plans can all be handled differently depending upon the client type. Thus, because of the above lack of knowledge of client type information associated with ownership interest and aggregation based on ownership interest, to comply with Federal and State and other laws and regulations, destination institutions are forced to comply with laws and regulations for the client type associated with the most restrictive laws and regulations.

Heretofore, there has been a technological barrier to destination institutions with regards to investments based on client type without the cooperation and participation of a transaction or deposit management system, by which ownership interest is tracked. Therefore, it is desirable to provide a technical solution that enables destination institutions to track in aggregate ownership interest by deposit type in deposit accounts.

What is needed is a technological solution to these and other technological shortcomings of existing computer systems used in sweep programs.

SUMMARY

An object of the present invention to address one or more of the above technological problems as outlined in the prior art.

The field of the invention generally relates to various technological improvements in systems, methods, and program products used with aggregated accounts. In embodiments, the invention relates generally to new technological mechanisms to transfer, allocate and track ownership interest in aggregate accounts at depository or other destination institutions based on client type.

In embodiments, the invention generally relates to systems, methods, and program products used to enable depository institutions to identify funds from different client types, by client type, sourced from source institutions (such as broker dealers, banks, and other financial institutions) on behalf of their respective clients or from clients directly, which are held by the depository institution in aggregate accounts, such as aggregated deposit accounts, and/or other aggregated cash management vehicles and/or aggregated cash management accounts, such as DDAs, MMDAs, NOW accounts, stable value funds, credit interest programs, to name a few, in order to transfer funds among those accounts.

In embodiments, a system, comprises: one or more computers, programmed with computer-readable code, to perform, when executed, the following steps: A) accessing, using the one or more computers, one or more databases comprising: (1) depository institution information for each depository institution of a plurality of depository institutions participating in a program, the depository information including for each depository institution: (i) respective institution balance of funds information indicating a total amount of funds held by each respective depository institution; (ii) respective institution target deposit information indicating a deposit target amount of total deposits to be held by each respective depository institution; (iii) respective client type target information indicating a total deposit target amount for each respective client type to be held by each respective depository institution; and (iv) respective client type balance information indicating a total amount of funds of a respective client type held by each respective depository institution; (2) aggregated deposit account information for each of a plurality of aggregated deposit accounts held in the plurality of depository institutions participating in the program, each of the respective depository institutions holding one or more of the aggregated deposit accounts, each of the aggregated deposit accounts holding funds of a plurality of client accounts associated with a plurality of clients, wherein the aggregated deposit account information comprises for each aggregated deposit account: (i) a respective aggregated deposit account balance of funds held in each of the respective aggregated deposit accounts; (ii) a respective aggregated deposit account target balance for each of the aggregated deposit accounts; (iii) client account information for each client account of the plurality of client accounts, the client account information for each client account comprising: (a) a respective client balance of funds associated with each client; (b) a respective balance of funds of each client account held in each aggregated deposit account; (c) client type information indicative of a respective client type for each client account of the plurality of client accounts, wherein the plurality of client types includes at least municipal client and individual government insured client; and (d) client transaction information indicating all transactions associated with each client account of the plurality of client accounts; (iv) total client type deposit information indicating a total amount of funds associated with each respective client type of the plurality of client types; B) obtaining, using the one or more computers, transaction data, wherein the transaction data is related to transactions associated with the plurality client accounts during a first time period; C) determining, using the one or more computers, a first net amount of funds to deposit into and/or withdraw from the plurality of client accounts during the first time period based on the transaction data; D) determining, using the one or more computers, a respective updated balance of funds of each client account based on the respective balance of funds for each client account and respective transactions associated with the respective client account during the first time period; E) determining, using the one or more computers, respective updated total client type deposit information for each respective client type; F) allocating, using the one or more computers, funds associated with the plurality of client accounts, the allocating step including: (i) determining an updated respective aggregated deposit account balance of funds for each aggregated deposit account of the plurality of aggregated deposit accounts by: (a) identifying one or more of the plurality of aggregated deposit accounts to deposit into and/or withdrawal from the first net amount of funds and a respective transfer amount for each of the identified one or more of the plurality of aggregated deposit accounts based on: (1) respective institution balance of funds information for each respective depository institution; (2) respective institution target deposit information for each respective depository institution; and (3) the first net amount of funds; wherein the sum of the respective transfer amounts for each of the identified one or more aggregated deposit accounts is equal to the first net amount of funds, and wherein the respective institution balance of funds information plus the respective transfer amount for each of the identified one or more of the plurality of aggregated deposit accounts associated with the respective depository institution is in compliance with the respective institution target deposit information; (b) calculating an updated respective institution balance amount for each depository institution by summing the respective institution balance amount and the respective transfer amounts associated with the respective one or more aggregated deposit accounts associated with each respective depository institution, wherein the respective transfer amounts is zero if there is no transfer, positive if there is a deposit, and negative if there is a withdrawal; (ii) allocating respective client funds associated with each of the respective client accounts among the plurality of aggregated deposit accounts by: (a) allocating client funds associated with municipal clients among the plurality of aggregated deposit accounts based on: (1) the respective updated total client type deposit information associated with municipal clients; (2) the respective client type target information for municipal clients for each depository institution, including the respective available collateral information for each depository institution; and (3) the updated respective institution balance amount for each depository institution; wherein the sum of each respective updated total client type deposit information for each of the plurality of aggregated deposit accounts is equal to the respective updated total client type deposit information, and wherein each respective updated total client type deposit information for each of the plurality of aggregated deposit accounts is in compliance with the respective client type target information, including the respective available collateral information for each depository institution, and wherein each respective updated total client type deposit information for each aggregated deposit account is less than the updated respective institution balance amount for each depository institution; (b) for each of the remaining client types, allocating the client funds associated with each respective client type other than the client type that associated with municipal clients for the respective updated total client type deposit information among the plurality of aggregated deposit accounts based on: (1) the respective updated total client type deposit information; (2) the respective client type target information for each depository institution; (3) the updated respective institution balance amount for each depository institution; and (4) a respective remaining available institution balance amount for each depository institution; wherein the respective remaining available institution balance amount of each respective depository institution is the difference between the updated respective institution balance for the respective depository institution and a respective updated total client type deposit information for the respective aggregated deposit accounts that has already been assigned to the respective aggregated deposit account, wherein, at the end of the allocation process, each respective updated total client type deposit information for each of the plurality of aggregated deposit accounts is in compliance with the respective client type target information, and wherein, throughout the allocation processes of step F), the sum of each respective updated total client type deposit information for each of the plurality of aggregated deposit accounts is equal to or less than the respective updated total client type deposit information, and wherein, at the end of the allocation process of step F), the sum of each respective updated total client type deposit information for each aggregated deposit account is equal to the updated respective institution balance amount for each depository institution; (iii) updating the depository institution information and the aggregated deposit account information based on the allocating step F); G) generating, using the one or more computers, one or more instructions to transfer funds to or from at least one of the aggregated deposit accounts in accordance with the transfer amounts; H) sending the one or more instructions to transfer funds to the respective one depository institution of the plurality of deposit institutions, where the respective transfer amounts are not zero; I) generating, using the one or more computers, for each respective depository institution a respective report based on information from the one or more databases reflecting the updated balance of funds held in each respective aggregated deposit account associated with the respective depository institution and the respective updated balance of funds associated with each client type of plurality of client types for the aggregated deposit accounts associated with the respective depository institution; and J) sending, using the one or more computers, the respective report to each respective depository institution.

In embodiments, the respective institution balance of funds information further indicates the total amount of funds held as part of the program.

In embodiments, the respective institution balance of funds information further indicates the total amount of funds held is associated with one or more funding sources.

In embodiments, the deposit target amount of total deposits to be held by each respective depository institution comprises: (a) a respective minimum target amount indicating a respective minimum amount of total deposits to be held by the respective depository institution; and (b) a respective maximum target amount indicating a respective maximum amount of total deposits to be held by the respective depository institution.

In embodiments, the deposit target amount of total deposits to be held by each respective depository institution comprises: (a) a respective maximum target amount indicating a respective maximum amount of total deposits to be held by the respective depository institution.

In embodiments, the deposit target amount of total deposits to be held by each respective depository institution comprises: (a) a respective target number indicating a respective amount of total deposits to be held by the respective depository institution.

In embodiments, the total client type deposit information, for each aggregated deposit account, comprises: (a) a respective minimum target amount for each of one or more client types indicating a respective minimum deposit amount for each respective client type of the one or more client types; and (b) a respective maximum target amount for each of one or more client types indicating a respective maximum deposit amount for each respective client type of the one or more client types.

In embodiments, the total client type deposit information, for each aggregated deposit account, comprises: (a) a respective maximum target total deposit amount for each of one or more client types to be held by the respective depository institution.

In embodiments, the total client type deposit information, for each aggregated deposit account, comprises: (a) a respective target number indicating a total deposit amount for each of one or more client types to be held by the respective depository institution.

In embodiments, the total client type deposit information, for each aggregated deposit account, comprises: (a) a respective client type percentage for each of one or more client types indicating a respective target percentage of the respective deposit target amount for the respective client type.

In embodiments, the respective total deposit target amount for a municipal deposit client type to be held by the respective depository institution comprises: (a) a respective collateral maximum indicating a maximum amount of collateralized funds associated with the municipal deposit client type available for deposit at the respective depository institution.

In embodiments, the respective total deposit target amount for a municipal deposit client type to be held by the respective depository institution comprises: (a) a respective non-collateral maximum indicating a maximum amount of non-collateralized funds associated with the municipal deposit client type available for deposit at the respective depository institution.

In embodiments, the respective aggregated deposit account target balance for a municipal deposit client type to be held by the respective depository institution comprises: (a) a respective collateral maximum indicating a maximum amount of collateralized funds associated with the municipal deposit client type available for deposit at the respective depository institution; and (b) a respective non-collateral maximum indicating a maximum amount of non-collateralized funds associated with the municipal deposit client type available for deposit at the respective depository institution.

In embodiments, the respective aggregated deposit account target balance for a municipal deposit client type to be held by the respective depository institution comprises: (a) a respective client type percentage indicating a respective target percentage of the respective deposit target amount for the municipal deposit client type.

In embodiments, the respective aggregated deposit account target balance for a municipal deposit client type to be held by the respective depository institution comprises: (a) a respective maximum target total deposit amount for the municipal deposit client type to be held by the respective depository institution.

In embodiments, the respective aggregated deposit account target balance for a municipal deposit client type to be held by the respective depository institution comprises: (a) a respective target number indicating a total deposit target amount for the municipal deposit client type to be held by the respective depository institution.

In embodiments, the respective aggregated deposit account target balance for each of the aggregated deposit accounts each comprise: (a) a respective minimum target amount indicating a respective minimum amount of client funds to be held in the respective aggregated deposit account; and (b) a respective maximum target amount indicating a respective maximum amount of client funds to be held in the respective aggregated deposit account.

In embodiments, the respective aggregated deposit account target balance for each of the aggregated deposit accounts each comprise: (a) a respective minimum target amount indicating a respective minimum aggregated deposit account target balance.

In embodiments, the respective aggregated deposit account target balance for each of the aggregated deposit accounts each comprise: (a) a respective maximum target amount indicating a respective maximum aggregated deposit account target balance.

In embodiments, the respective aggregated deposit account target balance for each respective client type to be held by the respective depository institution comprises: (a) a respective client type percentage for each client type indicating a respective target percentage of the respective deposit target amount for the respective client type.

In embodiments, the respective aggregated deposit account target balance for each of the aggregated deposit accounts each comprise: (a) a respective non-collateral max indicating a maximum of non-collateralized funds for the respective aggregated deposit account.

In embodiments, the respective aggregated deposit account target balance for each of the aggregated deposit accounts each comprise: (a) a respective collateral max indicating a maximum of collateralized funds for the respective aggregated deposit account.

In embodiments, the respective aggregated deposit account target balance for each of the aggregated deposit accounts each comprise: (a) a respective collateral max indicating a maximum of collateralized funds for the respective aggregated deposit account; and (b) a respective non-collateral max indicating a maximum of non-collateralized funds for the respective aggregated deposit account.

In embodiments, the one or more computers obtain the transaction data from one or more sweep files associated with at least one source.

In embodiments, the one or more computers obtain the transaction data from one or more electronic messages.

In embodiments, the one or more computers obtain the transaction data via a file transfer protocol (FTP).

In embodiments, the one or more computers obtain the transaction data from an individual transaction being uploaded to the system.

In embodiments, the identification of the one or more of the plurality of aggregated deposit accounts in step F)(i)(a) is further based on: (4) respective number of withdraws of funds information for each respective aggregated deposit account of each respective depository institution, wherein each respective number of withdraws of funds information comprises: (a) a number of withdraws of funds over a predetermined amount of time for the respective aggregated deposit account; and (b) a maximum allotted number of withdrawals over the predetermined amount of time for the respective aggregated deposit account, wherein the identified one or more of the plurality of aggregated deposit accounts, after the allocation, remain in compliance with respective number of withdraws of funds information for each respective aggregated deposit account. In embodiments, the predetermined amount of time is a statement period. In embodiments, the predetermined amount of time is a calendar month. In embodiments, the predetermined amount of time is a quarter of a calendar year.

In embodiments, the identification of the one or more of the plurality of aggregated deposit accounts in step F)(i)(a) is further based on: (4) pre-designated information comprising: (a) pre-designated deposit accounts including one or more of the plurality of aggregated deposit accounts; and (b) pre-designated withdrawal accounts including one or more of the plurality of aggregated deposit accounts, wherein the one or more aggregated deposit accounts identified for deposit comprise one or more of the pre-designated deposit accounts such that all of the pre-designated deposit accounts are identified for deposit before one or more of the plurality of aggregated deposit accounts not included as a pre-designated deposit account is identified for deposit, and wherein the one or more aggregated deposit accounts identified for withdrawal comprise one or more of the pre-designated withdrawal accounts such that all of the pre-designated withdrawal accounts are identified for withdrawal before one or more of the plurality of aggregated deposit accounts not included as a pre-designated withdrawal account is identified for withdrawal.

In embodiments, the identification of the one or more of the plurality of aggregated deposit accounts in step F)(i)(a) is further based on: (4) pre-designated information comprising: (a) pre-designated deposit accounts including one or more of the plurality of aggregated deposit accounts, wherein the one or more aggregated deposit accounts identified for deposit comprise one or more of the pre-designated deposit accounts such that all of the pre-designated deposit accounts are identified for deposit before one or more of the plurality of aggregated deposit accounts not included as a pre-designated deposit account is identified for deposit.

In embodiments, the identification of the one or more of the plurality of aggregated deposit accounts in step F)(i)(a) is further based on: (4) pre-designated information comprising: (a) pre-designated withdrawal accounts including one or more of the plurality of aggregated deposit accounts, wherein the one or more aggregated deposit accounts identified for withdrawal comprise one or more of the pre-designated withdrawal accounts such that all of the pre-designated withdrawal accounts are identified for withdrawal before one or more of the plurality of aggregated deposit accounts not included as a pre-designated withdrawal account is identified for withdrawal.

In embodiments, the identification of the one or more of the plurality of aggregated deposit accounts in step F)(i)(a) is further based on: (4) a predetermined order of the plurality of depository institutions participating in the program, wherein identification of the one or more aggregated deposit accounts complies with the preterminal order until compliance with the predetermined order and institution target deposit information is not feasible. In embodiments, the predetermine order is a rotation of the plurality of depository institutions participating in the program.

In embodiments, the identification of the one or more of the plurality of aggregated deposit accounts in step F)(i)(a) is further based on: (4) affiliation information for each respective aggregated deposit account of each respective depository institution, wherein the affiliation information for each respective aggregated deposit account indicates an associated with the program, and wherein the one or more aggregated deposit accounts identified comprise one or more of the plurality of aggregated deposit accounts associated with the program such that all of the plurality of aggregated pre-designated deposit accounts associated with the program are identified before an aggregate deposit account not associated with the program is identified.

In embodiments, the identification of the one or more of the plurality of aggregated deposit accounts in step F)(i)(a) is further based on: (4) transaction fee information for each respective aggregated deposit account of each respective depository institution, wherein the transaction fee information, for each respective aggregated deposit account, comprises a respective amount of fees charged for transactions associated with the respective aggregated deposit account, and wherein the one or more of the plurality of aggregated accounts were identified by: (a) minimizing a sum of transaction fees associated with the one or more of the plurality of aggregated deposit accounts; and (b) maintaining compliance with the institution target deposit information.

In embodiments, the identification of the one or more of the plurality of aggregated deposit accounts in step F)(i)(a) is further based on: (4) transaction fee information for each respective aggregated deposit account of each respective depository institution, wherein the transaction fee information, for each respective aggregated deposit account, comprises a respective amount of fees charged for transactions associated with the respective aggregated deposit account, and wherein the one or more of the plurality of aggregated accounts were identified by (a) maximizing a sum of transaction fees associated with the one or more of the plurality of aggregated deposit accounts; and (b) maintaining compliance with the institution target deposit information.

In embodiments, the identification of the one or more of the plurality of aggregated deposit accounts in step F)(i)(a) is further based on: (4) interest information for each respective aggregated deposit account of each respective depository institution, wherein the interest information, for each respective aggregated deposit account, comprises a respective interest rate associated with the respective aggregated deposit account, and wherein the one or more of the plurality of aggregated accounts were identified by (a) minimizing a first combined interest rate of the one or more aggregated deposit accounts identified for deposit, wherein the first combined interest rate is a first average of each respective interest rate associated with each of the one or more aggregated deposit accounts identified for deposit; (b) minimizing a second combined interest rate of the one or more aggregated deposit accounts identified for withdrawal, wherein the second combined interest rate is a second average of each respective interest rate associated with each of the one or more aggregated deposit accounts identified for withdrawal; and (c) maintaining compliance with the institution target deposit information.

In embodiments, at the end of the allocation process, each respective updated total client type deposit information for each of the plurality of aggregated deposit accounts is in compliance with respective insurance regulations associated with the respective aggregated deposit account.

In embodiments, at the end of the allocation process, each respective updated total client type deposit information for each of the plurality of aggregated deposit accounts is in compliance with respective government regulations and government agency regulations associated with the respective aggregated deposit account. In embodiments, the respective government regulations and government agency regulations associated with the respective aggregated deposit account include Federal Deposit Insurance Corporation government regulations and government agency regulations. In embodiments, the respective government regulations and government agency regulations associated with the respective aggregated deposit account include Federal Savings and Loan Insurance Corporation government regulations and government agency regulations. In embodiments, the respective government regulations and government agency regulations associated with the respective aggregated deposit account include Securities Investor Protection Corporation government regulations and government agency regulations.

In embodiments, the allocating client funds associated with municipal clients among the plurality of aggregated deposit accounts is further based on: (4) client preference information associated with one or more clients associated with client funds associated with municipal clients among the plurality of aggregated deposit accounts, wherein the client preference information identifies one or more of the plurality of depository institutions the one or more clients has placed on a blacklist.

In embodiments, the allocating client funds associated with municipal clients among the plurality of aggregated deposit accounts is further based on: (4) client preference information associated with one or more clients associated with client funds associated with municipal clients among the plurality of aggregated deposit accounts, wherein the client preference information identifies one or more of the plurality of depository institutions the one or more clients has placed on a whitelist.

In embodiments, the allocation of client funds for each of the remaining client types is further based on: (4) client preference information associated with one or more clients associated with each of the remaining client types, wherein the client preference information identifies one or more of the plurality of depository institutions the one or more clients has placed on a blacklist.

In embodiments, the allocation of client funds for each of the remaining client types is further based on: (4) client preference information associated with one or more clients associated with each of the remaining client types, wherein the client preference information identifies one or more of the plurality of depository institutions the one or more clients has placed on a whitelist.

In embodiments, the allocation of client funds for each of the remaining client types is further based on: (4) the respective aggregated deposit account balance of funds held in each of the respective aggregate accounts, such that each aggregate account balance of funds held in each of the respective aggregate accounts does not exceed a predetermined amount of funds. In embodiments, the predetermined amount of funds is associated with an insurance limit. In embodiments, the insurance limit is associated with Federal Deposit Insurance Corporation. In embodiments, the insurance limit is associated with Federal Savings and Loan Insurance Corporation. In embodiments, the insurance limit is associated with Securities Investor Protection Corporation.

In embodiments, the allocating client funds associated with municipal clients among the plurality of aggregated deposit accounts is further based on: (4) the respective aggregated deposit account balance of funds held in each of the respective aggregate accounts such that each aggregate account balance of funds held in each of the respective aggregate accounts does not exceed a predetermined amount of funds. In embodiments, the predetermined amount of funds is associated with an insurance limit. In embodiments, the insurance limit is associated with Federal Deposit Insurance Corporation. In embodiments, the insurance limit is associated with Federal Savings and Loan Insurance Corporation. In embodiments, the insurance limit is associated with Securities Investor Protection Corporation.

In embodiments, the allocating client funds associated with municipal clients among the plurality of aggregated deposit accounts is further based on: (4) the respective institution balance of funds information such that the total amount of funds held by each respective depository institution does not go above a predetermined amount of funds. In embodiments, the predetermined amount of funds is associated with an insurance limit. In embodiments, the insurance limit is associated with Federal Deposit Insurance Corporation. In embodiments, the insurance limit is associated with Federal Savings and Loan Insurance Corporation. In embodiments, the insurance limit is associated with Securities Investor Protection Corporation.

In embodiments, the allocation of client funds for each of the remaining client types is further based on: (4) the respective institution balance of funds information such that the total amount of funds held by each respective depository institution does not go above a predetermined amount of funds. In embodiments, the predetermined amount of funds is associated with an insurance limit. In embodiments, the insurance limit is associated with Federal Deposit Insurance Corporation. In embodiments, the insurance limit is associated with Federal Savings and Loan Insurance Corporation. In embodiments, the insurance limit is associated with Securities Investor Protection Corporation.

In embodiments, the allocation of client funds for each of the remaining client types is further based on: (4) respective client balance of funds for each client associated with the client funds associated with each of the remaining client types such that client funds associated with clients having a larger client fund balance are allocated before client funds associated with clients having a lesser client fund balance.

In embodiments, the allocating client funds associated with municipal clients among the plurality of aggregated deposit accounts is further based on: (4) respective client balance of funds for each client associated with the client funds associated with municipal clients such that client funds associated with clients having a larger client fund balance are allocated before client funds associated with clients having a lesser client fund balance.

In embodiments, the one or more instructions to transfer funds are sent via one or more wire transfers.

In embodiments, the one or more instructions to transfer funds are sent via one or more ACH transfers.

In embodiments, the one or more instructions to transfer funds are sent via one or more electronic transfers, such as by ZELLE™, VENMO™, PAYPAL™, GOOGLE PAY™, APPLE PAY™, or some combination thereof, to name few.

In embodiments, the one or more instructions to transfer funds are sent via one or more facsimile.

In embodiments, the one or more instructions to transfer funds are sent via electronic mail.

In embodiments, the one or more instructions to transfer funds are sent via one or more messengers.

In embodiments, each respective report is generated on a periodic basis, e.g., daily, weekly, monthly, quarterly, yearly basis, to name a few, or aperiodic basis, e.g., on request by the depository institution.

In embodiments, each respective report includes a respective daily average of funds over a day associated with the respective report held in a corresponding respective aggregated deposit account.

In embodiments, each respective report includes a respective daily balance of funds over a day associated with the respective report held in a corresponding respective aggregated deposit account. In embodiments, each respective report includes a respective daily average of funds over each day of a week associated with the respective report held in a corresponding respective aggregated deposit account.

In embodiments, each respective report includes a respective daily balance of funds for each day of a week associated with the respective report held in a corresponding respective aggregated deposit account.

In embodiments, each respective report includes a respective daily average of funds over each day of a month (or statement period) associated with the respective report held in a corresponding respective aggregated deposit account.

In embodiments, each respective report includes a respective weekly average of funds over each week of a month (or statement period) associated with the respective report held in a corresponding respective aggregated deposit account.

In embodiments, each respective report includes a respective daily balance of funds for each day of a month (or statement period) associated with the respective report held in a corresponding respective aggregated deposit account.

In embodiments, each respective report includes a respective weekly balance of funds for each week of a month (or statement period) associated with the respective report held in a corresponding respective aggregated deposit account.

In embodiments, each respective report includes a respective daily average of funds over each day of a quarter associated with the respective report held in a corresponding respective aggregated deposit account.

In embodiments, each respective report includes a respective weekly average of funds over each week of a quarter associated with the respective report held in a corresponding respective aggregated deposit account.

In embodiments, each respective report includes a respective monthly average of funds over each month of a quarter associated with the respective report held in a corresponding respective aggregated deposit account.

In embodiments, each respective report includes a respective daily balance of funds for each day of a quarter associated with the respective report held in a corresponding respective aggregated deposit account.

In embodiments, each respective report includes a respective weekly balance of funds for each week of a quarter associated with the respective report held in a corresponding respective aggregated deposit account.

In embodiments, each respective report includes a respective weekly balance of funds for each month of a quarter associated with the respective report held in a corresponding respective aggregated deposit account.

In embodiments, the respective report is sent to respective depository institution upon request from the respective depository institution.

In embodiments, the plurality of aggregated accounts are interest bearing accounts.

In embodiments, the plurality of aggregated accounts are insured by the Federal Deposit Insurance Corporation.

In embodiments, the plurality of aggregated accounts are insured by the Federal Savings and Loan Insurance Corporation.

In embodiments, the plurality of aggregated accounts are insured by the Securities Investor Protection Corporation.

In embodiments, one or more of the plurality of aggregated accounts are demand deposit accounts (DDA).

In embodiments, one or more of the plurality of aggregated accounts are money market deposit accounts (MMDA).

In embodiments, one or more of the plurality of aggregated accounts are MMDA-DDA pairs.

In embodiments, one or more of the plurality of aggregated accounts are negotiable order of withdrawal (NOW) accounts.

In embodiments, one or more of the plurality of aggregated accounts are certificate of deposit accounts.

In embodiments, the allocation of client funds for each of the remaining client types is further based on: (4) an even distribution such that client funds are distributed evenly over a fixed number of depository institutions of the plurality of depository institutions, wherein the fixed number of depository institutions is less than an amount of depository institutions of the plurality of depository instructions, and wherein the even distribution of client funds, for each depository institution, is distributed in a manner that does not exceed a predetermined limit of any of the fixed number of depository institutions.

In embodiments, the allocation of client funds for the municipal clients is further based on: (4) an even distribution such that client funds are distributed evenly over a fixed number of depository institutions of the plurality of depository institutions, wherein the fixed number of depository institutions is less than an amount of depository institutions of the plurality of depository instructions, and wherein the even distribution of client funds, for each depository institution, is distributed in a manner that does not exceed a predetermined limit of any of the fixed number of depository institutions.

In embodiments, the transaction data is obtained via a mobile application.

In embodiments, the transaction data is obtained via an interface over the Internet, such as via a website.

In embodiments, the plurality of aggregated deposit accounts further comprises one or more of the following types of aggregated accounts: (1) one or more cash management vehicles; (2) one or more aggregated cash management accounts and (3) one or more cash vehicles. In embodiments, the one or more aggregated cash management accounts comprise one or more of the following types of accounts: (i) one or more DDA accounts; (ii) one or more MMDA accounts; (iii) one or more NOW accounts; (iv) one or more stable value fund accounts; and (v) one or more credit interest program accounts. In embodiments, the one or more cash vehicles comprise one or more of the following types of accounts: (i) one or more certificate of deposit accounts; (ii) one or more money fund accounts; (iii) one or more exchange traded finds (ETFs) accounts: and (iv) one or more funds.

In embodiments, the one or more computers is associated with an administrator of the system.

In embodiments, one or more of the plurality of aggregated accounts are each insured by one or more of the following: (1) the Federal Deposit Insurance Corporation; (2) the National Credit Union Administration; (3) one or more letters of credit from a Federal Home Loan Bank; (4) the Federal Savings and Loan Insurance Corporation; and (5) Securities Investor Protection Corporation.

In embodiments, the plurality of client types further comprises: (i) single accounts; (ii) retirement accounts; (iii) joint accounts; (iv) revocable trust accounts; (v) irrevocable trust accounts; (vi) employee benefit plan accounts; (vii) corporation accounts; (viii) partnership accounts; (ix) unincorporated accounts; (x) government accounts; (xi) municipalities; (xii) villages; (xiii) countries; and (xiv) pension accounts.

In embodiments, the client account information for each client account, further comprises: (5) geographic origin information indicating a respective location associated with the respective client associated with the respective client account. In embodiments, allocating client funds associated with municipal clients among the plurality of aggregated deposit accounts is further based on: (4) respective geographic location for municipal clients for each depository institution, wherein the client funds associated with municipal clients is segregated such that client funds from respective locations that are the same are held together.

In embodiments, one or more of the plurality of depository institutions each comprise one or more of the following: (i) non-FDIC insured investment vehicles; (ii) one or more mutual funds; (iii) one or more ETFs; (iv) one or more exchange traded notes (ETNs); (v) one or more stable value funds; (vi) one or more index funds; (vii) one or more treasury bonds; (viii) one or more stocks; (ix) one or more bonds; and (x) one or more notes.

In embodiments, a method, comprises: A) accessing, one or more computers programmed with computer-readable code, one or more databases comprising: (1) depository institution information for each depository institution of a plurality of depository institutions participating in a program, the depository information including for each depository institution: (i) respective institution balance of funds information indicating a total amount of funds held by each respective depository institution; (ii) respective institution target deposit information indicating a deposit target amount of total deposits to be held by each respective depository institution; (iii) respective client type target information indicating a total deposit target amount for each respective client type to be held by each respective depository institution; and (iv) respective client type balance information indicating a total amount of funds of a respective client type held by each respective depository institution; (2) aggregated deposit account information for each of a plurality of aggregated deposit accounts held in the plurality of depository institutions participating in the program, each of the respective depository institutions holding one or more of the aggregated deposit accounts, each of the aggregated deposit accounts holding funds of a plurality of client accounts associated with a plurality of clients, wherein the aggregated deposit account information comprises for each aggregated deposit account: (i) a respective aggregate account balance of funds held in each of the respective aggregated deposit accounts; (ii) a respective aggregated deposit account target balance for each of the aggregated deposit accounts; (iii) client account information for each client account of the plurality of client accounts, the client account information for each client account comprising: (a) a respective client balance of funds associated with each client; (b) a respective balance of funds of each client account held in each aggregated deposit account; (c) client type information indicative of a respective client type for each client account of the plurality of client accounts, wherein the plurality of client types includes at least municipal client and individual government insured client; and (d) client transaction information indicating all transactions associated with each client account of the plurality of client accounts; (iv) total client type deposit information indicating a total amount of funds associated with each respective client type of the plurality of client types; B) obtaining, using the one or more computers, transaction data, wherein the transaction data is related to transactions associated with the plurality client accounts during a first time period; C) determining, using the one or more computers, a first net amount of funds to deposit into and/or withdraw from the plurality of client accounts during the first time period based on the transaction data; D) determining, using the one or more computers, a respective updated balance of funds of each client account based on the respective balance of funds for each client account and respective transactions associated with the respective client account during the first time period; E) determining, using the one or more computers, respective updated total client type deposit information for each respective client type; F) allocating, using the one or more computers, funds associated with the plurality of client accounts, the allocating step including: (i) determining an updated respective aggregate account balance of funds for each aggregated deposit account of the plurality of aggregated deposit accounts by: (a) identifying one or more of the plurality of aggregated deposit accounts to deposit into and/or withdrawal from the first net amount of funds and a respective transfer amount for each of the identified one or more of the plurality of aggregated deposit accounts based on: (1) respective institution balance of funds information for each respective depository institution; (2) respective institution target deposit information for each respective depository institution; and (3) the first net amount of funds; wherein the sum of the respective transfer amounts for each of the identified one or more aggregated deposit accounts is equal to the first net amount of funds, and wherein the respective institution balance of funds information plus the respective transfer amount for each of the identified one or more of the plurality of aggregated deposit accounts associated with the respective depository institution is in compliance with the respective institution target deposit information; (b) calculating an updated respective institution balance amount for each depository institution by summing the respective institution balance amount and the respective transfer amounts associated with the respective one or more aggregated deposit accounts associated with each respective depository institution, wherein the respective transfer amounts is zero if there is no transfer, positive if there is a deposit, and negative if there is a withdrawal; (ii) allocating respective client funds associated with each of the respective client accounts among the plurality of aggregated deposit accounts by: (a) allocating client funds associated with municipal clients among the plurality of aggregated deposit accounts based on: (1) the respective updated total client type deposit information associated with municipal clients; (2) the respective client type target information for municipal clients for each depository institution, including the respective available collateral information for each depository institution; and (3) the updated respective institution balance amount for each depository institution; wherein the sum of each respective updated total client type deposit information for each of the plurality of aggregated deposit accounts is equal to the respective updated total client type deposit information, and wherein each respective updated total client type deposit information for each of the plurality of aggregated deposit accounts is in compliance with the respective client type target information, including the respective available collateral information for each depository institution, and wherein each respective updated total client type deposit information for each aggregated deposit account is less than the updated respective institution balance amount for each depository institution; (b) for each of the remaining client types, allocating the client funds associated with each respective client type other than the client type that associated with municipal clients for the respective updated total client type deposit information among the plurality of aggregated deposit accounts based on: (1) the respective updated total client type deposit information; (2) the respective client type target information for each depository institution; (3) the updated respective institution balance amount for each depository institution; and (4) a respective remaining available institution balance amount for each depository institution; wherein the respective remaining available institution balance amount of each respective depository institution is the difference between the updated respective institution balance for the respective depository institution and a respective updated total client type deposit information for the respective aggregated deposit accounts that has already been assigned to the respective aggregated deposit account, wherein, at the end of the allocation process, each respective updated total client type deposit information for each of the plurality of aggregated deposit accounts is in compliance with the respective client type target information, and wherein, throughout the allocation processes of step F), the sum of each respective updated total client type deposit information for each of the plurality of aggregated deposit accounts is equal to or less than the respective updated total client type deposit information, and wherein, at the end of the allocation process of step F), the sum of each respective updated total client type deposit information for each aggregated deposit account is equal to the updated respective institution balance amount for each depository institution; (iii) updating the depository institution information and the aggregated deposit account information based on the allocating step F); G) generating, using the one or more computers, one or more instructions to transfer funds to or from at least one of the aggregated deposit accounts in accordance with the transfer amounts; H) sending the one or more instructions to transfer funds to the respective one depository institution of the plurality of deposit institutions, where the respective transfer amounts are not zero; I) generating, using the one or more computers, for each respective depository institution a respective report based on information from the one or more databases reflecting the updated balance of funds held in each respective aggregated deposit account associated with the respective depository institution and the respective updated balance of funds associated with each client type of plurality of client types for the aggregated deposit accounts associated with the respective depository institution; and J) sending, using the one or more computers, the respective report to each respective depository institution.

In embodiments, the respective institution balance of funds information further indicates the total amount of funds held as part of the program.

In embodiments, the respective institution balance of funds information further indicates the total amount of funds held is associated with one or more funding sources.

In embodiments, the deposit target amount of total deposits to be held by each respective depository institution comprises: (a) a respective minimum target amount indicating a respective minimum amount of total deposits to be held by the respective depository institution; and (b) a respective maximum target amount indicating a respective maximum amount of total deposits to be held by the respective depository institution.

In embodiments, the deposit target amount of total deposits to be held by each respective depository institution comprises: (a) a respective maximum target amount indicating a respective maximum amount of total deposits to be held by the respective depository institution.

In embodiments, the deposit target amount of total deposits to be held by each respective depository institution comprises: (a) a respective target number indicating a respective amount of total deposits to be held by the respective depository institution.

In embodiments, the total client type deposit information, for each aggregated deposit account, comprises: (a) a respective minimum target amount for each of one or more client types indicating a respective minimum deposit amount for each respective client type of the one or more client types; and (b) a respective maximum target amount for each of one or more client types indicating a respective maximum deposit amount for each respective client type of the one or more client types.

In embodiments, the total client type deposit information, for each aggregated deposit account, comprises: (a) a respective maximum target total deposit amount for each of one or more client types to be held by the respective depository institution.

In embodiments, the total client type deposit information, for each aggregated deposit account, comprises: (a) a respective target number indicating a total deposit amount for each of one or more client types to be held by the respective depository institution.

In embodiments, the total client type deposit information, for each aggregated deposit account, comprises: (a) a respective client type percentage for each of one or more client types indicating a respective target percentage of the respective deposit target amount for the respective client type.

In embodiments, the respective total deposit target amount for a municipal deposit client type to be held by the respective depository institution comprises: (a) a respective collateral maximum indicating a maximum amount of collateralized funds associated with the municipal deposit client type available for deposit at the respective depository institution.

In embodiments, the respective total deposit target amount for a municipal deposit client type to be held by the respective depository institution comprises: (a) a respective non-collateral maximum indicating a maximum amount of non-collateralized funds associated with the municipal deposit client type available for deposit at the respective depository institution.

In embodiments, the respective aggregated deposit account target balance for a municipal deposit client type to be held by the respective depository institution comprises: (a) a respective collateral maximum indicating a maximum amount of collateralized funds associated with the municipal deposit client type available for deposit at the respective depository institution; and (b) a respective non-collateral maximum indicating a maximum amount of non-collateralized funds associated with the municipal deposit client type available for deposit at the respective depository institution.

In embodiments, the respective aggregated deposit account target balance for a municipal deposit client type to be held by the respective depository institution comprises: (a) a respective client type percentage indicating a respective target percentage of the respective deposit target amount for the municipal deposit client type.

In embodiments, the respective aggregated deposit account target balance for a municipal deposit client type to be held by the respective depository institution comprises: (a) a respective maximum target total deposit amount for the municipal deposit client type to be held by the respective depository institution.

In embodiments, the respective aggregated deposit account target balance for a municipal deposit client type to be held by the respective depository institution comprises: (a) a respective target number indicating a total deposit target amount for the municipal deposit client type to be held by the respective depository institution.

In embodiments, the respective aggregated deposit account target balance for each of the aggregated deposit accounts each comprise: (a) a respective minimum target amount indicating a respective minimum amount of client funds to be held in the respective aggregated deposit account; and (b) a respective maximum target amount indicating a respective maximum amount of client funds to be held in the respective aggregated deposit account.

In embodiments, the respective aggregated deposit account target balance for each of the aggregated deposit accounts each comprise: (a) a respective minimum target amount indicating a respective minimum aggregated deposit account target balance.

In embodiments, the respective aggregated deposit account target balance for each of the aggregated deposit accounts each comprise: (a) a respective maximum target amount indicating a respective maximum aggregated deposit account target balance.

In embodiments, the respective aggregated deposit account target balance for each respective client type to be held by the respective depository institution comprises: (a) a respective client type percentage for each client type indicating a respective target percentage of the respective deposit target amount for the respective client type.

In embodiments, the respective aggregated deposit account target balance for each of the aggregated deposit accounts each comprise: (a) a respective non-collateral max indicating a maximum of non-collateralized funds for the respective aggregated deposit account.

In embodiments, the respective aggregated deposit account target balance for each of the aggregated deposit accounts each comprise: (a) a respective collateral max indicating a maximum of collateralized funds for the respective aggregated deposit account.

In embodiments, the respective aggregated deposit account target balance for each of the aggregated deposit accounts each comprise: (a) a respective collateral max indicating a maximum of collateralized funds for the respective aggregated deposit account; and (b) a respective non-collateral max indicating a maximum of non-collateralized funds for the respective aggregated deposit account.

In embodiments, the one or more computers obtain the transaction data from one or more sweep files associated with at least one source.

In embodiments, source is one or more broker dealers associated with a self-clearing broker dealer, one or more banks and/or savings and loans, one or more agents participating in a program or system, one or more retirement programs or defined benefit programs.

In embodiments, client funds may be directly obtained by an organization operating the one or more computers.

In embodiments, the one or more computers obtain the transaction data from one or more electronic messages.

In embodiments, the one or more computers obtain the transaction data via a file transfer protocol (FTP).

In embodiments, the one or more computers obtain the transaction data from an individual transaction being uploaded to the system.

In embodiments, the identification of the one or more of the plurality of aggregated deposit accounts in step F)(i)(a) is further based on: (4) respective number of withdraws of funds information for each respective aggregated deposit account of each respective depository institution, wherein each respective number of withdraws of funds information comprises: (a) a number of withdraws of funds over a predetermined amount of time for the respective aggregated deposit account; and (b) a maximum allotted number of withdrawals over the predetermined amount of time for the respective aggregated deposit account, wherein the identified one or more of the plurality of aggregated deposit accounts, after the allocation, remain in compliance with respective number of withdraws of funds information for each respective aggregated deposit account.

In embodiments, the predetermined amount of time is a statement period, a calendar month, a quarter, a year, to name few.

In embodiments, the identification of the one or more of the plurality of aggregated deposit accounts in step F)(i)(a) is further based on: (4) pre-designated information comprising: (a) pre-designated deposit accounts including one or more of the plurality of aggregated deposit accounts; and (b) pre-designated withdrawal accounts including one or more of the plurality of aggregated deposit accounts, wherein the one or more aggregated deposit accounts identified for deposit comprise one or more of the pre-designated deposit accounts such that all of the pre-designated deposit accounts are identified for deposit before one or more of the plurality of aggregated deposit accounts not included as a pre-designated deposit account is identified for deposit, and wherein the one or more aggregated deposit accounts identified for withdrawal comprise one or more of the pre-designated withdrawal accounts such that all of the pre-designated withdrawal accounts are identified for withdrawal before one or more of the plurality of aggregated deposit accounts not included as a pre-designated withdrawal account is identified for withdrawal.

In embodiments, the identification of the one or more of the plurality of aggregated deposit accounts in step F)(i)(a) is further based on: (4) pre-designated information comprising: (a) pre-designated deposit accounts including one or more of the plurality of aggregated deposit accounts, wherein the one or more aggregated deposit accounts identified for deposit comprise one or more of the pre-designated deposit accounts such that all of the pre-designated deposit accounts are identified for deposit before one or more of the plurality of aggregated deposit accounts not included as a pre-designated deposit account is identified for deposit.

In embodiments, the identification of the one or more of the plurality of aggregated deposit accounts in step F)(i)(a) is further based on: (4) pre-designated information comprising: (a) pre-designated withdrawal accounts including one or more of the plurality of aggregated deposit accounts, wherein the one or more aggregated deposit accounts identified for withdrawal comprise one or more of the pre-designated withdrawal accounts such that all of the pre-designated withdrawal accounts are identified for withdrawal before one or more of the plurality of aggregated deposit accounts not included as a pre-designated withdrawal account is identified for withdrawal.

In embodiments, the identification of the one or more of the plurality of aggregated deposit accounts in step F)(i)(a) is further based on: (4) a predetermined order of the plurality of depository institutions participating in the program, wherein identification of the one or more aggregated deposit accounts complies with the preterminal order until compliance with the predetermined order and institution target deposit information is not feasible. In embodiments, the predetermine order is a rotation of the plurality of depository institutions participating in the program.

In embodiments, the identification of the one or more of the plurality of aggregated deposit accounts in step F)(i)(a) is further based on: (4) affiliation information for each respective aggregated deposit account of each respective depository institution, wherein the affiliation information for each respective aggregated deposit account indicates an associated with the program, and wherein the one or more aggregated deposit accounts identified comprise one or more of the plurality of aggregated deposit accounts associated with the program such that all of the plurality of aggregated pre-designated deposit accounts associated with the program are identified before an aggregate deposit account not associated with the program is identified.

In embodiments, the identification of the one or more of the plurality of aggregated deposit accounts in step F)(i)(a) is further based on: (4) transaction fee information for each respective aggregated deposit account of each respective depository institution, wherein the transaction fee information, for each respective aggregated deposit account, comprises a respective amount of fees charged for transactions associated with the respective aggregated deposit account, and wherein the one or more of the plurality of aggregated accounts were identified by: (a) minimizing a sum of transaction fees associated with the one or more of the plurality of aggregated deposit accounts; and (b) maintaining compliance with the institution target deposit information.

In embodiments, the identification of the one or more of the plurality of aggregated deposit accounts in step F)(i)(a) is further based on: (4) transaction fee information for each respective aggregated deposit account of each respective depository institution, wherein the transaction fee information, for each respective aggregated deposit account, comprises a respective amount of fees charged for transactions associated with the respective aggregated deposit account, and wherein the one or more of the plurality of aggregated accounts were identified by (a) maximizing a sum of transaction fees associated with the one or more of the plurality of aggregated deposit accounts; and (b) maintaining compliance with the institution target deposit information.

In embodiments, the identification of the one or more of the plurality of aggregated deposit accounts in step F)(i)(a) is further based on: (4) interest information for each respective aggregated deposit account of each respective depository institution, wherein the interest information, for each respective aggregated deposit account, comprises a respective interest rate associated with the respective aggregated deposit account, and wherein the one or more of the plurality of aggregated accounts were identified by (a) minimizing a first combined interest rate of the one or more aggregated deposit accounts identified for deposit, wherein the first combined interest rate is a first average of each respective interest rate associated with each of the one or more aggregated deposit accounts identified for deposit; (b) minimizing a second combined interest rate of the one or more aggregated deposit accounts identified for withdrawal, wherein the second combined interest rate is a second average of each respective interest rate associated with each of the one or more aggregated deposit accounts identified for withdrawal; and (c) maintaining compliance with the institution target deposit information.

In embodiments, at the end of the allocation process, each respective updated total client type deposit information for each of the plurality of aggregated deposit accounts is in compliance with respective insurance regulations associated with the respective aggregated deposit account.

In embodiments, at the end of the allocation process, each respective updated total client type deposit information for each of the plurality of aggregated deposit accounts is in compliance with respective government regulations and government agency regulations associated with the respective aggregated deposit account. In embodiments, the respective government regulations and government agency regulations associated with the respective aggregated deposit account include Federal Deposit Insurance Corporation government regulations and government agency regulations. In embodiments, the respective government regulations and government agency regulations associated with the respective aggregated deposit account include Federal Savings and Loan Insurance Corporation government regulations and government agency regulations. In embodiments, the respective government regulations and government agency regulations associated with the respective aggregated deposit account include Securities Investor Protection Corporation government regulations and government agency regulations.

In embodiments, the allocating client funds associated with municipal clients among the plurality of aggregated deposit accounts is further based on: (4) client preference information associated with one or more clients associated with client funds associated with municipal clients among the plurality of aggregated deposit accounts, wherein the client preference information identifies one or more of the plurality of depository institutions the one or more clients has placed on a blacklist.

In embodiments, the allocating client funds associated with municipal clients among the plurality of aggregated deposit accounts is further based on: (4) client preference information associated with one or more clients associated with client funds associated with municipal clients among the plurality of aggregated deposit accounts, wherein the client preference information identifies one or more of the plurality of depository institutions the one or more clients has placed on a whitelist.

In embodiments, the allocation of client funds for each of the remaining client types is further based on: (4) client preference information associated with one or more clients associated with each of the remaining client types, wherein the client preference information identifies one or more of the plurality of depository institutions the one or more clients has placed on a blacklist.

In embodiments, the allocation of client funds for each of the remaining client types is further based on: (4) client preference information associated with one or more clients associated with each of the remaining client types, wherein the client preference information identifies one or more of the plurality of depository institutions the one or more clients has placed on a whitelist.

In embodiments, the allocation of client funds for each of the remaining client types is further based on: (4) the respective aggregated deposit account balance of funds held in each of the respective aggregate accounts, such that each aggregate account balance of funds held in each of the respective aggregate accounts does not exceed a predetermined amount of funds. In embodiments, the predetermined amount of funds is associated with an insurance limit.

In embodiments, the insurance limit is associated with Federal Deposit Insurance Corporation, Federal Savings and Loan Insurance Corporation, Securities Investor Protection Corporation to name a few.

In embodiments, the allocating client funds associated with municipal clients among the plurality of aggregated deposit accounts is further based on: (4) the respective aggregated deposit account balance of funds held in each of the respective aggregate accounts such that each aggregate account balance of funds held in each of the respective aggregate accounts does not exceed a predetermined amount of funds.

In embodiments, the predetermined amount of funds is less than, or equal to, or otherwise associated with an insurance limit.

In embodiments, the insurance limit is associated with Federal Deposit Insurance Corporation, Federal Savings and Loan Insurance Corporation, Securities Investor Protection Corporation to name a few.

In embodiments, the allocating client funds associated with municipal clients among the plurality of aggregated deposit accounts is further based on: (4) the respective institution balance of funds information such that the total amount of funds held by each respective depository institution does not go above a predetermined amount of funds.

In embodiments, the predetermined amount of funds is less than, or equal to, or otherwise associated with an insurance limit.

In embodiments, the insurance limit is associated with Federal Deposit Insurance Corporation, Federal Savings and Loan Insurance Corporation, Securities Investor Protection Corporation to name a few.

In embodiments, the allocation of client funds for each of the remaining client types is further based on: (4) the respective institution balance of funds information such that the total amount of funds held by each respective depository institution does not go above a predetermined amount of funds.

In embodiments, the predetermined amount of funds is less than, or equal to, or otherwise associated with an insurance limit.

In embodiments, the insurance limit is associated with Federal Deposit Insurance Corporation, Federal Savings and Loan Insurance Corporation, Securities Investor Protection Corporation to name a few.

In embodiments, the allocation of client funds for each of the remaining client types is further based on: (4) respective client balance of funds for each client associated with the client funds associated with each of the remaining client types such that client funds associated with clients having a larger client fund balance are allocated before client funds associated with clients having a lesser client fund balance.

In embodiments, the allocating client funds associated with municipal clients among the plurality of aggregated deposit accounts is further based on: (4) respective client balance of funds for each client associated with the client funds associated with municipal clients such that client funds associated with clients having a larger client fund balance are allocated before client funds associated with clients having a lesser client fund balance.

In embodiments, the one or more instructions to transfer funds are sent via one or more wire transfers.

In embodiments, the one or more instructions to transfer funds are sent via one or more ACH transfers.

In embodiments, the one or more instructions to transfer funds are sent via one or more electronic transfers, such as by ZELLE™, VENMO™, PAYPAL™, GOOGLE PAY™, APPLE PAY™, or some combination thereof, to name few.

In embodiments, the one or more instructions to transfer funds are sent via one or more facsimile.

In embodiments, the one or more instructions to transfer funds are sent via electronic mail.

In embodiments, the one or more instructions to transfer funds are sent via one or more messengers.

In embodiments, each respective report may be generated on a regular basis—e.g., daily, weekly, monthly, and/or quarterly, to name a few. Each respective report, in embodiments, may include a respective daily average of funds over a day, a respective weekly average of funds over a week, a respective monthly average of funds over a month, and/or a respective quarterly average of funds over a quarter of a calendar year. In embodiments, each respective report may include a respective daily balance over each day covered by the generated report, a respective weekly balance for each week covered by the generated report, a respective monthly balance for each month covered by the generated report and/or a respective quarterly balance for each quarter covered by the generated report, to name a few.

The respective reports, in embodiments, may be sent to institutions daily, weekly, monthly, quarterly, annually, at the end of a statement period, and/or a combination thereof, to name a few, In embodiments, the respective report is sent to each respective depository institution upon request from the respective depository institution.

In embodiments, the plurality of aggregated accounts are interest bearing accounts. In embodiments, the plurality of aggregated accounts are insured by one or more of the following: the Federal Deposit Insurance Corporation, the Federal Savings and Loan Insurance Corporation, and/or the Securities Investor Protection Corporation, to name a few.

In embodiments, one or more of the plurality of aggregated accounts are one or more of the following: demand deposit accounts (DDA), money market deposit accounts (MMDA), MMDA-DDA pairs, negotiable order of withdrawal (NOW) accounts, and/or certificate of deposit accounts, to name a few.

In embodiments, the allocation of client funds for municipal client types and/or one or more remaining client types, is further based on: (4) an even distribution such that client funds are distributed evenly over a fixed number of depository institutions of the plurality of depository institutions, wherein the fixed number of depository institutions is less than an amount of depository institutions of the plurality of depository instructions, and wherein the even distribution of client funds, for each depository institution, is distributed in a manner that does not exceed a predetermined limit of any of the fixed number of depository institutions.

In embodiments, the transaction data is obtained via a mobile application.

In embodiments, the transaction data is obtained via a website.

In embodiments, the plurality of aggregated deposit accounts further comprises one or more of the following types of aggregated accounts: (1) one or more cash management vehicles; (2) one or more aggregated cash management accounts; and (3) one or more cash vehicles. In embodiments, the one or more aggregated cash management accounts comprise one or more of the following types of accounts: (i) one or more DDA accounts; (ii) one or more MMDA accounts; (iii) one or more NOW accounts; (iv) one or more stable value fund accounts; and (v) one or more credit interest program accounts. In embodiments, the one or more cash vehicles comprise one or more of the following types of accounts: (i) one or more certificate of deposit accounts; (ii) one or more money fund accounts; (iii) one or more exchange traded funds (ETF's) accounts; and (iv) one or more funds.

In embodiments, the one or more computers is associated with an administrator of the system.

In embodiments, one or more of the plurality of aggregated accounts are each insured by one or more of the following: (1) the Federal Deposit Insurance Corporation; (2) the National Credit Union Administration; (3) one or more letters of credit from a Federal Home Loan Bank; (4) the Federal Savings and Loan Insurance Corporation; and (5) Securities Investor Protection Corporation.

In embodiments, the plurality of client types further comprises: (i) single accounts; (ii) retirement accounts; (iii) joint accounts; (iv) revocable trust accounts; (v) irrevocable trust accounts; (vi) employee benefit plan accounts; (vii) corporation accounts; (viii) partnership accounts; (ix) unincorporated accounts; (x) government accounts; (xi) municipalities; (xii) villages; (xiii) countries; and (xiv) pension accounts.

In embodiments, the client account information for each client account, further comprises: (5) geographic origin information indicating a respective location associated with the respective client associated with the respective client account. In embodiments, allocating client funds associated with municipal clients among the plurality of aggregated deposit accounts is further based on: (4) respective geographic location for municipal clients for each depository institution, wherein the client funds associated with municipal clients is segregated such that client funds from respective locations that are the same are held together.

In embodiments, one or more of the plurality of depository institutions each comprise one or more of the following: (i) non-FDIC insured investment vehicles; (ii) one or more mutual funds; (iii) one or more ETFs; (iv) one or more exchange traded notes (ETNs); (v) one or more stable value funds; (vi) one or more index funds; (vii) one or more treasury bonds; (viii) one or more stocks; (ix) one or more bonds; and (x) one or more notes.

BRIEF DESCRIPTION OF THE DRAWINGS

The above and related objects, features, and advantages of the present invention, will be more fully understood by reference to the following detailed description of the exemplary embodiments of the present invention, when taken in conjunction with the following exemplary figures, wherein:

FIG. 4A-4B are an exemplary screenshots of graphical user interfaces in accordance with exemplary embodiments of the present invention;

FIG. 6A-FIG. 6D are additional screenshots of exemplary graphical user interfaces according to an exemplary embodiment of the present invention;

FIG. 6D-1-FIG. 6D-4 are exemplary displays of holdings in accordance with exemplary embodiments of the present invention;

FIG. 7A is a schematic diagram of embodiments of a client interface screen for accessing client source accounts in accordance with exemplary embodiments of the present invention;

FIG. 7B is a schematic diagram of embodiments of a client interface screen for obtaining client authentication data for accessing client source accounts in accordance with exemplary embodiments of the present invention;

FIG. 7C is a schematic diagram of embodiments of a client interface screen for accessing client destination accounts in accordance with exemplary embodiments of the present invention;

FIG. 7D is a schematic diagram of embodiments of a client interface screen for obtaining client authentication data for accessing client destination accounts in accordance with exemplary embodiments of the present invention;

FIG. 8A is a schematic diagram of embodiments of a client interface screen for a client home page that lists recent transaction history for client source accounts and facilitates access to client source accounts and destination accounts and transaction rules and the client DAS account in accordance with exemplary embodiments of the present invention;

FIG. 8B is a schematic diagram of embodiments of a client interface screen for viewing a listing of the client's source accounts, with an Add Source Account button, a View Account button, and an Edit Account button in accordance with exemplary embodiments of the present invention;

FIG. 8C is a schematic diagram of embodiments of a client interface screen that may be presented when the Add Source Account button is activated for adding a new client source account in accordance with exemplary embodiments of the present invention;

FIG. 8D is a schematic diagram of embodiments of a client interface screen that may be presented when the Edit Account button is activated for viewing and editing the data for a particular one of the client's source accounts in accordance with exemplary embodiments of the present invention;

FIG. 9 and FIG. 10 are flow charts of an exemplary process for aggregating funds in accordance with embodiments of the present invention;

FIG. 11A through FIG. 11B are flow charts of an exemplary process for aggregating funds in accordance with embodiments of the present invention;

FIG. 12A through FIG. 12B are flow charts of an exemplary process for aggregating funds in accordance with embodiments of the present invention;

FIG. 13B through FIG. 13D are flow charts of an exemplary process for tracking ownership interest and reserve requirements in accordance with embodiments of the present invention;

FIG. 14A through FIG. 14B are flow charts of an exemplary process for tracking ownership interest and allocating funds by ownership interest in accordance with exemplary embodiments of the present invention;

FIG. 15A is a flow chart of an exemplary process for allocating funds by ownership interest in accordance with exemplary embodiments of the present invention;

FIG. 15B is a flow chart of an exemplary process which continues the exemplary process of FIG. 15A for allocating funds by ownership interest in accordance with exemplary embodiments of the present invention; and FIG. 15C is a flow chart of an exemplary process which continues the exemplary process of FIG. 15A for allocating funds by ownership interest in accordance with exemplary embodiments of the present invention.

DETAILED DESCRIPTION OF THE EMBODIMENTS

The field of the invention generally relates to various technological improvements in systems, methods, and program products used with aggregated accounts. In embodiments, the invention relates generally to new technological mechanisms to transfer, allocate and track ownership interest in aggregate accounts at depository or other destination institutions based on client type.

In embodiments, the invention generally relates to systems, methods, and program products used to enable depository institutions to identify funds from different client types, by client type, sourced from source institutions (such as broker dealers, banks, and other financial institutions) on behalf of their respective clients, which are held by the depository institution in aggregated depository accounts, and/or other aggregated cash management vehicles and/or aggregated cash management accounts, such as DDAs, MMDAs, NOW accounts, stable value funds, credit interest programs, to name a few, in order to transfer funds among those accounts freely.

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail. Thus, the present invention is not intended to be limited to the embodiments shown but is to be accorded the widest scope consistent with the principles and features disclosed herein.

The technological improvements provided by exemplary embodiments of the present invention may be applicable to many types of cash management systems, such as those described in U.S. Pat. Nos. 8,150,766; 8,359,267; 8,719,157; 8,712,911; 8,234,188; 7,895,099; 7,904,372; 8,090, 651; 8,301,560; 9,946,997; and U.S. Pat. No. 8,660,920, to name a few, the contents of which are incorporated herein by reference in their entirety.

Figure 1:
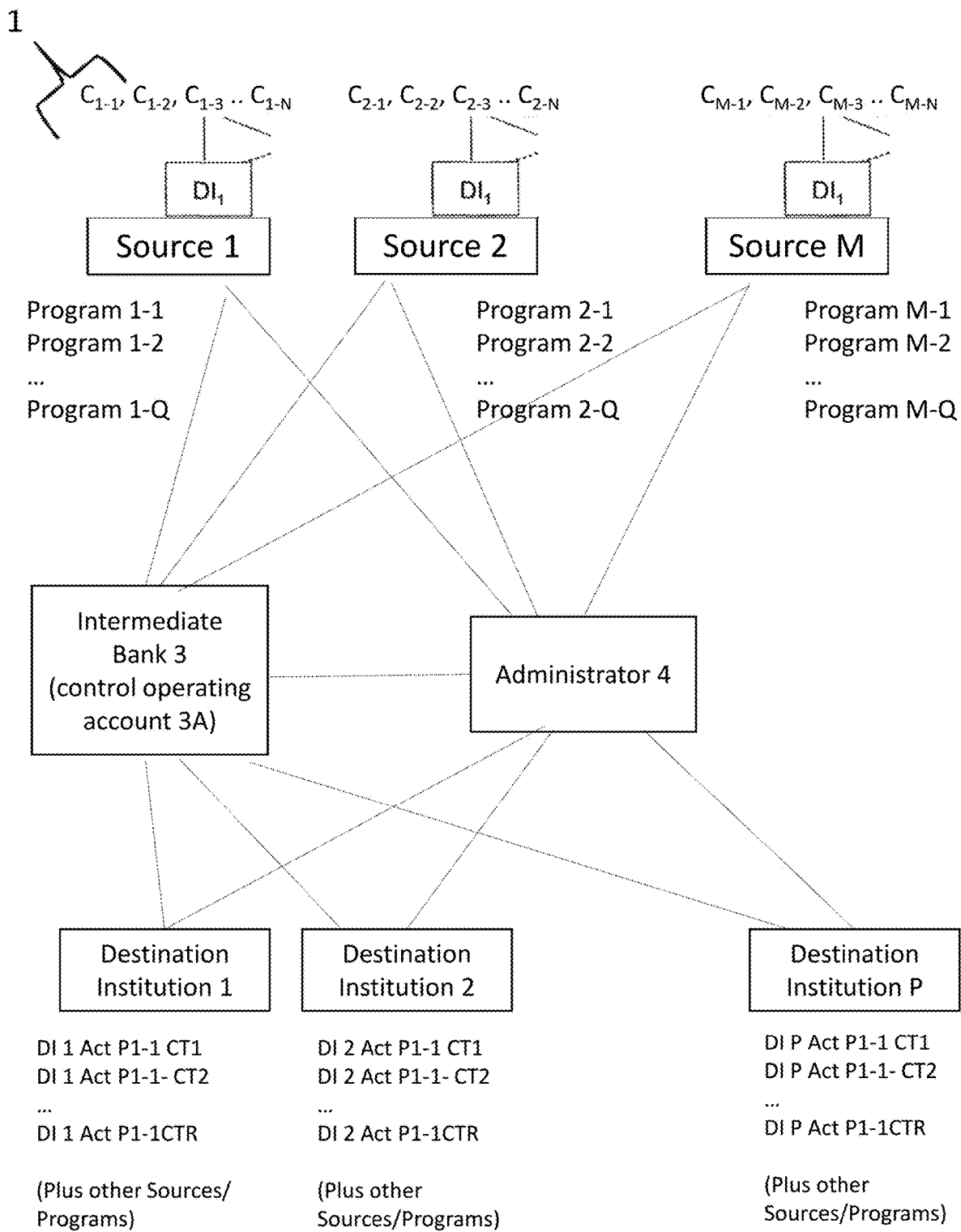
FIG. 1 is a schematic block diagram of an exemplary sweep system for allocating, transferring, and tracking ownership interests using segregated, aggregated deposit accounts in accordance with exemplary embodiments of the present invention.
Figure 1A:
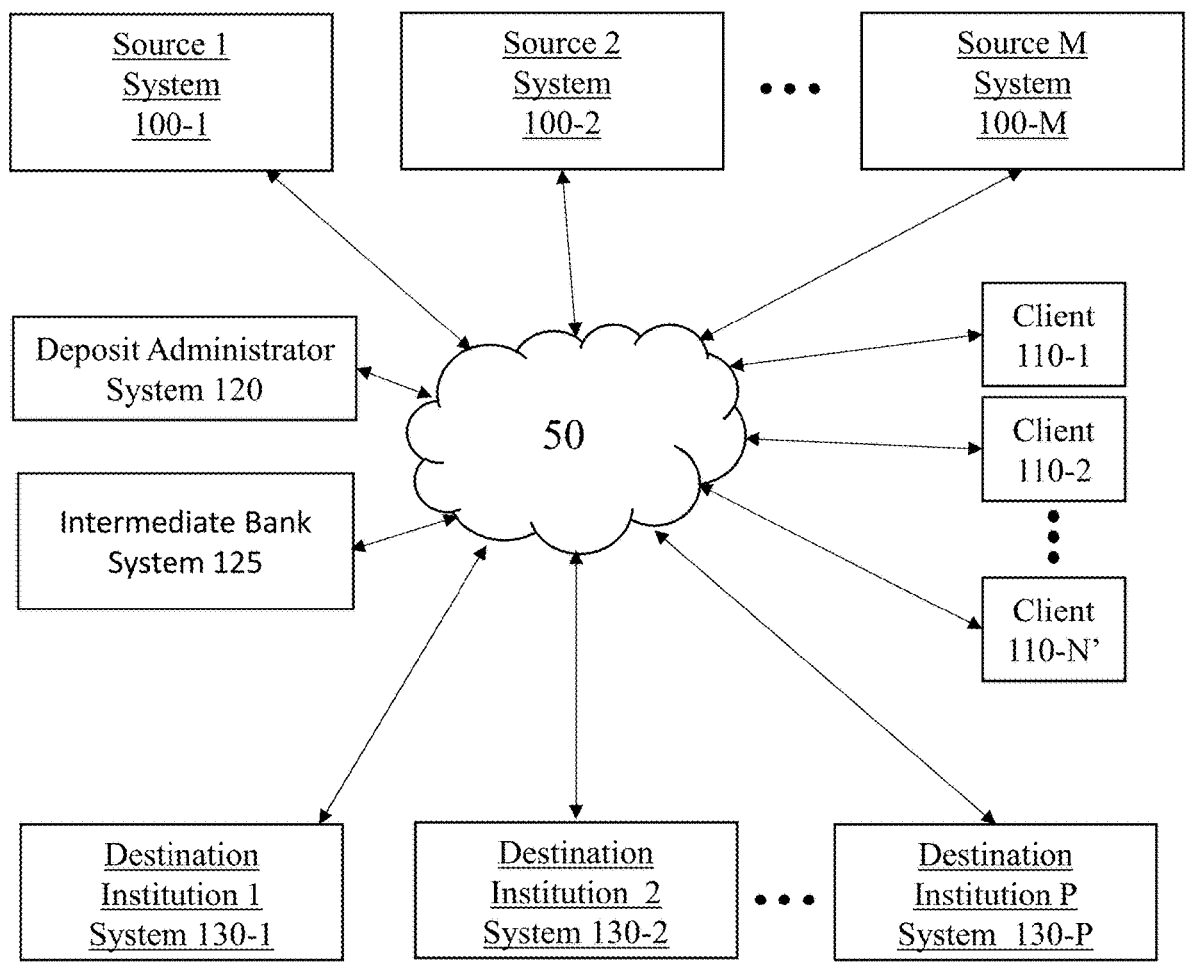
FIG. 1A is a schematic block diagram representing am exemplary sweep system in accordance with exemplary embodiments of the present invention.
Figure 1B:
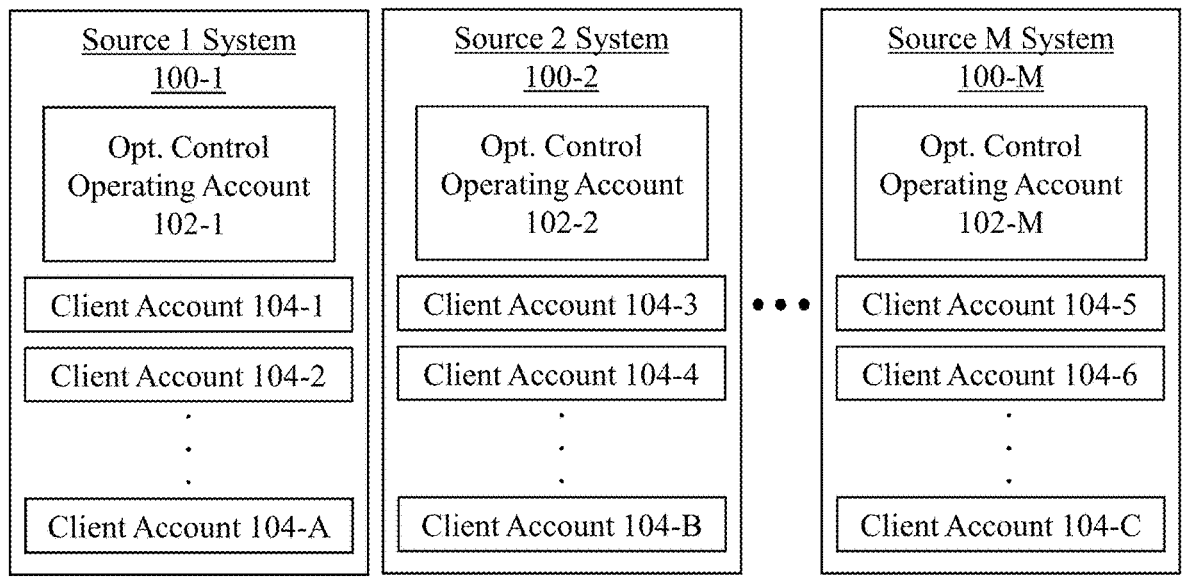
FIG. 1B is a schematic diagram representing source institutions in accordance with exemplary embodiments of the present invention.
Figure 1C:
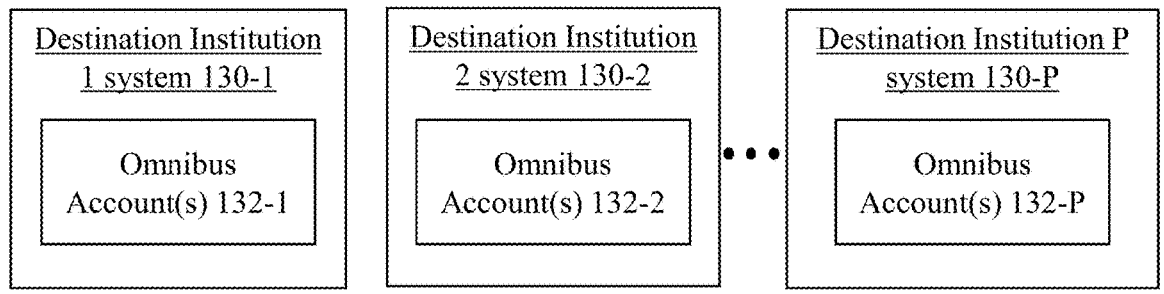
FIG. 1C is a schematic block diagram representing destination institutions in accordance with exemplary embodiments of the present invention.

FIG. 1A through FIG. 1C, illustrate various schematic block diagrams representing computer systems associated with different type of sweep systems that may implement the present inventions. Generally speaking, FIG. 1A represents a schematic block diagram associated with a sweep system in which client funds are held in the first instance at a source institution (e.g., a bank, broker dealer, and/or other financial institution, to name a few) and a deposit administrator (or deposit administrators) assist in the transfer, allocation and tracking of client funds held in destination institutions, such as FDIC insured and interest bearing aggregated accounts (e.g., MDDA, DDA, NOW accounts, to name a few), or other cash vehicles (e.g., certificate of deposits, money funds, exchange traded funds (ETFs), and/or other funds, to name a few). It will be appreciated by those skilled in the art that, in embodiments, a sweep program may be set up with only one source institution (e.g., a specific broker dealer or specific bank or even a specific agent, to name a few), or with more than one source institution (e.g., a self-clearing broker dealer and other broker dealers that clear through that self-clearing broker dealer, more than one banks and/or other savings institutions, or multiple agents, to name a few). It will also be appreciated by those skilled in the art that, in embodiments, a system may be set up where a deposit administrator interacts directly with clients so that there is no separate source institution involved. It will also be appreciated by those skilled in the art that, in embodiments, a system may be set up where there is no formal "program", and each clients fund is handled on an ad-hoc basis. For ease of description of the present invention, and without intending to limit the scope of application of the present invention, FIG. 1A is presented to illustrate the various types of participants and associated computer systems involved an exemplary type of sweep system which can be used with the present invention.

FIG. 1 is a block diagram of participating entities in a system for transferring, allocating and tracking client funds, including deposits to and withdrawals from, aggregated accounts, according to an exemplary embodiment of the present invention. The system 1 includes a number of source institutions Source 1, Source 2 . . . Source M, in embodiments, each managing one or more programs Program1-1, 1-2, . . . 1-Q, 2-1, 2-2, . . . 2-Q, . . . M-1, M-2 . . . M-Q, such as insured deposit products, for example. M reflects the number of source institutions participating in the system, which can be 1 or more than 1. Q reflects the respective number of programs each respective source institution participates. By way of illustration, Program 1-1 reflects a first program that Source 1 participates in. Program 1-2 reflects a second program that Source 1 participates in. Program m-n reflects the nth program that Source m participates in. Each Program m-n may include one or more insured deposit products, each having different attributes, such as insurance level, different tier options and rates paid and services. In one embodiment, the rates paid may be determined by such factors as the balance in the client's insured account, or can be determined by the total value of the client's brokerage account, or determined by the total value of a group of accounts for a particular household together, or determined by relationship pricing based on the number of products a client uses though a financial entity or sister entities, to name a few. Those skilled in the art will understand that while it is preferred to have a structured program, in embodiments, an administrator may not have a formal "program" and may handle one or more clients' funds on an ad-hoc basis.

Each respective source institution Source 1, 2 . . . M may have a plurality (N) of clients $C_{1-1}$, $C_{1-2}$, $C_{1-3}$ . . . $C_{1-N}$, (for Source 1), and $C_{2-1}$, $C_{2-2}$, $C_{2-3}$ . . . $C_{2-N}$, (for Source 2), and $C_{M-1}$, $C_{M-2}$, $C_{M-3}$ . . . $C_{M-N}$, (for Source M) (generally represented as $C_{m-n}$, where m is the source institution and n the client number in that institution), that invest in particular products that make up part of a particular program. The clients $C_{m-n}$ may be categories into one of a plurality of client types, e.g., individuals, married, corporations, partnerships, municipalities, retirement or pension accounts, to name a few. In embodiments, a client type can include a reciprocal deposit client type. In embodiments, clients $C_{m-n}$ may be further categorized by region, e.g., country, state, county, municipality, to name a few, in which the client resides or is domiciled or otherwise associated. In embodiments, each $C_{m-n}$ of a respective source institution may be client of only that source institution, or may be a client of one or more source institutions. In embodiments, as discussed below, the allocation process may either consider or elect not to consider whether a client is also participating in more than one program from the same or a different source institution, without limiting the applicability of embodiments of the present invention.

Thus, for example, a Source 1 may manage a number of programs designated in FIG. 1 as PROGRAM 1-1, PROGRAM 1-2, . . . PROGRAM 1-Q, where each client $C_{1-n}$, of the Source 1 invests in at least one of the products under at least one of the programs PROGRAM 1-1, PROGRAM 1-2, . . . PROGRAM 1-Q. Examples of different kinds of programs that may be offered, include a program with cash management services, a program for government accounts with a higher minimum balance required, a program paying a lower rate and offering more services, a no frills program with a higher rate and no services, however for a fee the client could get other services, to name a few.

The system 1 also includes a number of destination institutions $DI_1$-$DI_p$, into which funds are deposited, where P is the total number of deposit institutions participating in the system. For ease of reference $DI_p$ refers to the pth deposit institution in the system. In embodiments, destination institutions $DI_p$ may be, for example, banks or credit unions, or other types of deposit institutions, to name a few. In embodiments, at least some of deposit institutions $DI_p$ are banks that have FDIC insurance. In embodiments, at least some of the deposit institutions $DI_p$ may be savings and loan institutions with FSLIC insurance. However, not all deposit institutions need be FDIC insured. For example, certain PROGRAMS can also default to a money fund, or other uninsured deposit account, if the client's account balance is over the FDIC insurance limit for that PROGRAM. In embodiments, at least some of deposit institutions $DI_p$ are insured. While the basic federal insurance amount for the FDIC is currently $250,000 for individuals, more than $250,000 of coverage may be obtained if funds are maintained in different ownership categories, according to the FDIC. In embodiments, one or more aggregated deposit accounts may be federally insured by one or more of the following: the FDIC, a letter of credit from a Federal Home Loan Bank, the Securities investor Protection Corporation; the Federal Savings and Loan Insurance Corporation and/or the National Credit Union Administration (NCUA), to name a few.

The FDIC provides separate insurance coverage for funds depositors may have in different categories of legal ownership. The FDIC refers to these different categories as "ownership categories." This means that a bank customer who has multiple accounts may qualify for more than, e.g., $250,000 (or any updated limit) in insurance coverage if the customer's funds are deposited in different ownership categories and the requirements for each ownership category are met.

In embodiments, examples of different ownership categories (e.g., client types) may include, e.g., (i) single accounts; (ii) retirement accounts; (iii) joint accounts; (iv) revocable trust accounts (v) irrevocable trust accounts; (vi) employee benefit plan accounts; (vii) corporation accounts; (viii) partnership accounts; (ix) unincorporated accounts; (x) government accounts; (xi) municipalities; (xii) villages; (xiii) countries; and/or (xiv) pension accounts, to name a few.

For example, in embodiments, a single account is a deposit owned by one person. Generally, under current FDIC guidelines, a single account ownership category includes:

An account held in one person's name only, provided the owner has not designated any beneficiary(ies) who are entitled to receive the funds when the account owner dies;

An account established for one person by an agent, nominee, guardian, custodian, or conservator, including Uniform Transfers to Minors Act accounts, escrow accounts and brokered deposit accounts;

An account held in the name of a business that is a sole proprietorship (for example, a "Doing Business As" or DBA account);

An account established for or representing a deceased person's funds—commonly known as a decedent's estate account;

A grantor's retained interest in an irrevocable trust;

An account that fails to qualify for separate coverage under another ownership category.

These examples are not intended to be limiting, but merely to reflect current examples of a single account as recognized by the FDIC at the time of filing. To the extent these definitions may vary over the course of time, the appropriate definitions as applied by the FDIC or its equivalent at the time may be used consistent with the present invention. In embodiments, if an account title identifies only one owner, but another person has the right to withdraw funds from the account (e.g., as Power of Attorney or custodian), the FDIC will insure the account as a single ownership account. In embodiments, assuming all recordkeeping requires for a revocable trust has been met, if the owner or a single account has designated one or more beneficiaries who receive the deposit when the account owner dies, the account would be insured as a revocable trust account. In embodiments, the FDIC adds together all single accounts owned by the same person at the same bank and insures only up to the current limit, which at the time of the invention is $250,000, but may change over the course of time, as it has in the past.

In embodiments, certain retirement accounts may be considered as separate ownership category for purposes of the present invention and/or qualifying for additional FDIC Insurance. For example, individual retirement accounts (IRAs), such as a traditional IRA, Roth IRA, Simplified Employee Pension (SEP) IRA or Savings incentive Match Plan for Employees (SIMPLE) IRA, to name a few may qualify as a separate ownership category. Other examples may include self-directed defined contribution plan accounts, such as self-directed 401(k) plan, self-directed SIMPLE IRA held in the form of a 401(k) plan, and self-directed defined contribution profit-sharing plan, to name a few. Still other examples may include self-directed Keogh plan account (or H.R. 10 plan account) designated for a self-employed individual and Section 457 deferred compensation plan account, such as an eligible deferred compensation plan provided by state and local governments regardless of whether the plan is self-directed. In embodiments, all of these types of retirement accounts owned by the same person are considered to be subject to the same insurance limit (currently $250,000 at time of filing) when held at the same destination institution for purposes of the present invention. One skilled in the art would appreciate that to the extent FDIC rules governing these categories change over time such changes could be incorporated into the present invention without changing the scope or spirit of the invention.

In embodiments, joint accounts may also be considered separate ownership categories for purposes of the present invention and/or FDIC insurance. A join account is a deposit account owned by two or more individuals, such as accounts owned by, e.g., join tenants with rights o survivorship, tenants by the entirety and tenants in common, to name a few. In embodiments, to qualify as a joint account, all co-owners must be living individuals (and not legal entities, such as corporations, trusts, estates, or partnerships), and have equal rights to withdrawal deposits. In embodiments, for certain types of accounts, all co-owners must personally sign (such as in ink or electronically) or the bank has other information establishing co-ownership of the account. In embodiments, this signature requirement does not apply to CDs or accounts established by an agent, nominee, guardian, custodian, executor or conservator, to name a few. In embodiments, when the above requirements are met for these types of joint accounts, each co-owner's share of every joint-account that he or she owns at the same insured bank ae added together and the total insurance is up to a limit (e.g., currently $250,000). Typically, in embodiments, unless otherwise specified, all of the co-owners' shares are deemed equal.

In embodiments, the balance of a joint account can exceed the limit (e.g., currently $250,000) and still be fully insured (e.g., via a letter of credit from a Federal Home Loan Bank or by the NCUA). For example, if the same two co-owners jointly own both a $350,000 CD and a $150,000 savings account at the same insured bank, the two accounts would be added together and insured up to $500,000, providing up to $250,000 in insurance coverage for each co-owner. This example assumes that the two co-owners have no other joint accounts at the bank. In embodiments, there is no kinship requirement for joint account coverage. Any two or more people that co-own funds can qualify for insurance coverage in the joint account ownership category provided the requirements listed above are met. In embodiments, limits may not be modified by rearranging the owners' names or Social Security numbers or changing the styling of their names. Similarly, in embodiments, the use of "or," "and" or "and/or" to separate the names of co-owners in a joint account title also does not affect limits. One skilled in the art would appreciate that to the extent FDIC rules governing these categories change over time such changes could be incorporated into the present invention without changing the scope or spirit of the invention.

In embodiments, revocable trust accounts may be considered separate ownership categories for purposes of the present invention and/or FDIC insurance. In embodiments, a revocable trust account is a deposit account owned by one or more individuals that identifies one or more beneficiaries who will receive the deposits upon the death of the owner(s). A revocable trust can be revoked, terminated or changed at any time, at the discretion of the owner(s). In this section, the term "owner" means the grantor, settlor, or trustor of the revocable trust. In embodiments, for purposes of the present invention the designation of trustees, co-trustees and successor trustees is not relevant. This ownership category can include both informal and formal revocable trusts to name a few. One skilled in the art would appreciate that to the extent FDIC rules governing these categories change over time such changes could be incorporated into the present invention without changing the scope or spirit of the invention.

In embodiments, irrevocable trust accounts are a separate ownership category for purposes of the present invention and/or FDIC insurance. In embodiments, irrevocable trust accounts are deposit accounts held in connection with a trust established by statute or a written trust agreement in which the owner (also referred to as a grantor, settlor or trustor) contributes deposits or other property to the trust and gives up all power to cancel or change the trust. An irrevocable trust also may come into existence upon the death of an owner of a revocable trust.

In embodiments, employee benefit plan accounts, are a separate ownership category for purposes of the present invention and/or FDIC insurance. In embodiments, an employee benefit plan account is a deposit of a pension plan, defined benefit plan or other employee benefit plan that is not self-directed, to name a few. In embodiments, an account under this category must meet the definition of an employee benefit plan in section 3(3) of the Employee Retirement Income Security Act (ERISA) of 1974, with the exception of plans that qualify under the Certain Retirement Account ownership category. In embodiments, accounts in this category may be required to meet the following additional requirements:

The investment and management decisions relating to the account must be controlled by a plan administrator (not self-directed by the participant);

The plan administrator must maintain documentation supporting the plan and the beneficial interest of the participants; and The account must be properly titled as an employee benefit account with the bank In embodiments, pass through coverage may be provided for accounts in this category. To determine the maximum amount a plan can have on deposit in a single bank and remain fully insured, the plan administrator must first identify the participant who has the largest share of the plan assets and calculate the participant's share as a percentage of overall plan assets. Then, the plan administrator must divide $250,000 by that percentage to arrive at the maximum fully insured amount that a plan can have on deposit at one bank. One skilled in the art would appreciate that to the extent FDIC rules governing these categories change over time such changes could be incorporated into the present invention without changing the scope or spirit of the invention.

In embodiments, corporation/partnership/unincorporated association accounts are a separate ownership category for purposes of the present invention and/or FDIC insurance. In embodiments, deposits owned by corporations, partnerships, and unincorporated associations, including for-profit and not-for-profit organizations, are insured under the same ownership category. Such deposits are insured separately from the personal deposits of the organization's owners, stockholders, partners or members. In embodiments, unincorporated associations may be treated under this category include churches and other religious organizations, community and civic organizations and social clubs, to name a few. In embodiments, a separate category may be set up for unincorporated associations. In embodiments, to qualify under this ownership category, a corporation, partnership or unincorporated association must be engaged in an "independent activity," meaning that the entity is operated primarily for some purpose other than to increase deposit insurance coverage. One skilled in the art would appreciate that to the extent FDIC rules governing these categories change over time such changes could be incorporated into the present invention without changing the scope or spirit of the invention.

In embodiments, government accounts are a separate ownership category for purposes of the present invention and/or FDIC insurance. In embodiments, government accounts (also called Public Unit accounts) includes deposit accounts owned by, the United States, including federal agencies, any state, county, municipality (or a political subdivision of any state, county or municipality), the District of Columbia, Puerto Rico and other government possessions and territories; and/or Native American tribes. In embodiments, insurance coverage of a government account is unique in that the insurance coverage extends to the official custodian of the deposits belonging to the government or public unit, rather than to the government unit itself. For purposes of the present invention, the inventors recognized that keeping track of location source information for at least certain government entities when held together with other government entities having a common location source offer surprising advantages not contemplated by prior art systems. One skilled in the art would appreciate that to the extent FDIC rules governing these categories change over time such changes could be incorporated into the present invention without changing the scope or spirit of the invention.

One skilled in the art would appreciate over time that these and other categories of client types may be used and/or change depending upon changes in state, government and other laws and regulations over time without deviating from the scope or spirit of the present invention.

Similarly, one skilled in the art would appreciate over time that the insurance limits by category of client type may also change depending upon changes in state, government and other laws and regulations over time without deviating from the scope and spirt of the present invention.

Turning back to FIG. 1, the use of more than one destination institution provides further advantages. By way of illustration, in embodiments, by depositing funds at more than one FDIC insured deposit institution, multiples of available coverage (e.g., $250,000 per individual) protected by federal insurance. For example, if deposits are made to 10 FDIC insured deposit institutions, with no more than $250,000 for each ownership category deposited in each of said 10 FDIC deposit institutions, then $2.5 million of effective federal insurance can be obtained for each ownership category.

Continuing with FIG. 1, the use of aggregated deposit accounts has been found to be useful in systems that would benefit from transferring, allocating, and/or tracking ownership interests based on client type (e.g., sweep systems). As discussed in greater detail with respect to the process(es) described in connection with FIG. 9 through FIG. 15C below, the present invention improves upon prior art systems by using aggregated deposit accounts in each deposit institution based not only on source institution, but also upon client types, such as ownership category and/or geographic origination. Thus, to the extent that clients form different ownership categories participate in a given program, e.g., single accounts, certain retirement accounts, joint accounts, revocable trust accounts, irrevocable trust accounts, employee benefit plan accounts, corporation/partnership/ unincorporated association accounts, and government accounts to name a few, the present invention creates and/or utilizes sub-accounts within each aggregated account at each deposit institution and/or separate aggregated accounts at each deposit institution for each type of ownership category with client funds being held by such deposit institution. In embodiments, additional segregation of aggregated accounts may include segregation based on geographic origin of clients of the same client type (e.g., New York municipalities, New Jersey municipalities, to name a few). In embodiments, client type information may be tracked in aggregate within an aggregated account, as discussed later.

As discussed, the use of accounts aggregated based on client type, depository institution information and/or account information associated with said client type (e.g., maximums, minimums, preferences to particular client types, collateral, balances, geographic location, and/or a combination thereof, to name a few), target information associated with depository institutions and/or accounts held therein (e.g., maximums, minimums, client types, collateral, balance, and/or combination thereof, to name a few), preference information associated with depository institutions, accounts, and/or clients associated with the client funds (e.g., whitelists, blacklists, maximums, minimums, balances, collateral, client types, and/or a combination thereof, to name a few), geographic origin, and/or source institution (and/or a combination thereof), across one or more aggregated accounts held and/or not held in the same depository institution provides technological advantages that reduces computational time and power spent by depository institutions and enables more efficient and better processing and investment returns for each segregated aggregated account. For example, the above account aggregation increases both efficiency and returns while reducing computational time and power spent by Depository Institutions with regards to complying with requirements such as government regulations and client rules. For exemplary purposes for explanation, government regulations may control the minimum balance required for funds associated with municipal accounts. The lack of clarity and certainty (which leads to conservative action and causes increased computational time and power) that results from an unorganized allocation of funds is avoided by allocating funds associated with municipal accounts. As another example, the above account aggregation increases both efficiency and returns while reducing computational time and power spent by Depository Institutions with regards to maximizing insurance coverage. The time, effort, and money lost due to an unorganized allocation is avoided by allocating funds based on client type and information associated with insurances (e.g., maximum balances). As another example, allocation by client type enables one or more Depository Institutions to avoid unnecessary costs. For example, the DAS 120 may allocate funds based on client type and the balances of the accounts associated with the clients. DAS 120, using the balances of the client accounts, may allocate funds such that larger amounts associated with respective clients are held either in the same account and/or same depository institution, where feasible. Keeping large amounts of client funds allocated by client type and balance avoids unnecessary transaction fees associated with allocating funds from a single client having a large amount of funds.

Once allocated, the clients associated with the program may still access its respective account(s) held at one or more source institution(s) and/or transfer funds (i.e. make a transaction) to and/or from its respective account(s) held at the one or more source institution(s). The transactions made by one or more clients associated with the program are accounted for (e.g., by the DAS 120). To account for those transactions, funds associated with accounts associated with the transactions are allocated.

This allocation may be repeated on one or more intervals that are one or more of: regular, semi-regular, irregular, and/or a combination thereof. For example, the DAS 120 may obtain transaction data for each pay period of New York City (exemplary client of DAS 120)— e.g., a client of the program with funds held in one or more aggregated accounts makes a large withdrawal.

As discussed in more detail below, the allocation of funds (e.g., to account for transactions in transaction data for a period of time) may be broken up into portions (e.g., a first portion associated with one or more client types associated with a large portion of client funds and a second portion associated with the remaining client types) and/or may be done in totality for each client type (and/or a combination thereof).

This allocation may be repeated on one or more intervals that are one or more of: regular, semi-regular, irregular, and/or a combination thereof. For example, the DAS 120 may obtain transaction data for each pay period of New York City (exemplary client of DAS 120)—e.g., a client of the program with funds held in one or more aggregated accounts makes a large withdrawal.

As discussed in more detail below, the allocation of funds may be based on one or more of the following: depository institution information and/or account information associated with said client type (e.g., maximums, minimums, preferences to particular client types, collateral, balances, geographic location, and/or a combination thereof, to name a few), target information associated with depository institutions and/or accounts held therein (e.g., maximums, minimums, client types, collateral, balance, and/or combination thereof, to name a few), preference information associated with depository institutions, accounts, and/or clients associated with the client funds (e.g., whitelists, blacklists, maximums, minimums, balances, collateral, client types, and/or a combination thereof, to name a few), and/or a combination thereof, to name a few.

Furthermore, as discussed, the use of segregated aggregated accounts based on client type, geographic origin, and source institution (e.g., aggregated accounts that are segregated from other aggregated accounts held on behalf of the same source institution in the same depository institution) provides technological advantages that reduces computational time and power spent by depository institutions and enables more efficient and better processing and investment returns for each segregated aggregated account.

In one embodiment, an administrator 4, acting as agent for one or more source institutions participating in a program or the system provides services associated with transferring, allocating and tracking client funds, including deposits to and withdrawals from, aggregated accounts, according to an exemplary embodiment of the present invention. While FIG. 1 illustrates administrator 4 as a separate entity from the source m, and destination institutions p, one skilled in the art would appreciate that one or more of these administrative functions may be performed by one or more source institutions, one or more administrators, and/or one or more destination institutions, or some combination thereof. For each of reference, and without limiting the scope or spirit of the invention, administrator 4 will be referenced for purposes of illustrating exemplary embodiments of the present invention. In embodiments, aggregated accounts may take the form of an aggregate money market deposit account (MMDA) and an aggregate demand deposit account (DDA), both being in the identical name of e.g., a source institution (e.g., a self-clearing broker dealer), or its agent (e.g., administrator 4 or another bankruptcy remote entity to name a few), by and/or on behalf of the clients $C_{m-n}$. When pairs of MMDA and DDA accounts are used, it is referred to herein as an "MMDA-DDA pair". In accordance with embodiments of the present invention, each MMDA-DDA pair shall only hold clients of a common client type, and a separate MMDA-DDA pair shall be established in each destination institution for each type of common client types. By way of example for illustration purposes only, if Source 1 has a program 1-1, in which Clients 1-N include client types that are single accounts, employee benefit plan accounts, corporation/partnership/unincorporated association accounts, then separate MMDA-DDA pairs shall be established at each destination institution in which client funds are held. Thus, Destination Institution 1, would have DI 1 Acct P1-1 CT1 for client funds from, e.g., single account client types, whose funds come from Source 1 and participate in program 1. Where MMDA-DDA pairs are being used, DI 1 Acct P1-D1 CT1 would include both an MMDA and DDA. In embodiments, where the client type is limited to individuals, the segregated aggregated deposit account may be a NOW account. In some embodiments, depending upon the allocation operation implemented, instead of an MMDA-DDA pair, an MMDA may be used by itself.

Further, in this example, Destination Institution 1 would have D.I. 1 Acct P1-1 CT2 for client funds from a second client type, e.g., employee benefit plans, whose funds come from Source 1 and also participate in program 1. Where MMDA-DDA pairs are being used, DI 1 Acct P1-D1 CT2 would include both an MMDA and DDA. In some embodiments, depending upon the allocation operation implemented, instead of an MMDA-DDA pair, an MMDA may be used by itself.

Further, continuing with the same example, Destination Institution 1 would have DI 1 Acct P1-1 CT3 for client funds from a third client type, e.g., corporation/partnership/unincorporated association client types, whose funds come from Source 1 and also participate in program 1. Where MMDA-DDA pairs are being used, DI 1 Acct P1-D1 CT2 would include both an MMDA and DDA. In some embodiments, depending upon the allocation operation implemented, instead of an MMDA-DDA pair, an MMDA may be used by itself.

Likewise, in embodiments where multiple destination institutions each destination institution participating in the same program from the same source institution will have a separate segregated aggregated account for each client type to the extent such depository institutions hold funds for such client type. In embodiments, all participating depository institutions may hold funds of all client types and thus have the same collection of segregated aggregated accounts at each depository institutions. In embodiments, one or more participating depository institution may not hold funds of all client types, in which a segregated aggregated account for the omitted client type would not be necessary and/or funded.

Turning back to FIG. 1, in embodiments where MMDA-DDA pairs are used, in response to client deposit and withdrawal transactions at a respective source institution Source m, Source M or its agent administrator 4 initiates transfers of funds between the MMDA-DDA pairs associated with a designated client type, so that if the aggregate deposits of all clients of that client type whose funds held in the aggregated account for that source institution or PROGRAM for that client type exceed the aggregate client withdrawals (net client credit), then all or some of the funds may be deposited directly in the MMDA at the deposit institution or, in an alternative embodiment, by way of the DDA in the MMDA-DDA pair. Conversely, if client withdrawals for all clients of a common client type for that source institution or Program exceed client deposits (net client debit) for clients of that common client type, then the deposit institution may be instructed by messenger or otherwise to transfer funds from the aggregate MMDA to the DDA.

In embodiments, client deposit and withdrawal transactions (e.g., transaction data associated with a respective program) may be obtained by the DAS 120 from one or more of the following: one or more sweep files associated with at least one source; one or more electronic messages; a file transfer protocol (FTP); an individual transaction being uploaded to the system (e.g., by a broker-dealer); a website; a mobile application; and/or a combination thereof, to name a few.

As noted, the MMDAs are interest-bearing, insured deposit accounts, collectively in which client funds of the common client type are deposited. The DDAs, which are deposit accounts permitting an unlimited number of deposits and withdrawals, serve to facilitate the exchange of funds between the MMDAs, the deposit institutions, and sources of client transactions (referred to herein as "transaction sources"). If the source m or administrator 4 determines that it is necessary to move funds from a particular MMDA (at a particular deposit institution), in MMDA-DDA pair embodiments, it may first causes a messenger or otherwise to have these funds transferred from the MMDA to the DDA member of the MMDA-DDA pair, and second causes the funds in the DDA to be moved to the source's or its agent's own account or accounts. Then, from these accounts, funds may be further transferred to a third party, such as a transaction source or a customer financial entity (preferably by electronic or other automatic means). If funds are to be moved into a particular MMDA, the agent either may have them deposited into the associated DDA and then moved into the MMDA or may have them deposited directly into the MMDA. The agent database is updated to reflect these funds transfers.

In embodiments, an intermediate bank 3 may be used as an intermediary between the source institutions and the destination institutions. In embodiments, one or more intermediate banks 3 may be used. Each intermediary bank 3 participating in the program or system will have at least one control operating account 3A, which is also an aggregated deposit account. In embodiments, a single intermediate bank 3 with a single control operating account 3A may be used for funds from all source institutions and all client account types. In embodiments, multiple control operating accounts 3A may be used, including separate control operating accounts 3A for each client account type. In embodiments, there may not be an intermediate bank 3 participating, and all transfers will go directly between respective source institutions and respective destination institutions, typically pursuant to instructions provided by the administrator 4.

FIG. 1 illustrates a system where one or more source institutions participate. Examples of such systems may include source institutions which are broker dealers. In embodiments, other structures can be created depending upon the type of source institution, such as when banks are the Source Institutions. In such embodiments, as described in U.S. Pat. Nos. 7,536,350, 8,560,442, 8,290,661 and 8,401,962 (the contents of which are incorporated by reference as if fully set forth herein) a source institution with respect to its own clients, may be a destination institution for clients of another bank, and vis-versa. In such systems, banks may agree to provide reciprocal deposits and the allocation system implemented by the administrator 4 would need to account for reciprocity as part of the allocation process. Consistent with the present invention, each destination institution would have segregated aggregated accounts (either in the form of, e.g., MMDA, MMDA-DDA pair, NOW Accounts, to name a few) for each client type and/or geographic source.

In practice, when large number of customers $C_{m-n}$ are involved in programs (e.g., sweep programs), sophisticated computer systems are necessary to implement the type of sweep programs illustrated and discussed with respect to FIG. 1. FIG. 1A shows a schematic block diagram representing various computer systems associated with source institutions, their respective clients, a deposit administrator, and depository institutions.

Still referring to FIG. 1A, the computer systems 100-1, 100-2 and 100-M (e.g., desktop systems, laptop systems, servers, server farms, cloud computing systems, networks of computer systems, to name a few) associated with various source institutions Source 1, Source 2 and Source M are shown as systems 100-1, 100-2 . . . 100-M, where M represents the total number of source institutions participating in a program or the system. System 100-*m* represents the system associated with the mth Source institution (Source m). In embodiments, there may be one or more source institutions participating. It is understood that when only one source institution is participating M=1, and only Source Institution 100-1 is applicable.

In practice, referring to FIG. 1B, each source institution (Source m) will have one or more client accounts (104-*n*) associated with each client (Cm-n) of the source institution, as well as a control operating account 102-*n*, which is used to facilitate batch transfers of one or more clients' funds into the sweep system. System 100-*m* associated with the Source m maintains one or more databases associated with transaction and balance information for each of these accounts.

Referring to FIG. 1A, each respective client $C_{m-n}$ will have one or more associated computer systems 110, 110-2 . . . 110-N' (e.g., laptops, desktops, mobile phones, tablets, to name a few) as represented by the client blocks 110-1, 110-2, . . . 110-N', where N' is the total number of clients participating in the program or system. System 110-*n* represents the system associated with the nth client participating in the system. In embodiments, each client $C_{m-n}$ is associated with at least one source institution Source m, to name a few. In embodiments, a plurality of client accounts 104 may be associated with a single client 110.

Still referring to FIG. 1A, each depository institution 1, 2 . . . P is associated with computer systems 130-1, 130-2 . . . 130-P, respectively, where P is the total number of deposit institution participating in the program or the system. For example, in a program where ten (10) program banks are participating, P=10. System 100-*p* refers to the computer system associated with the pth depository institution participating in the system or program.

In practice, referring to FIG. 1C, as discussed, each depository institution (depository institution p) will have a plurality of segregated aggregated accounts (DI 1 Act P1-1 CT1, DI1 Act P1-1-CT2, . . . DI 1 Act 1-1CTR, etc.) associated with each program (e.g., Program 1-1), or each source institution (e.g., Source 1) and each client type (CT1, CT2, . . . CTR), where DI p Act Pm-q-DIp-CTr represents the segregated aggregated account held at destination institution p, for Program m-q of source institution m for client type r. System 130-*p* associated with the destination institution p maintains one or more databases associated with transaction and balance information for each of these segregated aggregated accounts.

Figure 1D:
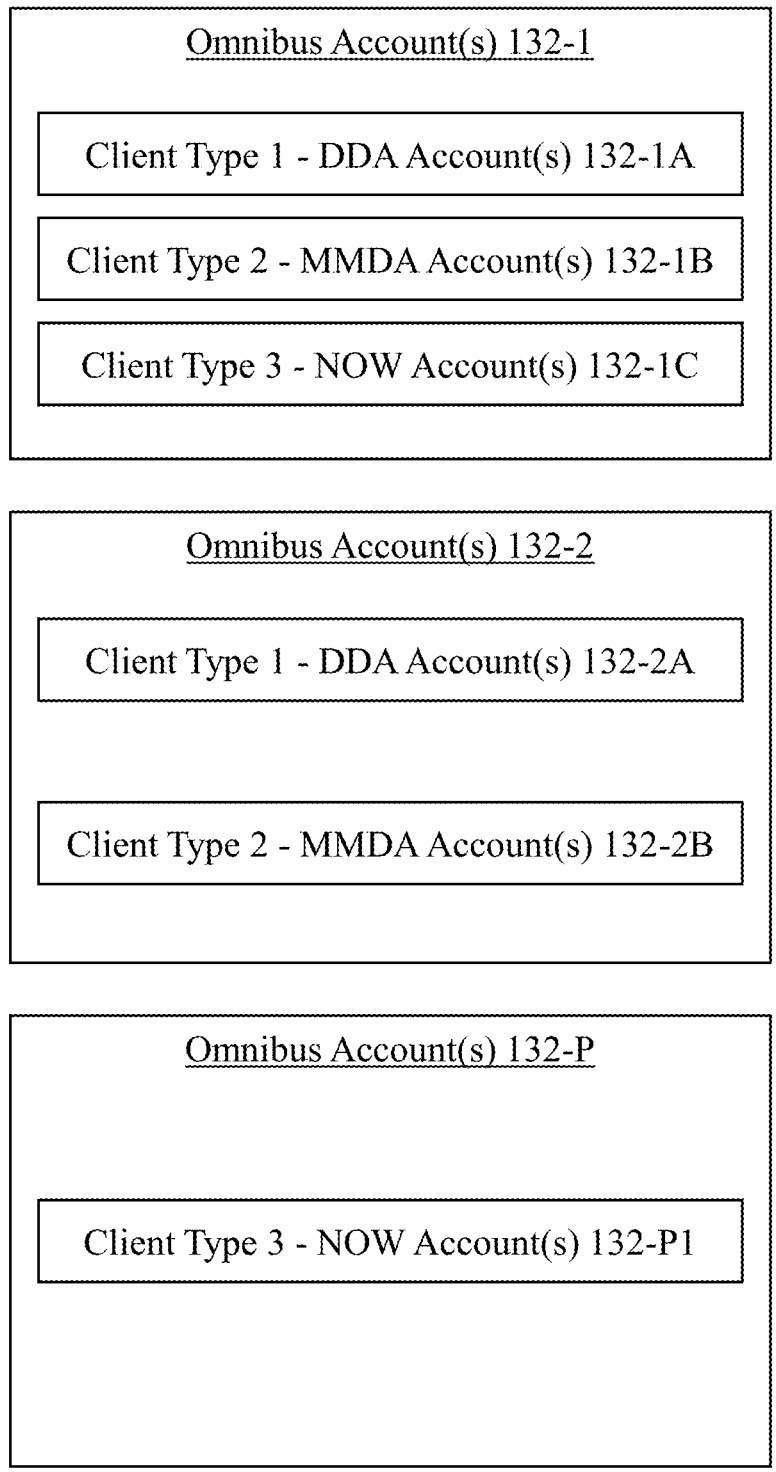
FIG. 1D shows illustrative examples of different types of segregated aggregated account structures that can be used in destination institutions in accordance with embodiments of the present invention.

FIG. 1D shows illustrative examples of different types of segregated aggregated account structures that can be used in destination institutions in accordance with embodiments of the present invention. In embodiments, a destination institution may be a broker-dealer or brokerage institution, or a depository institution, such as a bank or other institution providing interest-bearing accounts (insured or not insured) or other investment accounts (e.g., money fund, exchange traded fund, etc.). Other destination institutions can include, by way of example, institutions holding, managing, and/or providing cash management vehicles and/or cash management accounts, such as DDAs, MMDAs, NOW accounts, CDs, stable value funds, money funds, and/or credit interest programs, to name a few. In embodiments, the destination institutions may include non-FDIC insured investment vehicles, such as money market mutual funds, other kinds of mutual funds, exchange traded funds (ETF), exchange traded notes (ETN), stable value funds, index funds, treasury bonds, stocks, bonds, notes, to name a few. As described herein, a sweep transaction allocates and transfers funds from source institutions to one or more destination institutions. As described more fully below in connection with FIG. 9 through FIG. 15C, the technological solution to the technical problem of tracking a sweep transaction enables one or more entities to allocate and transfer funds while tracking ownership interests and/or segregating the swept funds by type of ownership interest.

As illustrated in connection with FIG. 1D, destination institutions can include one or more destinations—e.g., bank accounts or institutions—providing time deposit instruments, negotiable order of withdrawal (NOW) accounts (e.g., Client Type 3—Now Account(s) 132-1C, Client Type 3—Now Account(s) 132-P1, to name a few), money market deposit accounts (MMDAs) (e.g., Client Type 2—MMDA Account(s) 132-1B, Client Type 2—MMDA Account(s) 132-2B, to name a few), aggregated MMDAs, demand deposit accounts (DDAs) (e.g., Client Type 1—DDA Account(s) 132-1A, Client Type 1—DDA Account(s) 132-2A, to name a few), aggregated DDAs, and/or certificates of deposit (CDs), to name a few.

Still referring to FIG. 1A, the computer system associated with the administrator 4 is represented by deposit administrator system (DAS) 120 (e.g., laptop, desktops, servers, server farms, cloud computing system, to name a few). DAS 120 is programmed and configured to perform various operations necessary and/or desirable to transfer, allocate and/or track client funds between one or more source institutions and/or one or more destination institutions participating in the program and/or the system. In embodiments where a control operating account 3A at an intermediate bank 3, the DAS 120 may also communicate with intermediate bank system 125 associated with intermediate bank 3 to facilitate transfer of client funds from control operating accounts 100-*m* at the Source m and respective aggregated deposit accounts at destination institutions p. In embodiments, the DAS 120 may be a deposit sweep computer system. The DAS 120 may be configured to access source and/or destination account information, e.g., using user credentials. In embodiments, the DAS 120 in embodiments, may include one or more processor(s), memory, communications circuitry, and/or a display, to name a few. In embodiments, the DAS 120 may correspond to one or more of, and/or a combination thereof, the following suitable type of electronic device including, but are not limited to, desktop computers, mobile computers (e.g., laptops, ultrabooks), mobile phones, portable computing devices, such as smart phones, tablets and phablets, televisions, set top boxes, smart televisions, personal display devices, large scale display devices (e.g., billboards, street signs, etc.), personal digital assistants ("PDAs"), gaming consoles and/or devices, virtual reality devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), smart security systems, and/or smart accessories (e.g., light bulbs, light switches, electrical switches, etc.), to name a few. In some embodiments, the DAS 120 may be relatively simple or basic in structure such that no, or a minimal number of, mechanical input option(s) (e.g., keyboard, mouse, track pad) or touch input(s) (e.g., touch screen, buttons) are included. For example, the DAS 120 may be able to receive and output audio, and may include power, processing capabilities, storage/memory capabilities, and communication capabilities. However, in other embodiments, the DAS 120 may include one or more components for receiving mechanical inputs or touch inputs, such as a touch screen and/or one or more buttons. The DAS 120 may, in embodiments, be a voice activated electronic device. A voice activated electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device may be one or more of the following: Amazon Echo®; Amazon Echo Show®; Amazon Echo Dot®; Smart Television (e.g., Samsung® Smart TVs); Google Home®; Voice Controlled Thermostats (e.g., Nest®; Honeywell® Wi-Fi Smart Thermostat with Voice Control), smart vehicles, smart transportation devices, wearable devices (e.g., Fitbit®), and/or smart accessories, to name a few.

The processor(s) of the DAS 120, in embodiments, may include any suitable processing circuitry capable of controlling operations and functionality of the DAS 120, as well as facilitating communications between various components within the DAS 120. In some embodiments, the processor(s) may include a central processing unit ("CPU"), a graphic processing unit ("GPU"), one or more microprocessors, a digital signal processor, or any other type of processor, or any combination thereof. In some embodiments, the functionality of the processor(s) may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processing unit 1803 may include its own local memory, which may store program systems, program data, and/or one or more operating systems. However, the processor(s) may run an operating system ("OS") for the DAS 120, and/or one or more firmware applications, media applications, and/or applications resident thereon. In some embodiments, the processing unit 1803 may run a local client script for reading and rendering content received from one or more websites. For example, the processor(s) may run a local JavaScript client for rendering HTML or XHTML content received from a particular URL accessed by the DAS 120.

The memory of the DAS 120 may be internal storage 1808A, and/or external storage operably connected to the DAS 120, which may include one or more types of storage mediums such as any volatile or non-volatile memory, or any removable or non-removable memory implemented in any suitable manner to store data for the DAS 120. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the memory may be implemented as computer-readable storage media ("CRSM"), which may be any available physical media accessible by the processor(s) to execute one or more instructions stored within the memory. In some embodiments, one or more applications (e.g., mobile application software, gaming, music, video, calendars, lists, banking, social media etc.) may be run by the processor(s), and may be stored in the memory.

The display of the DAS 120 may correspond to a display device and/or touch screen, which may be any size and/or shape and may be located at any portion of the DAS 120. Moreover, the display of the DAS 120 may be operationally connected to the DAS 120 (e.g., connected via one or more cables and/or wires, wireless connection, etc., to name a few). Various types of display devices may include, but are not limited to, liquid crystal displays ("LCD"), LED, OLED, QLED, monochrome displays, color graphics adapter ("CGA") displays, enhanced graphics adapter ("EGA") displays, video graphics array ("VGA") display, or any other type of display, or any variation or combination thereof. Still further, a touch screen may, in some embodiments, correspond to a display device including capacitive sensing panels capable of recognizing touch inputs thereon. For instance, the display of the DAS 120 may correspond to a projected capacitive touch ("PCT"), screen include one or more row traces and/or driving line traces, as well as one or more column traces and/or sensing lines. In some embodiments, the display of the DAS 120 may be an optional component for the computer 1802. For instance, the DAS 120 may not include the display of the DAS 120. Such devices, sometimes referred to as "headless" devices, may output audio, or may be in communication with a display device for outputting viewable content.

The display of the DAS 120, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of the display of the DAS 120, a capacitance between the object and the conductive material may be formed. The processor(s) of the DAS 120 may be capable of determining a location of the touch screen associated with where the capacitance change is detected, and may register a touch input as occurring at that location.

In some embodiments, the display of the DAS 120 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. One or more additional layers, or spaces between layers, may be included. Furthermore, any suitable number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on the display of the DAS 120 corresponding to where a conductive object contacted the display of the DAS 120.

A change in capacitance may be measured to determine a location on the touch screen where the object has contacted the surface. For example, if an individual touches a point on the display of the DAS 120, then a corresponding driving line and sensing line that intersect at that point may be identified. A location of the point may have one or more pixels associated with that location, and therefore one or more actions may be registered for an item or items that are displayed at that location. The processor(s) of the DAS 120 may be configured to determine which pixels are associated with a particular location point, and which item or items are also displayed at that pixel location. Furthermore, the DAS 120 may be configured to cause one or more additional actions to occur to the item or items being displayed on the display of the DAS 120 based on a temporal duration the touch input, and or if one or more additional touch inputs are detected. For example, an object (e.g., a user's hand, a stylus, etc., to name a few) that is contacted on the display of the DAS 120 at a first location may be determined, at a later point in time, to contact the display of the DAS 120 at a second location. In the illustrative example, the object may have initially contacted the display of the DAS 120 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen monitor having 100 driving lines and 100 sensing lines may have 100 intersection points, and therefore 100 individual capacitors, while a touch screen monitor having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by the DAS 120, and therefore the fewer driving lines and/or sensing lines used, the smaller the amount of power that is needed to operate the touch screen display.

In some embodiments, the display of the DAS 120 may correspond to a high-definition ("HD") display. For example, the display of the DAS 120 may display images and/or videos of 720p, 1080p, 1080i, or any other image resolution. In these exemplary scenarios, the display of the DAS 120 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080-pixel image having 2,073,600 pixels. However, the aforementioned display ratios and pixel numbers are merely exemplary, and any suitable display resolution or pixel number may be employed for the display of the DAS 120, such as non-HD displays, 4K displays, and/or ultra-displays.

In embodiments, each source system (source system 100-1 . . . 100-*m*), the intermediate bank system 125, and each destination institution system (destination institution system 130-1 . . . 130-P) may include hardware and/or software similar to the hardware and software described above in connection with DAS 120, the description of which applying herein.

Source institutions, e.g., various broker dealers which may originate buy and sell orders, are represented by the blocks 100-1, 100-2, . . . 100-M. Each of the source institutions is shown with a control operating account 102, which, in embodiments, may be an optional account. Each of the source institutions 100 is also shown with multiple different client accounts 104, e.g., for the client suffices 1, 2, . . . N. Source institutions may be banks, credit unions, other types of Deposit institutions, registered investment advisors, broker dealers, asset managers, trust companies, retirement programs, other financial institutions or intermediaries, to name a few. Typically, the source institutions are the institutions that interact with the clients that are placing or authorizing the respective clients' funds to go into and be managed by the system. Note that a source institution can be a clearing institution for one or more other source institutions or an intermediary for other source institutions. Source institutions can hold source accounts relating to securities and/or bonds, including trading thereof.

Destination institutions, e.g., deposit institutions, are represented by the blocks 130-1, 130-2, . . . 130-P. Deposit institutions can be any institution that is authorized to accept deposits and issue certificates of deposit. This would include state and national banks, state and federal savings banks, savings and loan associations, credit unions, and probably some industrial loan companies, depending on current law. Most but not necessarily all, would have government backed-insurance, such as Federal Deposit Insurance Corporation (FDIC) insurance, insurance for credit unions, or state insurance. As illustrated in connection with FIG. 1D, deposit institutions can include banks holding bank accounts or institutions providing time deposit instruments, negotiable order of withdrawal (NOW) accounts (e.g., Client Type 3—Now Account(s) 132-1C, Client Type 3—Now Account(s) 132-P1, to name a few), money market deposit accounts (MMDAs) (e.g., Client Type 2—MMDA Account(s) 132-1B, Client Type 2—MMDA Account(s)

132-2B, to name a few), aggregated MMDAs, demand deposit accounts (DDAs) (e.g., Client Type 1—DDA Account(s) 132-1A, Client Type 1—DDA Account(s) 132-2A, to name a few), aggregated DDAs, and/or certificates of deposit (CDs), to name a few. Each of the Deposit institutions is shown with one or more omnibus account(s) 132 (e.g., omnibus account(s) 132-1, omnibus account(s) 132-2 . . . omnibus account(s) 132-P, to name a few) holding the funds of multiple clients, and an aggregated money market deposit account 134 holding the funds of multiple clients. In embodiments, referring to FIG. 1D, omnibus account(s) 132 may organize deposits by client type. For example, omnibus account(s) 132-1 may include one or more of the following: Client Type 1 DDA Accounts 132-1A, Client Type 2 MMDA Accounts 132-1B, Client Type 3 NOW Accounts 132-1C . . . Client Type N Accounts 132-1N, to name a few. Each client type (e.g., Client Type 1, Client Type 2, Client Type 3 . . . Client Type N) may represent one or more of the following client types: single accounts, certain retirement accounts, joint accounts, revocable trust accounts, irrevocable trust accounts, employee benefit plan accounts, municipalities, corporations, non-profits, individuals, partnerships, retirement accounts, and/or pension accounts, to name a few. Similarly, for example, omnibus account(s) 132-2 may including one or more of the following: Client Type 1 DDA Accounts 132-2A, Client Type 2 MMDA Accounts 132-2B . . . Client Type N Accounts 132-2N, to name a few. In embodiments, omnibus account(s) 132-3 may include Client Type 3 Accounts 132-P1.

However, in embodiments, there may be a separate DDA and MMDA for each of multiple clients. In embodiments, a source institution may also be a depository institution and vice versa. Deposit institutions may hold omnibus accounts and/or individual customer accounts. In embodiments, the source and deposit functions may be maintained in separate institutions. The entities shown may be associated with one or more computer systems and/or user electronic devices, as described herein with respect to FIG. 1C.

Depending on the particular deposit sweep transaction being executed, a source institution or a destination institution may be trading institution, such as a broker-dealer or brokerage institution, or a depository institution, such as a bank or other institution providing interest-bearing accounts (insured or not insured) or other investment accounts (e.g., money fund, exchange traded fund, etc.). Other destination institutions can include, by way of example, institutions holding, managing, and/or providing cash management vehicles and/or cash management accounts, such as DDAs, MMDAs, NOW accounts, CDs, stable value funds, credit interest programs, to name a few. Thus, a sweep transaction may involve an allocation, transfer, and tracking of funds from a source institution to a destination institution or vice versa from the destination institution to the source institution. In embodiments, a sweep transaction may involve an allocation, transfer, or other flow of funds from a first destination institution to a second destination institution.

While certain systems, methods, and program products described herein refer to embodiments involving deposit sweep transactions, it will be understood by one of skill in the art that such systems, methods, and program products may apply to other sweep transactions, such as cash sweep transactions, which may include money fund sweeps, stable value fund sweeps, capital investment plan (CIP) sweeps, or sweeps from or to any of the institutions holding cash management vehicles and/or cash management accounts as described herein, and the present invention extends to such embodiments.

FIG. 1B is a schematic block diagram illustrating one or more source systems in accordance with various embodiments of the present invention. As mentioned above, each source institution (Source m) will have one or more client accounts (104-$n$) associated with each client (Cm-n) of the source institution, as well as a control operating account 102-$n$, which his used to facilitate batch transfers of client's funds into the sweep system. System 100-$m$ associated with the Source m maintains one or more databases associated with transaction and balance information for each of these accounts. A source institution may be a trading institution, such as a broker-dealer or brokerage institution, or a depository institution, such as a bank or other institution providing interest-bearing accounts (insured or not insured) or other investment accounts (e.g., money fund, exchange traded fund, etc.).

FIG. 1A is a schematic block diagram representing the computer systems and/or user electronic devices for the source institutions, clients, intermediate bank system, and the Deposit Administrator System connecting via one or more electronic communications networks 50. An electronic communications network 50 may be a data network, such as the Internet, a wide area network, and/or a local area network, to name a few. The computer systems for the source institutions are represented by the blocks 106. The computer systems for the users are represented by the blocks—source 1 system 100-1, source 2 system 100-2 . . . source M system 100-$m$. The computer systems for the destination institutions are represented by the blocks—destination institution 1 system 130-1, destination institution 2 system 130-2 . . . destination institution P system 130-P. The various computer systems may comprise one or more computers or user electronic devices described above in connection with the description of DAS 120, the description of which applying herein. The computers and user electronic devices may comprise one or more processors, non-transitory computer-readable memory, communications portals, input devices (e.g., keyboard, mouse, touch screen, microphone, camera, scanner, to name a few) and output devices (e.g., display devices, speakers, to name a few). Communications portals can comprise hardware and/or software for transmitting, receiving, retrieving, and/or otherwise obtaining data, such as data packets or streams, according to one or more protocols, using wired and/or wireless communications. In embodiments, communications portals can include one or more communications chipsets, such as a GSM chipset, CDMA chipset, LTE chipset, Wi-Fi chipset, Bluetooth chipset, to name a few, and/or combinations thereof. Wired connections may be adapted for use with cable, telephone, fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports. Wireless connections may include cellular or cellular data connections adapted for use with one or more cellular communications protocols (e.g., digital cellular, PCS, CDPD, GPRS, EDGE, CDMA2000, 1xRTT, Ev-DO, HSPA, UMTS, 3G, 4G, 5G, and/or LTE, to name a few), and/or may include other wireless connections for use with wireless protocols such as Bluetooth, Bluetooth Low Energy, Wi-Fi, radio, satellite, and/or infrared connections, to name a few. Hardware for such communications portals can further include Ethernet interfaces (e.g., supporting a TCP/IP stack), X.25 interfaces, T1 interfaces, and/or antennas, to name a few.

In embodiments, each respective client $C_{m-n}$ will have one or more associated computer systems 110, 110-2 ... 110-N' (e.g., laptops, desktops, mobile phones, tablets, to name a few) as represented by the client blocks 110-1, 110-2, ... 110-N', where N' is the total number of clients participating in the program or system. System 110-n represents the system associated with the nth client participating in the system. In embodiments, each client $C_{m-n}$ is associated with at least one source institution Source m, to name a few. In embodiments, a plurality of client accounts 104 may be associated with a single client 110.

FIG. 1C is a schematic block diagram representing destination institutions with one or more segregated, aggregated accounts. The destination institutions are represented by blocks 130-1, 130-2 ... 130-P where P is the total number of destination institutions participating in the program or system. The one or more omnibus accounts of the one or more destination institutions are represented by blocks 132-1, 132-2 ... 132-P where P is the total number of destination institutions participating in the program or system. Each block represents one or more omnibus accounts. For example, omnibus account 132-1 may include 1 account, 10 accounts, 100 accounts, 1,000 accounts, and/or 1,000,000 accounts, to name a few.

In embodiments, the system described above in connection with FIG. 1 and FIG. 1A through FIG. 1D may be operable to perform the process illustrated by the flow charts in connection with FIG. 14A through FIG. 14B and FIG. 15A through FIG. 15B. In embodiments, the deposit administrator system 120 may perform the process(es) described in connection with FIG. 14A through FIG. 14B and FIG. 15A through FIG. 15B. Referring to FIG. 14A, in embodiments, a process for tracking ownership interests and/or allocating client funds by ownership interest is illustrated. The process, in embodiments, may begin with step S1402. At step S1202, in embodiments, DAS 120 accesses one or more electronic databases, each of which can be stored memory operably connected to DAS 120. The one or more databases accessed by DAS 120 may store and/or have access to one or more of the following: depository institution information for one or more depository institutions (e.g., destination institution 1, 2, and/or 3 of FIG. 1); aggregated deposit account information for one or more aggregated deposit accounts holding funds of one or more client accounts associated with one or more clients, and/or transaction information for each aggregated deposit account of the one or more aggregated deposit accounts, to name a few. In embodiments, the DAS 120 may connect to one or more electronic databases over a wired or wireless local area network, a wide area network, over the Internet, and/or via a cloud computing provider, to name a few. The one or more databases may be located in the same computing facility, or, alternatively, can be located in multiple facilities. The databases can also be located at any one of a plurality of deposit institutions (e.g., banks) or source institutions (e.g., broker dealers). In embodiments, the one or more databases may be similar to the memory of the DAS 120 described above in connection with FIG. 1A through FIG. 1C, the description of which applying herein.

In embodiments, the depository institution information may be information associated with one or more depository institutions participating in the program. In embodiments, the depository institution information may further include information associated with one or more depository institutions not participating in the program. The depository information for each depository institution, in embodiments, may include one or more of the following: institution balance of funds information; institution target deposit information; client type target information; client type balance information; and/or total deposit target amount, to name a few. In embodiments, the institution balance of funds information may indicate an amount of funds held by a respective depository institution. The institution balance of funds information, in embodiments, may indicate the amount of funds associated with the program held by a respective depository institution. The balance of funds held, by each depository institution, in embodiments may be associated with one or more funding sources, which, in embodiments, may be indicated by the institution balance of funds information.

In embodiments, the aggregated deposit account information may be information associated with one or more aggregated accounts held in the one or more participating depository institutions. In embodiments, each of the one or more aggregated accounts may be associated with the program. In embodiments, one or more of the aggregated accounts may not be participating in the program. Each of the one or more aggregated accounts, in embodiments, may be holding funds owned by a plurality of clients associated with a plurality of client accounts. In embodiments, the one or more aggregated accounts may, for example, be demand deposit accounts (DDAs), money market deposit accounts (MMDAs), MMDA-DDA pairs, negotiable order of withdrawal (NOW) accounts, and/or certificate of deposit (CD) accounts, to name a few. In embodiments, the one or more aggregated accounts may be: interest bearing accounts, non-collateralized accounts backed by insurance, collateralized accounts, and/or a combination thereof, to name a few. The insurance, in embodiments, may be provided privately and/or through the government—for example—by the Federal Deposit Insurance Corporation, the Federal Savings and Loan Insurance Corporation, and/or the Securities Investor Protection Corporation, to name a few. In embodiments, the first plurality of deposit accounts may be similar to the omnibus account(s) 132 described above in connection with FIG. 1, and FIG. 1A through FIG. 1D, the description of which applying herein.

In embodiments, for each of the one or more aggregated deposit accounts, the aggregated deposit account information may include one or more of the following: aggregated deposit account balance of funds; aggregated deposit account target balance; client account information; and/or total client type deposit information, to name a few. The aggregated deposit account balance of funds, for each of the one or more aggregated deposit accounts, may include a respective balance of funds for a respective aggregated deposit account.

The aggregated account balance of funds, for each of the one or more aggregated deposit accounts, in embodiments, may indicate the amount of funds held in a respective aggregated deposit account. In embodiments, the aggregated account balance of funds may indicate the amount of funds associated with the program and held in the respective aggregated deposit account.

The aggregated account target balance, for each of the one or more aggregated deposit accounts, in embodiments, may indicate a desired balance of funds for the respective aggregated deposit account. In embodiments, for each aggregated deposit account, the aggregated target balance information may include one or more of the following: a respective minimum target amount of funds for the respective aggregated deposit account; a respective maximum target amount of funds for the respective aggregated deposit account; a target amount funds for the respective aggregated deposit account; a respective collateral maximum; a respective non-collateral maximum; a respective collateral minimum; a respective non-collateral minimum; and/or a combination thereof, to name a few.

The client account information, for each of the one or more aggregated accounts, in embodiments, may include one or more of the following: a client balance of funds for each client; a balance of funds for each client account; client type information for each client; client transaction information; and/or a combination thereof, to name a few. In embodiments, each aggregated deposit account includes funds from one or more client accounts, each associated with one or more clients. The client account information, in embodiments, includes information associated with each of the one or more client accounts and corresponding associated one or more clients. For example, the client balance of funds information may be the balance of funds for each client having an ownership interest of funds held in the aggregated deposit account. As another example, the balance of funds of each client account information may be the balance of funds for each client account associated with funds held in the aggregated deposit account.

The client type information, in embodiments for each client having an ownership interest of funds held in the aggregated deposit account, may indicate the type of client associated with the respective client. In embodiments, client types can include one or more of the following: municipalities, villages, countries, corporations, non-profits, individuals, partnerships, retirement accounts, and/or pension accounts, to name a few.

In embodiments, the client transaction information, for each of the one more aggregated deposit accounts, may include information associated with each transaction involving the respective client account and/or the respective client. The client transaction information, in embodiments, may be stored in chronological order and, may include time stamps, transaction numbers, indices, to name a few.

The total client type deposit information for each aggregated deposit account, in embodiments, may include one or more of the following: a respective minimum target amount for one or more client types (e.g., indicating a respective minimum deposit amount for each of the one or more client types); a respective maximum target amount for one or more client types (e.g., indicating a respective maximum deposit amount for each of the one or more client types); a target amount for one or more client types (e.g., indicating a respective amount the respective depository institution would like to hold for each of the one or more client types); respective client type percentage for one or more client types (e.g., indicating a respective target percentage for each of the respective deposit target amounts for the respective client type); a respective collateral maximum (e.g., indicating a maximum amount of collateralized funds available for deposit); a respective collateral minimum (e.g., indicating a maximum amount of collateralized funds available for deposit); a non-collateralized maximum (e.g., indicating a maximum amount of non-collateralized funds available for deposit); a non-collateralized minimum (e.g., indicating a minimum amount of non-collateralized funds available for deposit); and/or a combination thereof, to name a few. In embodiments, the one or more databases accessed by DAS 120 may also store and/or have access to client account information for each respective client account. The client account information for each respective client account, in embodiments, can include one or more of the following: (i) a respective balance of funds; (ii) client type information; (iii) client identification information (e.g., name, address, contact information, occupation, age, gender, to name a few); client preferences; and/or (iv) transaction history associated with the respective client account, to name a few.

In embodiments, the one or more databases accessed by DAS 120 may also store and/or have access to transaction information for each aggregated deposit account of the one or more aggregated deposit accounts. The transaction information, in embodiments, may include, for each aggregated deposit account, one or more of the following: transactions as a result of past allocations; transactions associated with client accounts associated with the respective aggregated deposit account; and/or transactions associated with the depository institution holding the respective aggregated deposit account, to name a few. In embodiments, each transaction stored in the transaction information may include information indicating one or more of the following: (i) balance information; (ii) credit information; (iii) debit information; and/or (iv) information indicating each source institution associated with the respective transaction, to name a few.

The process illustrated in connection with FIG. 14A through FIG. 14B and FIG. 15A through FIG. 15C, in embodiments, may continue with step S1404. In embodiments, at step S1404, the DAS 120 may obtain transaction data related to transactions associated with the one or more client accounts associated with the one or more aggregated deposit accounts participating in the program. In embodiments, the transaction data may be data over a first time period (e.g., one or more minutes, hours, days, weeks, months, years, and/or a combination thereof, to name a few). The first time period, in embodiments, may refer to the amount of time that has elapsed since DAS 120 allocated funds associated with the program. In embodiments, the transaction information may include one or more of the following: (i) balance information for each of the one or more client accounts (e.g., the balance of the account before the transaction, the balance of the account after the transaction, and/or a combination thereof, to name a few); (ii) credit information applied to each of the one or more client accounts during the first time period; (iii) debit information applied against each of the one or more client accounts over the first time period; and/or (iv) information indicating each source institution associated with each transaction included in the transaction information, to name a few. The DAS 120, in embodiments, may obtain the transaction data from one or more of the following: one or more sweep files associated with at least one source institution; one or more electronic messages; via a file transfer protocol; one or more individual transactions being uploaded to the DAS 120; via a mobile application; via a website; and/or a combination thereof, to name a few.

The process illustrated in connection with FIG. 14A through FIG. 14B and FIG. 15A through FIG. 15C, in embodiments, may continue with step S1406. In embodiments, at step S1406, the DAS 120 determines, a first net amount of funds associated with the transaction data. In embodiments, each transaction associated with the transaction data results in the amount of funds associated with a respective client account decreasing (e.g., through a withdrawal) or the amount of funds associated with the respective client account increasing (e.g., through interest, a deposit, etc.). To determine the first net amount of funds associated with the transaction data, in embodiments, the DAS 120 may subtract the amounts associated with withdrawals over the first time period from the total balance of funds associated with the program and add the amounts associated with deposits over the first time period to the total balance of funds.

The process illustrated in connection with FIG. 14A through FIG. 14B and FIG. 15A through FIG. 15C in embodiments, may continue with step S1408. In embodiments, at step S1408, the DAS 120 determines, for each client account of the one or more client accounts, an updated balance of funds associated with a respective client account. For example, at the beginning of the first time period ("T1"), a first client account may have a balance of $1,000,000. During the first time period, continuing the example, the first client account may have 5 transactions, which for exemplary purposes, are as follows: (1) Withdrawal of $250,000; (2) Deposit of $500,000; (3) Deposit of $250,000; (4) Withdrawal of $500,000; and (5) Deposit of $250,000. In this example, to calculate the updated balance (balance at "T2") of the first client account, the DAS 120 may use the following equation:

Balance at $T2$=(Balance at $T1$)+($Net$ of Transactions Over First Time Period)

To find the net of the transactions, DAS 120 may subtract the transaction amounts associated with withdrawals from the transaction amounts associated with deposits. Continuing the example, the DAS 120 may determine that the net of the transactions is $250,000 (500,000+250,000+250,000–500,000–250,000). In embodiments, after determining the net of the transactions, the DAS 120 may determine the updated balance for the first client account as $1,250,000 (1,000,000+250,000).

The process illustrated in connection with FIG. 14A through FIG. 14B and FIG. 15A through FIG. 15C, in embodiments, may continue with step S1410. In embodiments, at step S1410, the DAS 120 determines, for each client type of the one or more client types, an updated total client type deposit information. Each client type associated with the program (e.g., client types associated with client accounts participating in the program) has a corresponding balance of funds. For example, client 1 and client 2 are municipalities and client three is a pension fund. Continuing the example, the balance of funds corresponding to client 1 is $10,000,000; the balance of funds corresponding to client 2 is $20,000,000; and the balance of funds of client 3 is $1,000,000. In this example, assuming no other municipality or pension fund clients, the total client type deposit information for the municipality client type is $30,000,000 and the total client type deposit information for pension funds is $1,000,000. The updated balance of funds, in embodiments, adjusts one or more of the balances associated with the client types based on the transaction information and the net transaction information. For example, if client 1 deposited $5,000,000, client 2 withdrew 10,000,000, and client 3 did not make a transaction, the updated balance of funds for the municipality client type, in this example, would be $25,000,000 (30,000,000+5,000,000–10,000,000), and the updated balance of funds for the pension fund client type, in this example, would be $1,000,000 (1,000,000+0–0).

The process illustrated in connection with FIG. 14A through FIG. 14B and FIG. 15A through FIG. 15C, in embodiments, may continue with step 1412. In embodiments, at step S1412, the DAS 120 may allocate funds associated with the first net amount of funds among the one or more client accounts. A more detailed description of the allocation process of step S1412 may be located in the description of FIG. 15A through FIG. 15C. Referring to FIG. 15A, the process of allocation may, in embodiments, begin with step S1502. At step S1502, in embodiments, the DAS 120 may determine, for each aggregated deposit account of the one or more aggregated deposit accounts, an updated aggregated account balance. To determine an updated aggregated account balance for each aggregated deposit account, in embodiments, at step S1502-A, the DAS may identify one or more aggregated deposit accounts to transfer at least a portion of the first net amount of funds, either via a deposit and/or a withdrawal, and, for each of the one or more aggregated deposit accounts, a respective transfer amount. In embodiments, the DAS 120 may identify the one or more aggregated deposit accounts and/or transaction amounts based on one or more of the following: an institution balance of funds associated with each depository institution of the one or more depository institutions; institution deposit target information for each of the one or more depository institutions; the first net amount of funds; number of withdraws of funds information associated with each aggregated deposit account; pre-designated information; a predetermined order; affiliation information of each aggregated deposit account; transaction fee information for each aggregated deposit account; interest information for each aggregated deposit account; and/or a combination thereof, to name a few.

The institution balance, in embodiments, may refer to the balance of each depository institution associated with the one or more aggregated deposit accounts. The institution balance information, in embodiments may indicate whether a depository institution has room for a transfer with an aggregated deposit account associated with the depository institution. If the aforementioned depository institution does not have the room for a transfer (e.g., withdrawal and/or deposit), DAS 120 may filter out all aggregated deposit accounts associated with the depository institution. Alternatively, if the aforementioned depository institution does not have the room for a transfer (e.g., withdrawal and/or deposit), DAS 120 allocate funds held in the aggregated deposit accounts associated with the depository institution to make room for allocation of the first net amount of funds. If, in embodiments, the aforementioned depository institution does have the room for a transfer (e.g., withdrawal and/or deposit), DAS 120 may select one or more of the aggregated deposit accounts associated with the depository institution for allocation.

The institution deposit target information, for each depository institution, in embodiments may refer to one or more of the following: a respective minimum target amount of funds for the respective depository institution (e.g., indicating a respective minimum amount of funds for the respective depository institution); a respective maximum target amount of funds for the respective depository institution; a target amount funds for the respective depository institution (e.g., indicating a respective maximum amount of funds for the respective depository institution); a respective collateral maximum (indicating a respective maximum for collateralized funds for the respective depository institution); a respective non-collateral maximum (indicating a respective maximum for non-collateralized funds for the respective depository institution); a respective collateral minimum (indicating a respective minimum for collateralized funds for the respective depository institution); a respective non-collateral minimum (indicating a respective minimum for non-collateralized funds for the respective depository institution); and/or a combination thereof, to name a few. In embodiments, non-collateralized accounts may be backed by insurance and collateralized accounts may be backed by collateral. The insurance, in embodiments, may be provided privately and/or through the government—for example—by the Federal Deposit Insurance Corporation, the Federal Savings and Loan Insurance Corporation, and/or the Securities Investor Protection Corporation, to name a few.

The first net amount of funds, in embodiments refers to the previously determined first net amount of funds.

The number of withdrawals information in embodiments, for each aggregated deposit account, refers to one or more of the following: a predetermined maximum amount of withdrawals for the respective aggregated deposit account over a period of time; a predetermined minimum amount of withdrawals for the respective aggregated deposit account over a period of time; a predetermined maximum amount of withdrawals for a depository institution associated with the respective aggregated deposit account over a period of time; a predetermined minimum amount of withdrawals for the depository institution associated with the respective aggregated deposit account over a period of time; and/or a combination thereof, to name a few. The period of time, in embodiments, may refer to one or more of the following: a day, a week, a month, a year, a quarter, and/or a combination thereof, to name a few.

Predesignated information for each aggregated deposit account, in embodiments, may refer to aggregated deposit accounts designated only for deposits, aggregated deposit accounts designated for only withdrawals, aggregated deposit accounts designated for one or more client types, and/or a combination thereof, to name a few.

The predetermined order, in embodiments, may refer to one or more of the following: an order of aggregated deposit accounts to be identified by the DAS 120; an order of depository institutions participating in the program holding the one or more aggregated deposit accounts to be identified; an order of aggregated deposit accounts to be identified by the DAS 120 for deposits for withdrawal; an order of depository institutions participating in the program holding the one or more aggregated deposit accounts to be identified for deposits; an order of aggregated deposit accounts to be identified by the DAS 120; an order of depository institutions participating in the program holding the one or more aggregated deposit accounts to be identified for withdrawal; a rotation of depository institutions for deposits; a rotation of aggregated deposit accounts for deposits; a rotation of depository institutions for withdrawals; a rotation of aggregated accounts for withdrawals; and/or a combination thereof to name a few.

The affiliation information, for each aggregated deposit account, in embodiments may refer to whether each of the one or more aggregated deposit accounts are participating in the program. In embodiments, the DAS 120 may identify one or more aggregated deposit accounts with affiliated information indicating participation in the program. In embodiments, the DAS 120 may identify one or more aggregated deposit accounts with affiliated information indicating non-participation. In embodiments, non-participating aggregated deposit accounts may be identified if allocation of the first net amount of funds between aggregated deposit accounts participating in the program is not feasible.

The transaction fee information, for each aggregated deposit account, in embodiments may refer to whether a transaction fee is associated with a transfer involving a respective aggregated deposit account. For example, Account 1 may have a transaction fee associated with each withdrawal for Account 1. As another example, Account 2 may have a fee that is incurred if a minimum amount of transactions are not completed with Account 2. In embodiments, DAS 120 may, where feasible, identify aggregated deposit accounts without transaction fees (or need a transaction to avoid a fee), before identifying aggregated deposit accounts with transaction fees. In embodiments, DAS 120 may, where feasible, identify aggregated deposit accounts with transaction fees, before identifying aggregated deposit accounts without transaction fees.

The interest information, for each aggregated deposit account, in embodiments may refer to a respective interest percentage associated with a respective aggregated deposit account. The interest percentage, in embodiments, may refer to the amount of interest that is gained by an aggregated deposit account over time. In embodiments, the DAS 120 may attempt to maximize the amount of funds being held in aggregated deposit accounts with a high interest percentage and/or minimize the amount of funds being held in aggregated deposit accounts with a low interest percentage. For example, DAS 120 may increase deposits and/or limit withdrawals from aggregated deposit accounts with a high interest percentage. As another example, DAS 120 may decrease deposits and/or increase withdrawals from aggregated deposit accounts with a low interest percentage. As another example, the DAS 120 may only deposit in aggregated deposit accounts with a high interest percentage until a predetermined limit is reached (e.g., an insurance limit, a collateral limit, etc.).

Continuing the process of determining an updated aggregated account balance for each aggregated deposit account, at step S1502-B, the DAS may, for each depository institution, calculate a respective updated institution balance amount. In embodiments, the updated balance amount of each respective institution may be calculated by summing the respective transfer amounts associated with one or more aggregated deposit accounts held by the respective depository institution. In embodiments, if a transfer amount is zero, no transfer occurred or will occur for the aggregated deposit account. In embodiments, if a transfer amount is a positive number, a deposit has or will occur for the aggregated deposit account. In embodiments, if a transfer amount is a negative number, a withdrawal has or will occur for the aggregated deposit account.

To account for the first net amount of funds, in embodiments, the DAS 120 may verify each respective transfer amount by confirming that the sum of each respective transfer amount is equal to the first net amount of funds. In embodiments, the DAS 120 may verify, for each of the one or more aggregated deposit accounts, compliance with respective institution target deposit information.

The allocation process, in embodiments, may continue at step S1503. Depending on the system, the DAS 120 may allocate funds associated with one or more client types before allocating the remainder of funds. For example, because municipalities have large amounts of funds, DAS 120 may allocate municipality funds first, to ensure sufficient room is available for the larger amount of funds. In embodiments, DAS 120 may allocate the first net amount of funds for all client types. If, for example, funds associated with a municipal client type are allocated first, the allocation process may continue with FIG. 15B. If not, the process may continue with FIG. 15C.

Referring to FIG. 15B, the process for allocating the first net amount of funds may continue with step S1504. At step S1504, in embodiments, the DAS 120 may allocate client funds associated with funds held in the identified one or more aggregated deposit accounts. In embodiments, as with the process illustrated in FIG. 15B, the DAS 120 may allocate funds in a two-step process. First, in embodiments, the DAS 120 may allocate funds for a first client type of the one or more client types associated with the funds to be allocated (e.g., step S1504-A). In embodiments, the DAS may next allocate funds for the remaining client types of the one or more client types associated with the funds to be allocated (e.g., S1504-B).

In embodiments, at step S1504-A, the DAS 120 may allocate a first portion of the client funds to be allocated among the one or more aggregated deposit accounts participating in the program. The first portion of funds, in embodiments, may be a portion of funds associated with one or more client types. For example, and as illustrated in FIG. 15B, the first portion of funds may be associated with municipal clients (i.e. clients of a municipal client type). In embodiments, the first portion of client funds may be allocated to one or more aggregated deposit accounts based on one or more of the following (associated with each of the one or more aggregate deposit accounts participating in the program): the respective updated total client type deposit information associated with municipal clients; the respective client type target information associated with municipal clients; the respective updated institution balance amount for each respective depository institution; client preference information; a respective maximum balance; a minimum respective balance; a respective client balance of funds; an even distribution; and/or a combination thereof, to name a few.

The respective updated total client type deposit information, in embodiments, may be the updated total client type deposit information determined in step S1410. In embodiments, the sum of each respective updated total client type deposit information for each of the one or more aggregated deposit accounts is equal to the respective updated total client type deposit information. To verify the updated total client type deposit information, in embodiments, the DAS 120 may determine whether the sum of each updated total client type deposit information is equal to the updated total client type deposit information. If equal, the DAS 120 may determine the updated total client type deposit information is valid. If not equal, in embodiments, the DAS 120 may stop the allocation proceeding and/or notify an administrator of the DAS 120.

The respective client type target information associated with municipal clients may, in embodiments, include one or more of the following: a respective minimum target amount for municipal client types (e.g., indicating a respective minimum deposit amount for municipal client types); a respective maximum target amount for municipal client types (e.g., indicating a respective maximum deposit amount for municipal client types); a target amount for municipal client types (e.g., indicating a respective amount preferable to hold for municipal client types); respective client type percentage for municipal client types (e.g., indicating a respective target percentage of the respective deposit target amount for the municipal client types); a respective collateral maximum (e.g., indicating a maximum amount of collateralized funds available for deposit); a respective collateral minimum (e.g., indicating a maximum amount of collateralized funds available for deposit); a non-collateralized maximum (e.g., indicating a maximum amount of non-collateralized funds available for deposit); a non-collateralized minimum (e.g., indicating a minimum amount of non-collateralized funds available for deposit); and/or a combination thereof, to name a few. In embodiments, non-collateralized accounts may be backed by insurance and collateralized accounts may be backed by collateral. The insurance, in embodiments, may be provided privately and/or through the government—for example—by the Federal Deposit Insurance Corporation, the Federal Savings and Loan Insurance Corporation, and/or the Securities Investor Protection Corporation, to name a few. In embodiments, the DAS 120 may allocate the first portion of funds such that each of the one or more aggregated deposit accounts and/or each depository institution may comply with each respective client type target information.

The respective updated institution balance amount for each respective depository, in embodiments, are the respective updated institution balance amount calculated by the DAS 120 in S1502-B.

The client preference information may refer to client preferences that may affect the allocation of funds. As mentioned above, in embodiments, the client account information for each client in the program may include client preference information. The client preference information, in embodiments, may include one or more of the following: a whitelist (e.g., a list of depository institutions and/or aggregated accounts of which the respective client will only deposit funds into) and/or a blacklist (e.g., a list of depository institutions and/or aggregated accounts of which the client will not deposit funds), to name a few.

A respective maximum balance, in embodiments, may indicate one or more of the following: a maximum balance for each respective aggregated deposit account; a respective maximum balance for the respective depository institution associated with the respective aggregated deposit account; a respective maximum balance for each client with an ownership interest in funds held in the respective aggregated deposit account; a respective maximum balance for each client with an ownership interest in funds held in the respective depository institution; and/or a combination thereof, to name a few.

A respective minimum balance, in embodiments, may indicate one or more of the following: a minimum balance for each respective aggregated deposit account; a respective minimum balance for the respective depository institution associated with the respective aggregated deposit account; a respective minimum balance for each client with an ownership interest in funds held in the respective aggregated deposit account; a minimum maximum balance for each client with an ownership interest in funds held in the respective depository institution; and/or a combination thereof, to name a few. In embodiments, the maximum amount may be associated with a collateral and/or insurance (e.g., the amount of collateral and/or insurance coverage, less than the amount of collateral and/or insurance coverage, to name a few). The insurance, in embodiments, may be provided privately and/or through the government—for example—by the Federal Deposit Insurance Corporation, the Federal Savings and Loan Insurance Corporation, and/or the Securities Investor Protection Corporation, to name a few.

The respective client balance of funds, in embodiments, may indicate the amount of funds associated with each client associated with each client account associated with the one or more aggregated deposit accounts participating in the program. The respective client balance of funds, in embodiments, may enable the DAS 120 to allocate funds of clients associated with larger portions of the first net amount of funds to ensure there is room for all clients associated with the first portion of funds.

The even distribution, in embodiments, may refer to the DAS 120 allocating the first portion of funds evenly across one or more aggregated deposit accounts within a set of two or more aggregated deposit accounts participating in the program and/or each aggregated deposit account participating in the program. For example, DAS 120 may allocate a percentage of client assets across a group of depository institutions, as descried in U.S. Pat. No. 10,552,910, the contents of which are incorporated herein by reference as if fully set forth herein. In embodiments, the DAS 120 ensures compliance with predetermined limits (e.g., FDIC limits) and/or applicable aggregated deposit account information.

In embodiments, the first portion of funds may be allocated by the DAS 120 such that the respective updated total client type deposit information for each aggregated deposit account is less than the updated respective institution balance amount for each depository institution.

In embodiments, at step S1504-B, the DAS 120 may allocate a second portion of the client funds to be allocated among the one or more aggregated deposit accounts participating in the program. The second portion of funds portion of funds, in embodiments, may be a portion of funds associated with one or more client types. For example, the DAS 120 may allocate a portion of funds for each client type of the one or more client types (e.g., third portion, third client type . . . N portion, N client type). As another example, and as illustrated in FIG. 15B, the second portion may be associated with each of the remaining client types associated with the first net amount of funds. (i.e. all of the client types associated with the first net amount of funds that are not the municipal client type). In embodiments, the sum of the first portion and the second portion is the first net amount of funds. In embodiments, the DAS 120 allocates the first net amount of funds in portions if a predetermined threshold is exceeded by one client type. For example, if one client has a percentage of the first net amount of funds greater than 30%, the DAS 120 may allocate the first net amount of funds associated with the one client before allocating funds associated with the remaining clients. As another example, if no clients have a percentage of the first net amount of funds greater than 30%, the DAS 120 may allocate the funds based on client type (e.g., similar to the process described in connection with FIG. 15C, the description of which applying herein).

In embodiments, the DAS 120 may allocate the second portion of funds based on one or more of the following (associated with each of the one or more aggregate deposit accounts participating in the program): the respective updated total client type deposit information; the respective client type target information; the respective updated institution balance amount for each respective depository institution; client preference information; a respective maximum balance; a minimum respective balance; a respective client balance of funds; an even distribution; and/or a combination thereof, to name a few.

In embodiments, the respective updated total client type deposit information for each aggregated deposit account, may include one or more of the following: a respective minimum target amount for one or more client types (e.g., indicating a respective minimum deposit amount for each of the one or more client types); a respective maximum target amount for one or more client types (e.g., indicating a respective maximum deposit amount for each of the one or more client types); a target amount for one or more client types (e.g., indicating a respective amount the respective depository institution would like to hold for each of the one or more client types); respective client type percentage for one or more client types (e.g., indicating a respective target percentage for each of the respective deposit target amount for the respective client type); a respective collateral maximum (e.g., indicating a maximum amount of collateralized funds available for deposit); a respective collateral minimum (e.g., indicating a maximum amount of collateralized funds available for deposit); a non-collateralized maximum (e.g., indicating a maximum amount of non-collateralized funds available for deposit); a non-collateralized minimum (e.g., indicating a minimum amount of non-collateralized funds available for deposit); and/or a combination thereof, to name a few. In embodiments, the one or more databases accessed by DAS 120 may also store and/or have access to client account information for each respective client account.

In embodiments, the respective client type target information may include one or more of the following: a respective minimum target amount for one or more client types (e.g., indicating a respective minimum deposit amount for one or more client types); a respective maximum target amount for one or more client types (e.g., indicating a respective maximum deposit amount for one or more client types); a target amount for one or more client types (e.g., indicating a respective amount preferable to hold for one or more client types); respective client type percentage for one or more client types (e.g., indicating a respective target percentage of the respective deposit target amount for the one or more client types); a respective collateral maximum (e.g., indicating a maximum amount of collateralized funds available for deposit); a respective collateral minimum (e.g., indicating a maximum amount of collateralized funds available for deposit); a non-collateralized maximum (e.g., indicating a maximum amount of non-collateralized funds available for deposit); a non-collateralized minimum (e.g., indicating a minimum amount of non-collateralized funds available for deposit); and/or a combination thereof, to name a few. In embodiments, non-collateralized accounts may be backed by insurance and collateralized accounts may be backed by collateral. The insurance, in embodiments, may be provided privately and/or through the government—for example—by the Federal Deposit Insurance Corporation, the Federal Savings and Loan Insurance Corporation, and/or the Securities Investor Protection Corporation, to name a few. In embodiments, the DAS 120 may allocate the second portion of funds such that each of the one or more aggregated deposit accounts and/or each depository institution may comply with each respective client type target information.

The respective updated institution balance amount for each respective depository, in embodiments, are the respective updated institution balance amount calculated by the DAS 120 in S1502-B.

The client preference information may refer to client preferences that may affect the allocation of funds. As mentioned above, in embodiments, the client account information for each client in the program may include client preference information. The client preference information, in embodiments, may include one or more of the following: a whitelist (e.g., a list of depository institutions and/or aggregated accounts of which the respective client will only deposit funds into) and/or a blacklist (e.g., a list of depository institutions and/or aggregated accounts of which the client will not deposit funds), to name a few.

A respective maximum balance, in embodiments, may indicate one or more of the following: a maximum balance for each respective aggregated deposit account; a respective maximum balance for the respective depository institution associated with the respective aggregated deposit account; a respective maximum balance for each client with an ownership interest in funds held in the respective aggregated deposit account; a respective maximum balance for each client with an ownership interest in funds held in the respective depository institution; and/or a combination thereof, to name a few.

A respective minimum balance, in embodiments, may indicate one or more of the following: a minimum balance for each respective aggregated deposit account; a respective minimum balance for the respective depository institution associated with the respective aggregated deposit account; a respective minimum balance for each client with an ownership interest in funds held in the respective aggregated deposit account; a minimum maximum balance for each client with an ownership interest in funds held in the respective depository institution; and/or a combination thereof, to name a few. In embodiments, the maximum amount may be associated with a collateral and/or insurance (e.g., the amount of collateral and/or insurance coverage, less than the amount of collateral and/or insurance coverage, to name a few). The insurance, in embodiments, may be provided privately and/or through the government—for example—by the Federal Deposit Insurance Corporation, the Federal Savings and Loan Insurance Corporation, and/or the Securities Investor Protection Corporation, to name a few.

The respective client balance of funds, in embodiments, may indicate the amount of funds associated with each client associated with each client account associated with the one or more aggregated deposit accounts participating in the program. The respective client balance of funds, in embodiments, may enable the DAS 120 to allocate funds of clients associated with larger portions of the first net amount of funds to ensure there is room for all clients associated with the first portion of funds.

The even distribution, in embodiments, may refer to the DAS 120 allocating the second portion of funds evenly across one or more aggregated deposit accounts participating in the program and/or each aggregated deposit account participating in the program. In embodiments, the DAS 120 ensures compliance with predetermined limits (e.g., FDIC limits, or an amount slightly below such limit) and/or applicable aggregated deposit account information. In embodiments, the predetermined limit may be selected to be slightly below an insurance limit. For example, if the FDIC insurance limit for the client type is $250,000, the predetermined limit may be, e.g., $245,000 or $240,000, to name a few, instead of $250,000, to provide a safety margin to ensure insurance coverage.

In embodiments, the DAS 120 may allocate the first portion of funds and/or the second portion of funds such that the respective remaining available institution balance amount of each respective depository institution is the difference between the updated respective institution balance for the respective depository institution and a respective updated total client type deposit information for the respective aggregated deposit accounts that has already been assigned to the respective aggregated deposit account.

In embodiments, at the end of the allocation process, the DAS 120 may allocate the first and/or second portion of funds such that each respective updated total client type deposit information for each of the plurality of aggregated deposit accounts is in compliance with the respective client type target information.

In embodiments, the DAS 120, throughout the allocation processes of steps S1502, S1504, and/or S1506, may allocate the first and/or second portion of funds such that the sum of each respective updated total client type deposit information for each of the one or more aggregated deposit accounts is equal to or less than the respective updated total client type deposit information.

In embodiments, the DAS 120, at the end of the allocation process of step F), may allocate the first portion of funds and/or second portion of funds such that the sum of each respective updated total client type deposit information for each aggregated deposit account is equal to the updated respective institution balance amount for each depository institution.

In embodiments, at the end of the allocation process, each respective updated total client type deposit information for each of the one or more aggregated deposit accounts is in compliance with respective insurance regulations associated with the respective aggregated deposit account.

In embodiments, at the end of the allocation process, each respective updated total client type deposit information for each of the one or more aggregated deposit accounts is in compliance with its respective government regulations and agency regulations associated with the respective aggregated deposit account. The respective government regulations and/or agency regulations associated with each respective aggregated deposit account, in embodiments include one or more of the following Federal Savings and Loan Insurance Corporation government regulations and government agency regulations; Securities Investor Protection Corporation government regulations and government agency regulations; and/or Federal Deposit Insurance Corporation government regulations and government agency regulations, to name a few.

In embodiments, the process for allocating the first net amount of funds may continue with step S1506. At step S1506, in embodiments, the DAS 120 may update the depository institution information and the aggregated deposit account information in the one or more databases to reflect the results of steps S1502 and S1504.

As mentioned above, the DAS 120 may, in embodiments, allocate the first net amount of funds for all client types. In such embodiments, the process may continue with FIG. 15C. Referring to FIG. 15C, the process, in embodiments, may continue with step S1504'. At step S1504, in embodiments, the DAS 120 may allocate client funds (e.g., each respective transaction amount) associated with the funds held in the identified one or more aggregated deposit accounts among the one or more aggregated deposit accounts participating in the program. Step S1504' may be similar to steps S1504-A and S1504-B with the exception that municipalities is not allocated first (e.g., instead of a first portion of funds and a second portion of funds, the DAS 120 allocates one portion of funds—the first net amount of funds), the descriptions of which applying herein.

In embodiments, the process for allocating the first net amount of funds may continue with step S1506'. Like with step S1506, at step S1506', in embodiments, the DAS 120 may update the depository institution information and the aggregated deposit account information in the one or more databases to reflect the results of steps S1502 and S150.4'

The process illustrated in connection with FIG. 14A through FIG. 14B and FIG. 15A through FIG. 15C, in embodiments, may continue with FIG. 14B. Referring to FIG. 14B, in embodiments, the process may continue with step S1414. At step S1414, in embodiments, the DAS may generate one or more instructions to transfer funds to or from at least one of the one or more aggregated deposit accounts participating in the program. Each of the one or more instructions, in embodiments, may include each respective aggregated deposit account and its corresponding transfer amount. In embodiments, the one or more instructions may be instructions to execute the allocation of funds (e.g., the first portion of funds, the second portion of funds and/or the first net amount of funds) described above in connection with FIG. 15A through FIG. 15C. For example, if the allocation of the first net of funds requires a first aggregated deposit account at a first depository institution to transfer $10,000,000 to a second aggregated deposit account at a second depository institution, the corresponding instructions would be generated by the DAS 120 and include instructions for the first depository institution to transfer the $10,000,000 from the first aggregated account to the second aggregated depository account held by the second depository institution. In embodiments, the allocation of funds may require a transfer of funds between aggregated deposit accounts held by the same depository institution. In embodiments, the one or more instructions may include instructions for each depository institution associated with a transfer of any portion of the first net of funds. For example, if 5 depository institutions are associated with the allocation of the first net amount of funds, each of the 5 depository institutions will receive corresponding transfer instructions. In embodiments, the one or more instructions may include instructions for each depository institution associated with the transaction data obtained over the first time period. For example, if 10 depository institutions are associated with the transaction data, each of the 10 depository institutions will receive corresponding transfer instructions.

In embodiments, each depository institution that receives instructions, may receive a batch of instructions for each aggregated deposit account associated with the allocation of the first amount of funds and held by the respective depository institution. For example, if 3 aggregated deposit accounts are associated with the allocation of the first net amount of funds and are held by a first depository institution, the DAS 120 may generate a batch of instructions for the first depository institution, including instructions for each of the three aggregated deposit accounts. In embodiments, each depository institution that receives instructions, receives one or more instructions for each aggregated deposit account associated with the allocation of the first amount of funds and held by the respective depository institution. For example, if 3 aggregated deposit accounts are associated with the allocation of the first net amount of funds and are held by a first depository institution, the DAS 120 may generate one or more instructions for each of the three aggregated deposit accounts. In embodiments, the DAS 120 may generate instructions to transfer funds of municipal clients before the remaining client types. In embodiments, all transfer instructions are generated at time regardless of client type association. In embodiments, the generated one or more instructions may include one or more of the following: one or more wire transfer instructions, one or more ACH transfer instructions; one or more electronic transfers; and/or a combination thereof. An electronic transfer, in embodiments, may include transfer instructions to be executed over one or more of the following: ZELLE™; VENMO™; PAYPAL™; GOOGLE PAY™; APPLE PAY™; facsimile; electronic mail; and/or a combination thereof, to name a few. In embodiments, the transfer instructions may be generated such that one or more messengers can deliver the transfer instructions.

The process illustrated in connection with FIG. 14A through FIG. 14B and FIG. 15A through FIG. 15C, in embodiments, may continue with step S1416. At step S1416, in embodiments the one or more instructions are sent to each depository institution associated with the at least one aggregated deposit account. In embodiments, the one or more instructions may be sent electronically, telephonically, physically, and/or a combination thereof. For example, the one or more instructions may be sent over one or more of the following: one or more messengers; wire transfer instructions, one or more ACH transfer instructions; one or more electronic transfers; and/or a combination thereof. An electronic transfer, in embodiments, may be similar to the electronic transfers described above in connection with step S1414, the description of which applying herein.

In embodiments, one or more instructions are generated and sent to depository institutions holding one or more aggregated deposit accounts with a corresponding respective transfer amount of greater than zero (e.g., greater than zero if deposit) and/or less than zero (e.g., less than zero if withdrawal). In embodiments, each depository institution participating in the program receives transfer instructions, even if not associated with the allocation of the first net amount of funds.

The process illustrated in connection with FIG. 14A through FIG. 14B and FIG. 15A through FIG. 15C, in embodiments, may continue with step S1418. At step S1418, in embodiments, the DAS 120 may generate a report for each depository institution participating in the program. Each depository institution participating in the program, in embodiments, may receive a report indicating the performance of funds held by the respective depository institution. The report, in embodiments, may be based on performance over a time period (e.g., day, week, month, quarter, annual, and/or a combination thereof, to name a few). The reports, in embodiments, may be generated daily, weekly, monthly, quarterly, annually, and/or a combination thereof, to name a few. The report(s), in embodiments, may be based on information from the one or more databases reflecting the updated balance of funds held in each respective aggregated deposit account associated with the respective depository institution and/or the respective updated balance of funds associated with each client type of plurality of client types for the aggregated deposit accounts associated with the respective depository institution.

In embodiments, each report for each aggregated deposit account may include one or more of the following: a daily balance of funds for the respective aggregated deposit account for each day over the aforementioned time period; a daily average of funds for the respective aggregated deposit account for each day over the aforementioned time period; a weekly balance of funds for the respective aggregated deposit account for each week over the aforementioned time period; a weekly average of funds for the respective aggregated deposit account for each week over the aforementioned time period; a monthly balance of funds for the respective aggregated deposit account each month over the aforementioned time period; a monthly average of funds for the respective aggregated deposit account for each month over the aforementioned time period; a quarterly balance of funds for the respective aggregated deposit account for each quarter over the aforementioned time period; a quarterly average of funds for the respective aggregated deposit account for each quarter over the aforementioned time period; an annual balance of funds for the respective aggregated deposit account for each year over the aforementioned time period; an annual average of funds for the respective aggregated deposit account for each year over the aforementioned time period; and/or a combination thereof.

The process illustrated in connection with FIG. 14A through FIG. 14B and FIG. 15A through FIG. 15C, in embodiments, may continue with step S1420. At step S1420, in embodiments, the DAS 120 may send each generated report to each respective depository institution. In embodiments, the report may be sent physically, telephonically, electronically, and/or a combination thereof. In embodiments, each report may be sent daily, weekly, monthly, quarterly, annually, and/or a combination thereof, to name a few.

In embodiments, the steps of the process(es) described in connection with FIG. 14A through FIG. 14B and FIG. 15A through FIG. 15C may be rearranged or omitted.

Figure 2:
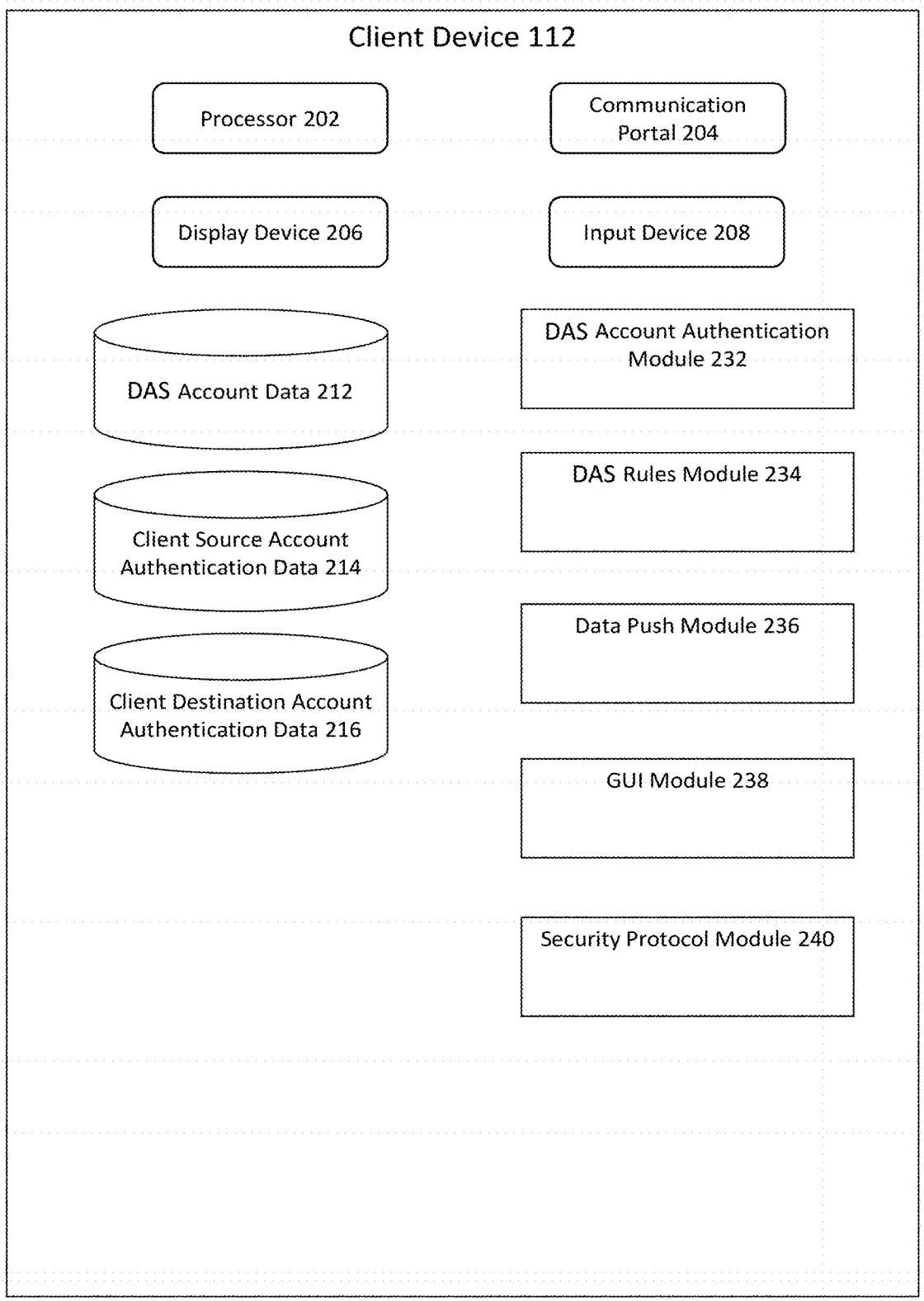
FIG. 2 is schematic block diagram representing components of a client device in accordance with exemplary embodiments of the present invention.

Referring to FIG. 2, there is shown a schematic block diagram representing components of a client device 112, which may be similar to the DAS 120 described above in connection with FIG. 1A through FIG. 1C, the description of which applying herein. In embodiments, the client device 112 may comprise a user electronic device, such as a computer, laptop computer, tablet computer, mobile phone, smart phone, PDA, web-enabled television, and/or wearable electronic device (e.g., watch and/or glasses), to name a few. In embodiments, the client device may comprise one or more processors 202, communications portals 204, display devices 206, e.g., an LCD display, and input devices 208, e.g., a keyboard, mouse, touch screen, etc. The client device 112 can further include non-transitory computer-readable memory. Data may be stored in one or more database stored on the computer-readable memory, and particular software modules may be stored on the computer-readable memory. Such modules may run or be configured to run on the one or more processors 202. Exemplary data and modules are described herein.

In embodiments, the client device 112 may comprise electronic data storage 212 for DAS account data. The DAS account data may comprise in embodiments, the user's information for the Deposit Administrator System 120, e.g., login credentials (username and/or password), contact information (email address, phone number, address), billing information (credit card information, bank account information), transaction rules, and/or notification settings, to name a few.

In embodiments, the client device 112 may comprise electronic data storage 214 for client source account authentication data. In embodiments, the client source account authentication data may comprise the user's information for accessing each account at the one or more source institutions of the client (e.g., account number, authentication information such as account login credentials, multi-factor authentication data, security questions, etc.). In embodiments, the client source account authentication data may also include information identifying the various source institutions. This may or may not be present on the client device. For example, in embodiments, such data may be stored at the DAS 120 instead of at the client device 112.

In embodiments, the client device 112 may comprise electronic data storage 216 for client destination account authentication data. In embodiments, the client destination account authentication data may comprise the user's information (e.g., login credentials, multi-factor authentication data, security questions) for accessing each account at one or more of the destination institutions or funds, or other destination institutions. The client destination account authentication data may also include information identifying the various destination accounts (destination institution or fund account identifier, e.g., account number). This may or may not be present on the client device.

In embodiments, the client device 112 may store other data, such as transaction logs and/or account balance data for one or more accounts. In embodiments, the client device 112 may store account balance retrieval history data, which may identify one or more times associated with retrievals of account balance information.

In embodiments, the client device 112 may comprise a DAS Account Authentication Module 232 for logging into the user's DAS account (e.g., to manage settings, view history of fund transactions, to add accounts, etc.). In embodiments, this Module 232 may be configured to access the DAS Account Data 212 and the requisite authentication data to log in to the DAS 120. Screens for managing settings, viewing a history of transactions, etc., are shown and will be discussed in relation to FIG. 8A through FIG. 8F.

In embodiments, the client device 112 may comprise a DAS Rules electronic module 234 for creating and/or managing transaction rules (e.g., source/deposit account monitoring frequency, accounts to monitor, limits for cash transactions, account minimums and account maximums, to name a few). In embodiments, default electronic rules may be provided by the DAS, which may be stored at the client device 112 and/or stored at the DAS 120.

In embodiments, the client device 112 may comprise a data push module 236 configured to be triggered by an event, e.g., the receipt at the client device 112, via the one or more electronic networks 50 and the communications portal 204, of new balance data for accounts held in the client's source institutions 100, and/or new balance data for accounts held in the destination institutions 130, and/or may be triggered by the transmission of transaction data, e.g., buy and sell orders, or the receipt of this transaction data by the client device. In embodiments, this push module may be implemented using Web Socket technology, Java applets or other plug-ins, to name a few.

The client device 112 may include a graphical user interface (GUI) module 238. A GUI module 238 may receive display data from one or more remote sources (e.g., computer servers) and/or may receive machine-readable instructions for generating a particular graphical user interface comprising display content. In embodiments, the GUI module 238 may generate the display data and/or activate a viewer application to render the graphical user interface. The GUI module 238 may update a GUI with new display data based at least in part upon data and/or instructions received, e.g., from a remote server, and/or in response to user inputs and/or time-based events (e.g., delayed actions) based at least in part upon pre-programmed or previously received instructions.

The client device 112 may include a security protocol module 240, which may perform processes to encrypt electronic messages and/or apply digital signatures to electronic messages, as described herein. A security protocol module 240 may generate an asymmetric private key based at least in part upon an invariant biometric feature vector, which may be extracted from and/or derived at least from a biometric reading of a user (e.g., a fingerprint).

Figure 3:
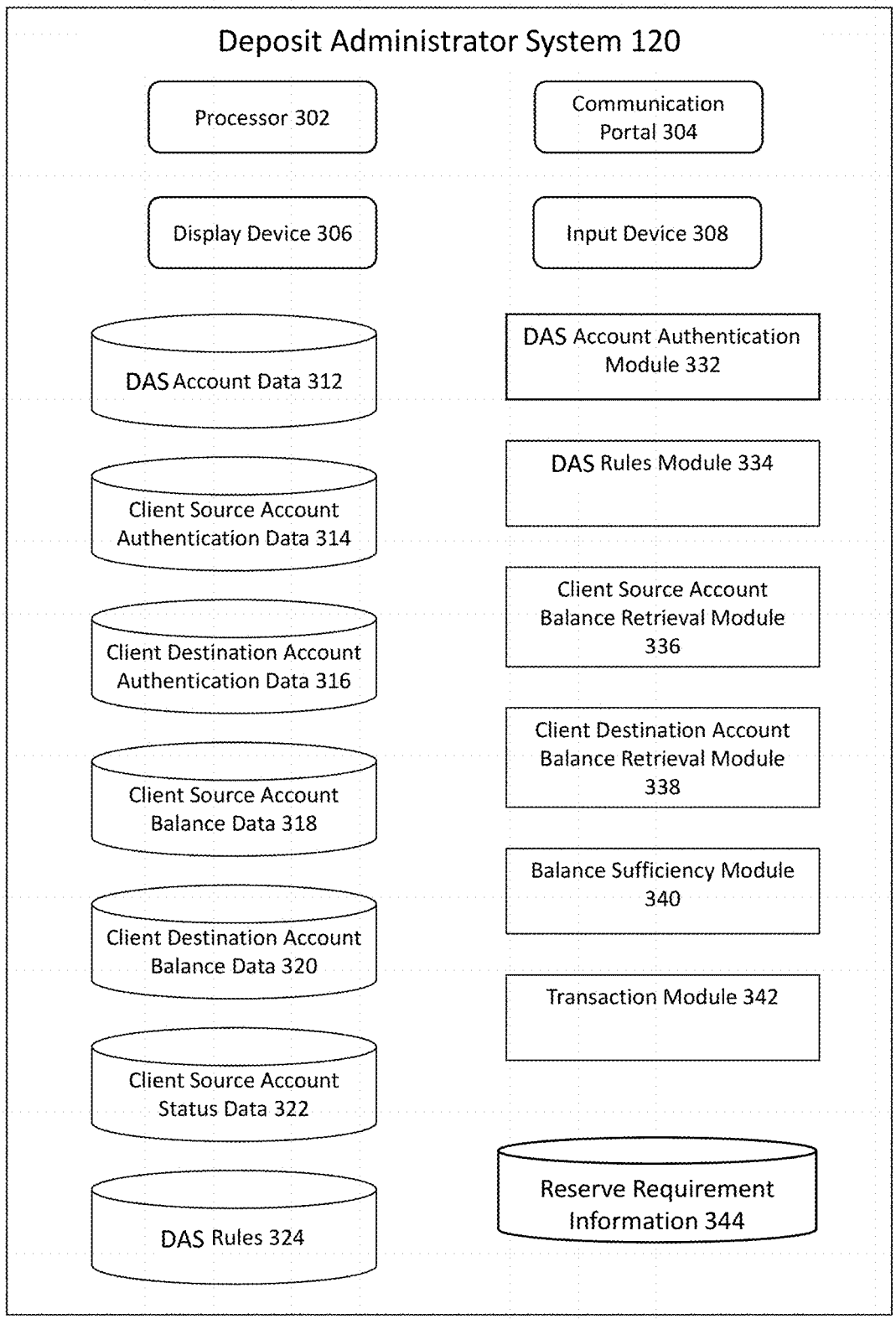
FIG. 3 is a schematic block diagram representing embodiments of a Deposit Administrator System in accordance with exemplary embodiments of the present invention.

Referring to FIG. 3, there is shown a schematic block diagram representing embodiments of the Deposit Administrator System (DAS) 120. The DAS 120 may be a computer system comprising one or more computers. The DAS 120 may comprise one or more processors 302, communications portals 304, display devices 306, and/or input devices 308. The DAS 120 can further include non-transitory computer-readable memory. Data may be stored in one or more database stored on the computer-readable memory, and particular software modules may be stored on the computer-readable memory. Such modules may run or be configured to run on the one or more processors 302. Exemplary data and modules are described herein.

In embodiments, the DAS 120 may comprise electronic data storage 312 for DAS account data. In embodiments, the DAS account data may comprise the user's information for the deposit administrator system, such as login credentials (username and/or password), contact information (email address, phone number, address), billing information (credit card information, bank account information), and/or user preferences and/or settings. In embodiments, DAS account data 312 can include DAS transaction history data, which may identify one or more transactions (e.g., fund transfers) performed by the DAS.

In embodiments, the DAS 120 may comprise electronic data storage 314 for client source account authentication data. In embodiments, the client source account authentication data may comprise the user's information for accessing each account at the source institution (account number, authentication information, such as login credentials). It can also include information identifying the various source institutions.

In embodiments, the DAS 120 may comprise electronic data storage 316 for client destination account authentication data. In embodiments, the client destination account authentication data may comprise the user's information for accessing each account at the one or more destination institutions. The client destination account authentication data may also include information identifying the various destination institutions.

In embodiments, the DAS 120 may comprise storage 318 for client source account balance data. In embodiments, client source account balance data may comprise an amount of cash held in a respective source account, and in embodiments, may further include amounts of other financial instruments or commodities (shares of stock, mutual funds, bonds, etc.). In embodiments, this balance data may be obtained on the fly after new transaction data has been received or obtained. In embodiments, the balance data may be obtained periodically, e.g., every 6 hours, 4 pm each day, once a week, twice a day, to name a few.

In embodiments, the DAS 120 may comprise electronic data storage 320 for client destination account balance data for one or more client destination accounts in the same or in different institutions. In embodiments, the client destination account balance data may comprise an amount of cash or liquid financial vehicles (e.g., an MMDA balance) held in a respective destination account, and in embodiments, may further include amounts of other financial instruments or commodities (shares of stock, mutual funds, bonds, etc.) held in the institution. In embodiments, this balance data may be obtained on the fly after new transaction data has been received or obtained. In embodiments, the balance data may be obtained periodically. In embodiments, client destination account transaction data 320 can include transaction history data for one or more destination accounts.

In embodiments, the DAS 120 may comprise electronic data storage 322 for client source account transaction data 322. In embodiments, the client source account transaction data may comprise pending order information for one or more trades, e.g., buy orders and/or sell orders. In embodiments, client source account transaction data 322 can include transaction history data for one or more source accounts.

In embodiments, the DAS 120 may comprise a DAS rules electronic storage 324 for storing electronic rules (e.g., user-specified and/or default rules) for performing various transactions. In embodiments, electronic transaction rules may be generated based at least in part upon user-specified and/or default rules. In embodiments, a user may set destination account balance limits that specify account balance limits (min or max limits), frequencies for performing cash transfer transactions (or other fund transfer transactions), and/or frequencies for determining account balances, to name a few.

Figure 13A:
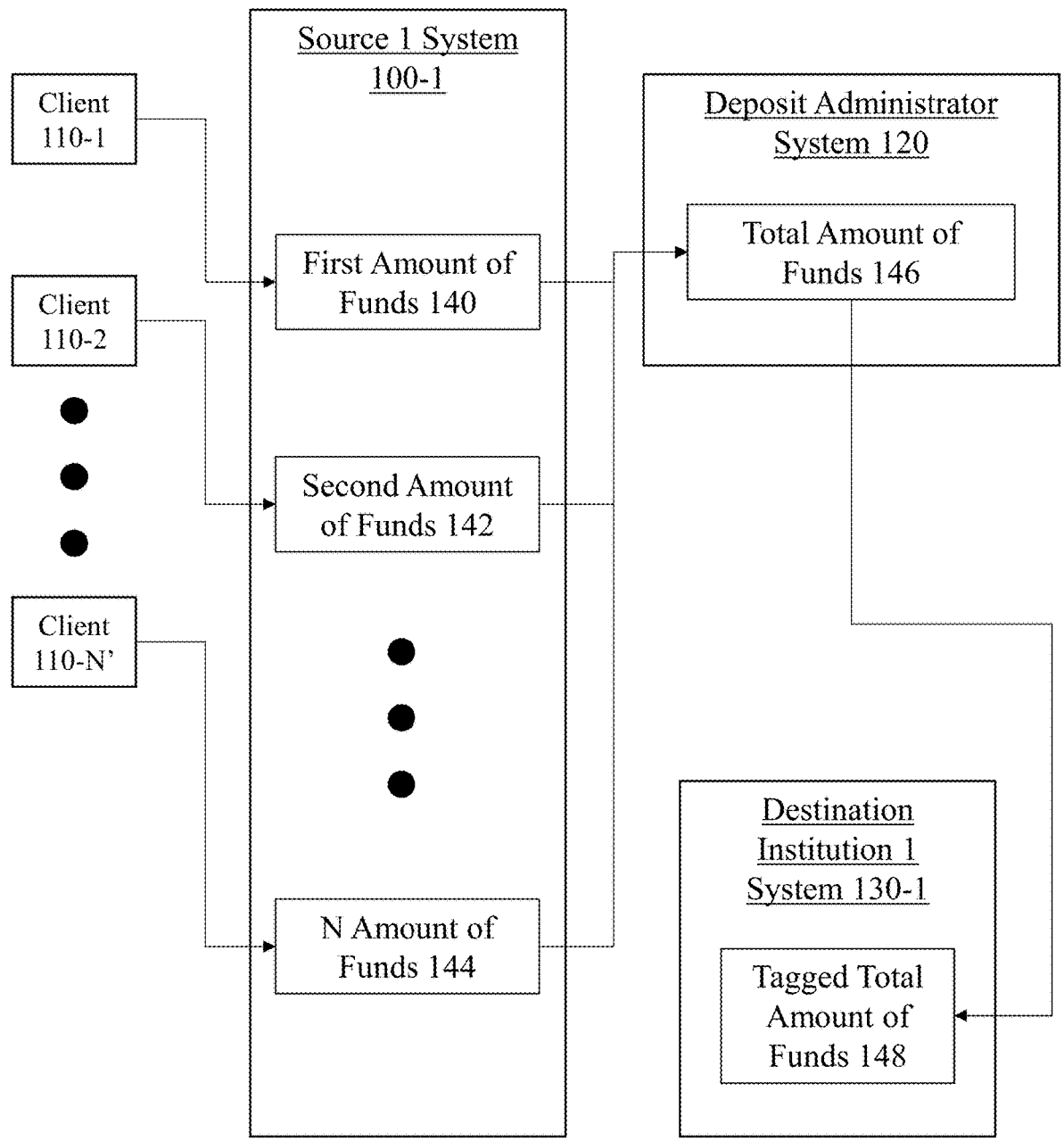
FIG. 13A is a schematic block diagram illustrating a system for tracking ownership interests in deposit accounts with more than one ownership interest, in accordance with exemplary embodiments of the present invention.
Figure 13D:
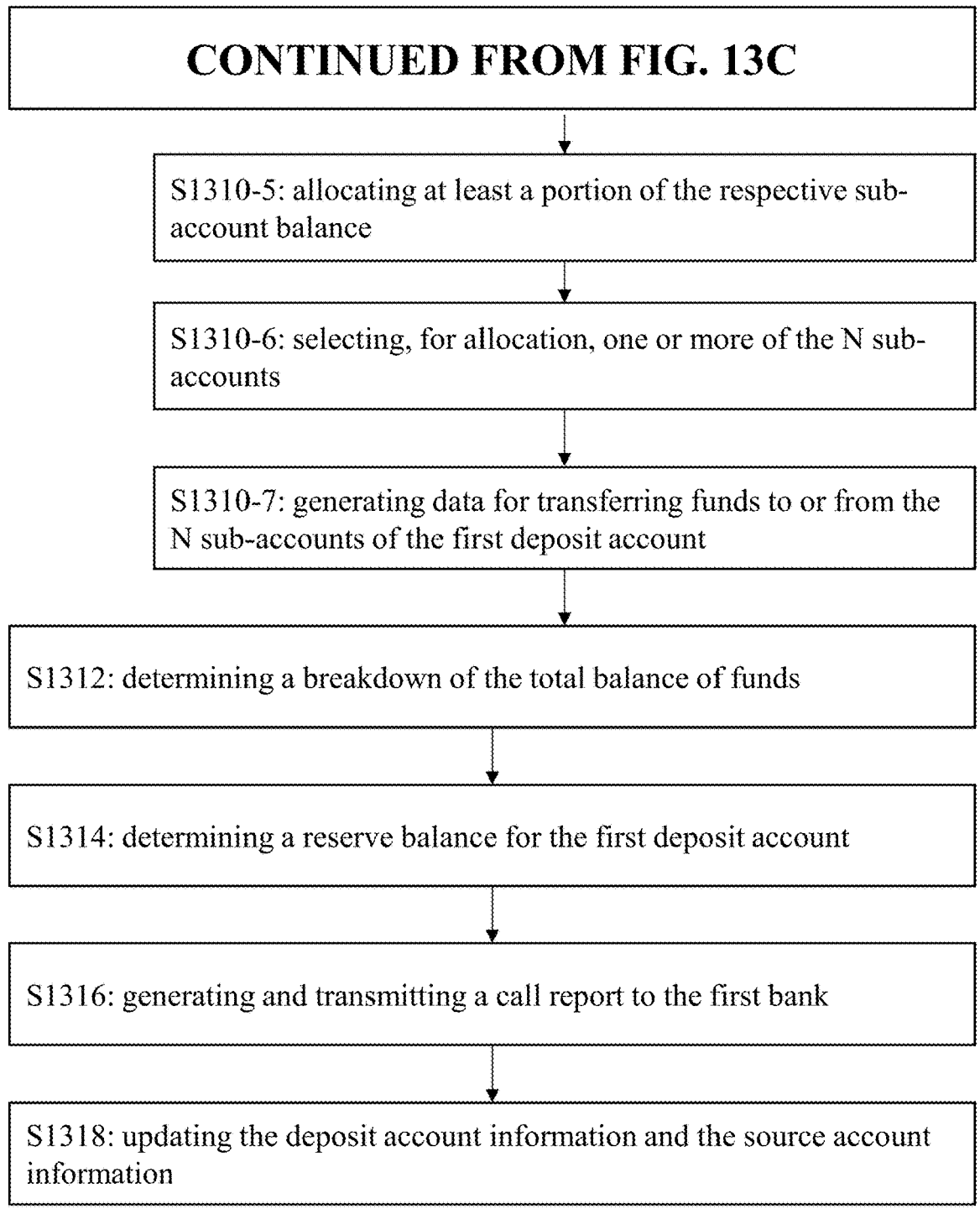

In embodiments, the reserve requirement information 344 may be similar to the reserve requirement information discussed below in connection with FIG. 13A through FIG. 13C, the description of which applying herein.

In embodiments, the DAS 120 may further comprise a DAS account rules module 334 for generating and/or populating electronic transaction rules based at least in part upon user-specified rules and data and/or default rules. In embodiments, this module 334 may also trigger and/or execute such rules.

The DAS 120 may include a client source account balance retrieval module 336. Such a module may obtain (e.g., retrieve and/or receive) source account balance data, which may comprise a numerical balance amount. In embodiments, a balance amount may have a corresponding timestamp (e.g., date and/or time). The source account balance retrieval module 336 may use client source account authentication data 314 to access one or more source accounts and obtain the source account balance data.

The DAS 120 may include a client destination account balance retrieval module 338. Such a module may obtain (e.g., retrieve and/or receive) destination account balance data, which may comprise a numerical balance amount and may have a corresponding timestamp. The destination account balance retrieval module 338 may use client destination account authentication data 316 to access one or more destination accounts and obtain the destination account balance data.

In embodiments, the DAS 120 may further comprise a balance sufficiency module 340. In embodiments, the balance sufficiency module may be configured to determine whether a source account balance (obtained from the electronic storage 318 or obtained on the fly) is sufficient to cover a pending net buy order, and/or to determine whether there is excess cash in the client source account. In embodiments, this module determination may comprise subtracting an amount for the net buy order from the client source account balance, and determining if the result is a positive amount, or a deficiency amount.

In embodiments, the DAS 120 may further comprise a transaction module 342. In embodiments, the transaction module may be configured to generate electronic transaction instructions to move funds between institutions, and/or execute a movement of funds between institutions, e.g., fund movement from a source account held at a source institution to a destination account at a destination institution, or vice versa. In embodiments, the electronic transaction instructions and/or parameters may identify source and destination accounts, transaction amounts, and/or account credentials or a database pointer to electronically stored credentials to use for authorizing the transaction. Embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general-purpose computer, special purpose computer, or special purpose processing machines to perform a certain function or group of functions.

Referring to FIG. 7A through FIG. 7D, interfaces for a client device are illustrated. FIG. 7A illustrates embodiments of an interface listing multiple client source accounts (note that the Source Accounts button 702 is activated in FIG. 7A). An Add Account button 710 may initiate a process to add a new source account. In the exemplary embodiment, activating this Add Account button 710 will open the screen shown in FIG. 7B comprising a block 720 to input a source institution (e.g., via text entry, searching, selecting from a predefined list, to name a few). A source account number may be input in a block 722. A user's login credentials for the source account may also be input, such as in a block 724 for the client's username and a block 726 for the client's password. A Submit button 728 and a Cancel button 730 are also provided in the interface to complete the add account process and to cancel the process, respectively. In embodiments, a confirmation process may be performed to verify the account credentials. For example, the DAS 120 may attempt to access the account and obtain account balance information, and/or the DAS 120 may perform a test transaction.

FIG. 7C illustrates embodiments of an interface listing multiple client destination accounts, which may be depository accounts (note that the Destination Accounts button 704' is activated in FIG. 7C). The interface comprises an Add Account button 710' to initiate a process to add a new destination account. Activating this Add Account button 710' will open the screen shown in FIG. 7D with a block 720' to enter (e.g., input, search for, and/or select) a destination institution, a block 722' to enter a destination account identifier (e.g., an account number), a block 724' to enter a client username, and a block 726' to enter a client password. A Submit button 728' and a Cancel button 730' are also provided in the interface.

Referring to FIG. 8A, illustrated are embodiments of a Website interface 800 (e.g., accessible at a URL via a web browser) for accessing a user's transaction management account associated with the DAS 120, e.g., to access account information and/or change settings. Activating the "Home 802" element navigates to a home page (shown in the figure). In embodiments, the Home page interface may show a log of DAS transaction activity, such as a log of money movements, time of the transactions, the accounts involved, the amounts transferred, any fees incurred, etc. In embodiments, such information may be provided on a different webpage associated with the DAS.

In embodiments, the Website interface 800 may comprise a Source Accounts 804 element to access an interface for listing the client's source accounts (view accounts, view account balances, view account activity log, to name a few). In embodiments, the Website interface 800 may comprise a Destination Accounts 806 element to access an interface listing the client's destination accounts. In embodiments, the Website interface 800 may comprise a Transaction Settings 808 element to access an interface for creating, setting, and/or editing client transaction rules. In embodiments, the Website interface 800 may comprise a DAS Account 810 element to access and adjust DAS administration information, e.g., a logout option, billing information, contact information, financial information, and change DAS password, to name a few.

Referring to FIG. 8B, embodiments of the Source Accounts 804 interface are illustrated. In the Your Source Accounts box, individual client source accounts are listed. In embodiments, when one of the source accounts is selected, a button for a View History 836 screen may be provided, where an account transaction history may be accessed. In embodiments, this information may be obtained by accessing source account data from the source institution servers using the client source account credentials and parsing and/or reformatting this data for display at the DAS website, as previously described. In embodiments, this information may be obtained in whole or in part from electronic storage in the DAS 120. In embodiments, an Edit Account 838 button may be provided to allow deletion of accounts and/or to allow changing source account credentials, which will update the source account credentials stored at the DAS in electronic storage 314. In embodiments, the DAS may provide an electronic notification to one or more user devices when a source account cannot be accessed and/or may prompt a user to modify the credentials. A button to Add Source Account 832 may be provided to present an interface for adding a new source account.

When the Add Source Account 832 button is clicked, an Add Source Accounts interface is provided. See FIG. 8C for exemplary embodiments of such an interface. Within this interface, block 842 allows entry of a source institution. Block 844 allows entry of a source account identifier (e.g., a source account number). Block 846 allows entry of a username for the source account, and block 848 allows entry of a password for the source account. In embodiments, an account name may be input to facilitate identification of the account for the user. A comparable interface may be provided for adding a new destination account.

When a particular one of the source accounts is highlighted in FIG. 8B, and the Edit Account button is activated, then an Edit interface is provided. Embodiments of an Edit interface are shown in FIG. 8D. Within the interface, block 852 allows entry of a modification of the source institution identifier (e.g., source institution account). Block 854 allows entry of a change of the source account identifier. Block 856 allows entry of a change of the username for the source account. Block 858 allows entry of a change of the password for the source account. Block 860 permits saving changes, block 862 cancels changes, and block 864 deletes an account.

Figure 8E:
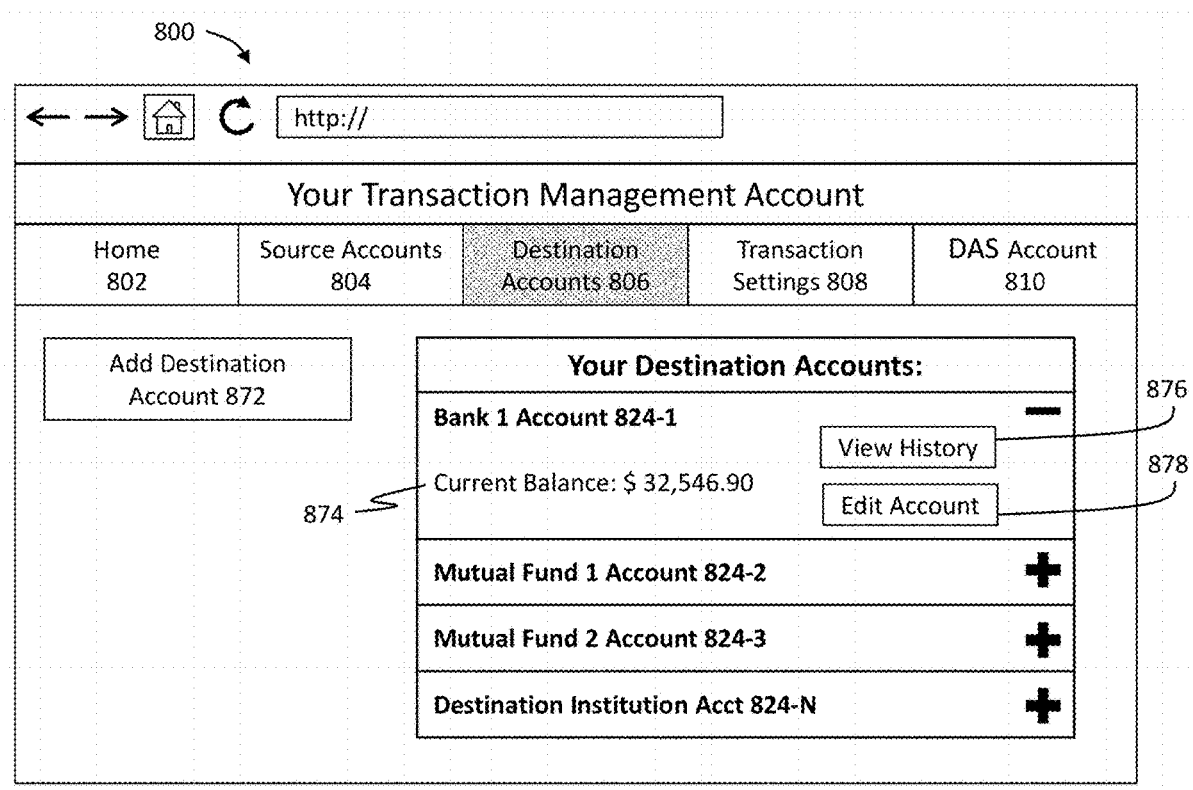
FIG. 8E is a schematic diagram of embodiments of a client interface screen for viewing a listing of the client's destination accounts, with an Add Source Account button, a View Account button, and an Edit Account button in accordance with exemplary embodiments of the present invention.

Referring to FIG. 8E, embodiments of the Destination Accounts 806 interface are illustrated. In the Your Destination Accounts box, individual client destination accounts are listed. In embodiments, when an individual destination account is selected, a button for a View History 876 screen may be provided where the destination account transaction history may be accessed using the account credentials obtained from the electronic storage 316 and parsed and/or reformatted for display at the DAS website. In embodiments, some or all of this account history data may be obtained from electronic storage at the DAS. In embodiments, an Edit Account 878 element (e.g., button) may be provided to allow deletion of accounts and/or to allow changing destination account information, such as account credentials. Changes to account information may be updated in the electronic storage 316. An Add Destination Account 872 button may be provided to open an interface to add a new destination account. An interface comparable to FIG. 8C may be provided for adding a new destination account. An interface comparable to FIG. 8D may be provided for editing the destination account data.

Figure 8F:
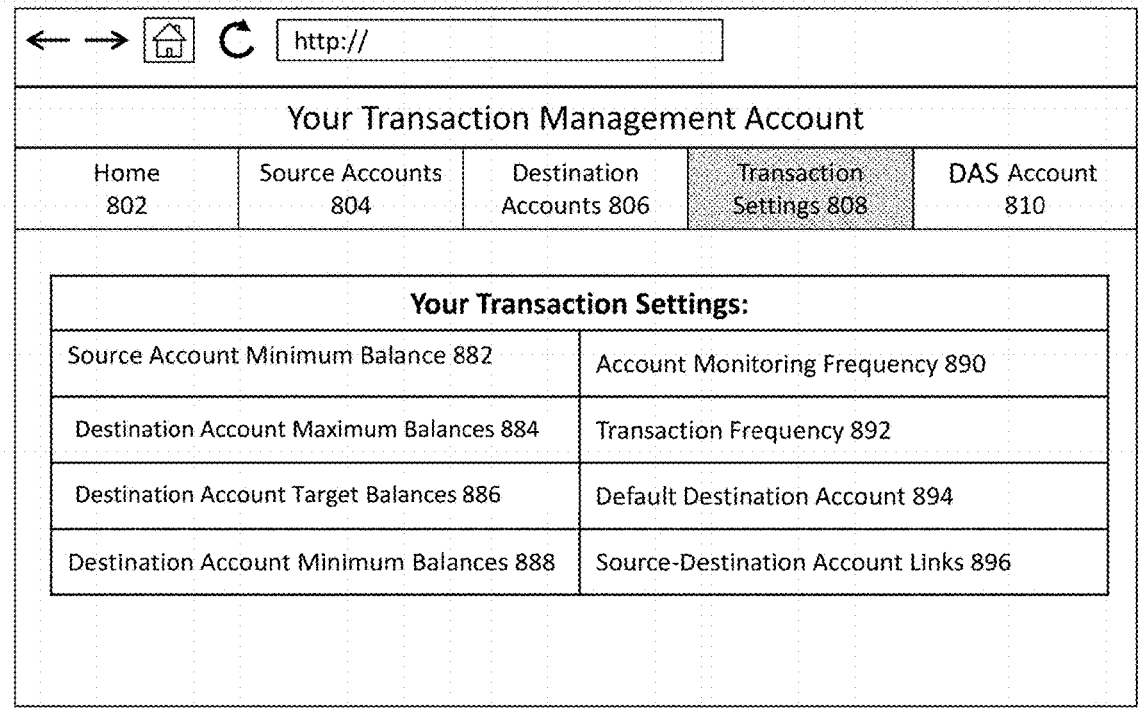
FIG. 8F is a schematic diagram of embodiments of an interface screen for editing transaction settings in accordance with exemplary embodiments of the present invention.

Referring to FIG. 8F, embodiments of a Transactions Settings 808 interface are presented.

These transaction settings are default and/or user-specified settings from which the DAS can generate electronic monitoring rules and/or electronic transaction rules. Listed below are example transaction setting types where a value may be input, an option selected, or a default setting used, to trigger generation of a rule using the setting. In embodiments, a setting may comprise a value (e.g., a threshold value), which may be an absolute value. In other embodiments, the value may be a proportion (e.g., percentage).

A Source Account Minimum Balances 882 setting is a minimum balance to be maintained in a source account. The DAS may create a rule to generate transfer instructions to transfer funds from a destination account to the source account to maintain this balance. This threshold minimum balance may be set for each source account individually, or may be used for all accounts. In embodiments, one or more destination accounts may be set for each of the source accounts, or a default one or more destination accounts may be set from which to transfer funds to maintain the source account minimum balance. In embodiments, the threshold minimum balance may be an absolute value or a percentage, e.g., of the account balance.

A Destination Account Maximum Balances 884 setting is a maximum balance to be maintained in a destination account. Based at least in part upon this threshold, the DAS may generate a rule to perform a subtraction operation or threshold comparison operation to determine when there is an excess amount in the source account over this destination account maximum balances threshold, and/or to determine a corresponding excess amount. The rule may then initiate generation of instructions to transfer funds from the respective destination account to an additional destination account to remove the excess amount. In embodiments, this threshold may be set for each source account.

A Destination Account Target Balances 886 setting is a target balance to be maintained in the destination account. In embodiments, setting the target balance value may generate a rule to provide an electronic notice to a client device, DAS, source institution, and/or destination institution if the destination account balance is less than this threshold. In embodiments, violating this target balance (e.g., via one or more executed or pending transactions) may initiate a transfer of funds to restore the target balance.

A Destination Account Minimum Balances 888 setting is a minimum balance to maintain in a destination account. Based at least in part upon this value, the DAS may generate a rule to prevent transfer from this destination account if the transfer transaction will cause the selected destination account balance to drop below the destination account minimum threshold. In embodiments, the DAS 120 may transfer from multiple destination accounts (e.g., according to a predefined order and/or a default order) to avoid violating the destination account minimum balance rule. Thus, the next destination account in an ordered list may be selected by the DAS, when the minimum balance will be violated for a given destination account. The destination account minimum balance threshold may be set for each destination account.

An Account Monitoring Frequency 890 setting may determine how often the DAS 120 monitors the source and/or destination accounts (e.g., once per day, twice per day, every hour, and/or every 5 minutes, to name a few) and/or specific times at which to monitor accounts (e.g., 9 am and/or 5 pm, market open, market close, to name a few). In embodiments, the setting may comprise an instruction to obtain account information following a transaction. This may be a default electronic instruction for the DAS 120.

A Transaction Frequency 892 setting may determine how often the DAS will initiate transfer transactions (e.g., as necessary, no more than once per day, cap of 5 transactions per month, to name a few).

A Default Destination Account 894 setting may allow the client to select a default destination account and/or a default order of destination accounts (e.g., if the first account is insufficient or a transfer will violate a destination account minimum balance rule, then the DAS may use a second account in the order, etc.). In embodiments, a rule may be set to transfer from two accounts a set percentage or amount.

A Source-Destination Account Links 896 setting provides links between source and destination accounts. For example, three source accounts may be linked to one destination account, while a fourth source account may be linked to a second destination account. Thus, in embodiments, the DAS may perform transactions, as described herein, between a source account and the one or more destination accounts to which it is linked in the DAS.

In embodiments, one or more of the intermediary computers may comprise a client computer. The one or more databases may comprise computer storage on the client computer to hold the client authentication data for the source institution computer system and the client authentication data for the one or more destination institution computer systems. In embodiments, accessing the client authentication data for the source institution computer and/or accessing the client authentication data for the one or more destination institution computers may be triggered/permitted only by authentication of the client by matching a predetermined security program, e.g., an iris scan, a fingerprint scan, and/or a voice sample to data held in the computer storage of the client computer.

In embodiments, a further operation of the DAS 120 may comprise associating, by the one or more intermediary computers, an insurance contract with a user's DAS account to insure against unauthorized transfers from the source account or the one or more destination accounts, when the predetermined security program is used to limit access to the client computer. In embodiments, a comparison operation may be performed of the amount of the net buy order and an insured amount limit, and if the insured amount limit is exceeded, then in embodiments, the transaction may be automatically terminated, or in embodiments an electronic notification may be sent to the client that the amount of the buy order exceed the insurance limit.

In embodiments, the client authentication data for the source institution computer of a source institution and the client authentication data for the one or more destination institution computers of one or more destination institutions may limit authorization only to transfers between client accounts associated with the source institution computers and the destination institution computers and no other transfers (e.g., no transfers to accounts not associated with the client or not registered with the DAS as such). An interface may be provided to insert this transfer limitation into any transfer instructions. In embodiments, it may be a default setting. Accordingly, the process may further comprise generating and/or verifying compliance with electronic transaction authorization rules.

In embodiments, the process may further comprise triggering an association, by the one or more computers, of an insurance contract to insure against unauthorized transfers from the source account or the one or more destination accounts, to a fund transfer when the limited authorization for fund transfers is activated.

In embodiments, the electronic authorization from the client is utilized along with their passwords and appropriate identification to retrieve source account (e.g., brokerage account) information and destination account (e.g., cash management account) information on a timely basis to move funds back-and-forth as needed to cover a trade and/or to maximize yield or maximize interest on a cash management account by directing the movement of funds among accounts across institutions while bypassing/inactivating the automatic fund transfer programs of clearing firm computers, and/or source institution computers and/or destination institution computers (and the attendant processing time and/or expense) at the computer systems of the clearing firms, the source institutions, and the destination institutions.

When a retail client provides their identification information and access information to the service provider associated with the DAS 120, the service provider may access data directly from the computer systems of the brokerage, money, and/or cash management providers. If the computer systems cannot be accessed directly the service provider (e.g., via the DAS 120) can use screen scraping or any other similar technology to access the respective clients account at the brokerage firm and/or at the cash management provider to retrieve appropriate account information. This account information may then be uploaded into a software program that determines an amount of money to be moved, from which account, and into which account, but bypassing/inactivating any the automatic fund transfer programs of clearing firm computers, and/or source institution computers and/or destination institution computers. The result of this automatic fund transfer bypass operation is that the client may be able to achieve a higher interest rate or yield on its cash management investments that are connected to the brokerage account and may eliminate attendant processing.

FIG. 12A through FIG. 12B, are flow charts of an exemplary process for administering deposit accounts in accordance with various embodiments of the present invention. In embodiments, the steps depicted in FIG. 12A and FIG. 12B can be performed by one or more computer systems configured to perform deposit administration, such as, for example, Deposit Administrator System (DAS) 120 depicted in FIG. 1A through FIG. 1C.

Referring now to the flow diagram shown in FIG. 12A, in embodiments, the process of FIG. 12A may begin with step S1202. At step S1202, in embodiments, DAS 120 accesses one or more electronic databases, each of which can be stored on one or more computer-readable media that are operably connected to DAS 120. The one or more databases accessed by DAS 120 may store and/or have access to segregated, aggregated account information for a plurality of Federal Deposit Insurance Corporation (FDIC)-insured and interest-bearing aggregated deposit accounts (hereinafter the "first plurality of deposit accounts") that are held in a plurality of banks, in accordance with a program associated with one or more source institutions and/or client account information for each client account of a plurality of client accounts, to name a few. In embodiments, the DAS 120 may connect to electronic databases over a wired or wireless local area network, a wide area network, over the Internet, and/or via a cloud computing provider. The one or more databases may be located in the same computing facility, or, alternatively, can be located in multiple facilities. The databases can also be located at any one of a plurality of deposit institutions (e.g., banks) or source institutions (e.g., broker dealers). In embodiments, the one or more databases may be similar to the memory of the DAS 120 described above in connection with FIG. 1A through FIG. 1C, the description of which applying herein.

In embodiments, the first plurality of deposit accounts can be, for example, demand deposit accounts (DDAs), money market deposit accounts (MMDAs), MMDA-DDA pairs, negotiable order of withdrawal (NOW) accounts, and/or certificate of deposit (CD) accounts, to name a few. In embodiments, the first plurality of deposit accounts may be similar to the omnibus account(s) 132 described above in connection with FIG. 1, and FIG. 1A through FIG. 1D, the description of which applying herein.

In embodiments, the aggregate account information of each of the deposit accounts in the first plurality of deposit accounts in the program may include information indicating an association with one or more of the following: (i) a respective client type, out of a plurality of client types; and/or (ii) one or more respective categories of the respective client type, to name a few. In embodiments, client types can include one or more of the following: municipalities, high-net-worth individuals, corporations, non-profits, individuals, partnerships, retirement accounts, and/or pension accounts, to name a few. In embodiments, each client type may include one or more categories associated with the client type. For example, client categories for municipalities can include large metropolises, medium size towns, and/or small villages, to name a few. As another example, client categories for individuals may include sub-categories. Continuing the example, the client type of individual may include a category of high-net worth individuals. In embodiments, sub-categories of high-net-worth individuals can include married, unmarried, retired, domestic, and/or foreign individuals, to name a few. Many other client categories are possible for each of the different client types and are within the scope of the present disclosure.

The first plurality of deposit accounts, in embodiments, are stored such that all funds held in each of these accounts are from clients associated with the same category of the same client type. That is, in embodiments, none of the funds held in the respective FDIC-insured and interest-bearing aggregated deposit account are associated with one or more clients from different client types out of the plurality of client types. For example, in one deposit account, all funds held in the account would be for one or more clients of a certain client type (e.g., municipalities) and of a certain client category (e.g., small villages). In embodiments, another deposit account, however, can hold funds belonging to another client type (e.g., high-net-worth individuals) of another associated client category (e.g., unmarried individuals).

In embodiments, the aggregated account information for each of the first plurality of deposit accounts and/or the client account information for each respective client account may include a respective balance of funds held in each deposit account of the first plurality of deposit accounts. In embodiments, the aggregated account information may be the aggregate balance of all clients of a corresponding client type and/or category for the respective deposit account.

In embodiments, as noted above, the one or more databases accessed by DAS 120 may also store and/or have access to client account information for each respective client account out of a plurality of client accounts that are each associated with one or more of the first plurality of deposit accounts and one or more source institutions participating in the program. The client account information for each respective client account, in embodiments, can include one or more of the following: (i) a respective balance of funds of the respective client account held in each of one or more accounts in the first plurality of deposit accounts, where these one or more accounts in the first plurality of deposit accounts holds funds of the respective client account; (ii) client type information that indicates a client type associated with the respective client, and a category associated with the client type associated with the respective client; (iii) client identification information (e.g., name, address, contact information, occupation, age, gender, to name a few); and/or (iv) transaction history associated with the respective client account, to name a few.

In embodiments, the one or more databases accessed by DAS 120 may also store and/or have access to client account transaction information for each of a plurality of FDIC-insured and interest-bearing deposit accounts associated with the plurality of client accounts of the one or more source institutions participating in the program (hereinafter the "third plurality of deposit accounts"). In embodiments, the client account transaction information may include information regarding each transaction associated with each of the third plurality of deposit accounts. In embodiments, the client account transaction information may include information indicating whether each account of the first plurality of deposit accounts has had any transaction activity over a sub-period of time (e.g., one or more minutes, hours, days, weeks, months, and/or years, to name a few). In embodiments, the transaction information may include, for each of the third plurality of deposit accounts and/or first plurality of deposit accounts, one or more of the following: (i) balance information; (ii) credit information applied to each of the plurality of client accounts for one or more sub-periods of time; (iii) debit information applied against each of the plurality of client accounts for one or more sub-periods of time; and/or (iv) information indicating each source institution associated with each transaction included in the transaction information, to name a few. In embodiments, the third plurality of deposit accounts can be a subset of the first plurality of deposit accounts, representing the deposit accounts associated with client accounts that have had and/or are associated with transactions during one or more predetermined time periods.

The process of FIG. 12A through FIG. 12B, in embodiments, may continue with step S1204. At step S1204, in embodiments, the DAS 120 may obtain the client account transaction information for each of the third plurality of deposit accounts. The transaction information, in embodiments, may be obtained by DAS 120 from one or more source institutions (e.g., Source institutions 100-1, 100-2 . . . 100-M, to name a few). In embodiments, the transaction information may be obtained by DAS 120 in real-time, at predetermined intervals, and/or when one or more transactions associated with the first plurality of deposit accounts occurs, to name a few. In embodiments, the client account transaction information may include balance information for the plurality of client accounts. In embodiments, as noted above, the client account transaction information may also include credit information and/or debit information applied to each of the plurality of client accounts for the time. For example, if, during the one or more predetermined time periods, a client account is either credited (e.g., by the depositing of funds) or debited (e.g., by drawing a check on the account), these credit and debit transactions would be obtained by DAS 120 as at least a portion of the client account transaction information associated with the given client account.

The process of FIG. 12A through FIG. 12B, in embodiments, may continue with step S1206. At step S1206, in embodiments, DAS 120 may determine a net transfer amount for each of the one or more source institutions over one or more sub-periods of time associated with the obtained client account transaction information. The net transfer amount, in embodiments, may be determined by first netting the transactions associated with each client account at the source institution (e.g., by netting the totality of credits and debits for each client account during the one or more predetermined time periods), and then netting these net client amounts against each other to arrive at a total net transfer amount associated with the source institution.

The process of FIG. 12A through FIG. 12B, in embodiments, may continue with step S1208. In embodiments, step S1208 may include sub-steps S1208-1, S1208-2, S1208-3, and S1208-4. Each of the aforementioned sub-steps, in embodiments, may be performed by the DAS 120 for each of the third plurality of deposit accounts, each of which may be associated with clients of a same client type out of the plurality of client types. In embodiments, each of the aforementioned sub-steps may be performed by the DAS 120 for each of the first plurality of deposit accounts.

The process of FIG. 12A through FIG. 12B, in embodiments, may continue with step S1208-1. At step S1208-1, in embodiments, the DAS 120 may determine a respective client type of the plurality of client types for a respective client account of the plurality of client accounts. In embodiments, DAS 120 may assign and/or store the determined respective client type to the respective client account. As described above, exemplary client types may be municipalities, corporations, non-profits, individuals, partnerships, charity accounts, attorney escrow accounts, retirement accounts, and/or pension accounts, to name a few. DAS 120 can, in embodiments, determine the client type of the respective client based at least on the client type information associated with the client account information stored in the one or more electronic databases.

The process of FIG. 12A through FIG. 12B, in embodiments, may continue with step S1208-2. At step S1208-2, in embodiments, the DAS 120 may access a respective client available deposit amount ($D_i$) for the respective client account. In embodiments, the available deposit amount $D_1$ may include funds to be distributed over a number ($N_i$) (described more fully below) of respective banks in the program. In embodiments, $N_i$ is a whole number that may be equal to or greater than 1. In embodiments, the available deposit amount $D_i$ is determined as a percentage (X) times the number $N_i$ of respective banks in the program. In such embodiments, X may be a distribution percent value to be distributed to each of the $N_i$ banks for the respective client account. For example, a given client i has funds that are to be distributed over $N_i$ banks, where $N_i$ equals 4. In this case, X can take on a single value of 25, such that 25 percent of the client's funds are distributed to a first of the $N_i$ banks, 25 percent of the client's funds are distributed to a second of the $N_i$ banks, and so on. In some embodiments, multiple percentages (e.g., multiple values of X) can be used to distribute varying percentages of the client's funds to different banks. For example, where, as before, Ni equals 4, X can take on different values (e.g., up to four different values), such that the sum of those values does not exceed 100 (e.g., 100 percent). Thus, for each of the four banks, X can take on 10, 20, 30, and 40. In this case, 10 percent of the client's funds would be distributed to the first bank, 20 percent of the client's funds would be distributed to the second bank, 30 percent of the client's funds would be distributed to the third bank, and 40 percent of the client's funds would be distributed to the fourth bank.

The process of FIG. 12A through FIG. 12B, in embodiments, may continue with step S1208-3. At step S1208-3, in embodiments, the DAS 120 may determine the identity and/or number ($N_i$) banks of which the respective client available deposit amount will be distributed. In embodiments, this determination may be based at least on the respective client available deposit amount, $D_i$. In some embodiments, the one or more of electronic databases may include client preference and/or exclusion information comprising a client's one or more preferences and/or one or more exclusions of one or more banks to hold respective client account funds. Such preferences or exclusions may be selected by a client using a user interface and then subsequently saved in the one or more electronic databases. In such a case, DAS 120 can determine the banks in the program for allocation of the client available deposit amount, $D_i$, based at least in part on the client preference and/or exclusion information. For example, out of four potential banks that a client's funds can be allocated to (e.g., $N_i$ would equal 4 in this case), a client can express a preference for three of them, while excluding one of them. In this case, $N_i$ would be reset to 3, and the client's funds would not be allocated to the excluded bank.

In embodiments, the number of banks may be selected by determining the account availability of accounts within the first plurality of deposit accounts. The account availability may be found, in embodiments, by subtracting the current amount of funds in a respective account from the FDIC insured limit (or another predetermined number). The account availability may be found for one or more accounts of the first plurality of deposit accounts. The process of finding account availability may continue until the determined account availability is equal to and/or greater than the available deposit amount. Once the account availability is equal to and/or greater than the available deposit amount, in embodiments, the number of banks that are in custody of the accounts associated with the determined account availability would equal the Ni respective banks.

The process of FIG. 12A through FIG. 12B, in embodiments, may continue with step S1208-4. At step S1208-4, in embodiments, the DAS 120 may allocate a client bank distribution amount ($BN_i$) to each of the determined $N_i$ respective banks. In embodiments, the respective client bank distribution amount $BN_i$ is at least a portion of the respective client available deposit amount, $D_i$. For example, based on the determined identity and number of banks, and based on the client available deposit amount, the DAS 120 may determine how much of the available deposit amount is to be transferred to each of the determined banks. Further, in embodiments, the respective client bank distribution amount $BN_i$ does not exceed a predetermined amount for each of the $N_i$ respective banks. In embodiments, the predetermined amount is the FDIC coverage limit for a client account at each of the $N_i$ respective banks. In other embodiments, the predetermined amount is less than the FDIC coverage limit. For example, the DAS 120 may utilize a limit less than the FDIC coverage limit in order to ensure each deposit account is under the FDIC coverage limit (e.g., for a limit of $250,000, the predetermined amount may be $245,000, $240,000, to name a few).

The process of FIG. 12A through FIG. 12B may continue with FIG. 12B. Referring to FIG. 12B, in embodiments, the process may continue with step S1210. At step S1210, in embodiments, the DAS 120 may select for allocation the one or more accounts of the first plurality of deposit accounts. The allocation, in embodiments, may pertain to the allocation of client funds among the $N_i$ respective banks. In embodiments, the selecting for allocation may be based on one or more selection criteria. The one or more selection criteria may include one or more of the following: (i) whether the $N_i$ respective banks are affiliated with one another; (ii) whether a client selected, using, for example, a graphical user interface, that its funds should be included for allocation in one or more of the $N_i$ respective banks; (iii) client preference information; (iv) client exclusion information; and/or (v) a deposit amount from the $N_i$ respective banks held in other of the plurality of the N banks participating in the program, to name a few. By way of example, computer code may be utilized to perform the following rules and/or functions:

Obtain Client Account Bank Selection Information
    Obtain Client Account Bank Preference Information
    Obtain Client Account Bank Exclusion Information
    Obtain List of Affiliations Between Banks in Program
    Determine Number of Accounts held in Banks listed in Bank Selection Preference Information
    Determine Account Availability for Each Account held in Banks listed in Bank Selection Information
    If the sum of the Account Availability for Each Account held in Banks listed in Bank Selection is greater than and/or equal to $D_i$., then select Accounts of Banks listed in Bank Selection
    If the sum of the Account Availability for Each Account held in Banks listed in Bank Selection is less than $D_i$., then determine difference between the sum of the Account Availability and $D_i$ (hereinafter "A")
    Save Account Information and associated Bank information for Each Account held in Banks listed in Bank Selection with an Account Availability above zero (hereinafter "First Banks")
    Determine Account Availability for Each Account held in Banks listed in Bank Preference Information
    If the sum of the Account Availability for Each Account held in Banks listed in Bank Preference is less than $A_i$., then determine difference between the sum of the Account Availability and A (hereinafter "B")
    Save Account Information and associated Bank information for Each Account held in Banks listed in Bank Preference with an Account Availability above zero (hereinafter "Second Banks")
    Determine List of Banks Associated with Banks listed in the Bank Selection Information and the Bank Preference Information (hereinafter "C")
    Determine, until the sum of the Account Availability is greater than or equal to B, Account Availability for Each Account of the First Plurality of Deposit Accounts that are not held in Banks listed in:
      the Bank Selection Information;
      the Bank Preference Information;
      the Bank Exclusion Information; and
      List C
      (hereinafter "Third Banks")
    Select Accounts associated with the First Banks, Second Banks, and Third Banks As an example, if one or more of the Ni banks deposit funds in banks outside of the group of $N_i$ respective banks, allocation may be prevented or allowed, depending on the amount of funds held on deposit at these other banks. The selection criteria, in embodiments, can also include a capacity of the respective bank and/or a balance sheet of the $N_i$ respective banks. That is, for example, one or more of the $N_i$ respective banks may not have the capacity or room on its balance sheet to accept a prospective allocation of funds. In such a case, a client's funds may need to be allocated to one or more of the remaining banks of the $N_i$ respective banks that do have balance sheet capacity. The selected one or more accounts, in embodiments, may hold funds from client accounts associated with clients of the same client type, and which are held in the $N_i$ respective banks for that client account. In embodiments, the DAS 120 allocates the net transfer amount for each of the one or more source institutions to be met with funds in the $N_i$ respective banks for each client account.

By way of another example, an additional criterion for selecting the one or more accounts of the first plurality of deposit accounts could be that the accounts chosen for the transfer are $98,000 or less, and in a variation of this embodiment may be required to be above some minimum amount, to allow for interest earned to be deposited to the account. As another example, the accounts chosen for transfer might be based on the difference between a predetermined amount (e.g., the FDIC insured limit or less than the FDIC insured limit), and the current amount of funds within said account for the purposes of ensuring each account has the maximum amount of funds before depositing into another account. Note, however, that the invention is not restricted to sending back only insured deposits. For example, where the accounts at the sending and receiving banks are omnibus accounts, the second deposit back to the bank 40 could contain funds from customers that have more than $100,000 in assets.

A more detailed description of representative allocation methodologies of funds may be located in U.S. Pat. Nos. 7,509,286, 7,680,716, 7,752,107, 8,380,621, 8,781,931, 8,458,089, 8,452,702, 8,655,689, and 8,374,370, each of which is hereby incorporated by reference as if fully set forth herein. One skilled in the art would understand that each of these allocation methodologies may be used alone and/or in combination with each other using segregated aggregated accounts consistent with the scope and spirt of the present invention.

The process of FIG. 12A through FIG. 12B, in embodiments, may continue with step S1212. At step S1212, in embodiments, the DAS 120 may generate transfer instructions for transferring funds to or from the selected one or more accounts held in the plurality of banks. In embodiments, the transfer instructions may include multiple transfer instructions—e.g., for each bank effected by the transfer. Transfer instructions, in embodiments, may include instructions for the $N_i$ respective banks to transfer a net amount of funds in accordance with the allocation and/or selection steps described above (S1208-4 and S1210 respectively). The transfer instructions, in embodiments, may ensure that the First Plurality of Deposit Accounts is segregated by client type and/or category of client type.

The process of FIG. 12A through FIG. 12B, in embodiments, may continue with step S1214. At step S1214, in embodiments, the generated transfer instructions are transmitted to each of the $N_i$ respective banks. In embodiments, the DAS 120 transmits the transfer instructions to each of the $N_i$ respective banks over network 50, to which DAS 120 and the Ni respective banks are operatively connected. For example, in some embodiments, and as shown in FIG. 1C, DAS 120 is connected via electronic communications network 50 to one or more destination institution computer systems 146-1 to 146-P, which are computer systems that reside at the $N_i$ respective banks. As shown in FIG. 3, DAS 120 can connect to electronic communications network 50 via one or more communications portals 304. In embodiments, DAS 120 transmits the transfer instructions via email, Hypertext Transfer Protocol (HTTP), File Transfer Protocol (FTP), Electronic Banking Internet Communications Standard (EBICS) communication, Simple Object Access Protocol (SOAP), or other network communication protocol.

In embodiments, DAS 120 may provide the generated transfer instructions telephonically to the $N_i$ respective banks, through text message, audio message, video message, and/or through automated telephone communication, to name a few. In embodiments, DAS 120 provides the generated instructions to a human and/or third-party entity, who, after receiving the instructions, may communicate the generated transfer instructions to one or more of the $N_i$ respective banks, either telephonically, via postal or express mail, and/or by physically conveying the transfer instructions to the respective banks, to name a few.

After the transmission of the transfer instructions to the $N_i$ respective banks, the DAS 120, at step S1216 in embodiments, may update the client account information and the aggregated account information in the one or more electronic databases based, at least in part, on the allocating and generating steps (S1208-4 and S1212 respectively).

In embodiments, DAS 120 may execute one or more additional steps not depicted in FIG. 12A and FIG. 12B. For example, DAS 120 may, after updating the client information and aggregated account information, generate a report of the updated client account information and the aggregate account information and transmit the report to one or more of the following, the plurality of banks N, the $N_i$ respective banks to which hold the respective client's funds, the one or more source institutions, and/or the clients of the one or more source institutions, to name a few. In embodiments, the DAS 120 may generate a plurality of reports. Each of the reports, in embodiments, may be unique to the recipient of the report. For example, if both Alice's and Bob's funds were involved in a sweep transaction, the report generated and transmitted to Alice may only include information regarding Alice's funds while the report generated and transmitted to Bob may only include information regarding Bob's funds. Continuing the example, if Alice and Bob are both clients of the same source institution—Source Institution A—the report generated and transmitted to Source Institution A may include information regarding both Alice and Bob's funds. However, continuing the example, the report generated and transmitted to Source Institution B (e.g., not Source Institution A), may not include information regarding Alice and Bob's funds. In some embodiments, DAS 120 transmits the report over a wireless or wired local area network, over a wide area network, over the Internet, over a SOAP connection, via a cloud computing provider, or via e-mail or text message. In embodiments, DAS 120 generates the report for physical delivery to one or more of the $N_i$ respective banks.

In embodiments, DAS 120 may receive, from at least one of the one or more respective banks, a confirmation message indicating the transfer instructions were executed. The confirmation message can be received over a wireless or wired local area network, over a wide area network, over the Internet, over a SOAP connection, via a cloud computing provider, or via e-mail or text message. In other embodiments, the message is physically delivered to a human administrator via postal or overnight mail, or via messenger.

The human administrator then provides the message to DAS 120 using an input device operatively connected to DAS 120.

In embodiments, DAS 120 may verify that the transfer instructions were executed by the one or more respective banks. DAS 120 may do this by issuing a query over an electronic communication network to the one or more deposit institutions, requesting information that confirms that the transfer instructions were executed. The query, in embodiments, may result in the receipt of one or more confirmation messages from the one or more deposit institutions.

In embodiments, the steps of the process described in connection with FIG. 12A through FIG. 12B may be rearranged or omitted.

Figure 4A:
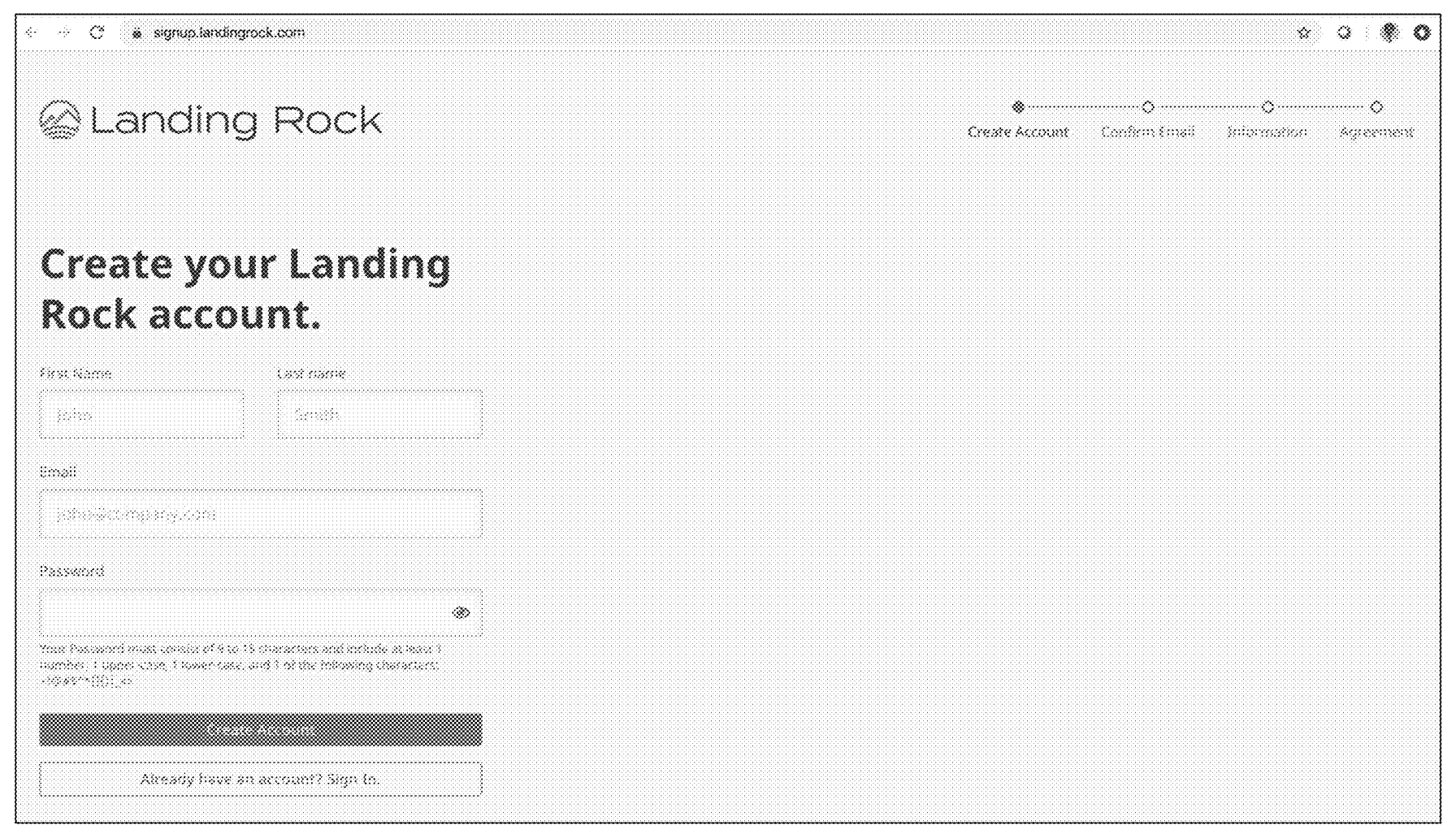
Figure 4B:
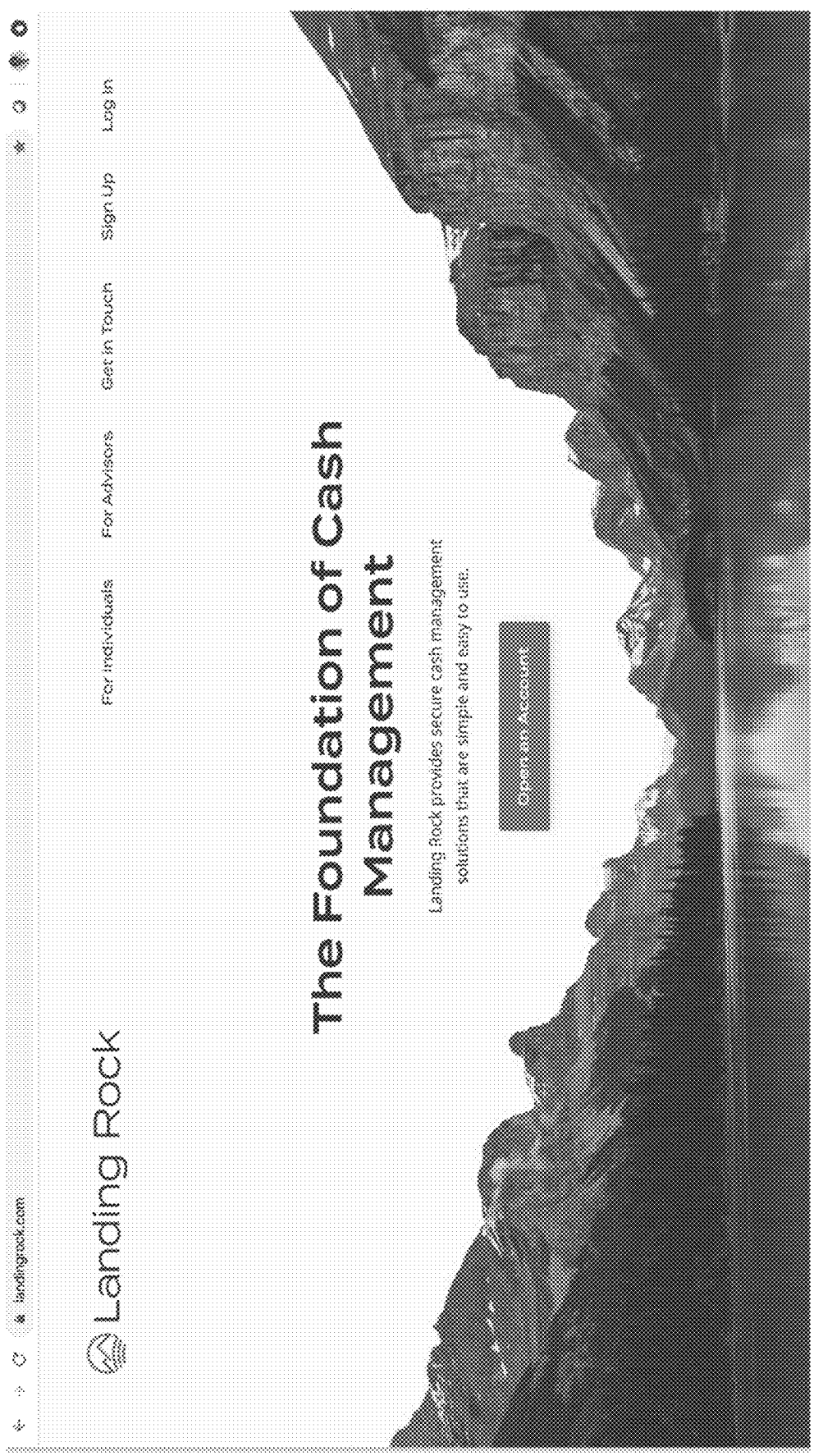
Figure 5:
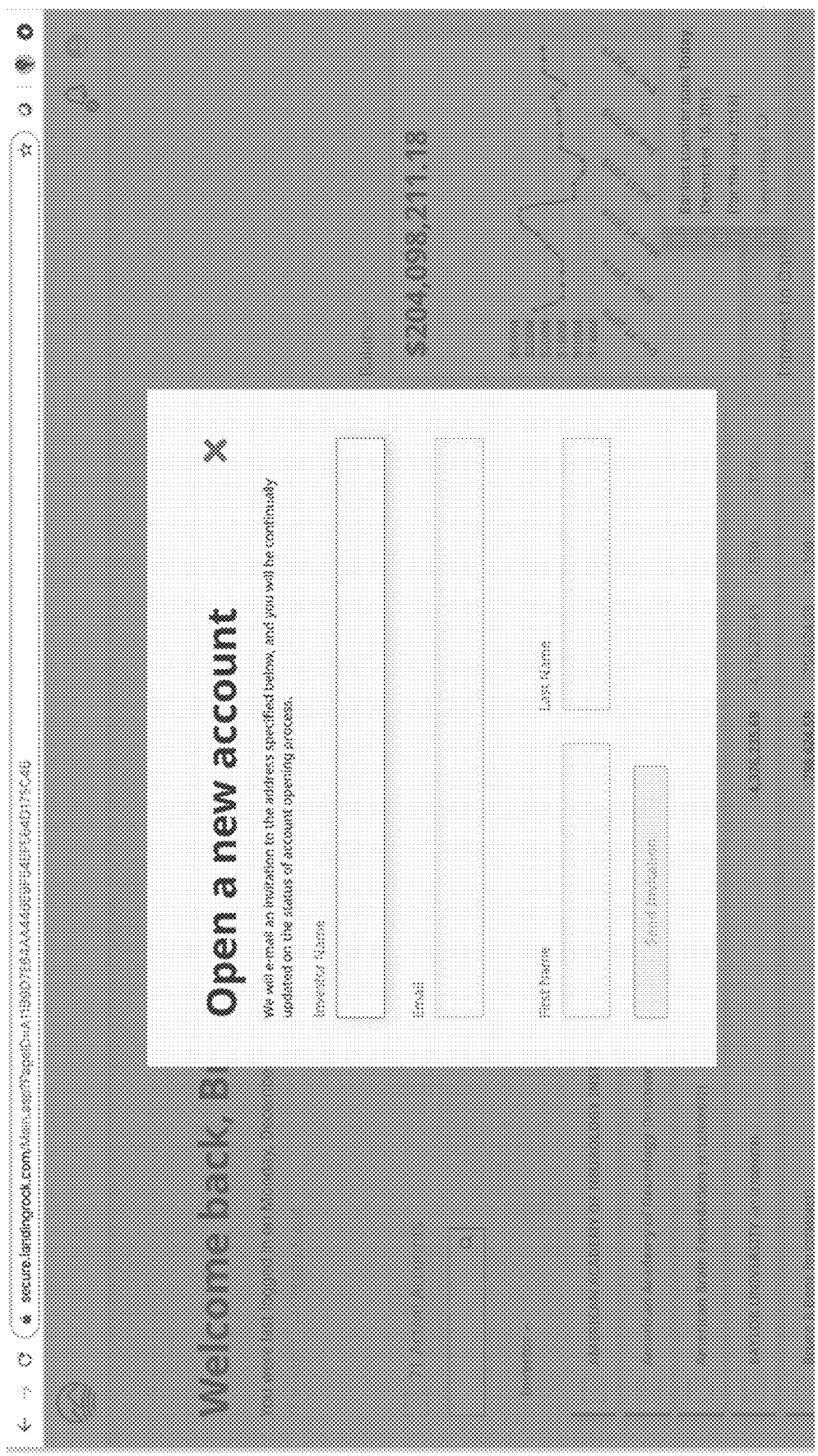
FIG. 5 is another exemplary screenshot of a graphical user interface in accordance with exemplary embodiments of the present invention.
Figure 6A:
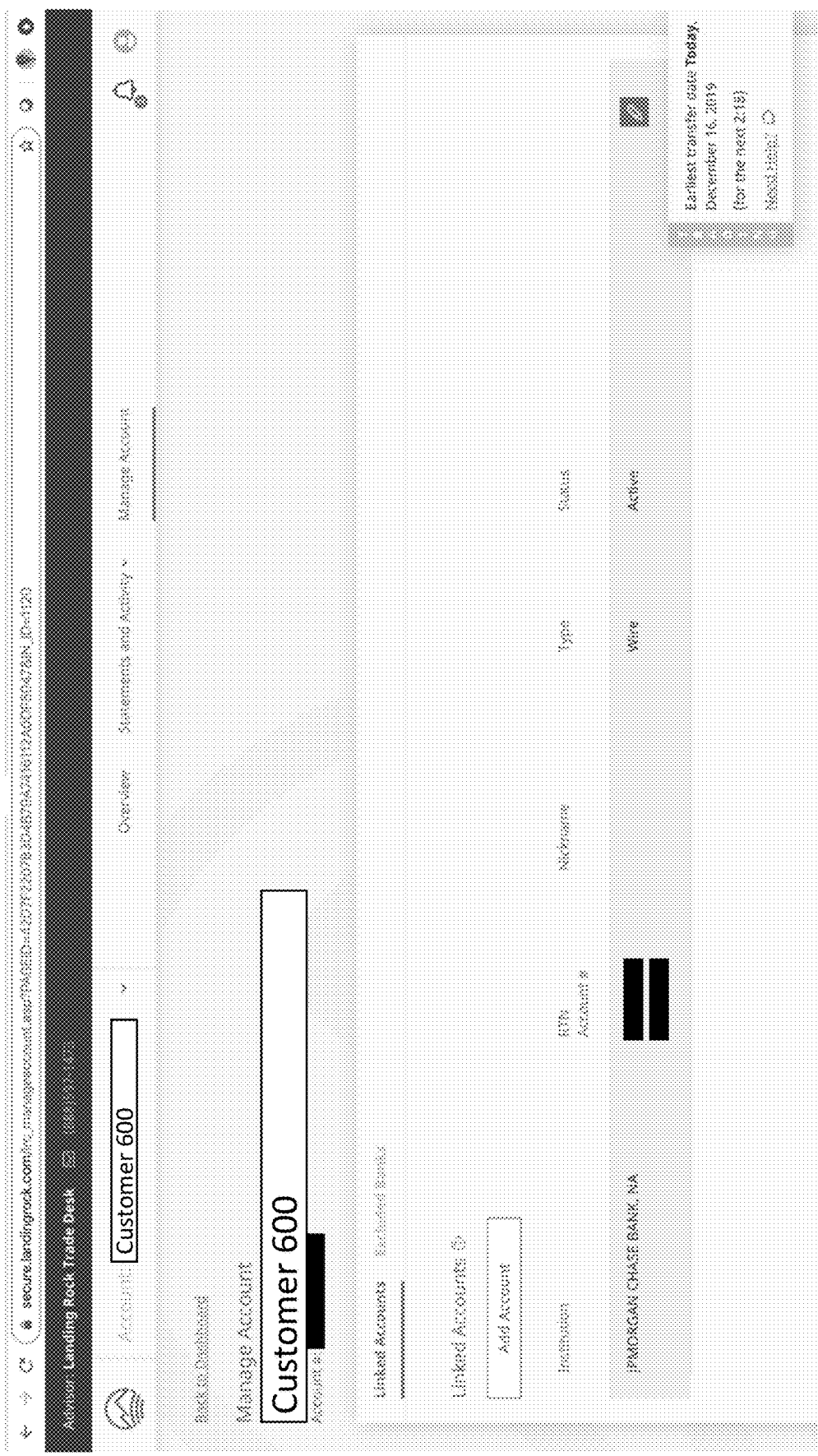
Figure 6C:
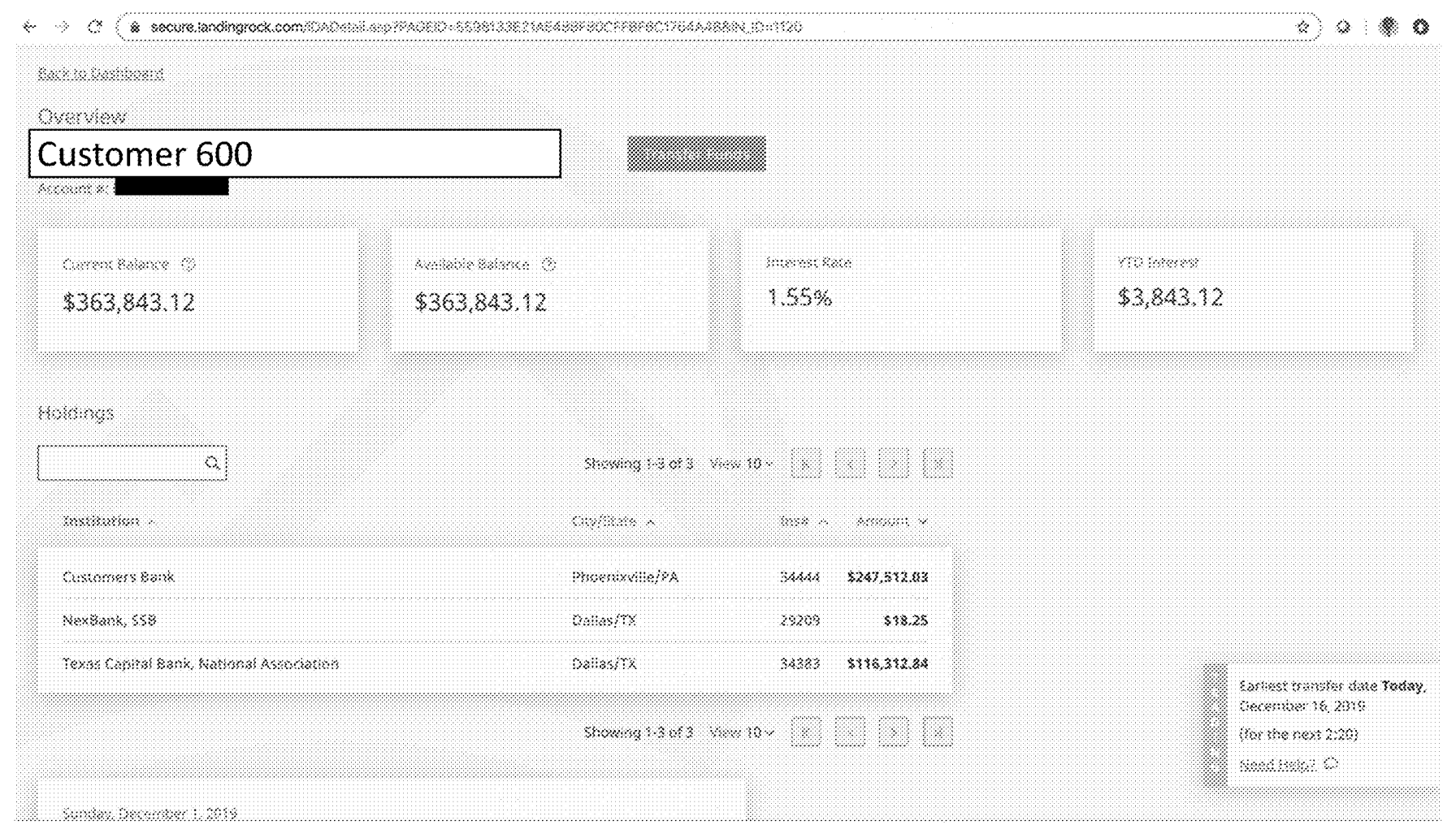
Figure 6D:
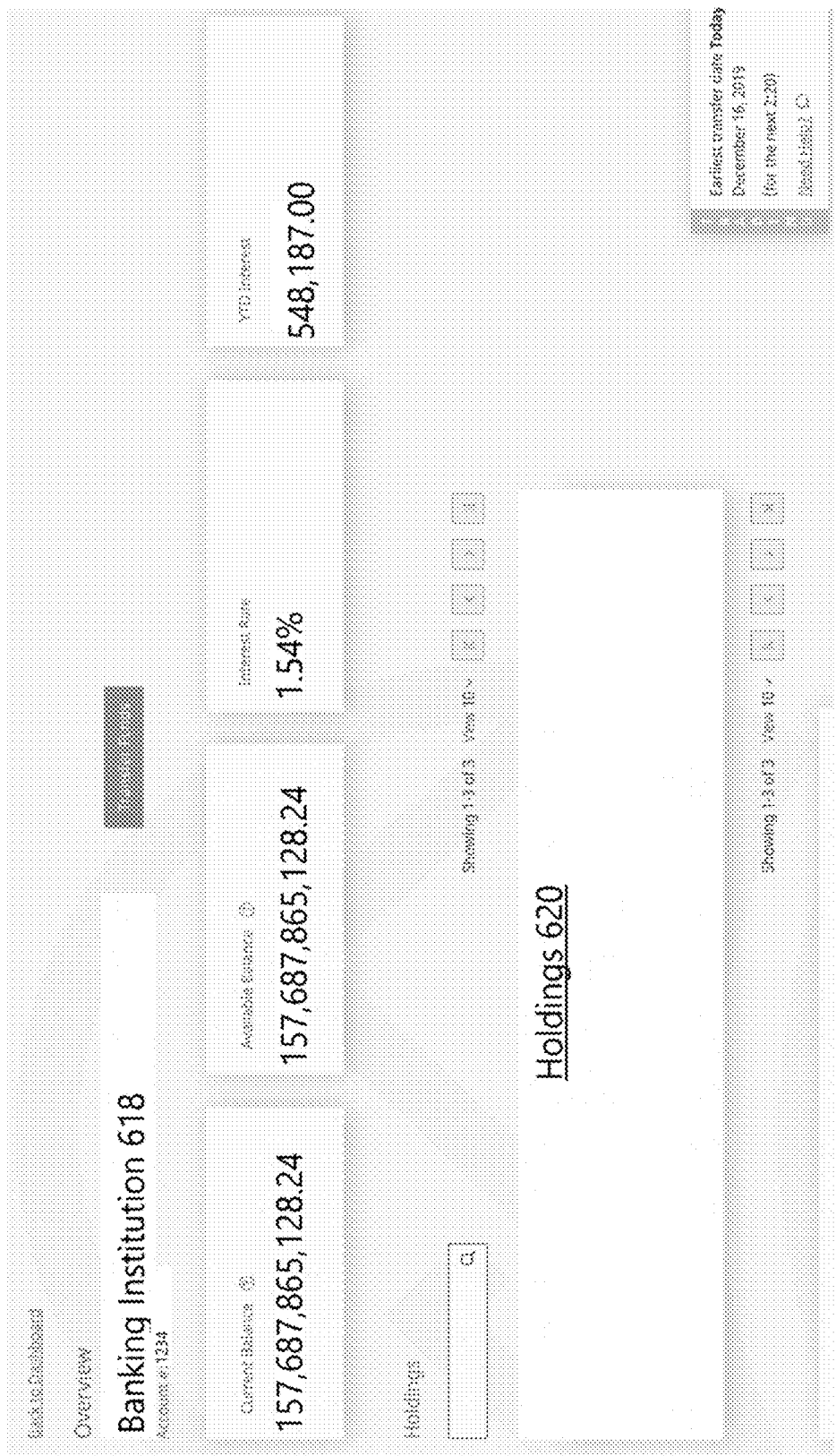
Figures 1, 2, 6D:
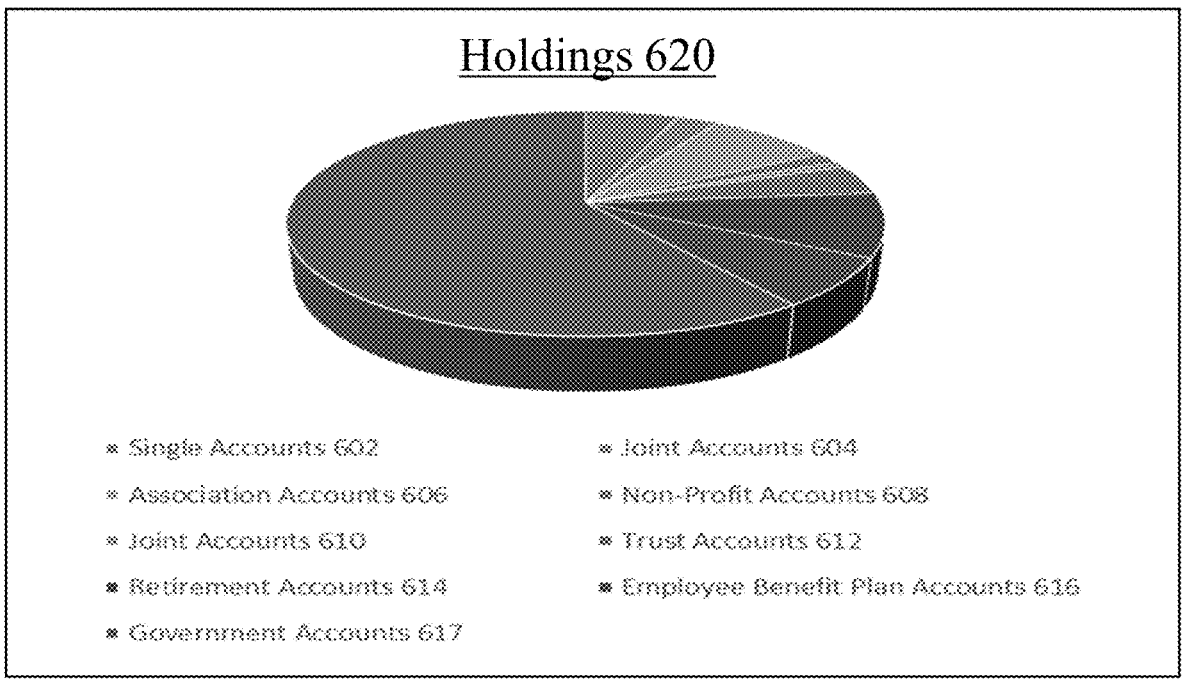

In embodiments, clients may access their account information using an electronic device capable of connecting to network 50 and displaying a graphical user interface. For example, as shown in FIG. 4A through FIG. 4B and FIG. 5, clients may set up an account by interacting with one or more graphical user interfaces of webpage. Referring to FIG. 6A, FIG. 6B and FIG. 6C, once an account is created, a customer 600 may view their account information. The client account information, as shown in FIG. 6A through FIG. 6C, may include the customer name—customer 600, a current balance, an available balance, an interest rate, and/or a year to date interest accrued, to name a few. In embodiments, referring to FIG. 6D, a banking institution 618 (e.g., a source institution, deposit institution, and/or a destination institution) may also be able to view its account information, which may include the banking institution's 618 holdings 620. In embodiments, holdings 620 may be displayed in a number of different manners, including by category. For example, referring to FIG. 6D-1, the holdings 620 may be displayed in table form, separated by client type—single accounts 602, joint accounts 604, association accounts 606, non-profit accounts 608, joint accounts 610, trust accounts 612, retirement accounts 614, employee benefit plan accounts 616, and/or government accounts 617. The information may further include location information, Ins #, and/or amount in holding. One skilled in the art would appreciate that other examples of client types may be used consistent with the spirit and scope of the present invention. As shown in FIG. 6D-2, holdings 620 may also be shown in pie chart form. For exemplary purposes, the information displayed in FIG. 6D-2 is a pie chart representing the amount held for each client type. The amount held, in this example, refers to the amounts shown in connection with FIG. 6D-1. Referring to FIG. 6D-3 and FIG. 6D-4, holdings 620 may further breakdown the holdings by country, state, amount, and/or percentage, to name a few.

FIG. 10A through 10B, are flow charts of an exemplary process for administering deposit accounts in accordance with various embodiments of the present invention. In embodiments, the steps depicted FIG. 10A through 10B can be performed by one or more computer systems configured to perform deposit administration, such as, for example, Deposit Administrator System (DAS) 120 depicted in FIG. 1A through FIG. 1C.

Referring now to the flow diagram shown in FIG. 10A, in embodiments, the process of FIG. 10A may begin with step S1002. At step S1002, in embodiments, DAS 120 may generate a web-based user interface at a first client computer associated with a first client account associated with a first client (e.g., web interfaces shown in connection with FIG. 4A through FIG. 4B, FIG. 5 and/or FIG. 6A through FIG. 6D). In embodiments, the process may continue with step S1004. At step S1004, in embodiments, the DAS 120 may receive, from the first client computer through the web-based user interface, a request to withdraw or transfer funds. In embodiments, the process may continue with step S1006. At step S1006, in embodiments, the DAS 120 may access one or more electronic databases stored on one or more computer-readable media to obtain aggregate account information and client account information. Step S1006 may be similar to step S1202 described above in connection with FIG. 12A through FIG. 12B, the description of which applying herein. In embodiments, the process may continue with step S1008. At step S1008, in embodiments, the DAS 120 may perform the following sub-steps for each client account associated with the client type of the first client. The process may continue, in embodiments, with sub-step S1008-1, where the DAS 120 may access a client available deposit amount, Di, for clients of the first common client type including funds to be distributed over Ni respective banks in a program. Step S1008-1 may be similar to step S1208-2 described above in connection with FIG. 12A through FIG. 12B, the description of which applying herein. The process may continue, in embodiments, with sub-step S1008-2, where the DAS 120 may determine a value of Ni destination institutions for the respective client account. In embodiments, step S1008-2 may be similar to step S1208-3, described above in connection with FIG. 12A through FIG. 12B, the description of which applying herein. The process may continue, in embodiments, with sub-step S1008-3, where the DAS 120 may allocate at least a portion of the respective client available deposit amount to each of the respective Ni banks determined for the client transaction amount. In embodiments, step S1008-3 may be similar to step S1208-4, described above in connection with FIG. 12A through FIG. 12B, the description of which applying herein.

Referring now to the flow diagram shown in FIG. 10B, in embodiments, the process of FIG. 10A may continue in FIG. 10B with step S1010. At step S1010, the DAS 120 may select for allocation, one or more of the aggregate deposit accounts and allocating the funds requested to be transferred or withdrawn to be met with funds in the Ni respective banks for the respective client account. In embodiments, step S1010 may be similar to step S1210 described above in connection with FIG. 12A through FIG. 12B, the description of which applying herein. The process of FIG. 10A through FIG. 10B, in embodiments, may continue with step S1012. At step S1012, in embodiments, the DAS 120 may generate data for transferring funds to or from the Ni banks in the program. In embodiments, step S1012 may be similar to steps S1212 and S1214 described above in connection with FIG. 12A through FIG. 12B, the description of which applying herein. In embodiments, the process may continue at step S1014. At step S1014, in embodiments, the DAS 120 may update the one or more of the electronic databases with update data for each of the more than one client accounts. Step S1014, in embodiments, may be similar to step S1216 described above in connection with FIG. 12A through FIG. 12B, the description of which applying herein.

In embodiments, the steps of the process described in connection with FIG. 10A and FIG. 10B may be rearranged or omitted.

Figure 11A:
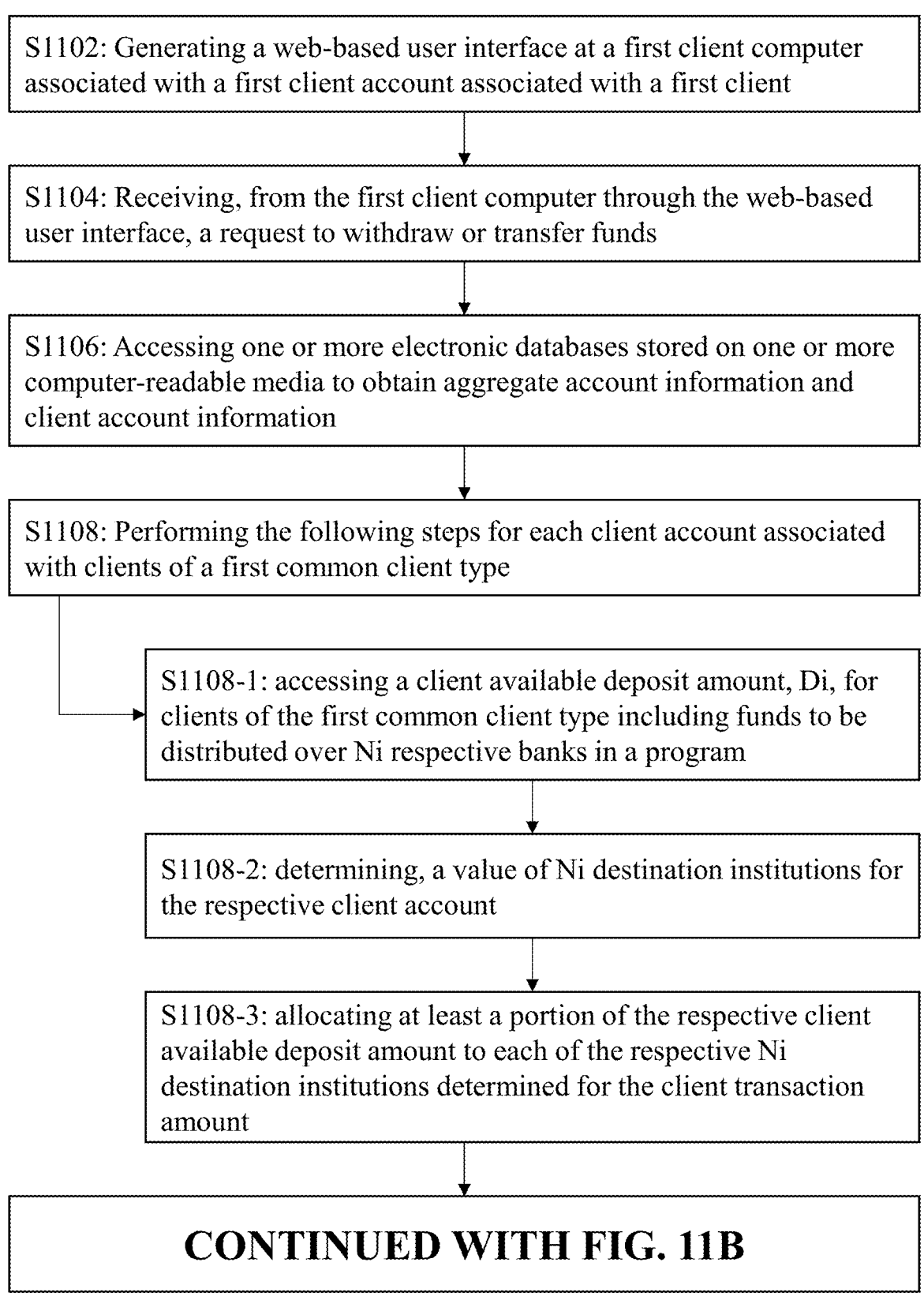

FIG. 11A through 11B, are flow charts of an exemplary process for administering deposit accounts in accordance with various embodiments of the present invention. In embodiments, the steps depicted FIG. 11A through FIG. 11B can be performed by one or more computer systems configured to perform deposit administration, such as, for example, Deposit Administrator System (DAS) 120 depicted in FIG. 1A through FIG. 1C.

Referring now to the flow diagram shown in FIG. 11A, in embodiments, the process of FIG. 11A may begin with step S1102. At step S1002, in embodiments, DAS 120 may generate a web-based user interface at a first client computer associated with a first client account associated with a first client (e.g., web interfaces shown in connection with FIG. 4A through FIG. 4B, FIG. 5 and/or FIG. 6A through FIG. 6D). In embodiments, the process may continue with step S1104. At step S1104, in embodiments, the DAS 120 may receive, from the first client computer through the web-based user interface, a request to withdraw or transfer funds. In embodiments, the process may continue with step S1106. At step S1106, in embodiments, the DAS 120 may access one or more electronic databases stored on one or more computer-readable media to obtain aggregate account information and client account information. Step S1106 may be similar to step S1202 described above in connection with FIG. 12A through FIG. 12B, the description of which applying herein. In embodiments, the process may continue with step S1108. At step S1108, in embodiments, the DAS 120 may perform the following sub-steps for each client account associated with the client type of the first client. The process may continue, in embodiments, with sub-step S1108-1, where the DAS 120 may access a client available deposit amount, Di, for clients of the first common client type including funds to be distributed over Ni respective banks in a program. Step S1108-1 may be similar to step S1208-2 described above in connection with FIG. 12A through FIG. 12B, the description of which applying herein. The process may continue, in embodiments, with sub-step S1108-2, where the DAS 120 may determine a value of Ni destination institutions for the respective client account. In embodiments, step S1008-2 may be similar to step S1208-3, described above in connection with FIG. 12A through FIG. 12B, the description of which applying herein. The process may continue, in embodiments, with sub-step S1108-3, where the DAS 120 may allocate at least a portion of the respective client available deposit amount to each of the respective Ni banks determined for the client transaction amount. In embodiments, step S1108-3 may be similar to step S1208-4, described above in connection with FIG. 12A through FIG. 12B, the description of which applying herein.

Referring now to the flow diagram shown in FIG. 11B, in embodiments, the process of FIG. 11A may continue in FIG. 11B with step S1110. At step S1110, the DAS 120 may select for allocation, one or more of the aggregate deposit accounts and allocating the funds requested to be transferred or withdrawn to be met with funds in the Ni respective banks for the respective client account. In embodiments, step S1110 may be similar to step S1210 described above in connection with FIG. 12A through FIG. 12B, the description of which applying herein. The process of FIG. 11A through FIG. 11B, in embodiments, may continue with step S1012. At step S1112, in embodiments, the DAS 120 may generate data for transferring funds to or from the Ni banks in the program. In embodiments, step S1112 may be similar to steps S1212 and S1214 described above in connection with FIG. 12A through FIG. 12B, the description of which applying herein. In embodiments, the process may continue at step S1114. At step S1114, in embodiments, the DAS 120 may update the one or more of the electronic databases with update data for each of the more than one client accounts. Step S1114, in embodiments, may be similar to step S1216 described above in connection with FIG. 12A through FIG. 12B, the description of which applying herein.

In embodiments, the steps of the process described in connection with FIG. 11A through FIG. 11B may be rearranged or omitted.

Embodiments of the invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general-purpose computing device in the form of a computer, including a processing unit, a system memory, and a system bus that couples various system components including the system memory to the processing unit. The system memory may include read only memory (ROM) and random-access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

In embodiments, a method comprises: (A) accessing, by a deposit administrator computer system, one or more electronic databases stored on one or more computer-readable media operably connected to the deposit administrator computer system, the one or more electronic databases comprising: (1) deposit account information for a first deposit account comprising a plurality of sub-accounts, wherein the first deposit account is an aggregated deposit account, wherein the first deposit account is federally-insured, wherein the first deposit account is interest bearing, wherein the first deposit account is held in a first bank in a program associated with a first source institution, wherein each sub-account of the plurality of sub-accounts holds funds associated with a plurality of ownership interests of a respective client type of a plurality of client types wherein the deposit account information comprises: (i) a total balance of funds of the first deposit account; (ii) sub-account balance of funds information comprising, for each sub-account of the plurality of sub accounts, a respective sub-account balance and a respective sub-account reserve balance; (iii) a first reserve balance for a reserve of the first deposit account; (iv) contact information for the first bank; and (v) call report information for the first deposit account, wherein the call report information comprises: (a) transaction information regarding the first deposit account over a predetermined amount of time; (b) reserve information regarding the reserve over the predetermined amount of time; and (c) investment information regarding one or more investments of a portion of the total balance of funds over the predetermined amount of time; wherein the balance comprises a plurality of ownership interests, each ownership interest of the plurality of ownership interests being associated with: (i) a respective client of the first source institution; (ii) a respective client account associated with the respective client; (iii) a respective client balance of funds held in the respective client account; (iv) one or more respective clients of the first source institution; and (v) a respective client type of the plurality of client types wherein the sum of each respective client balance of funds is equal to the total balance of funds, and wherein each of the one or more respective clients is associated with the respective client type; (2) source account information associated with the first deposit account comprising: (i) the total balance of funds; (ii) the plurality of ownership interests; (iii) client type information associated with the plurality of ownership interests; and (iv) contact information for the first source institution; and (3) reserve requirement information comprising a respective reserve requirement for each of the plurality of client types; (B) determining, by the deposit administrator system, a number of ownership interests of the total balance of funds of the first deposit account, wherein the number of ownership interests is equal to the plurality of ownership interests; (C) performing, by the deposit administrator, the following steps for each ownership interest: (1) determining, by the deposit administrator computer system, a respective client balance of funds held in a respective sub-account of the first deposit account; (2) calculating, by the deposit administrator, a respective client balance percentage by dividing the respective client balance of funds by a respective balance of funds held in the respective sub-account; (3) determining, by the deposit administrator computer system, a respective client type for a respective ownership interest of the plurality of ownership interests; (4) assigning, by the deposit administrator computer system, the respective client type to at least one of the following: (a) the respective sub-account; (b) the respective client balance; and (c) the respective client balance percentage; (5) accessing, by the deposit administrator computer system, the one or more electronic databases to determine a respective reserve requirement for the respective client type; and (6) calculating, by the deposit administrator computer system, a respective reserve balance requirement for the respective client balance of funds in accordance with the respective reserve requirement; (D) performing by the deposit administrator, the following steps for each sub-account of the plurality of sub-accounts: (1) accessing, by the deposit administrator computer system, the one or more electronic databases to determine at least: (a) a respective sub-account balance associated with a respective sub-account; and (b) a respective client type associated with the respective sub-account; (2) determining, by the deposit administrator computer system, a value N sub-accounts of the plurality of sub-accounts that are associated with the respective client type; (3) determining, by the deposit administrator computer system, respective sub-account transaction information by accessing the one or more electronic databases to obtain the transaction information regarding the first deposit account over the predetermined amount of time, wherein the respective sub-account transaction information comprises each transaction associated with the respective sub-account over the predetermined amount of time; (4) determining, by the deposit administrator computer system, a respective sub-account balance requirement by accessing the one or more electronic databases to obtain the sub-account balance of funds information; (5) allocating, by the deposit administrator computer system, at least a portion of respective sub-account balance, wherein the at least a portion of the respective sub-account balance comprises a respective client bank distribution amount allocated to each of the respective N sub-accounts, wherein the at least a portion of the respective sub-account balance is allocated is in accordance with the respective sub-account transaction information and the respective sub-account balance requirement; (6) selecting for allocation, by the deposit administrator computer system, one or more of the N sub-accounts such that transfers associated with the respective sub-account transaction information are met with funds from respective sub-account in accordance with the respective sub-account balance requirement; and (7) generating, by the deposit administrator computer system, data for transferring funds to or from the N sub-accounts of the first deposit account; (E) determining, by the deposit administrator computer system, a breakdown of the total balance of funds such that the breakdown includes a respective percentage of the total balance of funds associated with each determined client type; (F) determining, by the deposit administrator computer system, a second reserve balance for the first deposit account by calculating the sum of each of the calculated respective balance requirements; (G) updating, by the deposit administrator system, the call report information for the first deposit account to include: (1) the breakdown; and (2) the second reserve balance; (H) generating, by the deposit administrator computer system, a call report including the updated call report information; (I) transmitting the call report to the first bank; and (J) updating, by the deposit administrator computer system, the deposit account information and the source account information in the one or more of the electronic databases based, at least in part, on step (C) and step (D).

In embodiments, a method comprises: (A) accessing, by a deposit administrator computer system, one or more electronic databases stored on one or more computer-readable media operably connected to the deposit administrator computer system, the one or more electronic databases comprising: (1) deposit account information for a first federally-insured, interest bearing deposit account ("First Deposit Account") held in a first bank in a program associated with a first source institution, wherein the deposit account information comprises: (i) a balance of funds of the First Deposit Account; (ii) a first reserve balance for a reserve of the First Deposit Account; (iii) contact information for the first bank; and (iv) call report information for the First Deposit Account, wherein the call report information comprises: (a)

transaction information regarding the First Deposit Account over a predetermined amount of time; (b) reserve information regarding the reserve over the predetermined amount of time; and (c) investment information regarding one or more investments of a portion of the balance of funds over the predetermined amount of time; wherein the balance comprises a plurality of ownership interests, each ownership interest of the plurality of ownership interests being associated with: (i) a respective client of the first source institution; (ii) a respective client account associated with the respective client; (iii) a respective client balance of funds held in the respective client account; (iv) one or more respective clients of the first source institution; and (v) a respective client type of a plurality of client types wherein the sum of each respective client balance of funds is equal to the balance of funds, and wherein each of the one or more respective clients is associated with the respective client type; (2) source account information associated with the First Deposit Account comprising: (i) the balance of funds; (ii) the plurality of ownership interests; (iii) client type information associated with the plurality of ownership interests; and (iv) contact information for the first source institution; and (3) reserve requirement information comprising a respective reserve requirement for each of the plurality of client types; (B) determining, by the deposit administrator system, a number of ownership interests of the balance of funds of the First Deposit Account, wherein the number of ownership interests is equal to the plurality of ownership interests; (C) performing, by the deposit administrator, the following steps for each ownership interest: (1) determining, by the deposit administrator computer system, a respective client balance of funds held in the First Deposit Account; (2) calculating, by the deposit administrator, a respective client balance percentage by dividing the respective client balance of funds by the balance of funds, wherein the plurality of ownership interests is associated with a plurality of client balance percentages, wherein each ownership interest of the plurality of ownership interests is associated with a client balance percentage of the plurality of client balance percentages, and wherein the sum of each of the plurality of ownership interests is one; (3) determining, by the deposit administrator computer system, a respective client type for a respective ownership interest of the plurality of ownership interests; (4) assigning, by the deposit administrator computer system, the respective client type to at least one of the following: (a) the respective client balance; and (b) the respective client balance percentage; (5) accessing, by the deposit administrator computer system, the one or more electronic databases to determine a respective reserve requirement for the respective client type; and (6) calculating, by the deposit administrator computer system, a respective reserve balance requirement for the respective client balance of funds in accordance with the respective reserve requirement; (D) determining, by the deposit administrator computer system, a breakdown of the balance of funds such that the breakdown includes a respective percentage of the balance of funds associated with each determined client type; (E) determining, by the deposit administrator computer system, a second reserve balance for the First Deposit Account by calculating the sum of each of the calculated respective balance requirements; (F) updating, by the deposit administrator system, the call report information for the First Deposit Account to include: (1) the breakdown; and (2) the second reserve balance; (G) generating, by the deposit administrator computer system, a call report including the updated call report information; (H) transmitting the call report to the first bank; and (I) updating, by the deposit administrator computer system, the deposit account information and the source account information in the one or more of the electronic databases based, at least in part, on step (C).

In embodiments, a method may comprise: (A) accessing, by a deposit administrator computer system, one or more electronic databases stored on one or more computer-readable media operably connected to the deposit administrator computer system, the one or more electronic databases comprising: (1) aggregated account information for a first plurality of Federal Deposit Insurance Corporation (FDIC)-insured and interest-bearing aggregated deposit accounts ("First Deposit Accounts") held in a plurality of banks, N, in a program associated with one or more source institutions, wherein each of the First Deposit Accounts in the program is associated with: (i) a respective client type of a plurality of client types; and (ii) a respective category of the respective client type, such that all funds held in each of the First Deposit Accounts are from clients associated with a same category of a same client type, and none of the funds held in the respective FDIC-insured and interest-bearing aggregated deposit account are associated with one or more different client types of the plurality of client types, so that each of the plurality of banks in the program has a second plurality of Federal Deposit Insurance Corporation (FDIC)-insured and interest-bearing aggregated deposit accounts ("Second Deposit Accounts") in the program, wherein each respective aggregated deposit account of the Second Deposit Accounts in the program associated with a different category of client type, wherein the aggregated account information comprises a respective balance of funds held in each of the First Deposit Accounts, and wherein each client type of the plurality of client types includes one or more categories associated with said client type; (2) client account information for each respective client account of a plurality of client accounts associated with the First Deposit Accounts and one or more source institutions participating in the program, the client account information for each respective client account comprising: (i) a respective balance of funds of the respective client account held in each of one or more accounts of the First Deposit Accounts, wherein the one or more accounts holds funds of the respective client account; and (ii) client type information indicating: (a) a client type associated with the respective client; and (b) a category associated with the client type associated with the respective client; (B) obtaining, by the deposit administrator computer system, client account transaction information for each of a third plurality of Federal Deposit Insurance Corporation (FDIC)-insured and interest-bearing aggregated deposit accounts ("Third Deposit Accounts") of the plurality of client accounts of the one or more source institutions participating in the program, (C) determining, by the deposit administrator computer system, a net transfer amount for each of the one or more source institutions over one or more sub-periods of time based on at least the client account transaction information, wherein the one or more sub-periods of time is associated with the client account transaction information; (D) performing the following steps for each of the Third Deposit Accounts associated with clients of a same client type of the plurality of client types: (1) determining, by the deposit administrator computer system, a respective client type of the plurality of client types for a respective client account of the plurality of client accounts, wherein the deposit administrator computer system assigns the determined respective client type to the respective client account; (2) accessing, by the deposit administrator computer system, a respective client available deposit amount, Di, for the respective client account comprising funds to be distributed over Ni respective banks in the program, where Ni is a whole number having a value of at least 1; (3) determining, by the deposit administrator computer system, a value of Ni banks for the respective client account, based at least on the respective client available deposit amount, Di; and (4) allocating, by the deposit administrator computer system, a client bank distribution amount, BNi to each of the determined Ni respective banks, wherein the respective client bank distribution amount, BNi is at least a portion of the respective client available deposit amount, Di, and wherein the respective client bank distribution amount, BNi does not exceed a predetermined amount in each of the Ni respective banks; (E) selecting for allocation, by the deposit administrator computer system, the one or more accounts of the First Deposit Accounts, wherein the selected one or more accounts hold funds from client accounts associated with clients of the same client type and are held in the Ni respective banks for the respective client account and allocating the net transfer amount for each of the one or more source institutions to be met with funds in the Ni respective banks for the first respective client account; (F) generating, by the deposit administrator computer system, transfer instructions to transferring funds to the selected one or more accounts held in the plurality of banks or from the selected one or more accounts held in the plurality of banks, wherein the selected one or more accounts are held in one or more respective banks in the program based at least on the allocating step; (G) transmitting the transfer instructions to the one or more respective banks; and (H) updating, by the deposit administrator computer system, the client account information and the aggregated account information in the one or more of the electronic databases based, at least in part, on the allocating and generating steps.

In embodiments, the plurality of client types comprises at least one or more of the following: (a) single accounts; (b) certain retirement accounts; (c) joint accounts; (d) revocable trust accounts; (e) irrevocable trust accounts; (f) employee benefit plan accounts; (g) association accounts; and (h) government accounts. In embodiments, association accounts client type include one or more of the following: 1. corporate accounts; 2. partnership accounts; and 3. unincorporated accounts.

In embodiments, the First Deposit Accounts comprise accounts of an account type selected from the group consisting of: (1) demand deposit account (DDA); (2) money market deposit accounts (MMDA); (3) MMDA-DDA pair accounts; (4) negotiable order of withdrawal accounts (NOW); and (5) certificate of deposit accounts.

In embodiments, the plurality of client accounts comprises accounts, each of the accounts associated with one or more of the following account types: (1) FDIC-insured accounts; (2) interest-bearing accounts; (3) FDIC-insured and interest-bearing accounts; (4) money fund accounts; and (5) municipal bond accounts.

In embodiments, the method disclosed may include in step (D)(2), (X) times (Ni) is less than 100, where X is a distribution percent value to be distributed to each of the Ni banks for the respective client account. In embodiments, the method disclosed may include, in step (D)(3), the portion of the respective client available deposit amount, Di, is determined in accordance with the percentage, X.

In embodiments, the predetermined amount is the FDIC-insured limit.

In embodiments, the predetermined amount is less than the FDIC-insured limit.

In embodiments, the client account transaction information comprises: (1) balance information of the plurality of client accounts.

In embodiments, the client account transaction information comprises: (1) credit information applied to each of the plurality of client accounts for the one or more sub-periods of time.

In embodiments, the client account transaction information comprises: (1) debit information applied against each of the plurality of client accounts for the one or more sub-periods of time.

In embodiments, the step of selecting for allocation is based on one or more selection criteria. In embodiments, the one or more selection criteria comprises: (1) client preference information, wherein the client preference information comprises a respective client's bank preference; and (2) client exclusion information, wherein the client exclusion information comprises a list of banks in the program that the respective client prefers to not have funds deposited therein. In embodiments, one of the one or more selection criteria comprises an affiliation of the Ni respective banks. In embodiments, one of the one or more selection criteria comprises: (1) a client selection of one of the banks of the plurality of banks, N, participating in the program; or (2) a client exclusion of one of the banks of the plurality of banks, N, participating in the program. In embodiments, the one or more selection criteria comprises at least one of: (1) a capacity of the respective bank and; (2) a balance sheet of the Ni respective banks. In embodiments, one of the one or more selection criteria comprises a deposit amount from the Ni respective banks held in other of the plurality of banks, N, participating in the program.

In embodiments, the one or more of the electronic databases further includes: (1) client preference information associated with one or more client accounts of the plurality of client accounts, wherein the client preference information comprises a respective client's bank preference; and (2) client exclusion information associated with one or more client accounts of the plurality of client accounts, wherein the client exclusion information comprises a list of banks in the program that the respective client prefers to not have funds deposited therein; and wherein selecting for allocation, by the deposit administrator computer system, the one or more accounts of the First Deposit Accounts is based at least in part on the client preference information and the client exclusion information.

In embodiments, the determination of the respective client type is based on the client type information.

In embodiments, the method disclosed further comprises: (I) generating, by the deposit administrator computer system, a plurality of reports of the updated client account information and the aggregate account information, wherein the plurality of reports comprises a unique report comprising information associated with a respective recipient of a plurality of recipients of the report; and (J) transmitting, by the deposit administrator computer system to each recipient of the plurality of recipients, a respective report associated with the respective recipient, wherein the plurality of recipients comprises at least one of the following: (i) the plurality of banks, N, participating in the program; (ii) the one or more source institutions; and (iii) clients of the one or more source institutions.

In embodiments, the method disclosed further comprises: (I) receiving, by the deposit administrator computer system from at least one of the one or more respective banks, a confirmation message indicating the transfer instructions were executed.

In embodiments, the method disclosed further comprises: (I) verifying, by the deposit administrator computer system, the transfer instructions were executed by the one or more respective banks.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method, comprising:
   A) accessing, by a deposit administrator system comprising one or more computers wherein the deposit administrator system is arranged to be in electronic communication with depository institutions and programmed with computer-readable code to perform operations to transfer, allocate, or track funds between one or more source institutions and one or more destination institutions, one or more databases comprising:
      (1) depository institution information for each depository institution of a plurality of depository institutions participating in a program, the depository information including for each depository institution:
         (i) respective institution balance of funds information indicating a total amount of funds held by each respective depository institution;
         (ii) respective institution target deposit information indicating a deposit target amount of total deposits to be held by each respective depository institution;
         (iii) respective client type target information indicating a total deposit target amount for each respective client type to be held by each respective depository institution; and
         (iv) respective client type balance information indicating a total amount of funds of a respective client type held by each respective depository institution;
      (2) aggregated deposit account information for each of a plurality of aggregated deposit accounts held in the plurality of depository institutions participating in the program, each of the respective depository institutions holding one or more of the aggregated deposit accounts, each of the aggregated deposit accounts holding funds of a plurality of client accounts associated with a plurality of clients, wherein the aggregated deposit account information comprises for each aggregated deposit account:
         (i) a respective aggregate account balance of funds held in each of the respective aggregated deposit accounts;
         (ii) a respective aggregated deposit account target balance for each of the aggregated deposit accounts;
         (iii) client account information for each client account of the plurality of client accounts, the client account information for each client account comprising:
            (1) a respective client balance of funds associated with each client;
            (2) a respective balance of funds of each client account held in each aggregated deposit account;
            (3) client type information indicative of a respective client type for each client account of the plurality of client accounts, wherein the plurality of client types includes at least municipal client and individual government insured client; and
            (4) client transaction information indicating all transactions associated with each client account of the plurality of client accounts;
         (iv) total client type deposit information indicating a total amount of funds associated with each respective client type of the plurality of client types;
   B) obtaining with the deposit administrator system, using the one or more computers, transaction data, wherein the transaction data is related to transactions associated with the plurality client accounts during a first time period;
   C) determining with the deposit administrator system, using the one or more computers, a first net amount of funds to deposit into and/or withdraw from the plurality of client accounts during the first time period based on the transaction data;
   D) determining with the deposit administrator system, using the one or more computers, a respective updated balance of funds of each client account based on the respective balance of funds for each client account and respective transactions associated with the respective client account during the first time period;
   E) determining with the deposit administrator system, using the one or more computers, respective updated total client type deposit information for each respective client type;
   F) allocating with the deposit administrator system, using the one or more computers, funds associated with the plurality of client accounts, the allocating step including:
      (i) determining an updated respective aggregate account balance of funds for each aggregated deposit account of the plurality of aggregated deposit accounts by:
         (a) identifying one or more of the plurality of aggregated deposit accounts to deposit into and/or withdrawal from the first net amount of funds and a respective transfer amount for each of the identified one or more of the plurality of aggregated deposit accounts based on:
            (1) respective institution balance of funds information for each respective depository institution;
            (2) respective institution target deposit information for each respective depository institution; and
            (3) the first net amount of funds;
         wherein the sum of the respective transfer amounts for each of the identified one or more aggregated deposit accounts is equal to the first net amount of funds, and wherein the respective institution balance of funds information plus the respective transfer amount for each of the identified one or more of the plurality of aggregated deposit accounts associated with the respective depository institution is in compliance with the respective institution target deposit information;

(b) calculating an updated respective institution balance amount for each depository institution by summing the respective institution balance amount and the respective transfer amounts associated with the respective one or more aggregated deposit accounts associated with each respective depository institution, wherein the respective transfer amounts is zero if there is no transfer, positive it there is a deposit, and negative if there is a withdrawal;

(ii) allocating respective client funds associated with each of the respective client accounts among the plurality of aggregated deposit accounts by:

(a) allocating client funds associated with municipal clients among the plurality of aggregated deposit accounts based on:
  (1) the respective updated total client type deposit information associated with municipal clients;
  (2) the respective client type target information for municipal clients for each depository institution, including the respective available collateral information for each depository institution; and
  (3) the updated respective institution balance amount for each depository institution;

wherein the sum of each respective updated total client type deposit information for each of the plurality of aggregated deposit accounts is equal to the respective updated total client type deposit information, and wherein each respective updated total client type deposit information for each of the plurality of aggregated deposit accounts is in compliance with the respective client type target information, including the respective available collateral information for each depository institution, and wherein each respective updated total client type deposit information for each aggregated deposit account is less than the updated respective institution balance amount for each depository institution;

(b) for each of the remaining client types, allocating the client hinds associated with each respective client type other than the client type that associated with municipal clients for the respective updated total client type deposit information among the plurality of aggregated deposit accounts based on:
  (1) the respective updated total client type deposit information;
  (2) the respective client type target information for each depository institution;
  (3) the updated respective institution balance amount for each depository institution; and
  (4) a respective remaining available institution balance amount for each depository institution;

wherein the respective remaining available institution balance amount of each respective depository institution is the difference between the updated respective institution balance for the respective depository institution and a respective updated total client type deposit information for the respective aggregated deposit accounts that has already been assigned to the respective aggregated deposit account, wherein, at the end of the allocation process, each respective updated total client type deposit information for each of the plurality of aggregated deposit accounts is in compliance with the respective client type target information, and wherein, throughout the allocation processes of step F), the sum of each respective updated total client type deposit information for each of the plurality of aggregated deposit accounts is equal to or less than the respective updated total client type deposit information, and wherein, at the end of the allocation process of step F), the sum of each respective updated total client type deposit information for each aggregated deposit account is equal to the updated respective institution balance amount for each depository institution;

(iii) updating the depository institution information and the aggregated deposit account information based on the allocating step F);

G) generating with the deposit administrator system, using the one or more computers, one or more instructions to transfer funds to or from at least one of the aggregated deposit accounts in accordance with the transfer amounts;

H) sending the one or more instructions to transfer funds to the respective one depository institution of the plurality of deposit institutions, where the respective transfer amounts are not zero;

I) generating with the deposit administrator system, using the one or more computers, for each respective depository institution a respective report based on information from the one or more databases reflecting the updated balance of funds held in each respective aggregated deposit account associated with the respective depository institution and the respective updated balance of funds associated with each client type of plurality of client types for the aggregated deposit accounts associated with the respective depository institution; and J) sending with the deposit administrator system, using the one or more computers, the respective report to each respective depository institution.

2. The method of claim 1, wherein one or more of the plurality of aggregated accounts are each insured by one or more of the following:
  (1) the Federal Deposit Insurance Corporation;
  (2) the National Credit Union Administration;
  (3) one or more letters of credits from a Federal Home Loan Bank;
  (4) the Federal Savings and Loan Insurance Corporation; and
  (5) Securities Investor Protection Corporation.

3. The method of claim 1, wherein the plurality of client types further comprises:
  (i) single accounts;
  (ii) retirement accounts;
  (iii) joint accounts;
  (iv) revocable trust accounts;
  (v) irrevocable trust accounts;
  (vi) employee benefit plan accounts;

(vii) corporation accounts;
(viii) partnership accounts;
(ix) unincorporated accounts;
(x) government accounts;
(xi) municipalities;
(xii) villages;
(xiii) countries; and
(xiv) pension accounts.

4. The method of claim 1, wherein the client account information for each client account, further comprises:
(5) geographic origin information indicating a respective location associated with the respective client associated with the respective client account.

5. The method of claim 4, wherein allocating client funds associated with municipal clients among the plurality of aggregated deposit accounts is further based on:
(4) respective geographic location for municipal clients for each depository institution,
wherein the client funds associated with municipal clients is segregated such that client funds from respective locations that are the same are held together.

6. The method of claim 1, wherein one or more of the plurality of depository institutions each comprise one or more of the following:
(i) non-FDIC insured investment vehicles;
(ii) one or more mutual funds;
(lii) one or more ETF s;
(iv) one or more exchange traded notes (ETNs);
(v) one or more stable value funds;
(vi) one or more index funds;
(vii) one or more treasury bonds;
(viii) one or more stocks;
(ix) one or more bonds; and
(x) one or more notes.

7. The method of claim 1, wherein the respective aggregated deposit account target balance for a municipal deposit client type to be held by the respective depository institution comprises:
(a) a respective collateral maximum indicating a maximum amount of collateralized funds associated with the municipal deposit client type available for deposit at the respective depository institution; and
(b) a respective non-collateral maximum indicating a maximum amount of non-collateralized funds associated with the municipal deposit client type available for deposit at the respective depository institution.

8. The method of claim 1, wherein the respective aggregated deposit account target balance for a municipal deposit client type to be held by the respective depositor institution comprises:
(a) a respective maximum target total deposit amount for the municipal deposit client type to be held by the respective depository institution.

9. The method of claim 1, wherein the respective aggregated deposit account target balance for a municipal deposit client type to be held by the respective depository institution comprises:
(a) a respective target number indicating a total deposit target amount for the municipal deposit client type to be held by the respective depository institution.

10. The method of claim 1, wherein the respective aggregated deposit account target balance for a municipal deposit client type to be held by the respective depository institution comprises:
(a) a respective client type percentage indicating a respective target percentage of the respective deposit target amount for the municipal deposit client type.

11. The method of claim 1, wherein the identification of the one or more of the plurality of aggregated deposit accounts in step F)(i)(a) is further based on:
(4) respective number of withdraws of funds information for each respective aggregated deposit account of each respective depository institution,
wherein each respective number of withdraws of funds information comprises:
(a) a number of withdrawals of funds over a predetermined amount of time for the respective aggregated deposit account; and
(b) a maximum allotted number of withdrawals over the predetermined amount of time for the respective aggregated deposit account,
wherein the identified one or more of the plurality of aggregated deposit accounts, after the allocation, remain in compliance with respective number of withdraws of funds information for each respective aggregated deposit account.

12. The method of claim 1, wherein the identification of the one or more of the plurality of aggregated deposit accounts in step F)(i)(a) is further based on:
(4) affiliation information for each respective aggregated deposit account of each respective depository institution,
wherein the affiliation information for each respective aggregated deposit account indicates an associated with the program, and
wherein the one or more aggregated deposit accounts identified comprise one or more of the plurality of aggregated deposit accounts associated with the program such that all of the plurality of aggregated pre-designated deposit accounts associated with the program are identified before an aggregate deposit account not associated with the program is identified.

13. The method of claim 1, wherein the identification of the one or more of the plurality of aggregated deposit accounts in step F)(i)(a) is further based on:
(4) transaction fee information for each respective aggregated deposit account of each respective depository institution,
wherein the transaction fee information, for each respective aggregated deposit account, comprises a respective amount of fees charged for transactions associated with the respective aggregated deposit account, and
wherein the one or more of the plurality of aggregated accounts were identified by:
(a) minimizing a sum of transaction fees associated with the one or more of the plurality of aggregated deposit accounts; and
(b) maintaining compliance with the institution target deposit information.

14. The method of claim 1, wherein the identification of the one or more of the plurality of aggregated deposit accounts in step F)(i)(a) is further based on:
(4) interest information for each respective aggregated deposit account of each respective depository institution,
wherein the interest information, for each respective aggregated deposit account, comprises a respective interest rate associated with the respective aggregated deposit account, and
wherein the one or more of the plurality of aggregated accounts were identified by (a) minimizing a first combined interest rate of the one or more aggregated deposit accounts identified for deposit, wherein the first combined interest rate is a first average of each respective interest rate associated with each of the one or more aggregated deposit accounts identified for deposit;

(b) minimizing a second combined interest rate of the one or more aggregated deposit accounts identified for withdrawal, wherein the second combined interest rate is a second average of each respective interest rate associated with each of the one or more aggregated deposit accounts identified for withdrawal; and (c) maintaining compliance with the institution target deposit information.

15. The method of claim 1, wherein, the allocating client funds associated with municipal clients among the plurality of aggregated deposit accounts is further based on:

(4) the respective aggregated deposit account balance of funds held in each of the respective aggregate accounts such that each aggregate account balance of funds held in each of the respective aggregate accounts does not exceed a predetermined amount of funds.

16. The method of claim 15, wherein the predetermined amount of funds is associated with an insurance limit.

17. The method of claim 15, wherein the insurance limit is associated with Federal Deposit Insurance Corporation.

18. The method of claim 15, wherein the insurance limit is associated with Federal Savings and Loan insurance Corporation.

19. The method of claim 15, wherein the insurance limit is associated with Securities Investor Protection Corporation.

20. The method of claim 1, wherein, the allocating client funds associated with municipal clients among the plurality of aggregated deposit accounts is further based on:

(4) respective client balance of funds for each client associated with the client funds associated with municipal clients such that client funds associated with clients having a larger client fund balance are allocated before client funds associated with clients having a lesser client fund balance.

* * * * *